United States Patent [19]

Rast

[11] Patent Number: 4,710,956

[45] Date of Patent: Dec. 1, 1987

[54] CABLE TELEVISION SYSTEM

[75] Inventor: Robert M. Rast, Englewood, Colo.

[73] Assignee: American Television & Communications Corporation, Englewood, Colo.

[21] Appl. No.: 4,850

[22] Filed: Jan. 12, 1987

Related U.S. Application Data

[63] Continuation of Ser. No. 616,412, May 31, 1984.

[51] Int. Cl.[4] .......... H04N 7/167

[52] U.S. Cl. .......... 380/20; 358/86; 358/349; 380/10; 380/12

[58] Field of Search .......... 380/20; 358/86

[56] References Cited

U.S. PATENT DOCUMENTS

| | | | |
|---|---|---|---|
| 3,050,712 | 8/1962 | Bruck | 340/150 |
| 3,230,302 | 1/1966 | Bruck | 178/5.1 |
| 3,387,082 | 6/1968 | Farber | 178/6 |
| 3,668,307 | 6/1972 | Face et al. | 178/5.6 |
| 3,733,430 | 5/1973 | Thompson | 178/5.1 |
| 3,757,035 | 9/1973 | Sullivan | 178/6 |
| 3,786,424 | 1/1974 | McVoy et al. | 340/151 |
| 3,803,491 | 4/1974 | Osborn | 325/53 |
| 3,805,234 | 4/1974 | Masters | 340/146.1 |
| 3,859,596 | 1/1975 | Jannery | 325/31 |
| 3,987,397 | 10/1976 | Belcher et al. | 325/308 |
| 3,990,012 | 11/1976 | Karnes | 325/308 |
| 3,993,955 | 11/1976 | Belcher et al. | 325/308 |
| 4,002,843 | 1/1977 | Rackman | 179/15 AL |
| 4,030,072 | 6/1977 | Bjornsson | 340/172.5 |
| 4,082,922 | 4/1978 | Chu | 179/15 BA |
| 4,118,669 | 10/1978 | Fung | 325/309 |
| 4,135,157 | 1/1979 | den Toonder | 325/308 |
| 4,156,847 | 5/1979 | Tazawa et al. | 325/308 |
| 4,290,142 | 9/1981 | Schnee et al. | 455/3 |
| 4,322,854 | 3/1982 | Bundens | 455/5 |
| 4,343,042 | 8/1982 | Schrock | 455/5 |
| 4,351,059 | 9/1982 | Gregoire | 375/10 |
| 4,361,903 | 11/1982 | Ohta | 455/2 |
| 4,450,481 | 5/1984 | Dickinson | 358/114 |
| 4,455,538 | 6/1984 | Toriumi | 358/86 |
| 4,466,001 | 8/1984 | Moore et al. | 340/825.08 |
| 4,475,123 | 10/1984 | Dumbauld et al. | 358/114 |
| 4,484,218 | 11/1984 | Boland | 358/86 |
| 4,494,111 | 1/1985 | Rocci et al. | 340/533 |
| 4,520,508 | 5/1985 | Reichert, Jr. | 455/4 |
| 4,530,008 | 7/1985 | McVoy | 358/123 |
| 4,533,948 | 8/1985 | McNamara | 358/122 |
| 4,599,647 | 7/1986 | George et al. | 380/20 |

FOREIGN PATENT DOCUMENTS

| | | |
|---|---|---|
| 0019287 | 11/1980 | European Pat. Off. . |
| 0103432 | 3/1984 | European Pat. Off. . |

OTHER PUBLICATIONS

"Mini-Hub Addressable Distribution System for Hi--Rise Application", M. F. Mesiya, IEEE 1982.

"Application Note Deltakabel Starnetwork Coaxial Version", by DeltaKabel bv Cable Television in Broadband Systems, by DeltaKabel bv.

"Mini-Star Network with Selection Facilities and Computer Control", by DeltaKabel by.

(List continued on next page.)

*Primary Examiner*—Stephen C. Buczinski

*Attorney, Agent, or Firm*—Laurence S. Rogers; Jeffrey H. Ingerman

[57] ABSTRACT

A cable television system and method in which each subscriber's converter is located outside the subscriber's premises in an external control unit ("ECU") which also includes several other subscribers' converters. The ECU includes common signal processing circuitry for controlling all the converters in the ECU. In addition to television signals, the cable network transmits control and data signals in both directions between the ECU and the head end of the system and between the ECU and each subscriber. Each subscriber supplies a portion of the power required by the associated ECU. Multiple television channels can be supplied to each subscriber via a single drop cable connecting the subscriber to the ECU.

16 Claims, 59 Drawing Figures

OTHER PUBLICATION

"SCAT Series 10 Converter Off-Premises Addressable Control: Second Generation", by Joseph P. Preschutti.

"Packetcable: A New Interactive Cable System Technology", by Paul Bran, 31*st Annual NCTA Convention Official Transcript,* 1982.

"Kabel tv Experimenten Limburg", by DeltaKabel bv.

"Two Way Cable Experiment", *Limburg International Magazine,* vol. 3, No. 2, Apr./May 1982, pp. cover 2, 7–9, 24–25.

"Plessey Scientific-Atlanta Multistar System Technical Description".

"ATC, Toshiba Announce Plans to Produce New Cable Product", *ATC News,* Nov. 10, 1982.

"DST Unit Offers Cable Industry Desirable Features", *ATC News,* Nov. 10, 1982.

"Jerrold Introduces STARCOM IntraNet a Cost-Effective Off-Premises Addressable Converter System", by General Instrument.

"The Next Generation in Cable Systems", by Times Fiber Communications, Inc.

"Two-Way Applications for Cable Television Systems in the '70s", *IEEE Spectrum,* Nov. 1971, pp. 39–54.

"Just in Time for the Future", by Pico Products Inc.

"Out Of-Home Addressable Security is now a Reality", by Vitek Electronics, Inc.

"The Subscriber Response System", by R. T. Callais et al., 20*Annual NCTA Convention Official Transcript,* Jul. 1971, pp. 28–48.

"Tocom System Bi-Directional Cable Television Information and Control Transmisssion System", by William F. Osborn, 20*th Annual NCTA Convention Officail Transcript,* Jul. 1971, pp. 507–529.

"The Total Communication Concept for the Future", by E. J. Gargini, The Royal Television Society Journal, Mar./Apr. 1973, pp. 182–193.

"High-Speed Polling System for Multi Purpose CATV", by Ken'ichi Hiratsuka et al., *Japan Telecommunications Review,* Jan. 1977, pp. 20–28.

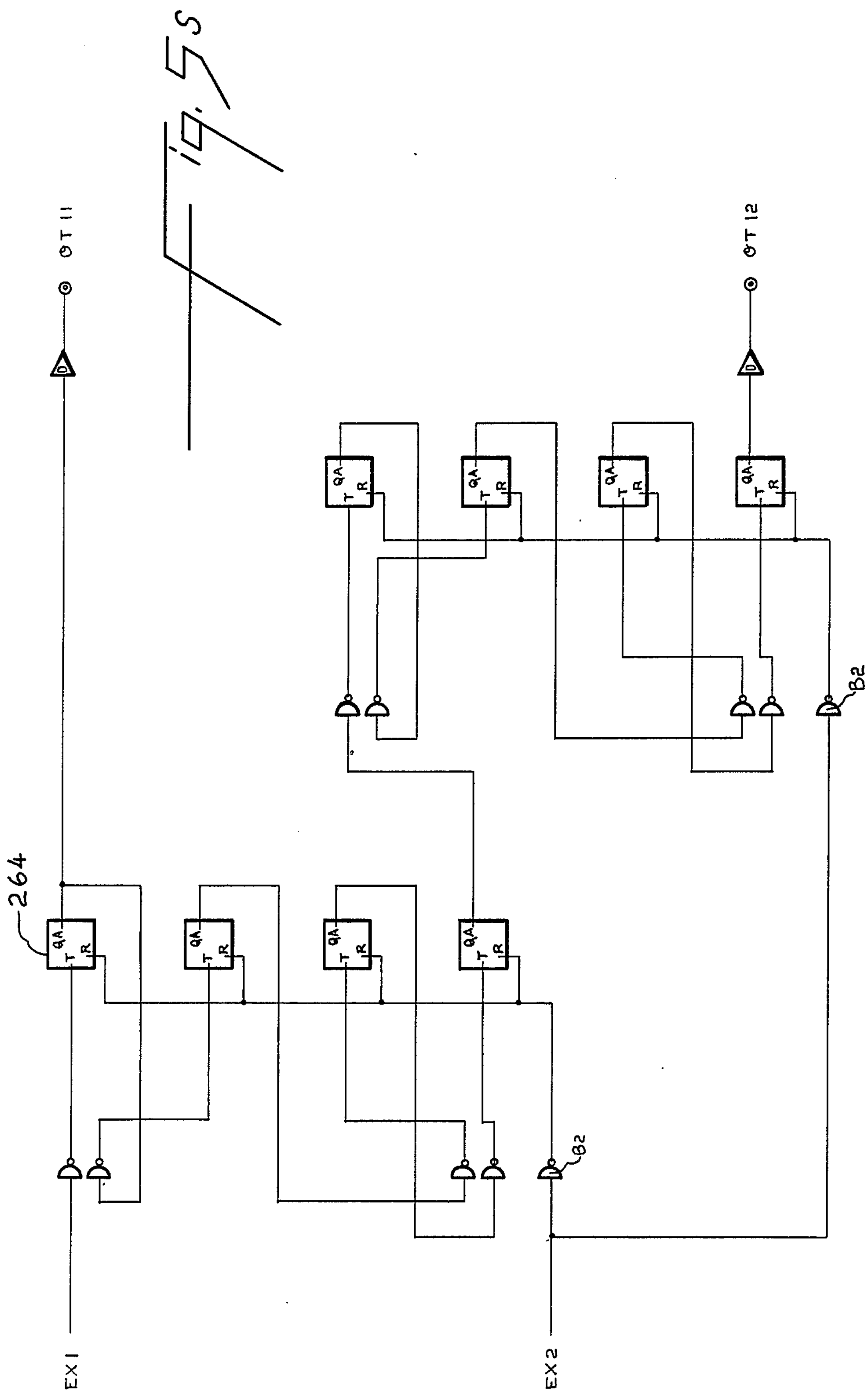
OT 11
OT 12
264
QA
T
R
B2
EX1
EX2

FROM COMBINER 30
HDRC
14
32
800
840
842
844
850
852
LOCAL OSCILLATOR
854
856
858
CARRIER DETECTOR
860
COSTAS LOOP
862
PROGRAM LOGIC ARRAY
864
OSCILLATOR
866
810
812
814
TTL BUFFER
816
PIN DIODE SWITCH
818
103.9 MHz OSCILLATOR
820
104.1 MHz OSCILLATOR
822
SURFACE ACOUSTIC WAVE BANDPASS FILTER
34
36
880
MAIN CPU
882
MAIN MEMORY
884
886
887
888
889
890
HDLC CONTROLLER
CPU
MEMORY

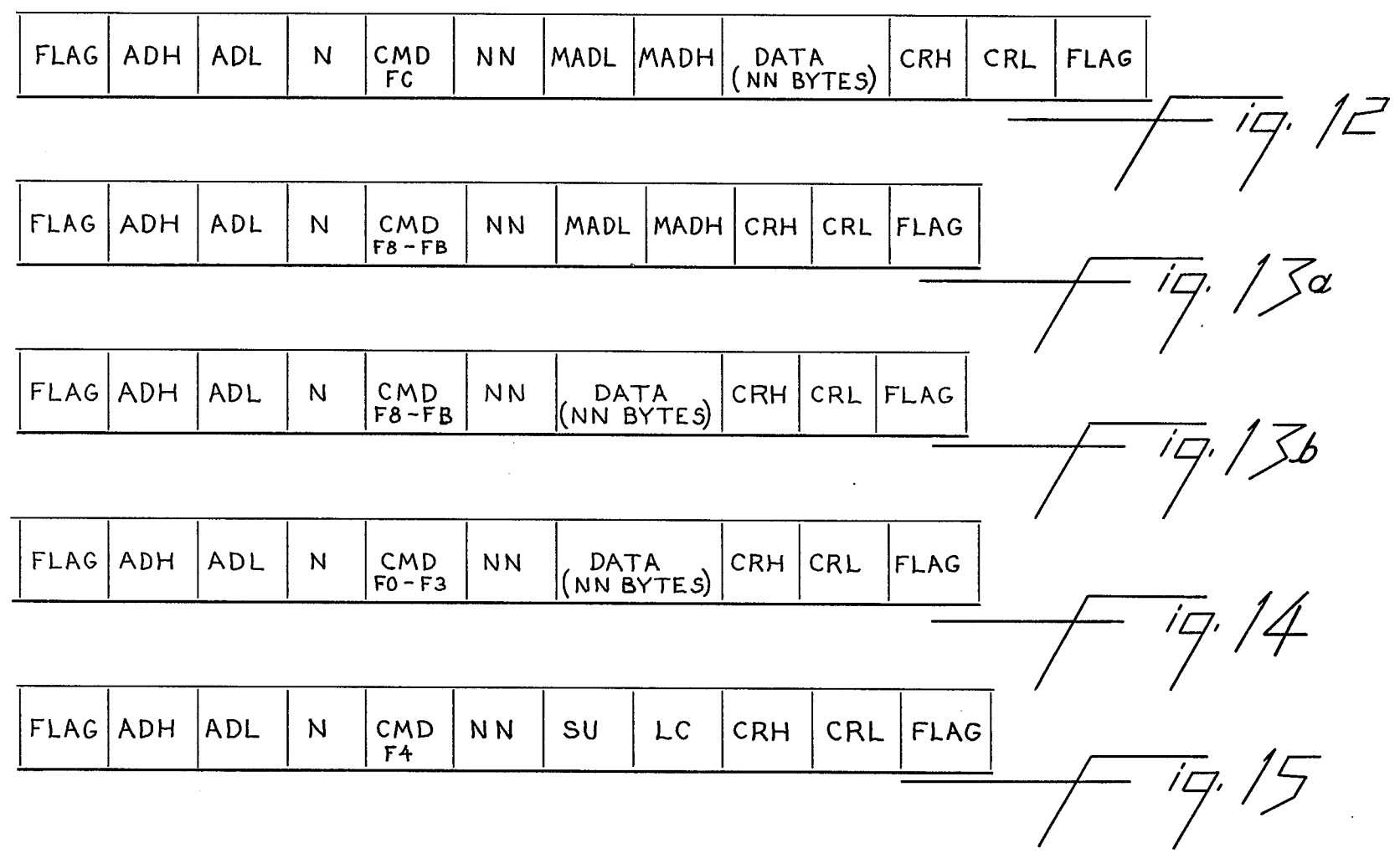

| | | | | | | | | | | | | |
|---|---|---|---|---|---|---|---|---|---|---|---|---|
| FLAG | ADH | ADL | N | CMD FC | NN | MADL | MADH | DATA (NN BYTES) | CRH | CRL | FLAG |

Fig. 12

| | | | | | | | | | | | |
|---|---|---|---|---|---|---|---|---|---|---|---|
| FLAG | ADH | ADL | N | CMD F8-FB | NN | MADL | MADH | CRH | CRL | FLAG |

Fig. 13a

| | | | | | | | | | |
|---|---|---|---|---|---|---|---|---|---|
| FLAG | ADH | ADL | N | CMD F8-FB | NN | DATA (NN BYTES) | CRH | CRL | FLAG |

Fig. 13b

| | | | | | | | | | |
|---|---|---|---|---|---|---|---|---|---|
| FLAG | ADH | ADL | N | CMD F0-F3 | NN | DATA (NN BYTES) | CRH | CRL | FLAG |

Fig. 14

| | | | | | | | | | | |
|---|---|---|---|---|---|---|---|---|---|---|
| FLAG | ADH | ADL | N | CMD F4 | NN | SU | LC | CRH | CRL | FLAG |

| | | | | | | |
|---|---|---|---|---|---|---|
| FLAG | SEND CNTL 08 | CTL | LVL | CRH | CRL | FLAG |

Fig. 21b

| | | | | | | |
|---|---|---|---|---|---|---|
| FLAG | SEND CNTL 00-03 | ADL | ADH | CRH | CRL | FLAG |

CABLE TELEVISION SYSTEM

This is a continuation of application Ser. No. 616,412, filed May 31, 1984, entitled CABLE TELEVISION SYSTEM.

RELATED APPLICATIONS

This application is related to commonly assigned applications Ser. Nos. 615,957 and 616,411, each entitled "Cable Television System", now abandoned and filed May 31, 1984.

BACKGROUND OF THE INVENTION

This invention relates to cable television systems, and more particularly to cable television systems in which the converter for converting portions of the television signal on the cable network to the television signal which is applied to the subscriber's television receiver is located outside the subscriber's premises.

There is increasing interest in cable television systems in which the converter for converting the portion of the cable television signal which the subscriber desires to receive to a signal suitable for application to the subscriber's television set is located outside the subscriber's premises, for example, on or adjacent to a neighboring utility or telephone pole. This is of interest because it reduces the risk of unauthorized tampering with the converter, accidental or intentional misappropriation of or damage to the converter, and the like.

On the other hand, locating the converter outside the subscriber's premises increases the complexity and cost of the system because apparatus must then be included in the system to enable the subscriber to remotely control the converter. This consideration has tended to discourage the development of cable television systems with off-premises converters.

It is therefore an object of this invention to improve, simplify and reduce the cost of cable television systems with off-premises converters.

SUMMARY OF THE INVENTION

This and other objects of the invention are accomplished in accordance with the principles of the invention by providing a cable television system and method in which the off-premises converters of several adjacent subscribers are at least partially controlled by common signal processing circuitry associated with those converters. The common signal processing circuitry and all the associated converters are preferably located in a common facility, for example, a housing mounted on or adjacent to a utility pole neighboring the premises of the associated subscribers. This apparatus is referred to herein as an external control unit or "ECU". The ECU preferably includes only a single tap for each network cable serving the ECU. The signals derived from this tap are distributed appropriately to the components of the ECU. A drop cable extends from the ECU to each subscriber's premises.

Inside the subscriber's premises the drop cable is connected to a subscriber processing unit or "SPU" which is typically located adjacent to the subscriber's television receiver. The SPU applies the television signal on the drop cable to the television receiver and also applies subscriber-originated control signals to the drop cable for transmission back to the ECU. Other devices located in the subscriber's premises, such as burglar, fire and other alarm or monitoring equipment capable of applying control signals to the drop cable for transmission back to the ECU, can also be connected to the drop cable.

The ECU processes the control signals originated by all of the associated subscribers to satisfy, if appropriate, the service requests indicated by those control signals. In particular, the common signal processing circuitry in the ECU is used as extensively as possible to process the subscriber-originated control signals to minimize the amount of separate ECU circuitry which must be provided for each subscriber.

The ECU is also capable of receiving and responding to control signals from the so-called "head end" of the cable network. For example, these control signals may include channel authorization data identifying which channels on the cable network a particular subscriber is authorized to receive and view. These head-end-originated control signals are preferably transmitted via the cable network, and the common signal processing circuitry in each ECU is again used as extensively as possible to process these signals. Because each ECU typically serves several subscribers, all of those subscribers can be serviced from the head end by control signals addressed to the ECU rather than to each subscriber individually. This greatly facilitates control of the system from the head end.

Further features of the invention, its nature and various advantages will be more apparent from the accompanying drawing and the following detailed description of the invention.

BRIEF DESCRIPTION OF THE DRAWING

FIGS. 5*a*–5*s* are sometimes collectively referred to as FIG. 5.

FIGS. 12–17 are diagrams of various messages sent between the CCC and an ECU in an embodiment of the invention.

FIGS. 21a–23d are diagrams of messages sent between the CCC and an ECU in another embodiment of the invention.

DETAILED DESCRIPTION OF THE INVENTION

I. Overview of the System

Figure 1:
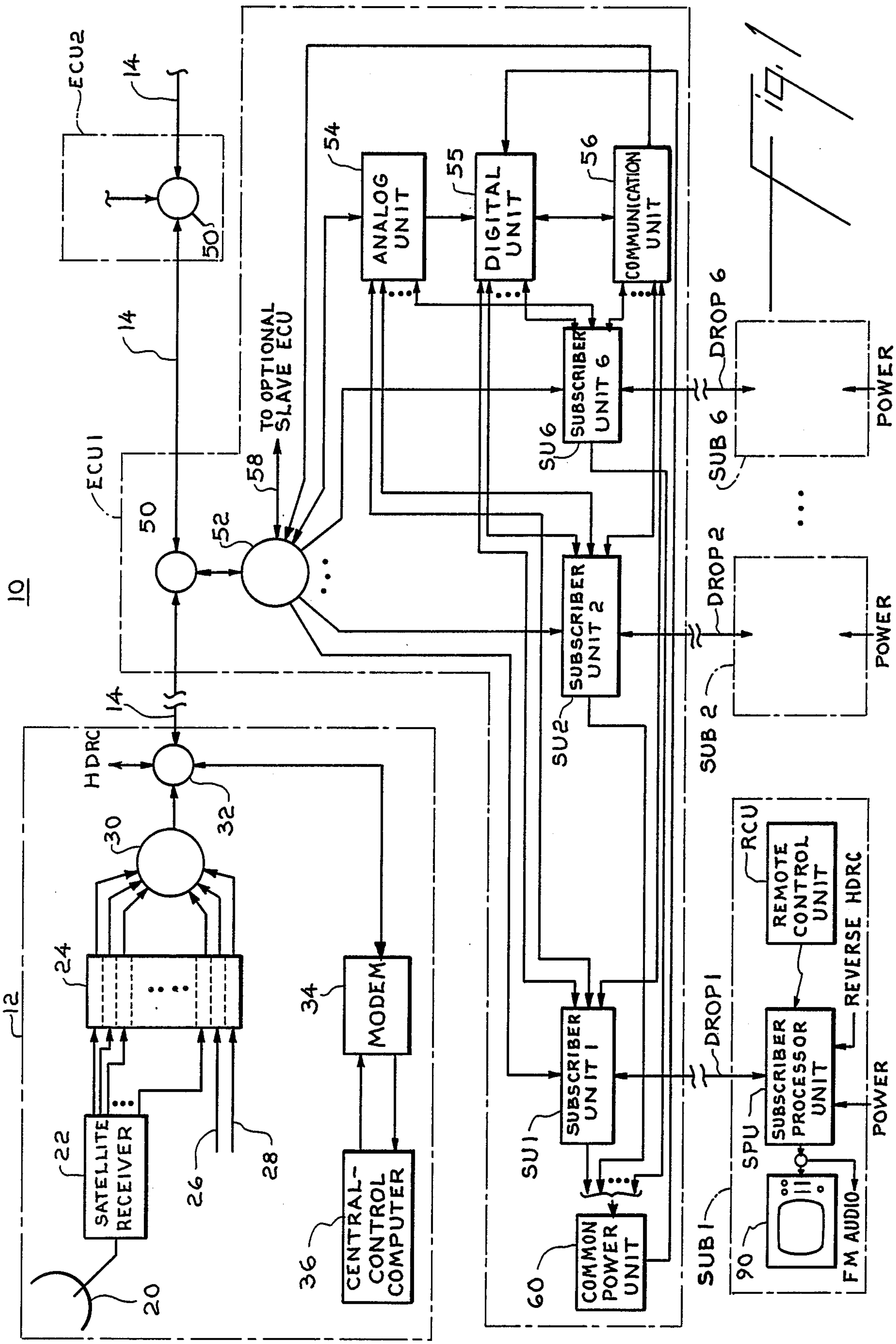
FIG. 1 is a block diagram of a cable television system constructed in accordance with the invention.

As shown in FIG. 1, an illustrative embodiment of the cable television system 10 of this invention includes head end apparatus 12; cable network 14; a plurality of external control units ECU1, ECU2, etc., connected to cable network 14 at locations which are typically remote from one another and from head end 12; and a plurality of subscriber premises SUB1, SUB2, etc., each of which is connected to an associated ECU by a drop cable DROP1, DROP2, etc. In the particular embodiment shown in the drawing, each ECU can be connected to as many as six subscribers, but this number is arbitrary and the maximum number of subscribers per ECU can be larger or smaller than six as desired.

Head end 12 typically includes one or more sources of television signal information such as conventional satellite antenna 20. Conventional satellite receiver 22 separates the television signal information received via antenna 20 into a plurality of base band television signals, each of which represents one base band television channel. Conventional modulator 24 modulates each of these television signals so that each base band channel is shifted to a predetermined frequency or "physical" cable channel for distribution via cable network 14. Additional base band television and other signals (e.g., television signals from studio cameras or video recorders, FM audio signals, etc.) may also be applied to modulator 24 via leads 26, 28, etc., and shifted to predetermined physical cable channels by the modulator.

All of the output signals of modulator 24 are applied to conventional combiner 30 which combines them for application to cable network 14 via conventional combiner 32. Combiner 32 also adds control and data signals to the signal applied to cable network 14. These control and data signals may be of two types: (1) a so-called "forward data" signal which represents information generated at head end 12 for controlling the ECUs in the network, and (2) a forward high data rate channel ("HDRC") signal which is typically included in the FM band and which allows the cable network to be used for such purposes as distributing non-television signal data (e.g., general purpose computer programs and data) to the subscribers. Because the forward HDRC signal is typically included in the FM band, the term "FM audio signal" as used herein includes the forward HDRC signal if such a signal is employed in the system.

In addition to adding forward data and forward HDRC signals to the signal applied to cable network 14, combiner 32 also conducts so-called "reverse data" signals in the opposite direction from cable network 14 to modem 34. The reverse data signals are control signals generated by the ECUs as described below for transmission to head end 12 for use in controlling the cable television network. In the illustrative embodiment shown and described herein, four channels are available for reverse data communication. Modem 34 converts (modulates) forward data signals produced by central control computer ("CCC") 36 to signals suitable for transmission via cable network 14. Modem 34 also converts (demodulates) reverse data signals received from cable network 14 to signals suitable for processing by central control computer 36.

Combiner 32 also extracts from the signal on cable network 14 a reverse HDRC signal which allows the cable network to be used for such purposes as transmitting non-television signal data (e.g., fire and burglary alarm signals) from the subscribers to a central location such as head end 12. The reverse HDRC signal is typically in a frequency band (e.g., 25 MHz) which is independent from all other frequency bands employed in the system. The use of a reverse HDRC frequency band in the present invention enables direct two-way communication between the head end and the subscribers, and minimizes noise and other signal degradation problems affecting other communication signals on the CATV cable and inherent in conventional two-way CATV systems.

Each ECU includes a conventional tap off device 50 for applying the signals which appear on cable network 14 to the circuitry of the ECU and for applying to cable network 14 the reverse data originating at the ECU and the reverse HDRC signals originating at the associated subscribers. Each ECU is typically located outside the premises of the subscribers served by the ECU. Typically, all the circuitry of the ECU is located in a common housing which may be adapted for mounting on a utility pole or other suitable structure adjacent to the premises of the subscribers served by the ECU.

Tap off device 50 is connected to conventional splitter-combiner network 52. Splitter-combiner network 52 distributes the signals received from cable network 14 to a plurality of subscriber units SU1, SU2, etc. within the ECU, each of which is associated with a respective one of the subscribers served by the ECU. Although each SU includes additional apparatus described in detail below, for the moment it will be sufficient to think of each SU as a digitally controlled converter for performing the television signal frequency conversion function performed by the converter located adjacent the subscriber's television receiver in conventional cable network systems.

Splitter-combiner network 52 also distributes the signals received from cable network 14 to analog unit 54, described in greater detail below. In general, analog unit 54 separates the FM audio and forward data signals from the other signals received from cable network 14. Analog unit 54 applies the FM audio signal to each SU for transmission to the subscribers. Analog unit 54 also demodulates the forward data signal and applies the resulting data signal to digital unit 55. Analog unit 54 applies reverse HDRC signals received from the SUs to splitter-combiner network 52, and splitter-combiner network 52 applies those reverse HDRC signals to tap off device 50 and thereby to cable network 14.

Splitter-combiner network 52 also applies reverse data signals from communication unit 56 to tap off device 50. In addition, if a so-called "slave" ECU (not shown in FIG. 1) is associated with "master" ECU1 as described in detail below, splitter-combiner network 52 conveys signals in both directions via lead 58 between tap off device 50 and the splitter-combiner network of the slave ECU.

As mentioned above, each SU receives the entire cable network signal from splitter-combiner network 52. In response to control signals received from digital unit 55, each SU (1) selects from the cable network signal the portion of that signal representing the television channel which the associated subscriber wishes to view, and (2) converts that signal portion to a television signal on a predetermined channel (e.g., channel 3) to which the associated subscriber's television receiver 90 is tuned. This television signal is applied to the SU's associated drop cable DROP1, DROP2, etc., which runs from the SU to the associated subscriber's premises SUB1, SUB2, etc. Each SU also receives the FM audio signal from analog unit 54 and combines that signal with the television signal applied to the associated subscriber's drop cable.

The ECU communicates via each SU with the associated subscriber's apparatus (in particular, the SPU of the associated subscriber) by means of so-called very low frequency ("VLF") data signals on the associated drop cable. Also, when a subscriber operates his or her SPU to make a television channel selection, the SPU applies to the associated drop cable for transmission to the ECU VLF data signals representative of the desired channel selection. Each SU conveys these VLF data signals in both directions between the associated subscriber drop cable and communication unit 56 which includes a modem for conveying these VLF data signals to and from digital unit 55. Each SU also conveys reverse HDRC signals from the associated subscriber drop cable to analog unit 54.

The power required to operate each ECU is supplied by the subscribers served by that ECU. Each subscriber has an SPU which applies an alternating current ("AC") power signal to the associated drop cable. The associated SU conveys that power signal to common power unit 60 in the ECU. Common power unit 60 combines all of the applied power signals and derives from the combined signal the currents and voltages needed to power the various components of the ECU. In this way, all of the subscribers served by the ECU share the power requirements of the ECU. In the event of a general AC power failure, common power unit 60 applies a control signal to digital unit 55 which causes the digital unit to shut down in such a way that important data is not lost.

Digital unit 55 controls the operation of the ECU. Digital unit 55 receives and processes forward data applied to the digital unit via analog unit 54. Digital unit 55 also generates reverse data and applies that data to communication unit 56 for transmission to head end 12. Digital unit 55 receives and processes demodulated VLF signals applied to the digital unit via communication unit 56 from all of the SUs in the ECU. Digital unit 55 also generates other signals for transmission back to the subscribers via communication unit 56 and the SUs. Digital unit 55 also controls various functions of the SUs. For example, when a subscriber wishes to view a particular television channel, digital unit 55 receives VLF signals generated by the subscriber indicating the desired channel selection, determines whether or not the subscriber is authorized to receive that channel based upon channel authorization data previously provided by head end 12, and, if the subscriber is authorized to receive the desired channel, controls the subscriber's SU to cause it to apply the desired channel signal to the subscriber's drop cable.

Each subscriber has at least one SPU, at least one conventional television receiver 90 connected to the SPU, and (optionally) a conventional remote control unit ("RCU") for remotely controlling the SPU by infrared or other signals. The SPU is connected to the drop cable and applies the received drop cable signal to the associated television receiver 90. The received drop cable signal may also be applied to the subscriber's (optional) FM audio receiver equipment (not shown) and to the subscriber's (optional) forward HDRC utilization equipment (also not shown). The SPU has a conventional keypad (not shown in FIG. 1) for allowing the subscriber to enter data such as the number of the television channel the subscriber wishes to receive. Alternatively, this data can be entered via the subscriber's RCU. The SPU converts data entered by the subscriber to VLF data signals which are transmitted to the associated ECU via the subscriber's drop cable. The SPU also typically has data display elements such as seven-segment light emitting diode ("LED") displays. These displays can be controlled by VLF data sent to the SPU from the associated ECU. The SPU also applies the reverse HDRC signal originated by the subscriber to the associated drop cable.

The following Table A summarizes the allocation of carrier signal frequencies in the illustrative embodiment of the invention shown and described herein:

TABLE A

| | Type of Signal | Approximate Frequency |
|---|---|---|
| 1. | AC Power | 60 Hz |
| 2. | VLF Data (ECU to SPU) | 430 KHz |
| 3. | VLF Data (SPU to ECU) | 468 KHz |
| 4. | Reverse Data | |
| | a. Channel 0 | 19.125 MHz |
| | b. Channel 1 | 19.375 MHz |
| | c. Channel 2 | 19.625 MHz |
| | d. Channel 3 | 19.875 MHz |
| 5. | Reverse HDRC Data | 25 MHz |
| 6. | Television | 50–88 MHz<br>108–450 MHz |
| 7. | FM Audio (Includes Forward HDRC Data) | 88–108 MHz |
| 8. | Forward Data | 104 MHz |

It will be understood that the frequencies shown in Table A are merely illustrative and that other frequencies can be employed if desired. For convenience herein, the television and FM audio signals on cable network 14 (items 6 and 7 in Table A, above) are sometimes hereafter referred to collectively as CATV signals.

Although cable network 14 has only a single feeder cable in the embodiment shown in FIG. 1, two feeder cables can be employed if desired to increase the number of television channels available for distribution to subscribers. For example, if two cables were provided, elements such as 24, 30, 32, 50, and 52 would be substantially duplicated to serve the second cable. Each SU would receive input CATV signals from each cable. To select between the two cables, each SU would also include a switch controlled by digital unit 55 for switching between the two applied cable signals. This is discussed in greater detail below in relation to the SUs. In a multi-cable system, the FM audio, reverse HDRC, forward data, and reverse data signals are preferably transmitted by only one cable, designated the primary cable, thereby allowing some simplification of the apparatus associated with the other cable or cables. Thus, elements such as 34, 36, 54, 55, 56, and 60 do not have to be duplicated or even significantly altered to provide a multi-cable system.

It is also possible for each subscriber to have more than one television receiver 90. The additional television receiver or receivers can be attached to one SPU, in which case all of the television receivers receive the same television signal. Alternatively, the additional television receiver or receivers can be served by a second SPU to enable the subscriber to simultaneously select and receive two different television channels. If a subscriber has two SPUs, both of the SPUs can be connected to a single drop cable. In such a case, one SPU will be configured as a "master" SPU, and the other will be configured as a "slave" SPU. At the ECU, a subscriber with a master and slave SPU is served by two SUs. Each SU is associated with a different SPU. The signals from both SUs are multiplexed onto the single drop cable. The television signal from the first or "primary" SU is converted by the SU to, and applied to the drop cable as, a first or lower drop cable channel. The television signal from the other or "secondary" SU is converted to, and applied to the drop cable as, a second or higher drop cable channel. The television receiver associated with each SPU is tuned to a respective one of the two drop cable channels.

Thus, each subscriber has at least one primary SU in the ECU associated with a master SPU. If a subscriber has two SPUs, that subscriber may also have a secondary SU in the ECU associated with the slave SPU. In any event, the total number of SUs which can be included in an ECU in the particular embodiment shown and described herein is six.

If additional subscriber service is needed at the location of an ECU which is operating at capacity, then a second or "slave" ECU containing six more SUs can be connected to the splitter-combiner network 52 of the "master" ECU via lead 58 as mentioned above. In this way, additional subscriber service can be provided without the necessity of cutting into the cable network 14 to insert an additional tap 50.

II. Subscriber Unit

Figure 2:
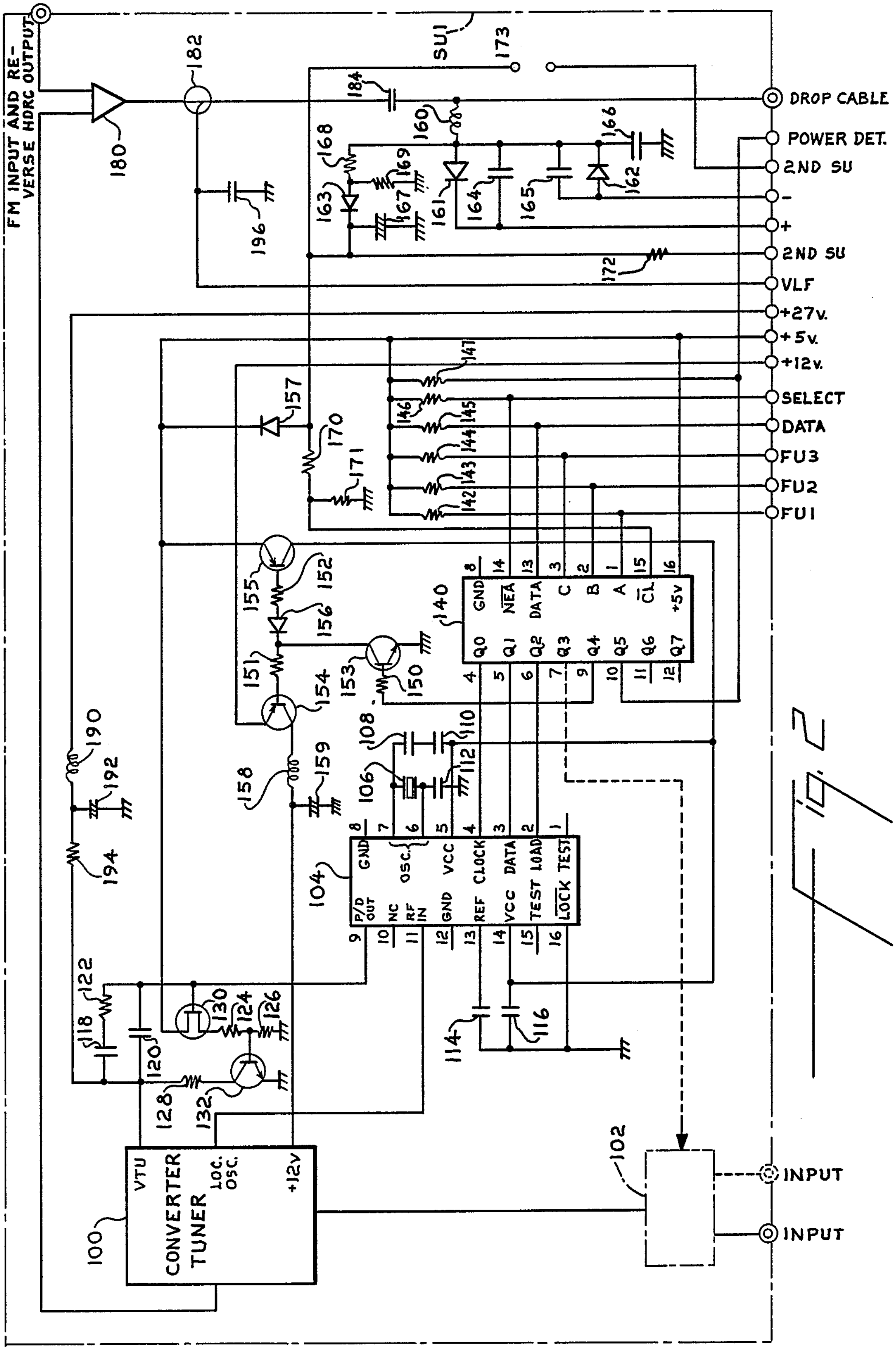
FIG. 2 is a schematic diagram of a typical subscriber unit ("SU") in the apparatus of FIG. 1.

FIG. 2 shows a typical subscriber unit SU1 in greater detail. The cable network signal from splitter-combiner network 52 (FIG. 1) is applied to conventional converter tuner 100 via the INPUT terminal and optional switching device 102. If the system had two cables rather than one as shown in FIG. 1, each SU would have two INPUT terminals, each connected to a respective one of the two cables. Switching device 102, which can include a conventional RF switching relay such as part number G4Y-152P available from Tateishi Electric Co. ("Omron") of Tokyo, Japan, would then be used to apply one or the other of the two cable signals to converter tuner 100. Switching device 102 would be controlled to select signals from one or the other CATV feeder cable by a conventional transistor switch (part of switching device 102) responsive to the state of the Q3 output on pin 7 of conventional addressable latch 140.

Converter tuner 100, together with conventional frequency synthesizer 104 and the circuits including crystal 106, capacitors 108, 110, 112, 114, 116, 118, 120, resistors 122, 124, 126, 128, and transistors 130 and 132, selects the portion of the cable television signal which the associated subscriber wishes to receive, converts that signal portion to a television signal on the channel to which the subscriber's television receiver 90 is tuned, and applies that signal to the DROP CABLE output terminal of the SU via conventional FM adder device 180, directional coupler 182, and capacitor 184. In one embodiment, converter tuner 100 may be part number CVA 213A (channel 3) or CVA 215A (channel 5) available from Toshiba Corporation of Tokyo, Japan (hereinafter "Toshiba"), or an equivalent device to convert the CATV signals to the same or other channels or frequencies. Frequency synthesizer 104 may be Toshiba part number TD6352P or an equivalent device.

The converter circuitry operates as follows. Via its DATA input lead, frequency synthesizer 104 receives a ten-bit main channel conversion coefficient ("MCCC") and a five-bit "swallow" conversion coefficient ("SCC"). The bits of these two coefficients, which are sometimes collectively referred to as the main and swallow ("MS") coefficients, are shifted into frequency synthesizer 104 at the clock rate established by its CLOCK input. When all the bits of the MS coefficients have been shifted into frequency synthesizer 104, they are latched into the synthesizer in response to a signal applied to the LOAD input terminal. Frequency synthesizer 104 then uses the MS coefficients in a known manner to (1) scale down the frequency of the voltage controlled LOCAL OSCILLATOR ("LOC. OSC.") output signal of converter tuner 100, (2) perform a phase detection comparison between the scaled down LOC. OSC. signal frequency and the reference OSCILLATOR ("OSC.") signal frequency provided in part by crystal 106, and (3) produce an error signal at the PHASE DETECTOR OUTPUT ("P/D OUT") terminal. The error signal produced by frequency synthesizer 104 is used to control the voltage controlled oscillator in converter tuner 100 to cause that oscillator to produce the demodulation signal frequency needed to convert the desired cable channel to the channel to which the subscriber's television receiver 90 is tuned.

Addressable latch 140, which may be Toshiba part number TC40H259 or an equivalent device, receives control and data signals from digital unit 55, stores that data, and outputs it to frequency synthesizer 104. In particular, addressable latch 140 receives data via its DATA input lead and processes that data in accordance with the function control signals applied to its A, B, and C input leads. The addressable latch in a particular SU is selected and thereby enabled by an appropriate signal applied to the NOT ENABLE ("NEA") input terminal of the addressable latch to be selected. (In general, the logical polarity of signals and signal names appearing in the drawings will be ignored in this specification. Thus, for example, whereas the signal at pin 14 of addressable latch 140 is actually an inverse enable signal, that signal is simply referred to in this specification by its functional name "NEA" without regard for its logical polarity.) Resistors 142–147 are pull-up resistors conventionally associated with selected inputs and outputs of addressable latch 140.

Addressable latch 140 also monitors whether or not the associated subscriber is supplying his or her share of the AC power needed to operate the ECU. This function is performed in response to the signal applied to the CLEAR ("CL") input terminal of addressable latch 140. If the associated subscriber is not providing AC power to the ECU via the subscriber's drop cable, the Q4 output signal of addressable latch 140 controls the circuit including resistors 150–152, transistors 153–155, diode 156, inductor 158, and capacitor 159 to shut off power to associated converter tuner 100. This prevents any subscriber who is not supplying AC power to the ECU from receiving television signals from the ECU. The Q5 output signal of addressable latch 140 also indicates whether or not the associated subscriber is supplying AC power. This Q5 output signal is applied to the POWER DETECT output terminal of the SU for use by digital unit 55.

Each primary SU such as SU1 has a power section which includes filtering inductor 160, diodes 161–163, capacitors 164–167, and resistors 168–169. Inductor 160 blocks VLF and CATV signals. Diodes 161 and 162 respectively produce half-wave rectified power signals ("+" and "−") from a 60 volt or less AC power signal on the associated drop cable. The + and − signals are respectively connected to and summed with other and − power signals from other subscribers and SUs (i.e., SU2–SU6) in the ECU. The summed power signals then are applied to common power unit 60 which is described in detail below. Circuit elements 163 and 167–169 constitute another half-wave rectifier circuit which produces a DC output signal (which is clamped to approximately +5V by diode 157) as long as the associated subscriber is supplying AC power via the drop cable. This DC output signal is applied to the CL input terminal of addressable latch 140 via voltage dividing resistors 170–171 for the purpose described above.

If a secondary SU (e.g., SU2) is associated with SU1 to enable the subscriber to select and receive two multiplexed channels via the drop cable, then the DC output signal produced by elements 163 and 167–169 is also applied to the secondary SU via resistor 172 in the primary SU and jumper 173 in the secondary SU. Jumper 173 is a completed connection only in the secondary SU. Power supply elements 160–169 are omitted from the secondary SU, as is capacitor 184. Also in the secondary SU, the terminal corresponding to the DROP CABLE terminal in FIG. 2 is connected to the FM INPUT AND REVERSE HDRC OUTPUT terminal of the associated primary SU. Thus, the secondary SU selects one television channel, adds the FM signal to the first television channel signal, and applies the resulting signal to the FM INPUT AND REVERSE HDRC OUTPUT terminal of the associated primary SU. The primary SU selects the second television channel, adds that signal to the signal received from the secondary SU, and applies the resulting signal to the subscriber's drop cable. In this way each subscriber can receive as many as two television channels multiplexed on a single drop cable. As mentioned above, each of the subscriber's television receivers is tuned to view one or the other of the two channels on the drop cable. The only other differences between the primary and secondary SUs are (1) the use of different local oscillator frequencies so that the primary and secondary SUs place the selected cable channels on different drop cable channels, and (2) the omission in the secondary SU of what would otherwise be a redundant VLF input/output.

The remaining elements in the SU are (1) a power filtering circuit including inductor 190 to block high-frequency signals from entering the +27V power line, and capacitor 192 and resistor 194 to remove high-frequency ripple from the +27V power line, and (2) capacitor 196 which is connected between the VLF input/output lead and ground. Directional coupler 182 conveys VLF signals in both directions between the drop cable and the VLF input/output terminal.

III Analog Unit

Figure 3:
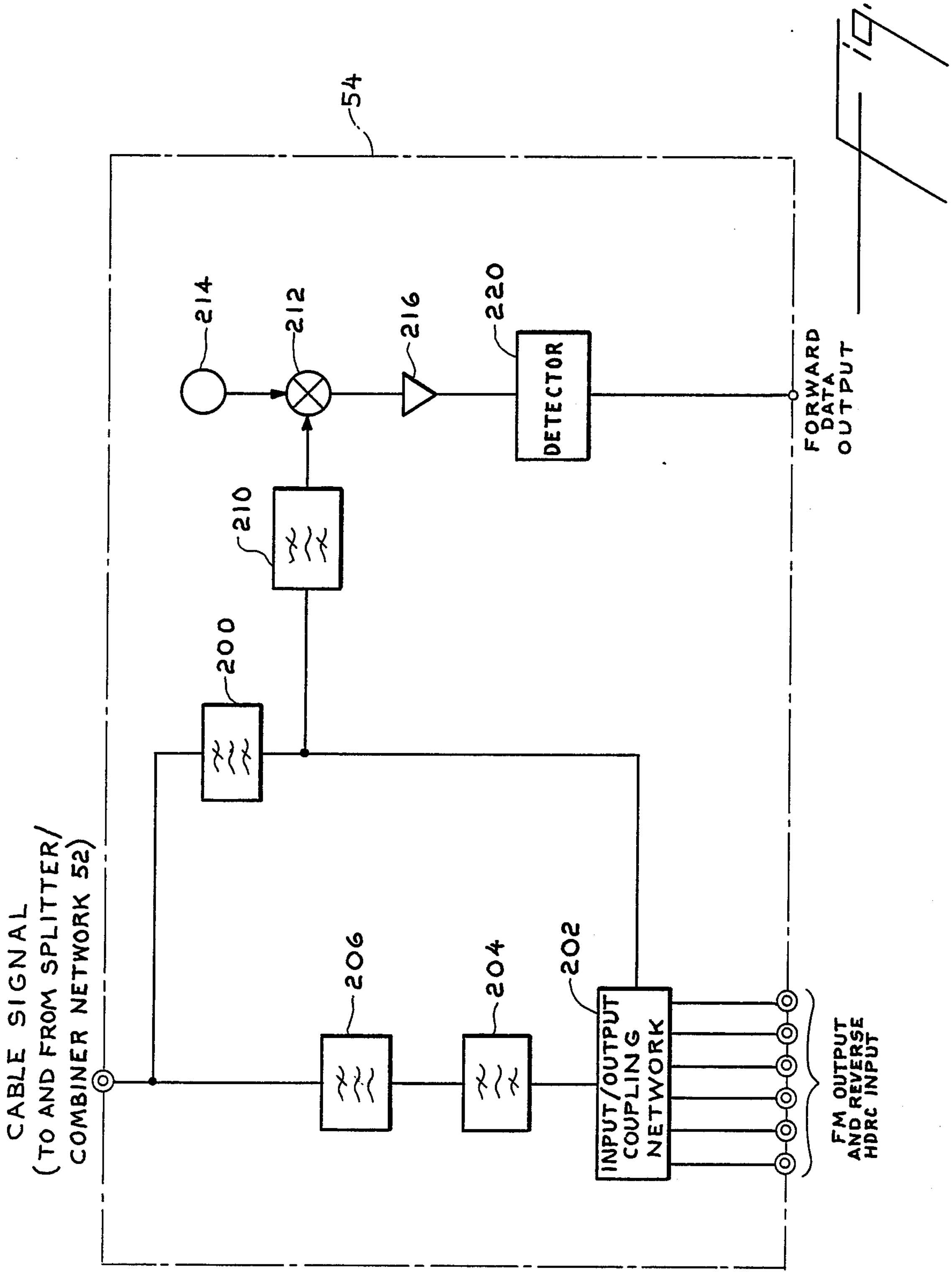
FIG. 3 is a block diagram of the analog unit in the apparatus of FIG. 1.

As shown in FIG. 3, analog unit 54 includes bandpass filter 200 for extracting the FM audio (approximately 88–108 MHz) and forward data (104 MHz plus or minus 100 KHz) signals from the CABLE SIGNAL. The FM signal is applied to each of the FM OUTPUT AND REVERSE HDRC INPUT terminals of analog unit 54 via input/output coupling network 202. Each FM OUTPUT AND REVERSE INPUT HDRC terminal of analog unit 54 is connected to the FM INPUT AND REVERSE HDRC OUTPUT terminal of a respective one of the SUs.

Input/output coupling network 202, bandpass filter 204, and lowpass filter 206 convey reverse HDRC signals (25 MHz plus or minus 0.5 MHz) from the FM OUTPUT AND REVERSE HDRC INPUT terminals to the CABLE SIGNAL terminal. Thus, filters 204 and 206 allow reverse HDRC signals to pass from subscriber premises SUB1, SUB2, etc. (FIG. 1) through the ECU and directly to cable network 14, thereby providing a data signal path for direct communication via cable network 14 between the subscribers and head end 12. However, filters 204 and 206 block other signals from directly passing from the subscribers and drop cables to cable network 14. In particular, filters 204 and 206 prevent signals, such as citizen band and other two-way radio signals, from entering cable network 14 and interfering with or degrading the reverse data signals sent from the ECUs to head end 12. In contrast, in a conventional two-way cable television system, such interfering signals typically are picked up at various poorly or loosely connected or dirty or corroded drop cable connections and cracked cable shields in the CATV system. The use of an HDRC channel and elements 204 and 206 in the CATV system of the present invention thus allows for reliable, high-speed, direct two-way communication between subscribers and head end 12 by isolating cable network 14, and the reverse data transmitted thereon, from interfering signals picked up by numerous drop cable connections.

Conventional bandpass filter 210 extracts the forward data signal from the output signal of bandpass filter 200. The forward data output signal of bandpass filter 210 is applied to mixer 212 for mixing with the 108.5 MHz output signal of local oscillator 214. The resulting 4.5 MHz output signal is amplified by conventional intermediate frequency amplifier 216 and applied to conventional detector 220. Detector 220 converts the frequency-modulated ("FM") forward data signal to a base band forward data signal which is applied to the FORWARD DATA OUTPUT terminal of analog unit 54 for application to digital unit 55.

IV. Communication Unit

Figure 4:
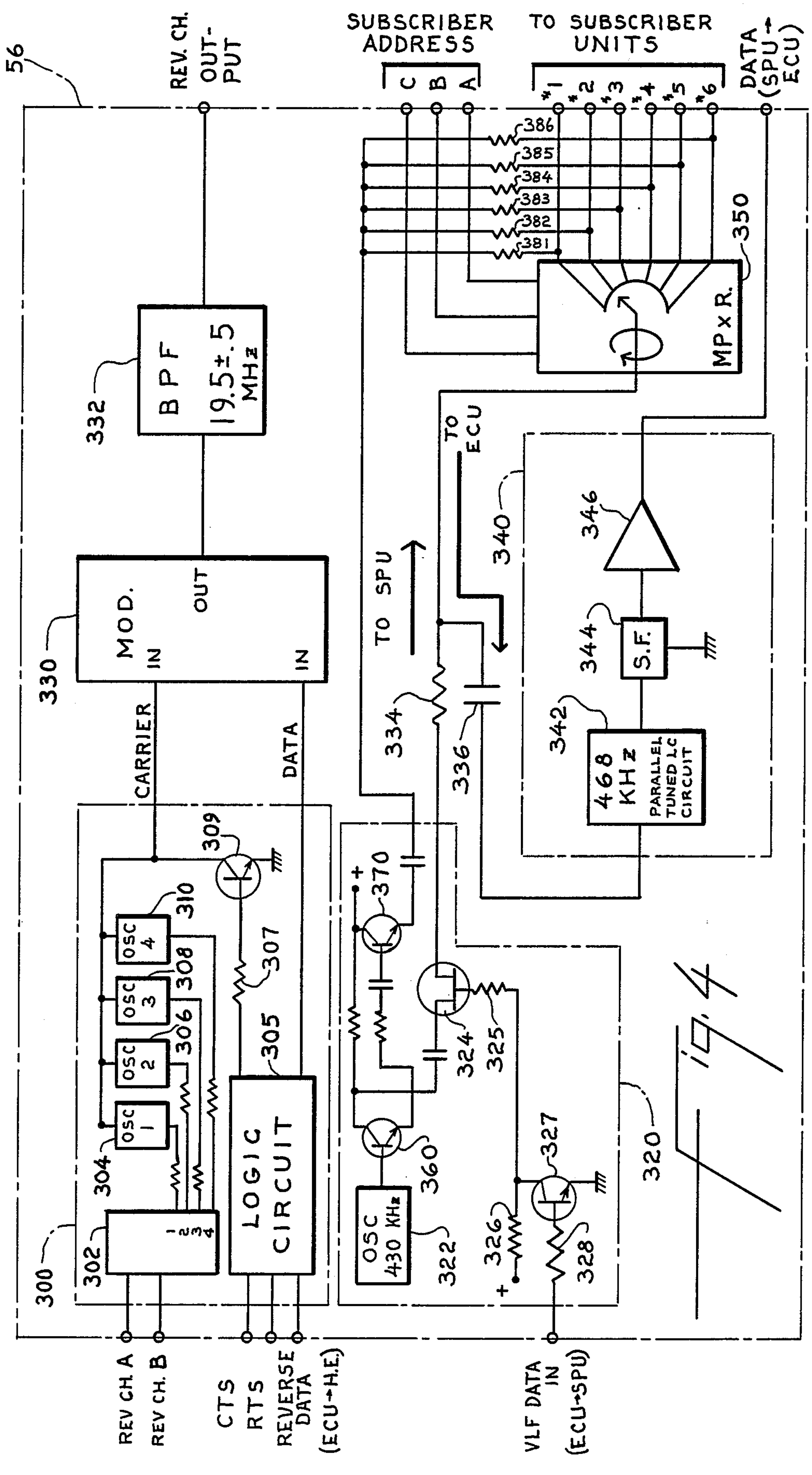
FIG. 4 is a schematic block diagram of the communication unit in the apparatus of FIG. 1.

FIG. 4 shows communication unit 56 in greater detail. Communication unit 56 is controlled by digital unit 55 and facilitates communication of (1) reverse data from the ECU to the CCC of head end 12, and (2) VLF data to and from the ECU and each associated subscriber's SPU.

For communicating information from the ECU to head end 12, communication unit 56 includes reverse channel selector 300, conventional modulator 330, and conventional bandpass filter 332. Channel selector 300, on command from digital unit 55, selects any one of four available reverse channels for transmission of ECU reverse data to head end 12. A two-bit reverse channel selection signal ("REV. CH. A" and "REV. CH. B") is applied from digital unit 55 to conventional binary decoder 302. Depending on the bit combination present on the A and B inputs of decoder 302 (i.e., 00, 01, 10, or 11), one of the four outputs of decoder 302 will be low and all other outputs will be high. The outputs of decoder 302, each of which is connected to a respective one of four crystal-controlled oscillators 304, 306, 308, and 310, in turn cause one of the four oscillators to be operative. Each oscillator 304, 306, 308, and 310 is tuned to oscillate at a different frequency corresponding to one of the frequencies of the four channels available for reverse data communication. In one embodiment, oscillators 304, 306, 308, and 310 operate at 19.125 MHz, 19.375 MHz, 19.625 MHz, and 19.875 MHz, respectively. It will, of course, be appreciated that other frequencies and a different number of reverse channels can be used if desired.

The output of the particular oscillator selected by decoder 302 is applied to modulator 330 as a carrier frequency for modulation by the reverse data to be transmitted to head end 12. Modulator 330 can be any conventional modulator for modulating digital signals onto an analog carrier. In a preferred embodiment, modulator 330 is a binary phase-shift keyed ("BPSK") modulator, such as part number MC 1496 available from Motorola Corporation of Phoenix, Ar. (hereinafter "Motorola"). Data is modulated for transmission on each reverse channel at a data rate of 50 Kbps.

Channel selector 300 also includes conventional logic circuit 305 (comprised, for example, of conventional NOR and NAND gates) for receiving and enabling the transmission of digital reverse data from digital unit 55 to head end 12, and for receiving a request-to-send ("RTS") signal from and providing a clear-to-send ("CTS") signal to digital unit 55. If digital unit 55 is not sending data to head end 12, digital unit 55 maintains the RTS lead to logic circuit 305 in a logical "0" state. This causes logic circuit 305 to apply a signal to transistor 309 through current-limiting resistor 307, thus shorting the output of oscillators 304, 306, 308, and 310 to ground and preventing the application of carrier to modulator 330. In addition, logic circuit 305 (1) maintains the CTS lead in a logical "1" state, thus signaling to digital unit 55 that it is not clear to send data, and (2) disables transmission of data signals to modulator 330. If digital unit 55 desires to send data to head end 12, it raises the RTS lead. This causes logic circuit 305, after a short delay, to (1) remove the signal from transistor 309 to allow a carrier signal to be applied to modulator 330, (2) present a logical "0" state on the CTS lead to signal digital unit 55 that it is clear to send data, and (3) enable the passage of data signals to modulator 330. Digital unit 55 may transmit data only while CTS is in a logical "0" state.

Modulator 330 modulates the reverse data presented at its data input line onto the carrier signal presented at its carrier input line. The output of modulator 330 is a modulated signal having a selected one of four carrier frequencies which is applied to bandpass filter 332. Bandpass filter 332 has a 1 MHz passband centered at 19.5 MHz. The output of bandpass filter 332 is reverse channel output, which is applied to splitter-combiner network 52 (FIG. 1) for transmission via cable network 14 to head end 12.

For enabling communications between the ECU and each associated subscriber SUB1, SUB2 . . . etc., communication unit 56 includes bi-directional multiplexer 350 for connecting a first input/output line to any one of a plurality of second input/output lines as a function of a binary code appearing on subscriber address lines A, B, and C. Subscriber address lines A, B, and C are connected to digital unit 55 to enable digital unit 55 to selectively connect any one of the plurality of second input/output lines to the first input/output line. In a preferred embodiment, multiplexer 350 is a 1-to-8 multiplexer, such as Toshiba part number TC4051BP, having 8 second input/output lines, only 6 of which are used (one for each of up to six SUs). Each of the second input/output lines is connected to the VLF input/output terminal of a respective one of subscriber units SU1, SU2 . . . etc. (see FIG. 2). By presenting different code combinations on address lines A, B, and C (i.e., 000, 001, 010, 011, 100, or 101), digital unit 55 can select a particular drop cable to enable a particular subscriber to communicate with the ECU.

For receiving communications from subscribers, the first input/output line of multiplexer 350 is connected through DC-blocking capacitor 336 to the input of very low frequency ("VLF") demodulator 340. VLF demodulator 340 receives VLF-modulated analog signals transmitted from the SPUs at a data rate of 1200 bps (or any other convenient rate) and demodulates those signals into serial digital data for processing by digital unit 55. In one embodiment, the VLF signals received from the SPUs are on/off amplitude-shift keyed ("ASK") modulated signals having a carrier frequency of 468 KHz. A logical "1" (mark) is represented by 100% carrier, and a logical "0" (space) is represented by 0% carrier. Demodulator 340 includes a conventional parallel tuned LC circuit 342 tuned to produce an output in response to the receipt at its input of a signal having a frequency of 468 KHz. The output of circuit 342 is applied to surface acoustic wave ("saw") filter 344 also tuned to 468 KHz. The output of saw filter 344 in turn is connected to conventional amplifier 346 which produces a mark and space data output in response to the presence and absence of carrier. This data output is applied tó digital unit 55 for processing as data received from the SPUs.

For communication from the ECU to the SPUs, data from digital unit 55 is applied to the data input connection of VLF modulator 320. In one embodiment, VLF modulator 320 modulates digital data signals at a data rate of 1200 bps (or any other convenient rate) from digital unit 55 into an on/off ASK analog VLF signal having a carrier frequency of 430 KHz. Data from digital unit 55 turns on and off transistor 327 (via current-limiting resistor 328). Transistor 327 in turn controls on and off FET transistor switch 324 via resistors 325 and 326. The 430 KHz carrier signal produced by conventional crystal-controlled oscillator 322 is applied to the base of transistor 360 which is connected in such a way that the carrier signal appears at the transistor's collector shifted 180° relative to the carrier signal appearing at the transistor's emitter. The collector carrier signal is switched on and off by transistor switch 324 in accordance with the VLF data to be transmitted to an SPU. This switched carrier signal is applied to the first input/output line of multiplexer 350 via resistor 334 for transmission to one of the plurality of subscriber SPUs. The continuous carrier signal appearing at the emitter of transistor 360 is applied to all of the second input/output lines of multiplexer 350 via transistor 370 and resistors 381-386. In this way, there is constant 430 KHz carrier on all of the second input/output lines of multiplexer 350 except when the carrier on one of those lines is cancelled by the switched carrier from transistor switch 324.

V. Digital Unit

As shown in FIG. 5, digital unit 55 has two major subparts. Those subparts are (1) signal processing portion 55*a* (shown in FIGS. *5a–5f*), and (2) memory portion 55*b* (shown in FIGS. *5g–5i*). These two portions of digital unit 55 are interconnected by means of the terminals represented by rectangles and numbered 01–40. For example, the terminal numbered 01 in FIG. *5f* is connected to the correspondingly numbered terminal in FIG. *5g*.

Digital unit 55 includes conventional universal synchronous or asynchronous receiver/transmitter ("USART") 400, such as part number 8274 available from Intel Corporation of Santa Clara, Calif. (hereinafter "Intel"). USART 400 converts HDLC-formatted serial forward data received from head end 12 into parallel data for processing by the remainder of digital unit 55. USART 400 also converts parallel reverse data generated by other elements in digital unit 55 into HDLC-formatted serial data for transmission back to head end 12. The operation of USART 400 is augmented by gate array 402, shown in detail in FIGS. *5k–5s*, which performs various functions such as converting nonreturn to zero inverted ("NRZI") forward data from head end 12 on the FORWARD DATA lead to non-return to zero ("NRZ") "receive" data on the RXD lead. Gate array 402 also converts NRZ "transmit" data on the TXD lead to NRZI reverse data on the REVERSE DATA lead.

Figure 6:
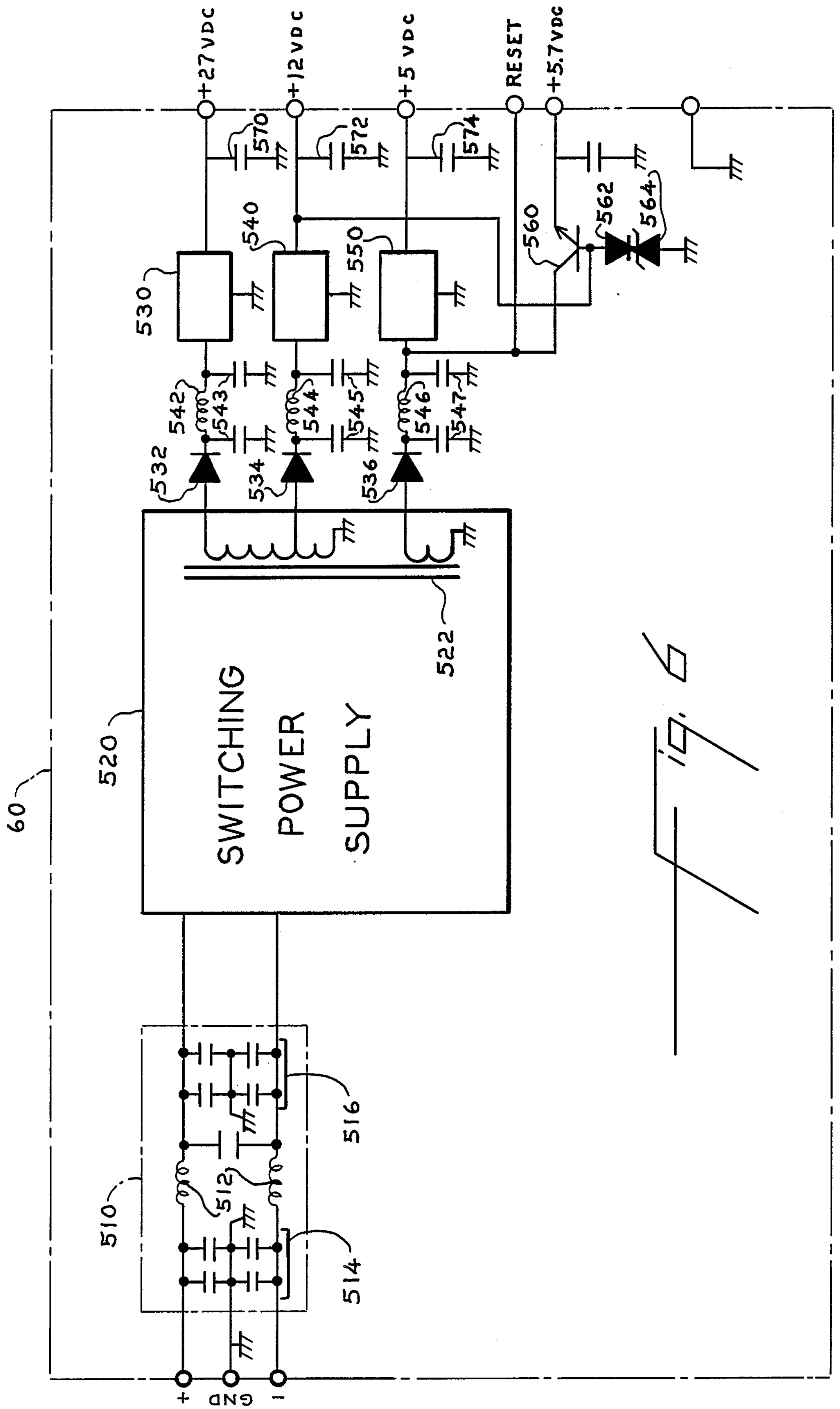
FIG. 6 is a schematic diagram of the common power unit in the apparatus of FIG. 1.

USART 400 and gate array 402 are also interconnected by INTERRUPT ("INT"), CLOCK ("CLK"), RXC, TXC, READ ("RD"), WRITE ("WR"), and RESET ("RES") leads. The INT signal is generated by USART 400, is inverted by gate array 402, and is applied to the INTO terminal of microprocessor 420. This signal is used to alert microprocessor 420 to the occurrence of an important event in USART 400 (e.g., the fact that a character has been received or transmitted via the FORWARD or REVERSE DATA leads). The CLK3 output signal of gate array 402 is derived from the CLKOUT output signal of microprocessor 420. In particular, the 6MHz CLKOUT signal is divided by two by gate array 402 to produce the 3 MHz CLK3 output signal which is applied to USART 400. The RXC output signal of gate array 402 is a clock signal derived by gate array 402 from the NRZI forward data signal. The TXC input signal of gate array 402 is a clock signal produced by microprocessor 420 to control the rate at which reverse data is transmitted back to head end 12. The source of the RD and WR signals is microprocessor 420. These signals respectively cause other devices in digital unit 55 to output data so that microprocessor 420 can read it, or cause other devices in digital unit 55 to input data from microprocessor 420. The ultimate source of the RESET or RES signals is power detect circuit 480. The POWER DETECT input terminal of digital unit 55 is connected to the RESET output terminal of common power unit 60 (FIG. 6). Power detect circuit 480 produces an output signal for resetting microprocessor 420 when power is restored following a power outage. Microprocessor 420 responds to this RES input signal by producing a RESET output signal which is applied to the RESET input terminal of gate array 402. Gate array 402 applies an inverted RESET signal to USART 400, microcomputer 450, and hex inverting buffer 465.

Gate array 402 is shown in detail in FIGS. *5k–5s*. In FIG. *5k*, reference number 250 denotes a typical input buffer; reference number 252 denotes a typical AND gate; reference number 254 denotes a typical NAND gate; reference number 256 denotes a typical J-K flip-flop; reference number 258 denotes a typical D-type flip-flop; reference number 260 denotes a typical OR gate; and reference number 262 denotes a typical output buffer. In FIG. *5s*, reference number 264 denotes a typical latch. The following Table B correlates the gate array 102 pin numbers shown in FIG. *5c* with the lead labels used in FIGS. *5k–5s*:

TABLE B

Figure 5D:
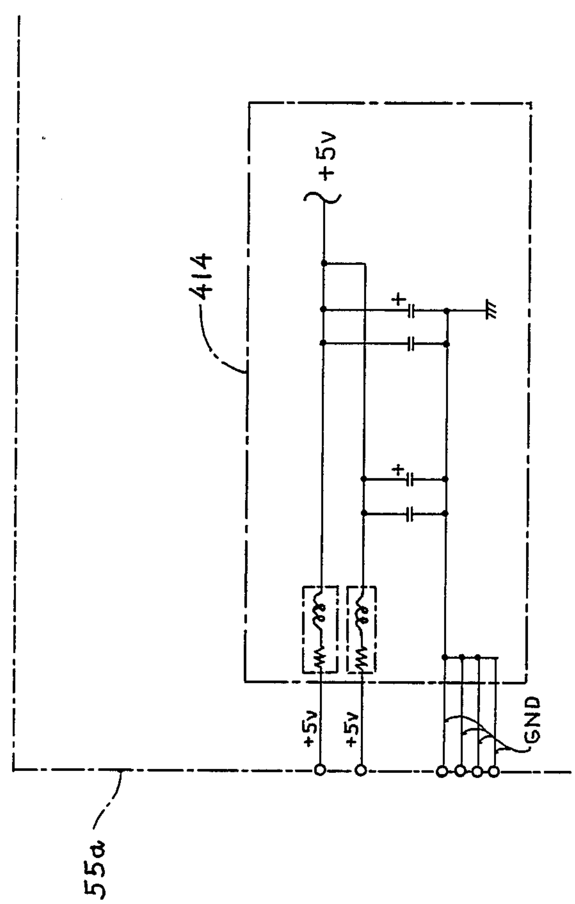
FIGS. 5*a*–5*i*, which are connected together as shown in FIG. 5*j*, are collectively a schematic block diagram of the digital unit in the apparatus of FIG. 1.
Figure 5B:
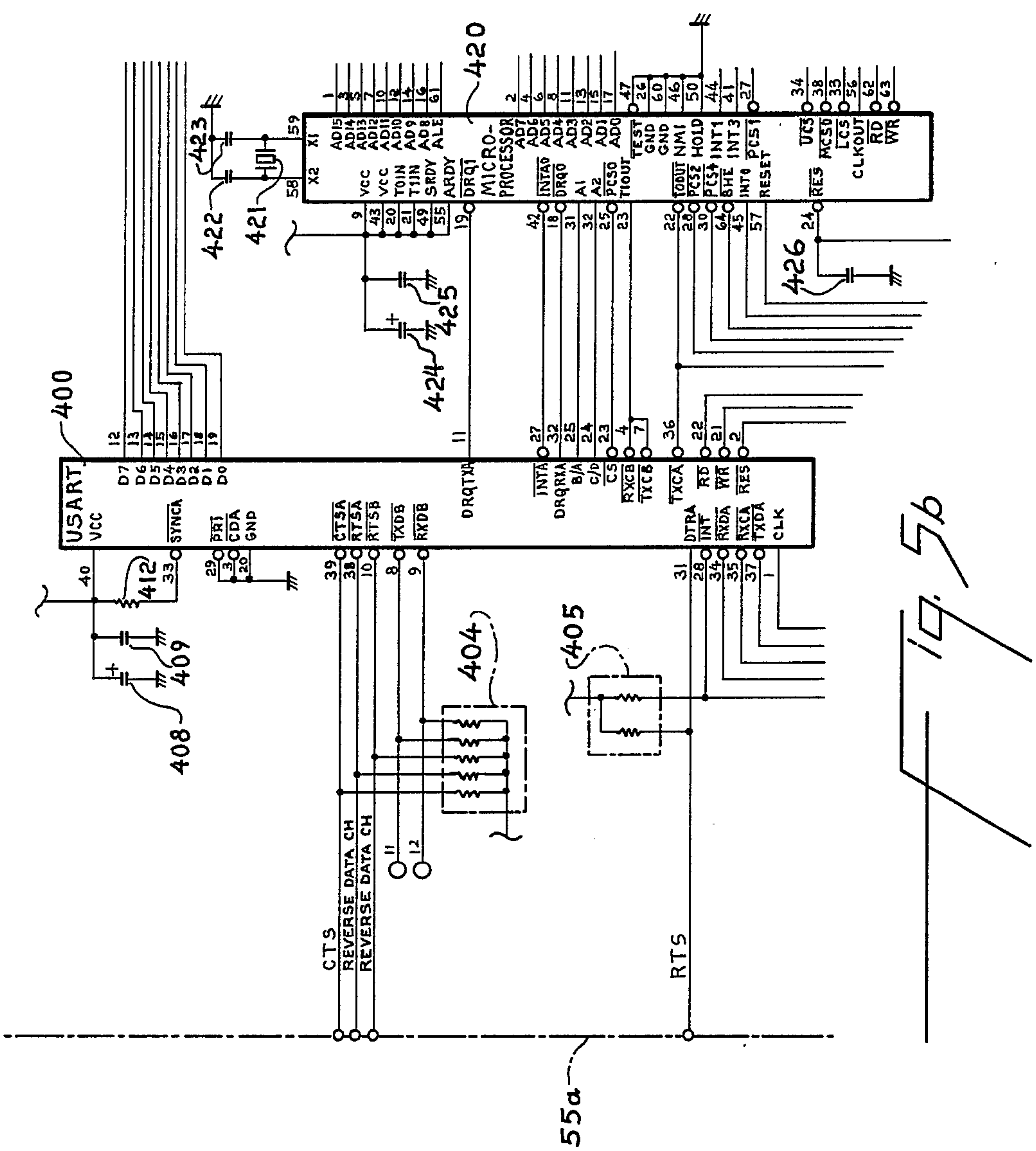
Figure 5C:
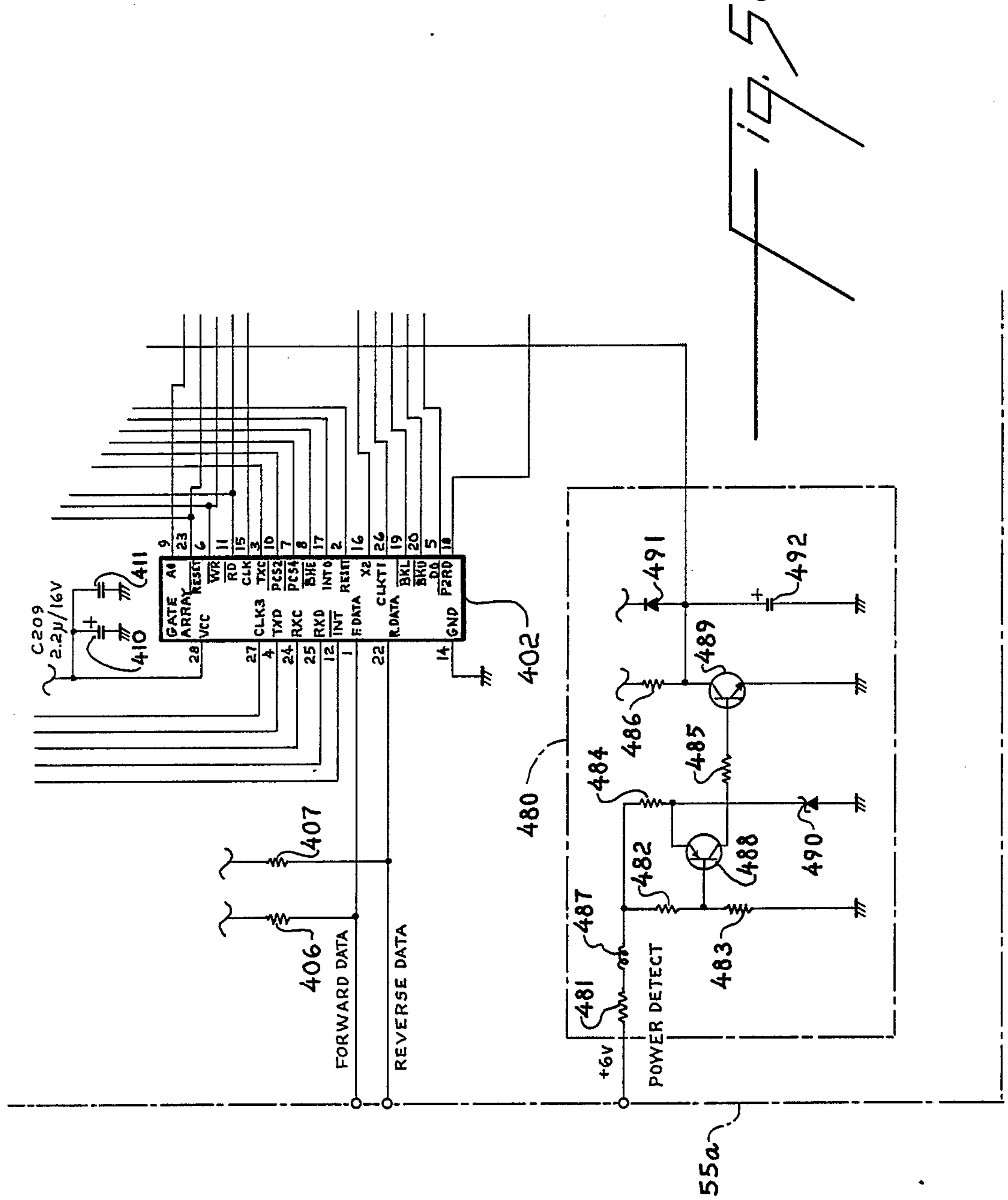
Figure 5D:
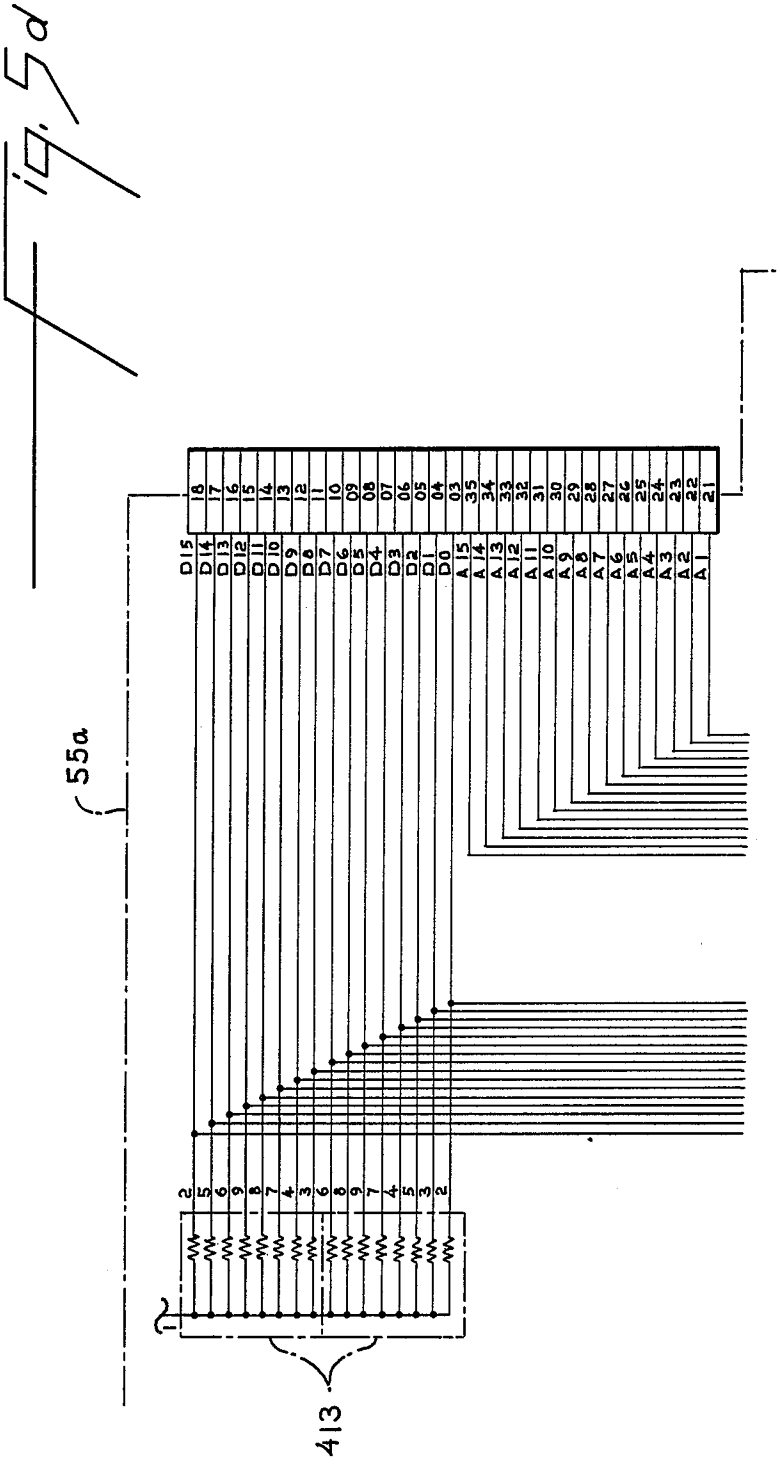
Figure 5E:
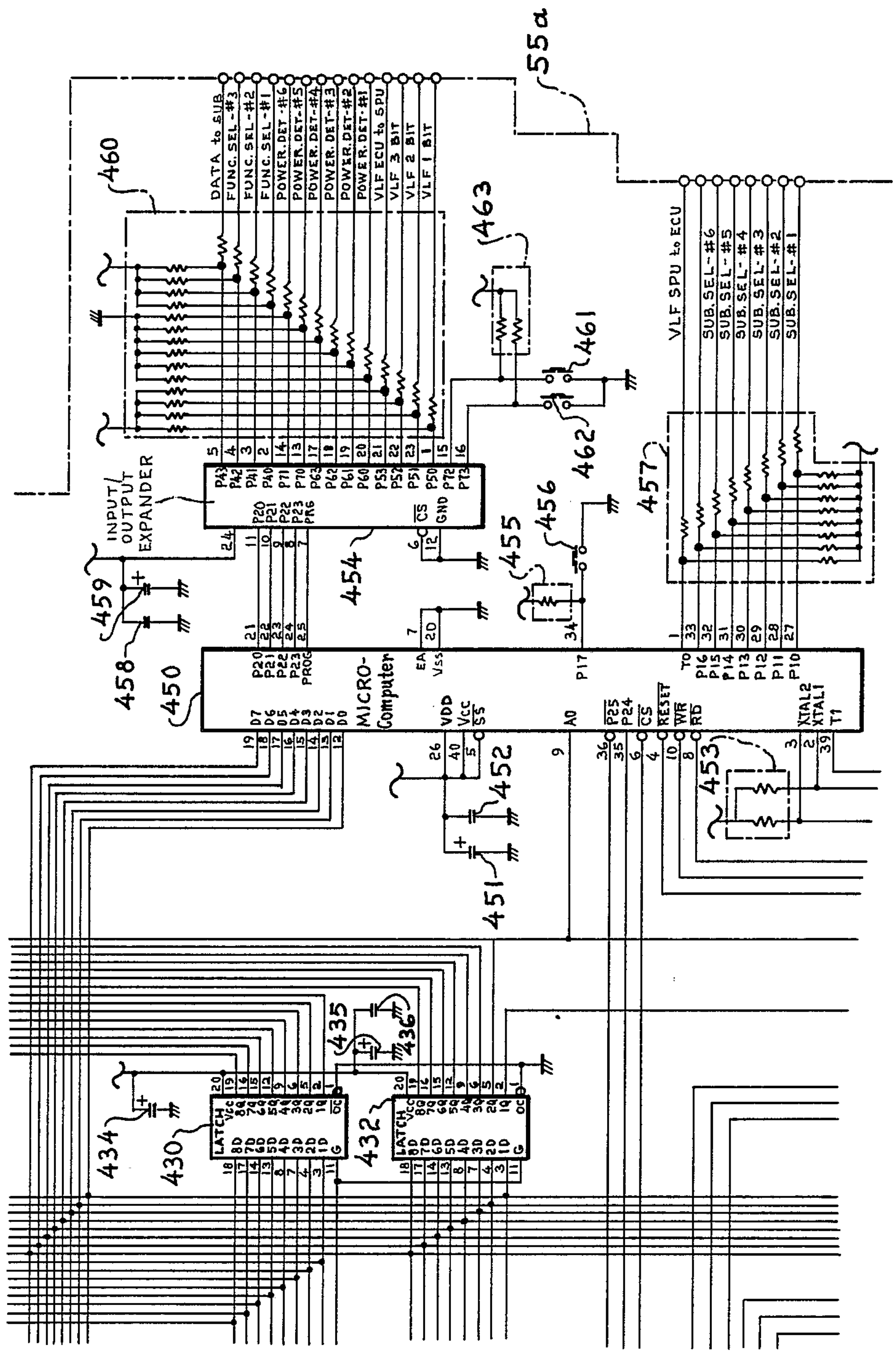
Figure 5F:
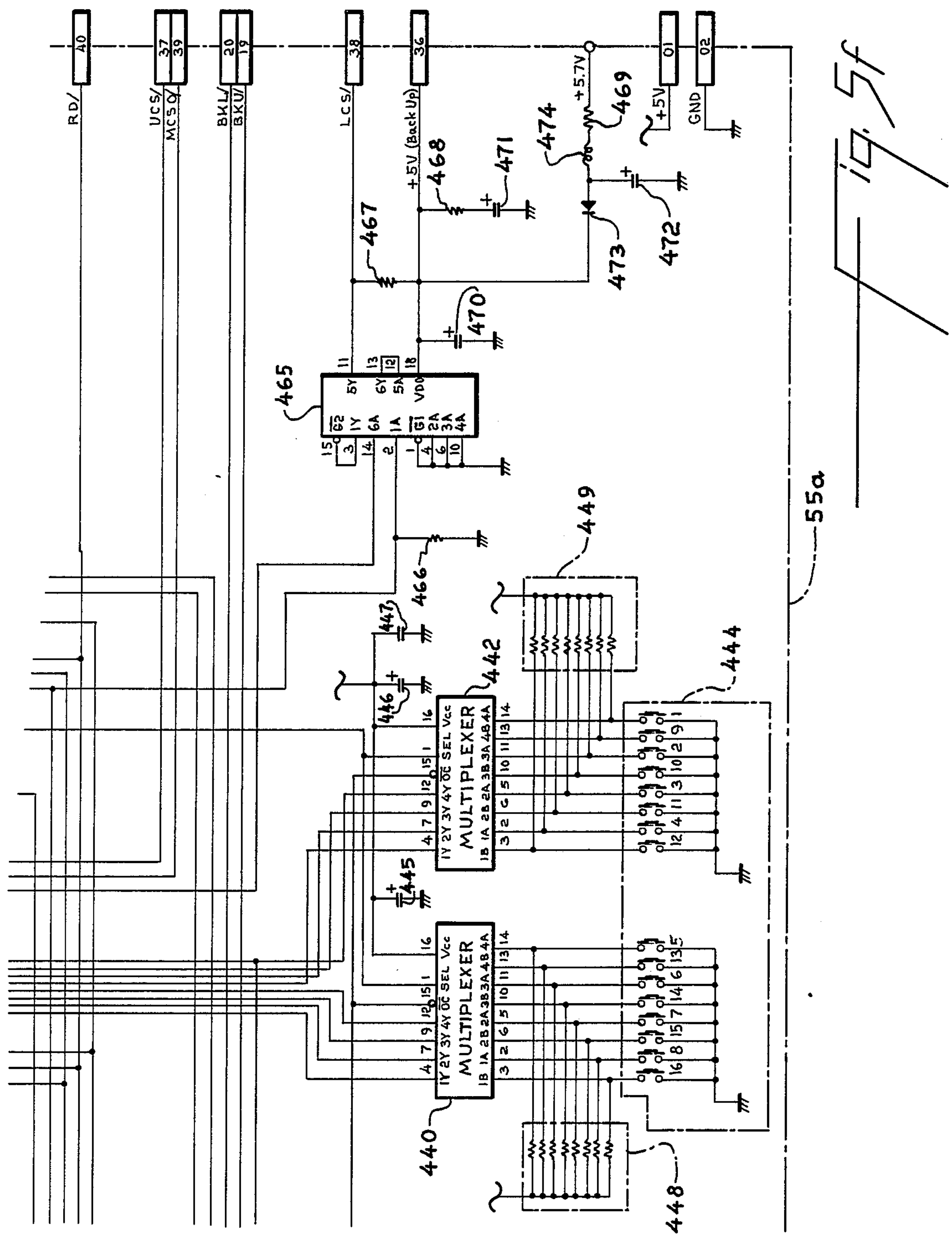
Figure 5G:
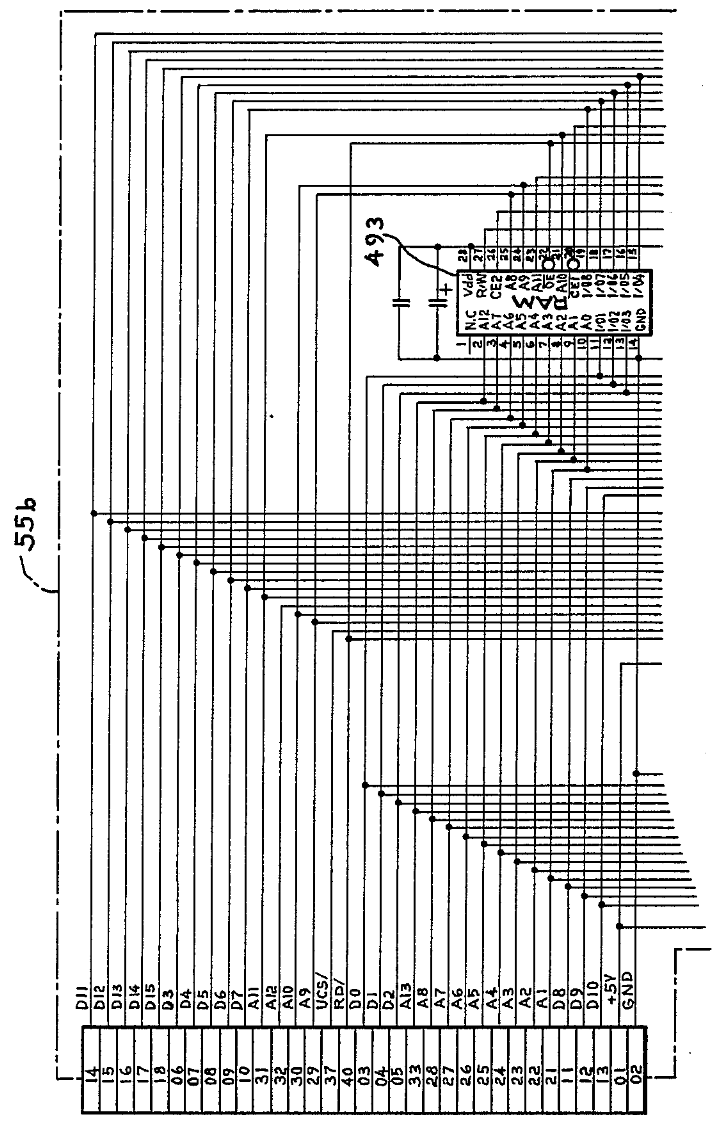
Figure 5H:
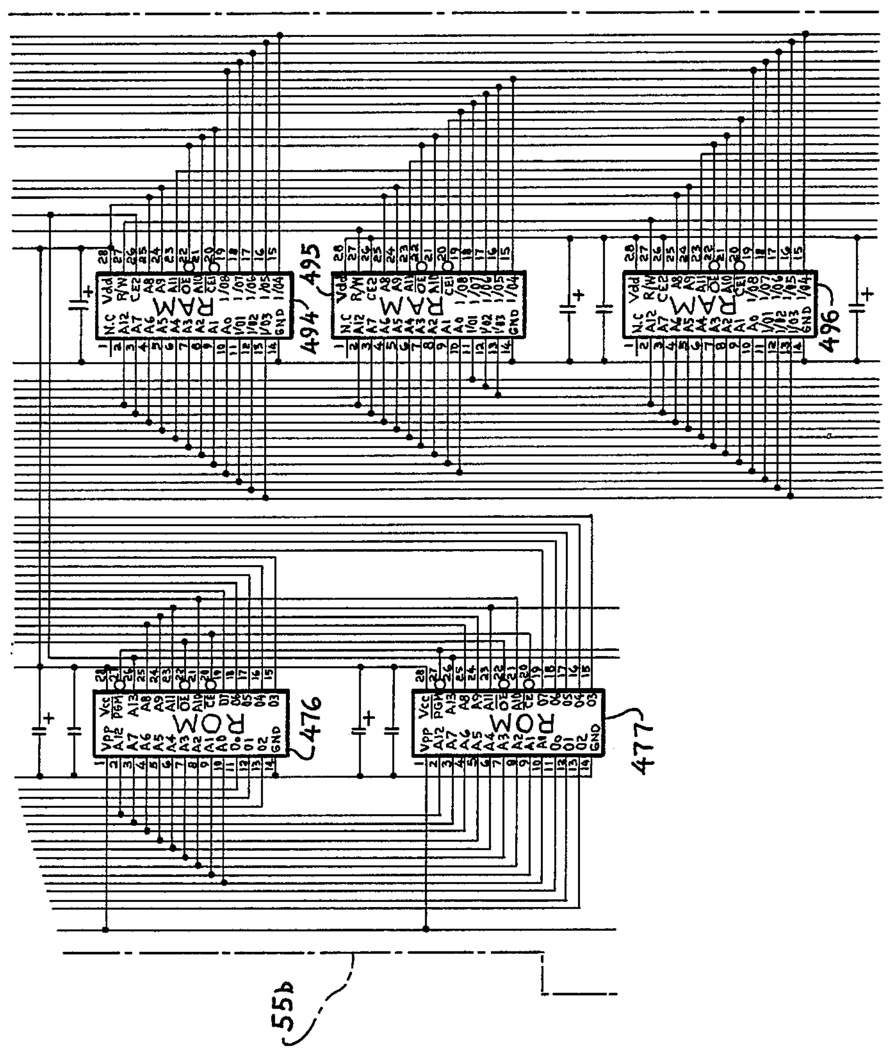
Figure 5I:
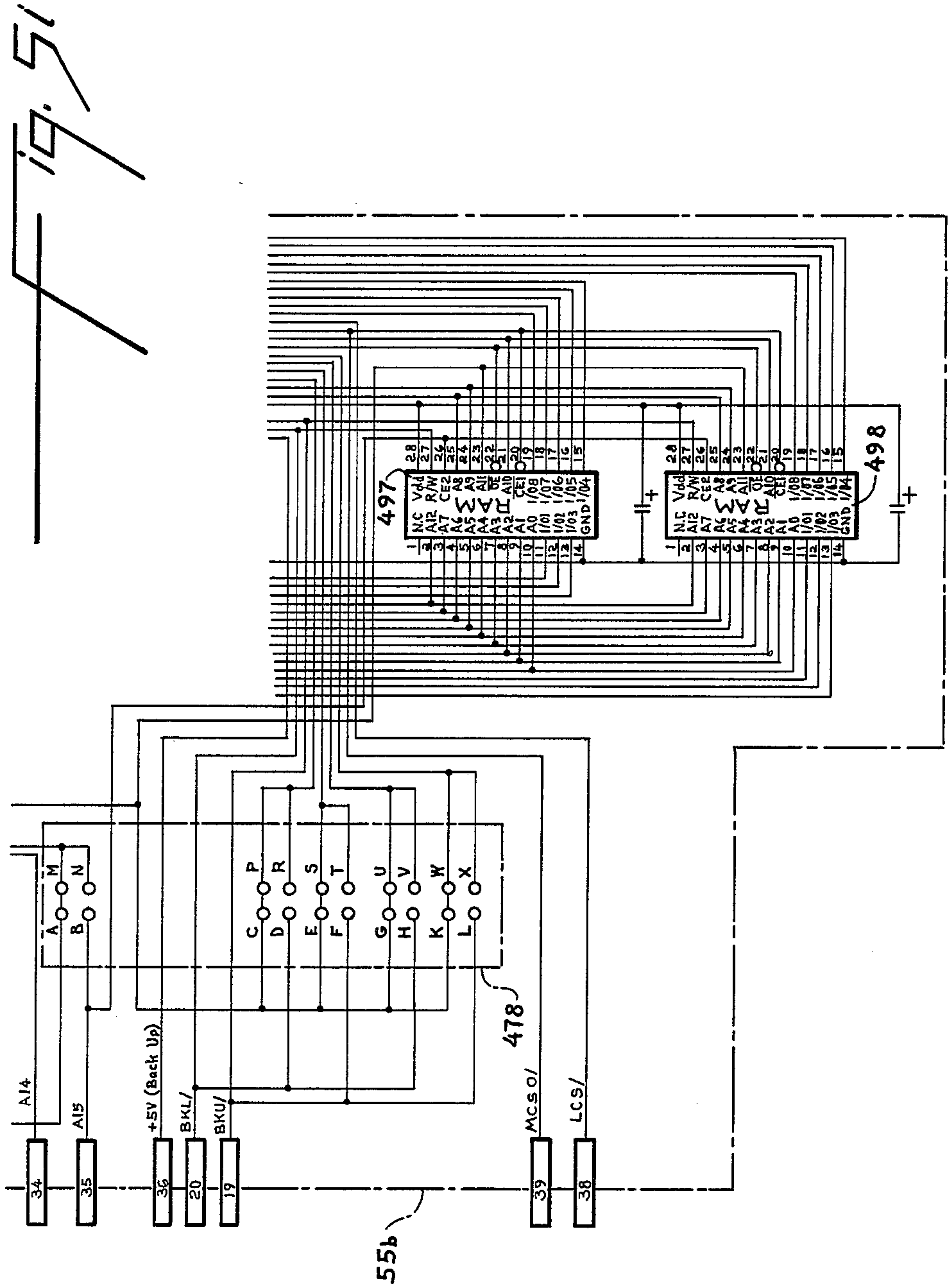
Figure 5J:
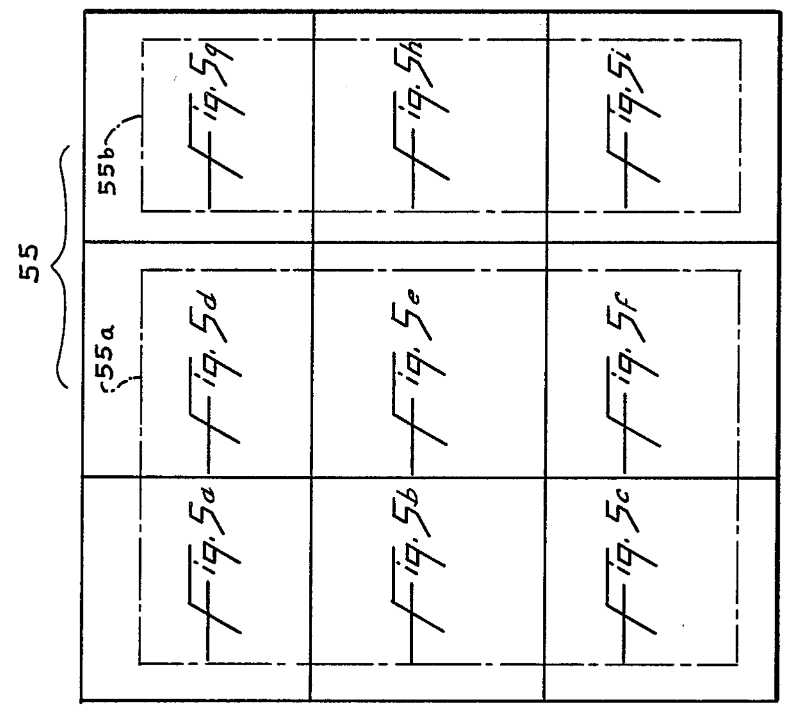
FIGS. 5*k*–5*s* are collectively a schematic diagram of the gate array shown in FIG. 5*c*.
Figure 5K:
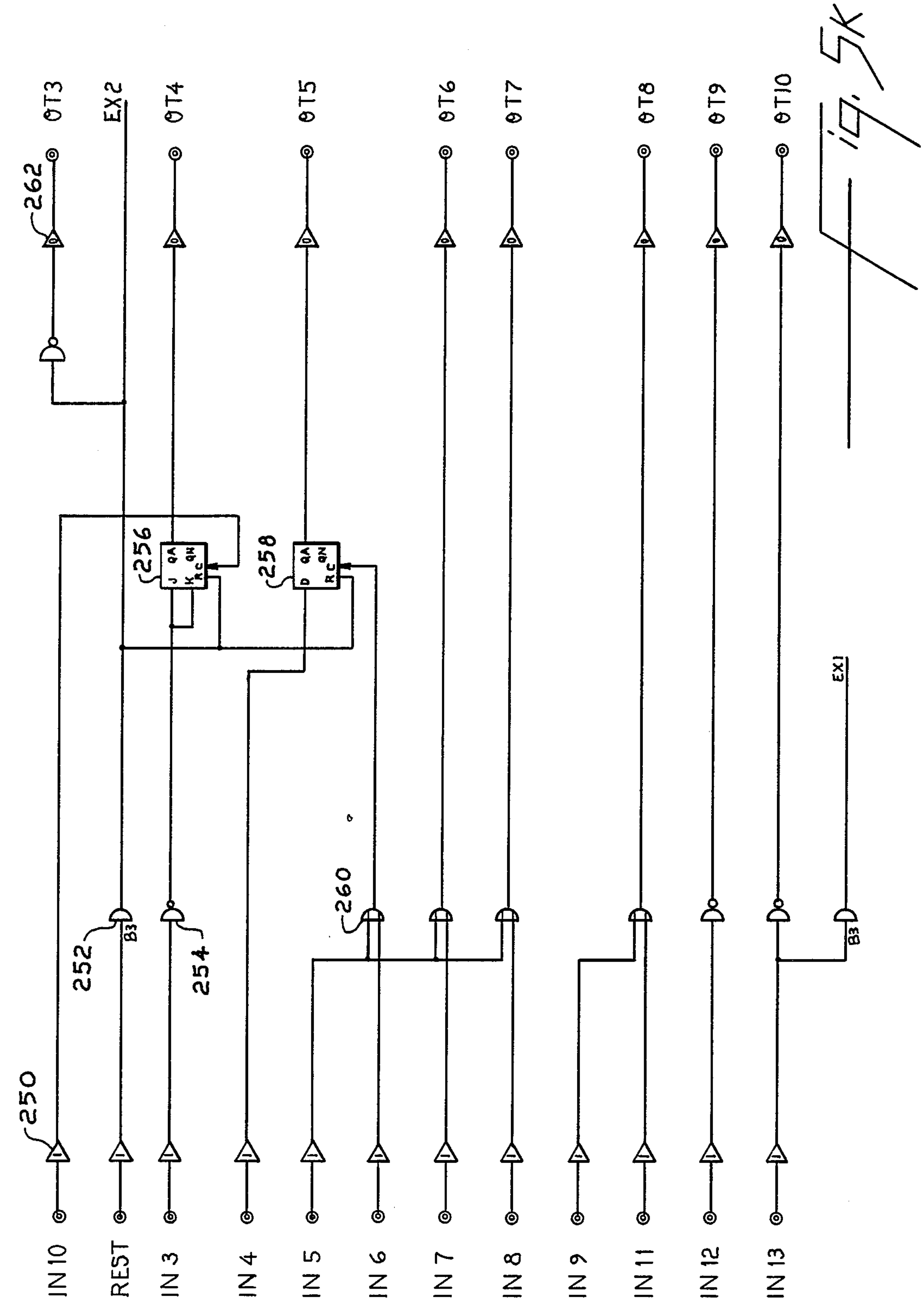
Figure 5L:
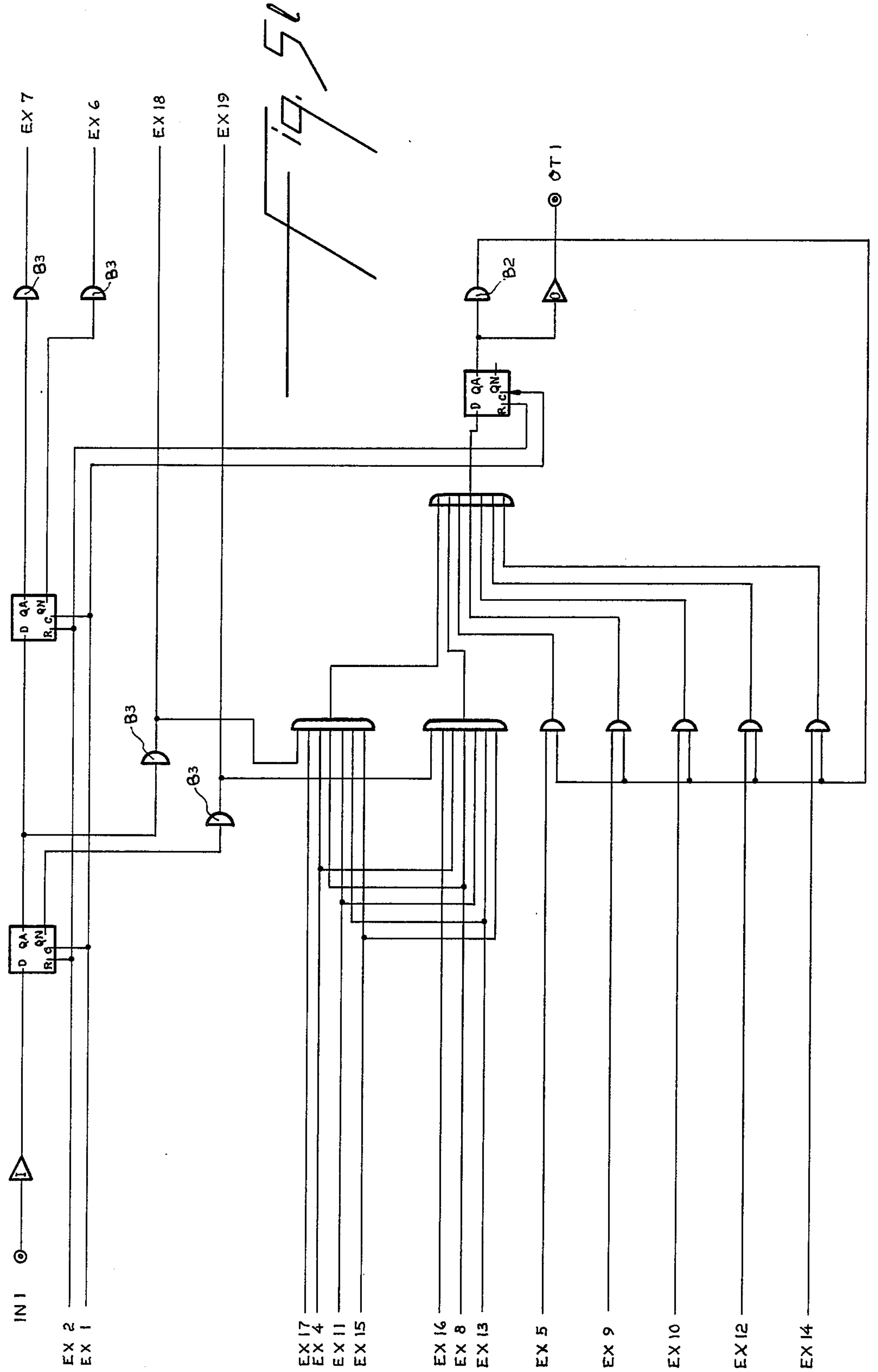
Figure 5M:
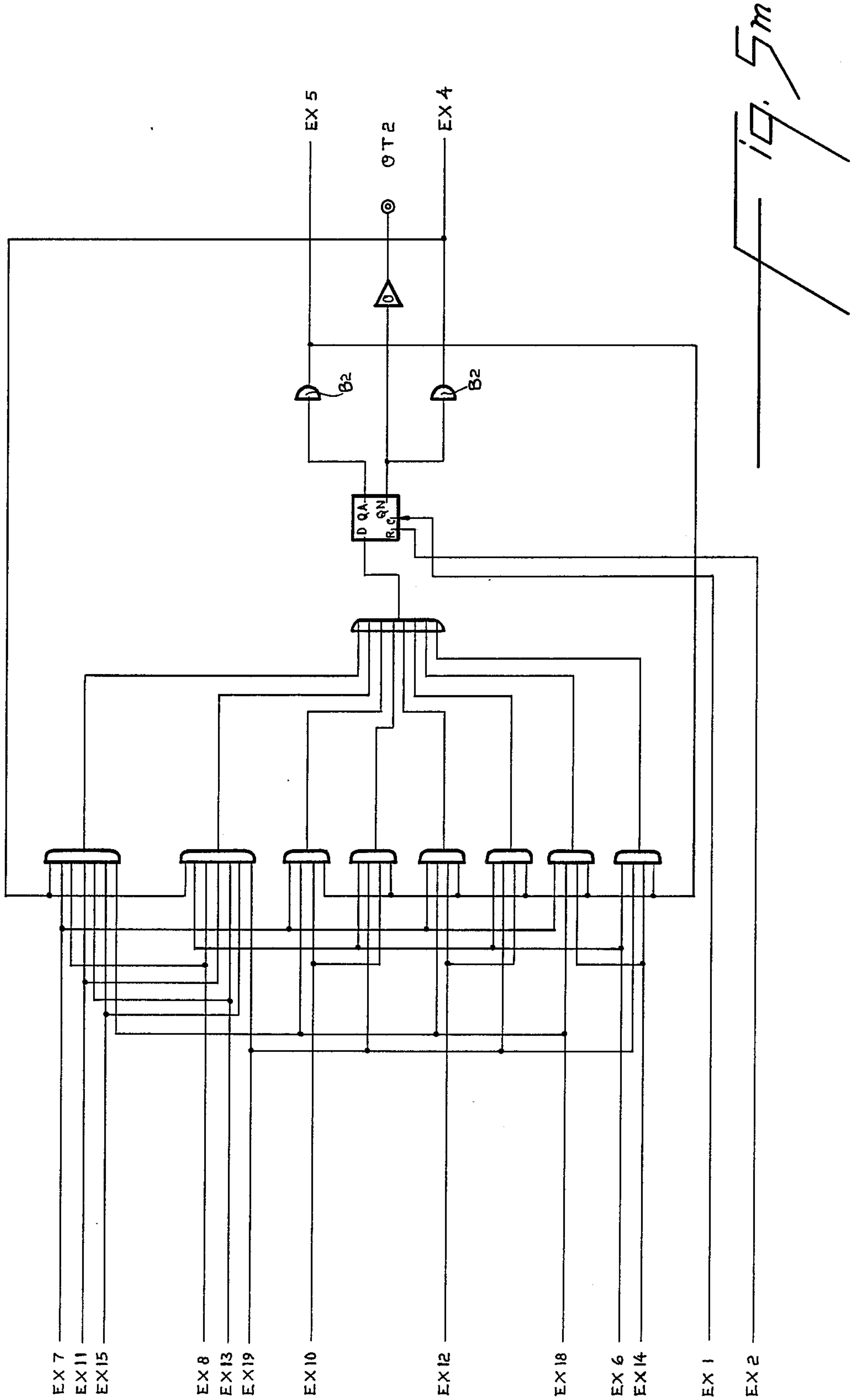
Figure 5N:
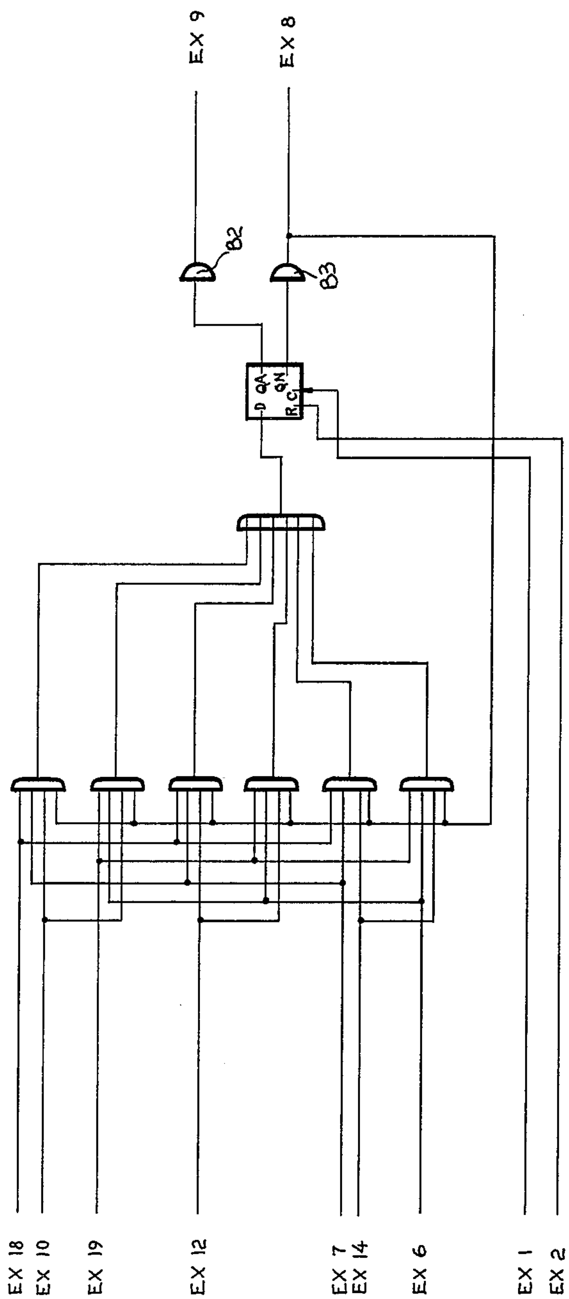
Figure 50:
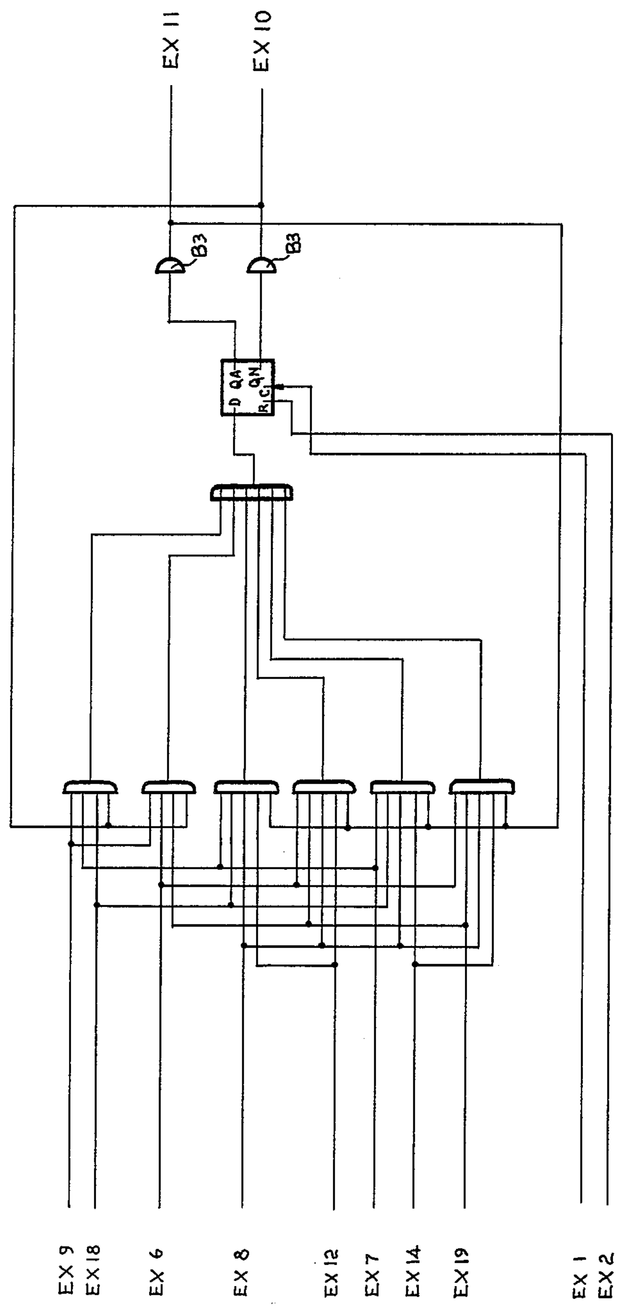
Figure 5P:
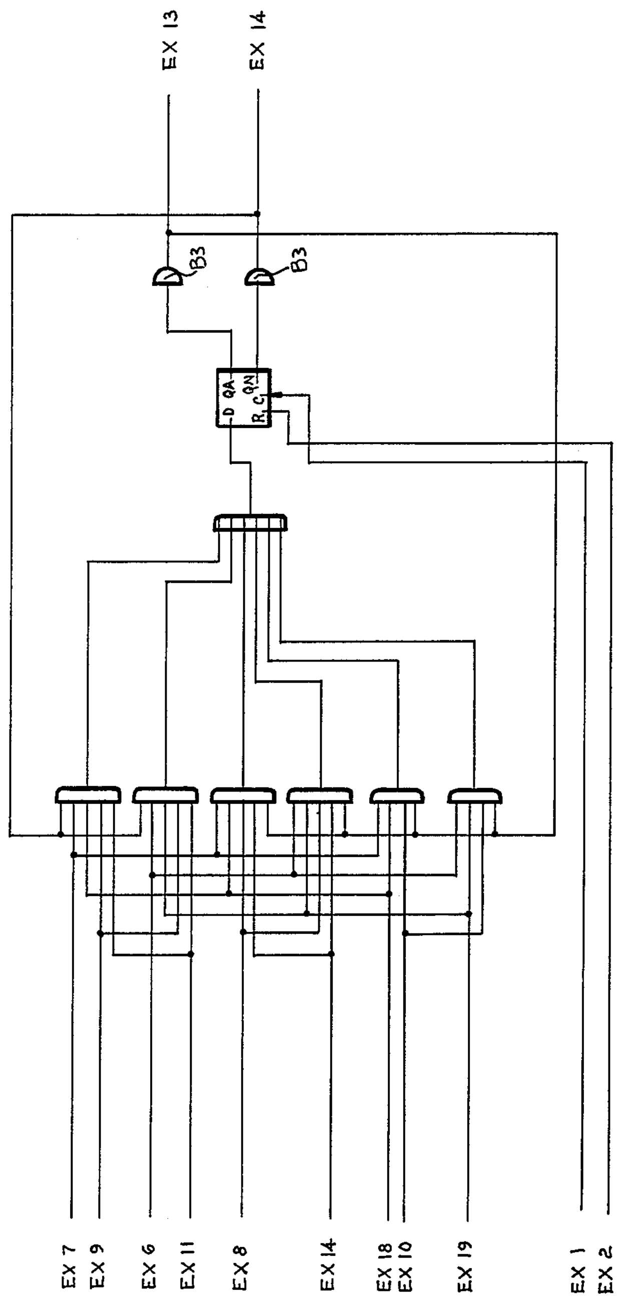
Figure 5G:
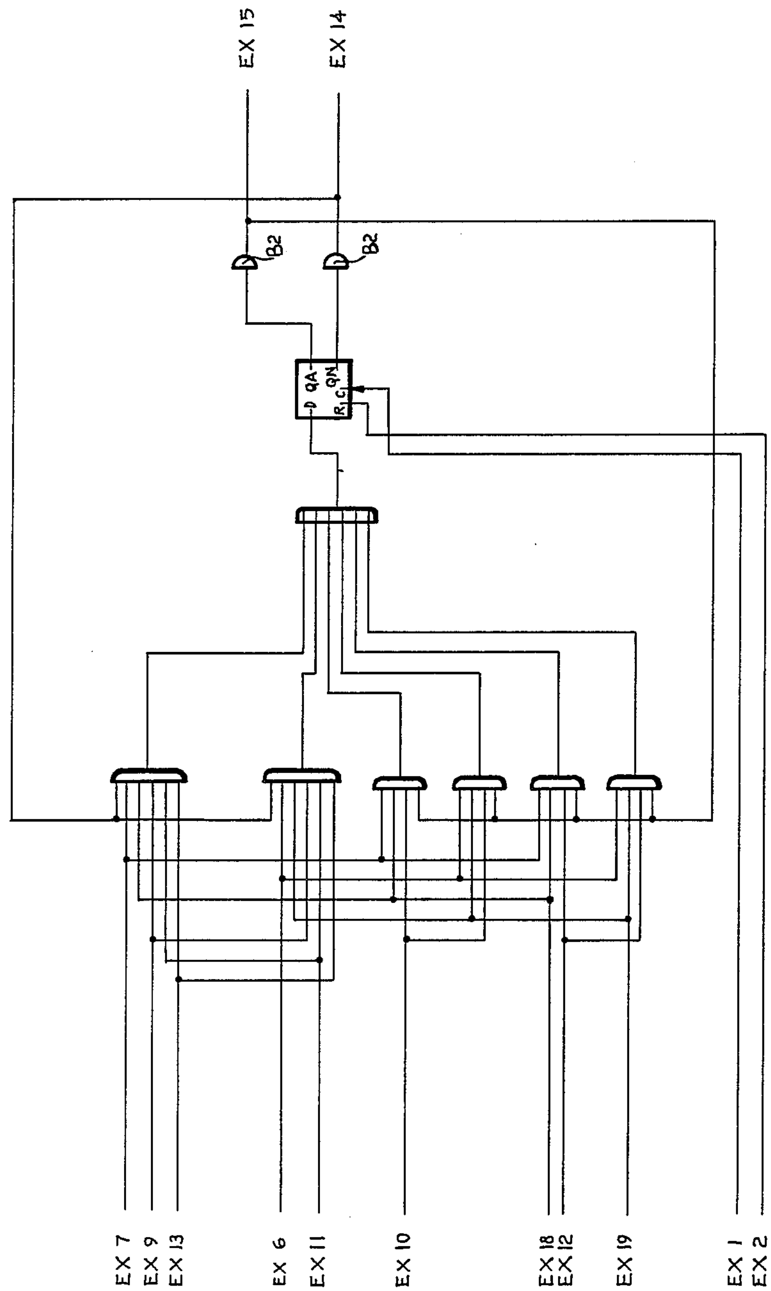
Figure 5R:
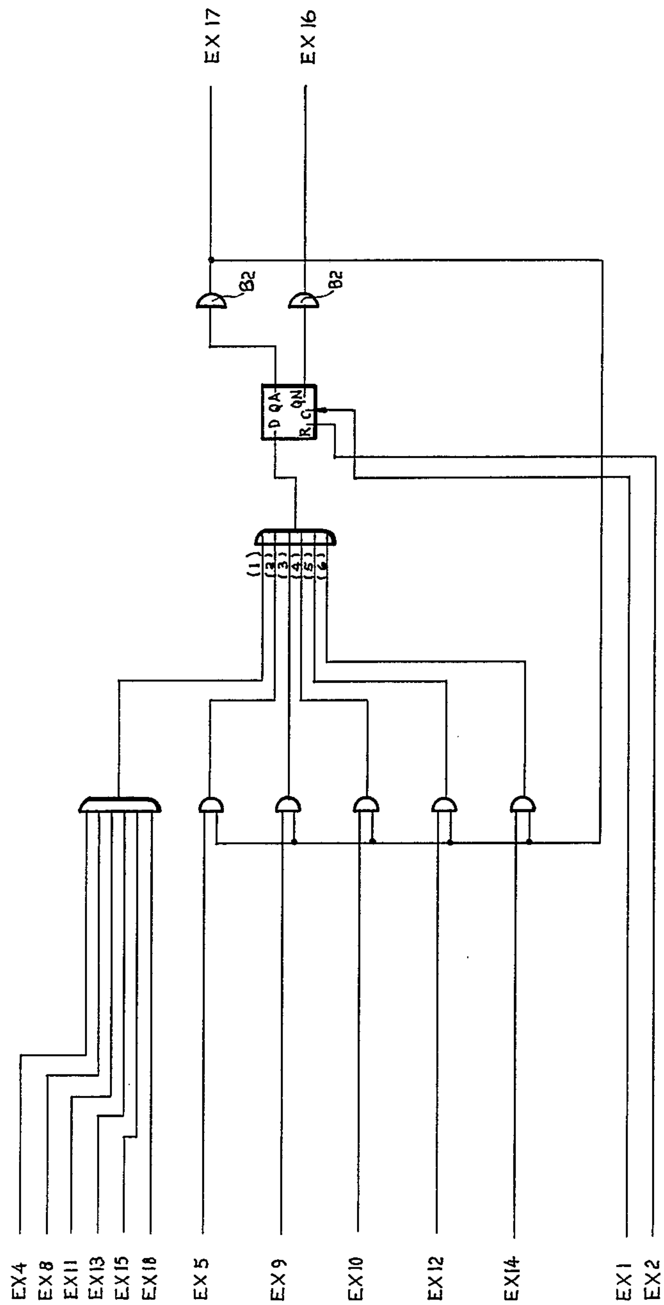

| FIG. 5c Pin Number | Lead Label in FIGS. 5k-5s |
|---|---|
| 1 | IN1 |
| 2 | REST |
| 3 | IN10 |
| 4 | IN3 |
| 5 | IN4 |
| 6 | IN5 |
| 7 | IN6 |
| 8 | IN7 |
| 9 | IN8 |
| 10 | IN9 |
| 11 | IN11 |
| 12 | IN12 |
| 13 | — |
| 14 | GND |
| 15 | IN13 |
| 16 | OT10 |
| 17 | OT9 |
| 18 | OT8 |
| 19 | OT7 |
| 20 | OT6 |
| 21 | OT5 |
| 22 | OT4 |
| 23 | OT3 |
| 24 | OT2 |
| 25 | OT1 |
| 26 | OT12 |
| 27 | OT11 |
| 28 | VCC |

In addition, leads with EX labels in FIGS. *5k–5s* are connected to similarly labelled leads in FIGS. *5k–5s*. For example, the output lead labelled EX4 IN FIG. *5m* is connected to the input lead labelled EX4 IN FIG. 51. The detailed operation of the gate array circuits shown in FIGS. *5k–5s* will be readily apparent to those skilled in the art from the circuits themselves and from the preceding and following functional description of gate array 402 in relation to the other components of digital unit 55.

USART 400 has a REQUEST TO SEND ("RTS" or "DTRA") lead by which it interrogates communication unit 56 to ensure that the communication unit is ready to transmit reverse data to head end 12. If communication unit 56 is ready to transmit reverse data, the communication unit sends an appropriate signal to USART 400 on the CLEAR TO SEND ("CTS" or "CTSA") lead. USART 400 selects the reverse data channel to be used by means of signals on the REVERSE DATA CHANNEL SELECT A and B ("RTSA" and "RTSB") leads, which are also connected to communication unit 56.

Pull-up resistor networks 404–407 are connected in the conventional way between +5V power supply circuit 414 and the CTS, RTSA, RTSB, RTS, INTERRUPT, FORWARD DATA, and REVERSE DATA leads, as well as to the TXDB and RXDB leads which are not used. Power supply circuit 414 is configured conventionally to provide noise protection for the +5V power signal used throughout digital unit 55. The VCC terminal of USART 400 is also conventionally connected to +5V power supply 414 in parallel with capacitors 408 and 409. The VCC terminal of gate array 402 is similarly connected to the +5V power supply in parallel with capacitors 410 and 411. The SYNCA terminal of USART 400 is clamped to the +5V supply via resistor 412. The PRI, CDA, and GROUND ("GND") leads of USART 400 and the GROUND ("GND") lead of gate array 402 are all connected to ground.

USART 400 applies parallel forward data to the data bus of digital unit 55 via terminals D0–D7. USART 400 also receives parallel reverse data from the data bus via terminals D0–D7. The data bus distributes data among USART 400, microprocessor 420, latches 430 and 432, multiplexers 440 and 442, microcomputer 450, and memory unit 475. Pull-up resistor network 413 is connected in the conventional way between the +5V power supply and the data bus leads.

Microprocessor 420, which can be a conventional microprocessor such as Intel part number 80186, performs such functions as (1) communicating with head end 12, (2) processing subscriber requests (e.g., channel selection), and (3) communicating with microcomputer 450. In addition to the data bus connections, microprocessor 420 communicates with USART 400 via its DRQ1, INTA0, DRQ0, A1, A2, PCSO, T1OUT, and T0OUT leads. When USART 400 is to read data directly from the memory portion 55*b* of digital unit 55, USART 400 requests direct memory access ("DMA") for reading by applying a DRQ1 signal to microprocessor 420. Microprocessor 420 acknowledges receipt of an INTO signal from USART 400 via gate array 402 as described above by means of an INTAO output signal. When USART 400 is to write data directly to the memory portion 55*b* of digital unit 55, USART 400 requests direct memory access ("DMA") for writing by applying a DRQ0 signal to micropressor 420. The A1 output signal of microprocessor 420 is applied to USART 400 to select one of two register sets in USART 400 for connection to the data bus. The A2 output signal of microprocessor 420 is applied to USART 400 to one of two register types (i.e., control "C" or data "D") within the USART register set selected by the A1 signal. The PCSO (programmable chip select -0) output signal of microprocessor 420 is used to select USART 400 for reading data from (WR) or writing data to (RD) microprocessor 420. The T0OUT output signal of microprocessor 420 is a timer signal which controls the rate at which forward and reverse data are transmitted. The T1OUT output signal of microprocessor 420 is similar to the T0OUT signal, but controls the data rate on unused channel TXDB/RXDB.

Microprocessor 420 also communicates with gate array 402 via its T0OUT, PCS2, PCS4, BHE, INTO, RESET, CLOCK OUT ("CLKOUT"), READ ("RD"), and WRITE ("WR") leads. The T0OUT output signal of microprocessor 420 is described above. The PCS2 and PCS4 (programmable chip select 2 and 4) output signals of microprocessor 420 are similar to the PCSO signal described above. The BHE (byte high enable) output signal of microprocessor 420 is used to allow the 16-bit data bus to be used as an 8-bit data bus.

The INTO input signal of microprocessor 420 is described above in connection with USART 400 and gate array 402. The RESET, CLKOUT, RD, and WR output signals of microprocessor 420 are also described above.

Microprocessor 420 applies data and address signal information to the data bus and receives such information from the data bus via its AD0–AD15 leads. Microprocessor 420 communicates directly with microcomputer 450 via its INT1, INT3, and PCS1 leads. Microprocessor 420 applies additional control signals to memory unit 475 via its UPPER CHIP SELECT ("UCS"), MIDDLE CHIP SELECT ("MCSO"), and LOWER CHIP SELECT ("LCS") leads. The operating frequency of microprocessor 420 is established in the usual way by the circuit including crystal 421 and capacitors 422 and 423. The VCC, T0IN, T1IN, SRDY, and ARDY leads are connected to the +5V power supply in parallel with capacitors 424 and 425. The TEST, GROUND ("GND"), NMI, and HOLD leads are connected to ground. As mentioned above, the RES terminal of microprocessor 420 is connected via power detect circuit 480 (including resistors 481–486, inductor 487, transistors 488–489, Zener diode 490, diode 491, and capacitor 492) to the POWER DETECT input terminal of digital unit 55. The POWER DETECT terminal is connected the RESET output terminal of common power supply 60 and is used to detect an AC power failure. When AC power is restored following a power interruption, power detect circuit 480 holds microprocessor 420 in the reset condition until sufficient time has elapsed to allow the microprocessor to re-initialize itself properly. For this purpose, the output signal of power detect circuit 480 is connected to the RESET ("RES") terminal of microprocessor 420 in parallel with capacitor 426.

Latches 430 and 432 are used to store address signal information produced by microprocessor 420 at terminals AD0–AD15 while associated data signals are transmitted or received via those same microprocessor terminals. The 1Q–8Q output leads of latches 430 and 432 collectively comprise an address bus which is connected to memory unit 475. Latches 430 and 432 are enabled by the ADDRESS LATCH ENABLE ("ALE") signal produced by microprocessor 420 and applied to the G input terminal of each latch. Power (+5V) is applied to the VCC input terminal of each latch 430 and 432 in parallel with capacitors 434–436. The OC terminals of both latches are connected to ground.

Multiplexers 440 and 442 act as an interface between 16 manually positioned switches 444, which specify the address of the ECU, and microprocessor 420 to enable the information represented by switches 444 to be read by the microprocessor in two successive 8-bit bytes. The signal for selecting ("SEL") multiplexers 440 and 442 comes from latch 432. The multiplexers are advanced or stepped by the signal applied to their OC terminals from gate array 402. Power (+5V) is supplied to the VCC terminals of multiplexers 440 and 442 in parallel with capacitors 445–447. Pull-up resistor networks 448–449 are conventionally connected between the +5V power supply and the data input leads of the multi- plexers.

Microcomputer 450, which can be a conventional microcomputer such as Intel part number 8472, performs such functions as (1) controlling communications with the subscribers via the drop cables, (2) controlling the tuner/converters in the SUs, and (3) communicating with microprocessor 420. Microcomputer 450 is connected to the data bus via its D0–D7 leads. The VDD, VCC, and SS leads of microcomputer 450 are connected to the 5V power supply in parallel with capacitors 451 and 452. The AO lead is connected to the SEL input terminals of multiplexers 440 and 442. The P25, P24, and CS leads are connected directly to microprocessor 420 as mentioned above. The RESET, WRITE ("WR"), READ ("RD"), XTAL2, XTAL1, and T1 leads are connected to gate array 402. The RD lead is also connected to memory unit 55b. The signals on the XTAL1 and XTAL2 leads determine the operating frequency of microcomputer 450. Pull-up resistor network 453 is connected between these leads and the +5V power supply.

The P20–P23 and PROG terminals of microcomputer 450 are connected to conventional input/output expander 454 which may be Intel part number TMP82C43P. Expander 454 allows a small number of microcomputer input/output terminals to be connected to a larger number of input/output leads. The EA and VSS leads of microcomputer 450 are connected to ground. In a development configuration, the P17 lead of microcomputer 450 is connected via pull-up resistor 455 to the +5V power supply, and via manually operated switch 456 to ground.

Microcomputer 450 receives VLF data from communication unit 56 via its T0 lead. The P16 lead is not used. Six SUBSCRIBER SELECT signals are produced by microcomputer 450 and applied to leads P10–P15. Each of these signals is applied to a respective one of the six SUs in this ECU in order to select the one or more of the SUs which is to respond to the DATA and FUNCTION SELECT signals mentioned below. The signals on leads T0 and P10–P16 pass through conventional buffering and pull-up resistor network 457, which is also connected to the +5V power supply.

The +5V power supply is connected to input/output expander 454 in parallel with capacitors 458 and 459. The CHIP SELECT ("CS") and GROUND ("GND") leads are connected to ground. The signal on lead P43 is serial DATA for use by the SU or SUs selected by the SUBSCRIBER SELECT output signals of microcomputer 450. For example, this DATA signal may be the MS coefficients used by the SUs as described above in relation to the SUs. The signals on leads P40–P42 are the three FUNCTION SELECT signals which are applied to the SUs to control their processing of the above-mentioned DATA signal. The signals on the P60–P63, P70, and P71 leads are respectively the six POWER DETECT signals produced by the SUs as described above. As mentioned above, each of these signals indicates whether or not the associated subscriber is supplying his or her share of the total AC power required for operation of the ECU. The signal on the P53 lead is the VLF data signal to be transmitted from the ECU to a selected subscriber's SPU via communication unit 56. The signals on the P50–P52 leads are also applied to communication unit 56 where they are used to control multiplexer 350 which selects the SPU that is to send or receive VLF data. The signals on leads P40–P43, P50–P53, P60–P63, and P70–P71 pass through conventional buffering and pull-up or clamping resistor network 460. Leads P72 and P73 are respectively connected to ground via manually operated switches 461 and 462 and to the +5V power supply via pull-up resistor network 463. Switches 461 and 462 allow the ECUs in the system to be grouped in up to four different addressable banks.

Back-up power supply 464 operates during a total AC power failure to prevent loss of data in an essential portion of memory unit 55_b_, i.e., the portion of the memory unit selected by the LOWER CHIP SELECT ("LCS") signal. A back-up power supply includes conventional hex inverting buffer 465, resistors 466–469, capacitors 470–472, diode 473, and inductor 474. Buffer 465 may be Toshiba part number TC40H368P or an equivalent device. The back-up power is actually derived from capacitor 471 which is a relatively large storage capacitor. While the AC power is on, capacitor 471 is charged from the +5.7 volt power supply via the circuit including elements 468, 469, and 472–474. During an AC power interruption (as indicated by the reset signal applied to the 1A input terminal of buffer 465), capacitor 471 supplies +5V back-up power to energize buffer 465, to provide an LCS signal, and to provide +5V power to the portion of memory unit 475 selected by the LCS signal.

Memory unit 55_b_ includes two conventional 16K-byte read only memories ("ROMs") 476 and 477 which store the operating program instructions for microprocessor 420. Each of ROMs 476 and 477 may be Intel part number 27128, or an equivalent device. Memory unit 55_b_ also includes six conventional 8K-byte random access memories ("RAMs") 493–498 which store the data needed for control of the ECU. Each of RAMs 493–498 may be Toshiba part number TC5565PL-15 or an equivalent device. The connection of the various elements of memory unit 55_b_ to the remainder of digital unit 55, as well as the inter-connection of the memory unit elements, is entirely conventional and will be readily apparent to those skilled in the art. The UCS, MCSO, and LCS signals are used to extend the 16-bit address information to allow use of more memory than can be accessed using only 16 bits. The UPPER BANK SELECT ("BKU") and LOWER BANK SELECT ("BKL") signals produced by gate array 402 are used in combination with jumper network 478 to allow the relative amounts of ROM and RAM to be changed if desired. RAMs 495 and 496 are the memory unit elements energized by back-up power supply 464 in the event of an AC power outage as described above.

VI. Common Power Supply

To reduce the amount of power required to be supplied by the CATV system operator, the power required to operate each ECU is supplied by the subscribers served by that ECU. This is accomplished by having each master SPU apply a 60-volt AC power signal to the SPU's associated drop cable. As earlier described, the AC power signals from each subscriber are converted by each subscriber's associated SU into +and −half-wave rectified DC power signals. The +and −signals are respectively summed and applied to common power unit 60.

FIG. 6 shows common power unit 60 in greater detail. As shown in FIG. 6, the combined +and −power obtained from the SUs is applied to a filter/smoothing circuit 510. Filter/smoothing circuit 510 includes a plurality of filtering capacitors 514 and 516 to further remove AC ripple from the input power. A pair of series-inductances 512 remove any CATV or VLF communication signals still present with the power signal.

The output of filter/smoothing circuit 510 is a well-filtered but unregulated DC voltage. This DC voltage output is applied to the input of a conventional switching power supply 520. Switching power supply 520 includes a step-down transformer 522 for producing as an output three AC power signals. These AC power signals are each half-wave rectified by rectifying diodes 532, 534, and 536, respectively. The outputs of diodes 532, 534, and 536 are smoothed and filtered by capacitances 543, 545, and 547 and inductances 542, 544, and 546. The outputs of the capacitance/inductance smoother/filter circuits are each applied as inputs to conventional voltage regulator circuits 530, 540, and 550, respectively. Voltage regulator circuits 530, 540, and 550 regulate the voltage appearing at their inputs to DC voltage levels of 27 volts, 12 volts, and 5 volts, respectively. These output voltages are each further filtered by output capacitors 570, 572, and 574. A fourth regulated output of 5.7 volts is obtained from the circuit comprising series-pass transistor 560, diode 562, and Zener diode 564. The output signal of inductor 546 is also used as a RESET signal for indicating an AC power failure. This RESET signal is applied to the POWER DETECT input terminal of digital unit 55 as described above.

The regulated DC output voltages of common power supply 60 are used to power the circuitry of the associated ECU. Thus, +5V, +12V, and +27V signals are applied from common power supply 60 to each subscriber unit (FIG. 2), as well as to analog unit 54 (FIG. 3), communication unit 56 (FIG. 4), and digital unit 55 (FIG. 5). To ensure that each subscriber equitably shares in providing power to operate the ECU associated with that subscriber, each SU includes power detection circuitry, earlier described, to turn the SU off in the event that AC power is not being received from the drop cable associated with the SU.

VII. Subscriber Processing Unit

Figure 7:
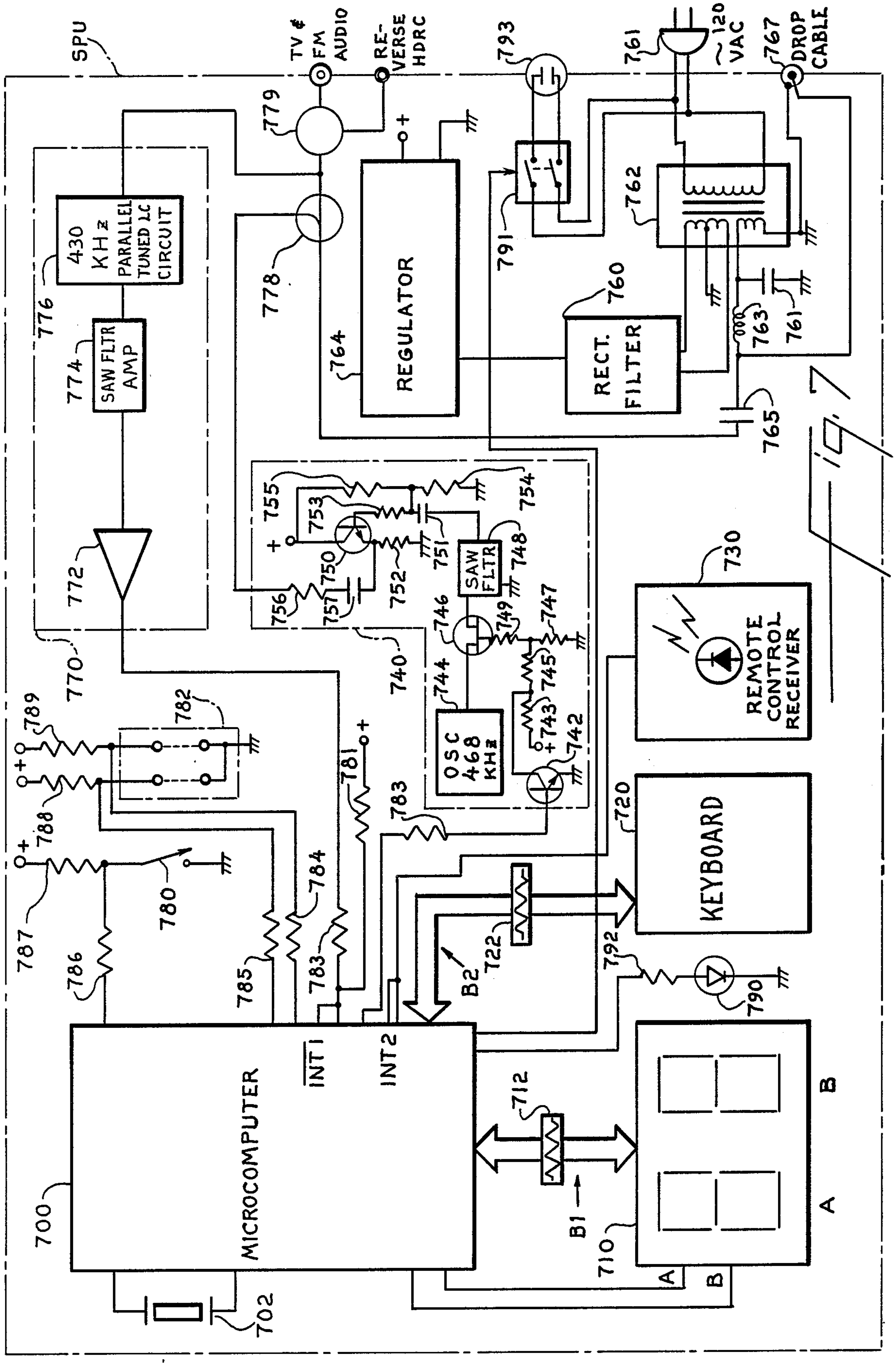
FIG. 7 is a schematic block diagram of the "SPU" in the apparatus of FIG. 1.

Subscriber processing units (SPUs) are located within subscriber residences. Each SPU is designed to (1) accept and transmit to its associated ECU subscriber-entered data, such as channel tuning requests, pay-per-view requests, parental control requests, and other functions normally associated with the television viewer, and (2) receive data and commands from the ECU to display information to a subscriber and control on and off the operation of the subscriber's television receiver. In addition, each SPU may serve as a data input terminal to accommodate audience response, shop-at-home, and other occasional two-way activities. FIG. 7 shows a typical master SPU in detail.

As shown in FIG. 7, a typical master SPU is connected via plug 761 to a source of subscribersupplied 120-volt AC power. Transformer 762 steps down this power for use by the SPU. Conventional rectifier and smoothing network 760 rectifies the AC power for application to conventional voltage regulator circuit 764. Voltage regulator circuit 764 supplies as an output ("+") all necessary regulated DC voltages required to operate the circuitry of the SPU.

In addition to supplying AC power to rectifier/filter 760, transformer 762 provides as an output a source of 60 volt, 60 Hz AC power for application to the drop cable connecting the SPU to its associated ECU. For this purpose, transformer 762 includes a separate secondary winding connected to capacitor 761 and inductor 763. Inductor 763 presents a high impedance to the relatively high frequency CATV, VLF, and reverse HDRC signals, but presents a low impedance to the lower frequency AC power signals. AC power signals are tapped off from inductor 763 and applied to terminal 767 to which is connected the drop cable. Thus, each subscriber, via the master SPU in the subscriber's residence, provides a share of the total power required to operate the ECU to which the subscriber's SPU is connected. If the SPU of FIG. 7 were a slave SPU, inductor 763 would be removed so that only the subscriber's master SPU would supply power to the drop cable.

Drop cable terminal 767 is also connected to one terminal of conventional directional coupler 778 through capacitor 765. Capacitor 765 presents a high impedance to 60 Hz AC power signals, but a low impedance to the higher frequency CATV, VLF, and reverse HDRC signals. Another terminal of directional coupler 778 is connected via combiner 779 to a terminal ("TV") to which the subscriber's television receiver 90 (FIG. 1), optional FM audio receiver equipment, and optional forward HDRC utilization equipment are attached. In this way, CATV signals (including television, FM audio, and forward HDRC signals) received from the ECU are transmitted to the devices which utilize those signals. Combiner 779 adds the reverse HDRC signal for application to the drop cable. Although in the preferred embodiment, a subscriber's television, FM audio and HDRC equipment are connected to the drop cable via connection to the SPU, it will of course be appreciated that such equipment may instead be connected to the drop cable without direct connection to the SPU by utilizing a conventional directional coupler and capacitor. Thus, the present invention provides subscribers with great flexibility in variously locating the SPU and the subscribers' television apparatus and other equipment within the subscribers' premises.

The terminal of directional coupler 778 connected to the TV and FM audio terminal is also connected to the input of conventional VLF demodulator 770. Demodulator 770 receives signals transmitted from the ECU, including CATV and VLF communication signals. As already described with respect to an embodiment of the ECU, ECU-to-SPU VLF communication signals are ASK-modulated signals having a carrier frequency of 430 KHz. This carrier signal is on continuously except when data is being transmitted. Demodulator 770 demodulates the applied ECU-to-SPU VLF signals to produce serial digital data as an output. This is accomplished in one embodiment by parallel tuned LC circuit 776 which is tuned to 430 KHz. Conventional amplifier/filter circuit 774, which in one embodiment uses a surface acoustic wave ("saw") filter as the filtering element, receives the output of circuit 776 to provide an output only when 430 KHz carrier is detected. The output from circuit 774 is then applied to operational amplifier 772 which produces an output that is high or low in response to the presence or absence, respectively, of a signal from amplifier/filter 774. Operational amplifier 772 thus produces a digital data output representative of the information transmitted to the SPU from the ECU via the VLF signal.

The digital data output of demodulator 770 is applied to a data input line and to an interrupt input line of conventional microcomputer 700. Microcomputer 700 may be any suitable commercially available microprocessor or microcomputer such as Toshiba part No. TMP 4740P, which is 4-bit microcomputer having 4k bytes of on-board ROM and 256 bytes of on-board RAM memory. An object and source code computer program listing which will be readily understood by those skilled in the art suitable for controlling the operations of microcomputer 700 is annexed hereto at Appendix A.

Microcomputer 700 utilizes data received from the ECU to display information on conventional 7-segment display 710. In one embodiment, display 710 is capable of displaying two decimal digits representative, for example, of the television channel to which the associated SU in the ECU is tuned. Microcomputer 700 drives display 710 in a conventional manner by multiplexing display data onto a common seven-line bus B1 and alternately enabling two return lines A and B. Resistor-pack 712 includes seven resistors, each resistor being in series with a line of bus B1 to provide current limiting for display 710.

Microcomputer 700 also utilizes data received from the ECU to illuminate a so-called order event lamp. In one embodiment, the order event lamp is a conventional light emitting diode (LED) 790 connected to microcomputer 700 via current limiting resistor 792. As described in greater detail below, the order event lamp may be utlized to inform the subscriber that the subscriber is viewing a program for which the subscriber will be charged an additional fee.

Another circuit element controlled by microcomputer 700 is television power relay 791. Television power relay 791 is a normally-open relay which controls the application of 120-volt AC power to power outlet 793, into which the associated television receiver 90 is plugged. Relay 791 is controlled on and off on command from the ECU.

Also connected to microcomputer 700 is keyboard 720 for use by the subscriber, for example, in entering channel selection requests. In one embodiment, keyboard 720 is a conventional membrane matrix keyboard having four columns and four rows. A common bus B2 having eight lines connects the keyboard's row and column outputs via resistor pack 722 to corresponding inputs of microcomputer 700. In addition to keyboard 720, an optional remote control unit ("RCU") may be used to enable a subscriber to remotely enter data into the SPU (see FIG. 1). Such an RCU may be of any type, wired or not. In one embodiment, the RCU is a conventional wireless device which communicates with the SPU by transmitting coded infra-red light. In the SPU, conventional remote control receiver 730 having a photo-diode sensitive to infra-red light receives these coded signals and converts them into serial digital data. This data is then provided to microcomputer 700.

Microcomputer 700 communicates subscriber-entered channel and other requests to the attached ECU by sending digital data to VLF modulator 740. The digital data turns transistor 742 on and off via current-limiting resistor 783. In turn, transistor 742 turns on and off FET transistor 746 via resistors 743, 745, 747, and 749. FET transistor 746 controls on and off the output of continuously operating 468 KHz oscillator 744 to ASK modulate a 468 KHz signal. Saw filter 748 provides bandpass limiting for the modulated output of modulator 740. The output of saw filter 748 is applied to an emitter-follower circuit comprising transistor 750 and resistors 752–755. Capacitor 751 blocks DC voltage. The output of the emitter-follower circuit is applied through capacitor 757 and resistor 756 to a terminal of directional coupler 778. The VLF modulated signal is then applied from directional coupler 778 to the drop cable for transmission to the attached ECU on the SPU-to-ECU communication channel.

For enabling each of a plurality of SPUs (i.e., a master SPU and one or more slave SPUs) connected to a drop cable to selectively communicate with the ECU, each SPU is given a unique address at the time the SPU is installed in the subscriber's residence. This is accomplished by placing appropriate jumper wires in jumper block 782. Jumper block 782 has 2 jumper connections, each representing one bit of a 2-bit address. By selectively jumping the terminals in jumper block 782, each SPU attached to an ECU may be assigned any of 4 different addresses. In addition, switch 780 serves to identify the SPU depending on whether the switch is opened or closed as either a master SPU associated with a primary SU in the ECU, or a slave SPU associated with a secondary SU in the ECU. Typically, the master SPUs are assigned binary address 00 in jumper block 782, and slave SPUs are assigned any address 01, 10, or 11 in jumper block 782.

Communication between the ECU and its associated SPUs is via separate transmit and receive channels over the drop cable. As mentioned above, the first channel, the ECU-to-SPU channel, is a VLF channel having a carrier frequency of 430 KHz. The second channel, the SPU-to-ECU channel, is a VLF channel having a carrier frequency of 468 KHz. Both channels carry data at a rate of 1200 bps, although other convenient data rates may be used. Each SPU associated with an ECU transmits data to the ECU on the common SPU-to-ECU channel. Similarly, the ECU transmits data to each associated SPU on the common ECU-to-SPU channel.

VIII. Head End

Figure 8:
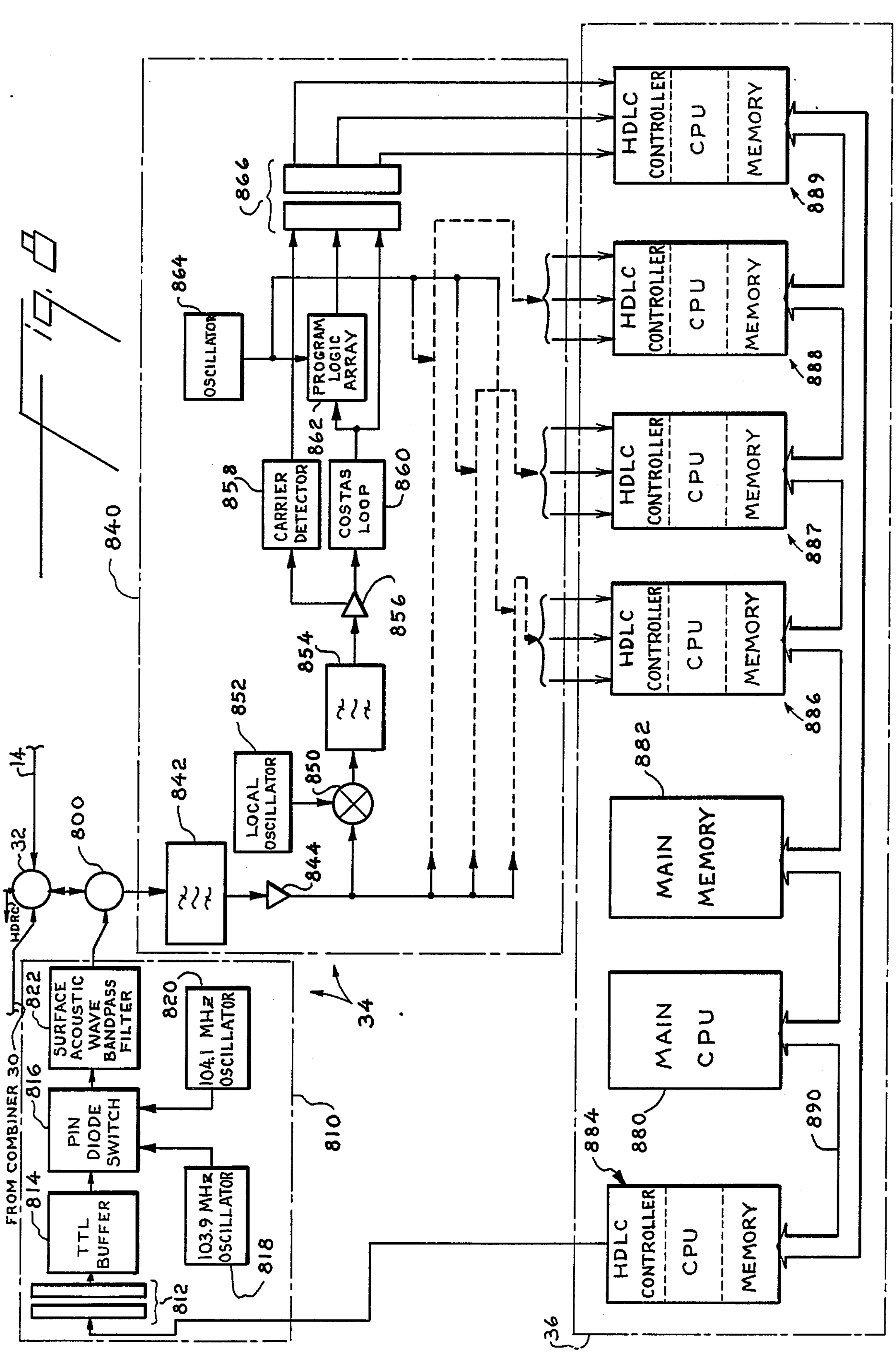
FIG. 8 is a block diagram of the central control computer ("CCC") and modem of the headend in the apparatus of FIG. 1.

Elements 34 and 36 of head end 12 are shown in greater detail in FIG. 8. The forward and reverse data signals on cable network 14 are coupled to combiner 800 by combiner 32. Combiner 800 applies the forward data signal from the modulator portion 810 of modem 34 to combiner 32, and applies the reverse data signal from combiner 32 to the demodulator portion 840 of the modem.

Central control computer 36, which may be any suitable computer such as a conventional Intel 330 computer, includes conventional main central processing unit ("CPU") 880, conventional main memory 882, conventional output buffer unit 884, and four conventional main input buffer units 886–889. All of elements 880, 882, 884, and 886–889 are conventionally interconnected via communications bus 890. Depending on the data rates and the speed of operation of buffer units 884 and 886–889, it may be possible to combine the functions of units 884 and 886–889 into a smaller number of buffer units. Main CPU 880 includes or is coupled to conventional input/output devices (not shown) for use by the operators of the system to control the system.

Each of buffer units 884 and 886–889 includes a conventional high level data link ("HDLC") controller portion, a conventional CPU portion, and a conventional memory portion. The HDLC controller portion of output buffer unit 884 converts parallel forward data originated by main CPU 880 to a serial NRZI forward data signal. This forward data signal is applied to conventional EIA RS 422 interface device 812 in the modulator portion 810 of modem 34. Interface device 812 applies the forward data signal to conventional TTL buffer 814. TTL buffer 814 applies the forward data to PIN diode switch 816 which frequency modulates the forward data signal by switching back and forth between 103.9 MHz and 104.1 MHz oscillators 818 and 820 in accordance with the applied data signal. The frequency modulated forward data signal is applied to surface acoustic wave bandpass filter 822 and then to combiner 800 for application to cable network 14 via combiner 32.

Considering now the elements which receive, demodulate, and process the reverse data signals, it will be recalled that there are four reverse data channels having frequencies of 19.125 MHz, 19.375 MHz, 19.625 MHz, and 19.875 MHz, respectively, and that the reverse data is in NRZI protocol. All of these reverse data signals are passed through conventional bandpass filter 842 and conventional preamplifier 844. The output signal of preamplifier 844 is applied to four similar demodulator circuit paths, only one of which is shown in detail in FIG. 8. Each of these circuit paths demodulates the reverse data signal in a respective one of the reverse data channels.

In each of the above-mentioned circuit paths, the reverse data signal is mixed by mixer 850 with the output signal of local oscillator 852 having a frequency selected such that the associated reverse data channel signal frequency minus the local oscillator frequency equals 10.7 MHz. Mixer 850 therefore shifts the associated reverse data channel signal to 10.7 MHz. The output signal of mixer 850 is applied to bandpass filter 854 which eliminates all signals other than the 10.7 MHz modulated signal. The output signal of bandpass filter 854 is applied to conventional intermediate frequency ("IF") amplifier 856. IF amplifier 856 is augmented by conventional carrier detector device 858 which applies a request to send ("RTS") output signal to conventional EIA RS 422 interface device 866 whenever a 10.7 MHz signal is detected. Conventional Costas loop device 860 converts the 10.7 MHz data signal to a baseband data signal which is applied to interface device 866. The baseband data signal is also applied to program logic array 862 which uses the data signal and the higher frequency output signal of oscillator 864 to produce a clock signal pulse during each bit interval in the associated NRZI data signal. This clock signal is also applied to interface device 866.

Interface device 866 applies the carrier detect, clock, and NRZI data signals to the associated input buffer device 886–889. The HDLC controller portion of the buffer device converts the serial NRZI data to parallel data suitable for further processing by central control computer 36.

IX. ECU Operation

Microprocessor 420 (hereafter sometimes the "Data Processor") is responsible for controlling the overall operation of the ECU. This responsibility includes communicating with the CCC at head end 12, initiating, implementing and coordinating various operations within the ECU, and communicating with the SPUs. The Data Processor is aided in its functions by microcomputer 450 (hereafter sometimes the "Drop Processor"). The Drop Processor is responsible for transmitting to associated SPUs messages originated by the Data Processor, and for transmitting to the Data Processor messages originated by the SPUs. In addition, the Drop Processor on command from the Data Processor controls various functions associated with the SUs of the ECU. The operations of the Data Processor and Drop Processor in communicating with the CCC at head end 12 and with associated SPUs, and in implementing and controlling various ECU functions, will now be described.

A. ECU/SPU Communication Protocol

The communication protocol between an ECU and its associated SPUs must allow for the prompt detection and servicing of channel selection, pay-per-view requests and other subscriber-originated requests from any of a plurality of SPUs (both master and slave) associated with any of up to six drop cables. Moreover, the communication protocol must be capable of detecting requests which are sporadic and infrequent.

1. ECU/SPU Polling

To ensure the prompt servicing and processing of subscriber-entered SPU requests, communication access to the ECU is controlled by the ECU's digital unit 55 using a two-level polling scheme. The first level is called "drop polling", and permits a very rapid polling or sensing of each drop associated with the ECU to identify a drop which has an SPU in need of service (i.e., having information to transmit to the ECU). Drop polling is accomplished without transmitting or receiving any data over the relatively low-speed (in one embodiment, 1200 bps) ECU/SPU data link.

Once a particular drop has been identified by the ECU as requiring service, and if necessary because of the existence of more than one SPU attached to the drop, the ECU uses a second level of polling, called "device polling", to differentiate between SPUs. In this event, the communication link is used to specifically address each SPU attached to the drop to determine which SPUs require service. The ECU maintains maps in its memory of each drop, and of each device on each drop. The data of each map is in a predetermined order so as to optimize response times or to give priority to certain SPUs.

Drop Polling

Drop polling is controlled by microcomputer 450 in ECU digital unit 55 (FIG. 5*e*) and multiplexer 350 in communication unit 56 (FIG. 4). If an SPU requires service (e.g., a subscriber has entered a channel request into the SPU's keyboard), SPU microcomputer 700 causes VLF modulator 740 to transmit a continuous 468 KHz carrier signal to the ECU. This continuous carrier signal is called a "cry" or "Service Request" signal. At the ECU, microcomputer 450 selects a drop by sending a drop address code to multiplexer 350 via the multiplexer's address lines A, B and C (FIG. 4) to selectively connect the ECU's VLF modulator 320 and demodulator 340 to a particular one of the six drops. Once connected to a drop via multiplexer 350, ECU digital unit 55 listens for the presence of carrier signal (a Service Request) on the drop. If carrier signal is present on the drop and detected by the ECU, this is interpreted by the ECU to mean that an SPU on the drop requires service. If no carrier signal is detected on the drop, the ECU interprets this to mean that no SPUs on the drop require service. In this latter event, the ECU (via multiplexer 350) selects another drop in a predetermined sequence, and listens for the presence of carrier on that drop. If carrier is present, then an SPU attached to the drop requires service.

It should be noted that SPUs on the several drops request service simply by activating carrier on the SPUto-ECU drop cable communication channel. It is not necessary for an SPU to transmit to the ECU any data or special commands to obtain service, thus allowing for very fast polling. To prevent any interference with communications already taking place on the drop, each SPU connected to the drop continuously monitors the ECU-to-SPU channel for the presence or absence of data. An SPU will activate carrier to transmit a Service Request only after the SPU has detected a predetermined number of (e.g., twelve) bit times of a continuous mark condition on the ECU-to-SPU channel. This verifies to the SPU that there is no other communication on the drop cable.

Device Polling

Device polling is also controlled by microcomputer 450 in the ECU. As described above, if more than one SPU is attached to a drop on which a Service Request is detected, the ECU must individually poll the SPUs on the drop to determine which SPU has requested to communicate with the ECU. Irrespective of which SPU on the drop first requested service, device polling will occur in a predetermined order established by the ECU.

The ECU initiates device polling by transmitting conditional poll commands on the selected drop. All SPUs and other devices connected to the selected drop sense these commands and cease any activity (i.e., carrier transmissions) on the SPU-to-ECU link. The particular SPU being polled responds to the ECU with a single mark bit if the SPU does not require service. If the polled SPU requires service, the SPU responds by transmitting to the ECU an acknowledgement (a space bit) followed by data.

2. ECU/SPU Message Formats

The communication of messages between an ECU and its associated SPUs is asynchronous with uniform bit timings and non-uniform, indeterminate character timings. The ECU-to-SPU link completely controls data transfers on the SPU-to-ECU link. Each character transmitted to the SPU by the ECU is acknowledged by the SPU with a one-bit acknowledged/not acknowledged ("ACK/NAK") handshake. This bit is also used for a poll response, as earlier described. Each character is preceeded by at least one bit time of mark state. A mark-to-space transition resulting in a start bit in a space state initiates the character. The next bit is a message framing bit, then eight data bits (transmitted low-order bit first), a parity bit, and at least one bit time of mark condition as an ending. The ending bit time of mark condition also serves as a lead-in to a possible subsequent character.

Character Framing

Character framing is established by the SPU sensing on the ECU-to-SPU link at least a predetermined number (e.g., twelve) bit times of a continuous mark condition followed by a mark-to-space transition resulting in a start bit. If an SPU loses character framing it will not recognize any commands until character framing is re-established by the ECU. The ECU periodically allows a given drop the opportunity to re-establish character framing by enforcing periods of continuous mark condition.

Message Framing

The manner in which a message character (data) is to be interpreted by an SPU is determined by the state (mark or space) of the message framing bit. The beginning of a message is indicated by a space condition (logical zero) in the message framing bit. A logical zero message framing bit means that the data field (8 bits) represents a command which all SPUs on the drop must interpret. On the other hand, if the message framing bit is in a mark condition (a logical one), then the data field is interpreted as containing subsequent information to a previous command. Any number of message characters can occur between command bytes. The incorporation of the message framing bit, although adding 1/11ths overhead to each message character, increases framing integrity and permits increased through-put when long data streams are encountered. Without the message framing bit, the transmission of long data streams to or from an SPU would be curtailed or precluded in view of the need for the ECU to be able to rapidly poll and service up to 6 drops, each drop potentially having a plurality of SPUs. By utilizing the expedient of a message framing bit, the ECU may perform drop polling or even service other SPUs on other drops during the interstices between character transmissions to a specific SPU on a particular drop.

ACK/NAK and Poll Responses

The bit time immediately following the parity bit is used as an ACK/NAK window on the SPU-to-ECU link. Each character transmitted by the ECU is acknowledged by the SPU during the ACK/NAK window. This ACK/NAK window is also used in a special manner to respond to polls.

SPUs respond to the ECU during the ACK/NAK window as follows. Upon the receipt of an initial message start bit, all SPUs on the drop turn off carrier on the SPU-to-ECU link. Upon receipt of the message framing bit, if the bit is a space, all SPUs input the data bits (which represent a command) to check for the presence of their address. If the message framing bit was a mark, then only the previously addressed SPU on the drop inputs the data bits.

Upon receipt of the last data bit, the addressed SPU turns on its carrier on the SPU-to-ECU link. Upon receipt of the parity bit, if the parity bit indicates an error in transmission, then the SPU leaves its carrier on during the next bit time as a NAK signal to the ECU. If the parity bit indicates correct transmission, then the SPU turns its carrier off and maintains the carrier off during the next bit time as an ACK signal to the ECU.

If the data is a correctly transmitted poll, then the polled SPU after receipt of the parity bit turns its carrier off by transmitting the start bit of the information it has to transmit to the ECU. Otherwise, carrier is maintained on during the ACK/NAK window. One bit time after receipt of the parity bit (i.e., after the ACK/NAK window), all SPUs turn carrier off in preparation for another transmission to or from the ECU.

B. ECU/SPU Messages

Communications from the Data Processor to the Drop Processor are in the form of variable length messages representing commands which the Drop Processor executes. Execution by the Drop Processor of a Data Processor command normally follows a handshaking sequence requiring the Drop Processor to return a command response to the Data Processor. This command response may be a single byte acknowledgment, or a multiple byte response if the Data Processor command requires a return of data. However, if the Data Processor command requires the Drop Processor to send a message to a device attached to a drop cable, as described below, a command response may not be required.

In addition to command responses, information may be passed to the Data Processor from the Drop Processor without any commands having been issued by the Data Processor. Such a transfer would occur, as further described below, in the event that a device attached to a drop cable transmits a Service Request to the ECU. In such an event, the Drop Processor will read data from the device requesting service and pass the information to the Data Processor as an Unsolicited Data Response.

The following table sets forth the Data Processor/Drop Processor communication commands utilized in one embodiment of the invention. Commands having an asterisk are sent from the Drop Processor. The other commands are sent from the Data Processor.

TABLE C

| COMMAND (HEX) | FUNCTION |
|---|---|
| 00 | Reset drop processor. |
| 01 | Read power detect and bank address. |
| 03 | Change tuner frequency (channel select). |
| 04 | Send message to attached device. |
| 05 | Turn converter on/off and select cable A or cable B. |
| 07 | Define drop poll sequence. |
| 08 | Define device poll sequence. |
| 84* | Unsolicited Data Response from attached device. |

Briefly, the commands set forth in Table C operate as follows:

Command 00. This is a one-byte command message used by the Data Processor to reset the Drop Processor and to initialize its registers and pointers. All polling activities are discontinued. The Drop Processor acknowledges receipt of this command by returning to the Data Processor a single command response byte equal to 00.

Command 01. This is a one-byte command message used by the Data Processor to cause the Drop Processor to read the state of the six power detect lines (POWER DET, FIG. 2) from the subscriber units SU1, SU2, etc., and to read the bank to which the ECU's address is assigned. The response sent by the Drop Processor to this command comprises two bytes. The first byte echoes the command byte (01). The second byte is a data byte which specifies the state of each of the POWER DET lines and the ECU's bank address. For each of the POWER DET lines of the six subscriber units, corresponding bits 0–5 of the response byte are set to 1 or 0 depending respectively on whether or not power is being supplied to the drop cable by the subscriber connected to that subscriber unit. Bits 6 and 7 of the response data byte specify to which one of four banks the ECU's address is assigned.

Command 03. This is a four-byte command message used by the Data Processor to cause the Drop Processor to tune any of the ECU's six associated SUs to a specified physical channel. The first byte is the command byte (03). Next are three bytes of data. The first byte specifies in bits 0–2 which one of the six SUs is to be tuned. The next two bytes specify the two MS numbers, earlier described, which are required by the circuitry of the SU's tuner/converter to tune to a particular physical television channel. The Drop Processor sends a two-byte command response to the Data Processor upon receipt of the command echoing the first two bytes of the command message.

Command 04. This command message (hereafter the "04 Command") is used by the Data Processor to cause the Drop Processor to send an addressed message to a device attached to a drop cable. In one embodiment, the device may be an SPU having an address equal to 2, 3, 4 or 5, or the device may be some other type of apparatus attached to the drop cable and capable of communicating with the ECU. Examples of such other devices are medical monitoring equipment, fire alarms, smoke alarms, burglary alarms, and so forth. Such other devices may have addresses equal to 0, 1, 6 or 7.

The 04 Command message to the Drop Processor includes at least four bytes, as follows: (1) in the first byte, the command code (04), (2) in the second byte, the drop number (bits 0–2) and the device address from 0–7 (bits 3–7), (3) in the third byte, the number of bytes contained in the message, and (4) in the fourth byte, a device command. Following the device command byte are one or more data bytes. The device command and data bytes together comprise the message. The device command byte includes a 3-bit device address (bits 0–2) and a 5-bit function code (bits 3–7). The function code is used to command a particular operation in the addressed device. The following table sets forth the function codes used to control SPU or device operation in one embodiment of the invention:

TABLE D

| FUNCTION CODE (HEX) | DEVICE OPERATION |
|---|---|
| 00 | Read internal status, and return a response message to the ECU. |
| 01 | Turn on or off the order event lamp. |
| 02 | Set the order-event lamp to flashing or non-flashing mode. |
| 03 | Enable or disable data input to the device. |
| 04 | Enable or disable data output from a device. |
| 05 | Turn the television power relay on or off. |
| 06 | Blank the display. |
| 07 | Set the display to flashing or non-flashing mode. |
| 08 | Display a character in the right-most position of the display. |
| 09 | Transmit a number of characters to the ECU as specified by the byte count of the 04 Command message. |
| OA | Display a character at a specified position of the display. |
| OB | Conditional poll to determine the identity of the device sending a Service Request. The device returns its data. |

If the device message requires the device to return a response to the ECU (e.g., in response to function codes 00, 09, or OB), a command response (hereafter the "04 Response") is returned from the Drop Processor to the Data Processor. This response includes a three-byte response header followed by one or more data bytes. The response header includes: (1) in the first byte, a command response code (hex 04), (2) in the second byte, an echo of the drop and device address byte originally sent by the Data Processor, and (3) in the third byte, the number of bytes of data in the response message. Assuming no transmission errors occurred, following the response header are one or more response data bytes. The data byte of an error-free 04 Response to a conditional poll, for example, may identify the key which the subscriber has depressed. Or, in the case of an error-free 04 Response to a status request message, the data byte may specify by its bit settings the device status as follows: the device is a master or slave SPU (bit 7), the order event lamp is flashing (bit 5), the order event lamp is on (bit 4), the television power relay is on (bit 3), there has been recent power on (bit 2), a key has been recently depressed (bit 1), and a new character is available (bit 0). If a transmission error occurred, the byte count is 00. In this event, a single data byte follows the byte count to specify an error code. The error code may be 01 (indicating an ECU-to-device transmission (parity) error), 02 (indicating a device-to-ECU transmission (parity) error), or 03 (indicating an invalid device response). Error codes are sent to the Data Processor only after the occurrence of five consecutive link transmission errors.

Command 05. This command is used by the Data Processor to cause the Drop Processor to turn on or off a particular SU and, in a two-cable system, to cause the SU to select either cable A or cable B. The command message includes two bytes. The first byte is the command code byte (hex 05). The second byte specifies (1) the SU (bits 0–2), (2) the selected cable (bit 6 is set to 0 or 1 to select cable A or B, respectively), and (3) whether to turn the SU unit on or off (bit 7 is set to "0" or "1", respectively). A two-byte command response is returned to the Data Processor by the Drop Processor. The first byte echoes the command byte (05). The second byte includes in bits 0–2 the SU address contained in the command message.

Command 07. This command is used by the Data Processor to load a drop polling map into the Drop Processor to define the drop polling sequence. The command message includes five bytes. The first byte is a command code byte (hex 07). Bytes two through four specify the drop polling sequence. Each of these bytes is divided into two nibbles of four-bits per nibble. The value of each nibble is set from 0–5 to specify in each nibble a particular drop. Drops are sequentially polled in the order specified by the nibbles as received by the Drop Processor from the Data Processor. A value of hex F in a nibble indicates the end of the polling map. If all nibbles contain hex F, drop polling is disabled. The fifth byte would include an F in its high order nibble to indicate the end of a polling map for six drops. A one-byte command response (07) is sent by the Drop Processor to the Data Processor echoing the command code byte.

Command 08. This command is used by the Data Processor to load a device polling map into the Drop Processor to define the device polling sequence. This command message includes seven bytes. The first byte is the command byte (hex 08). The second byte specifies the drop in bits 0–2. Bytes three through six specify in each of eight nibbles a device address. Devices on the specified drop are sequentially polled in the order specified by the device address nibbles as received by the Drop Processor from the Data Processor. A value of hex F in a nibble indicates the end of the device polling map. If all entries in the device polling map are set to hex F, device polling is disabled. The seventh byte would include an F in its high order nibble indicating the end of a device polling nap for eight devices. A two-byte command response is sent by the Drop Processor to the Data Processor echoing the first two bytes of the Data Processor's command message.

Command 84. This command (hereafter the "84 Command") is sent from the Drop Processor to the Data Processor indicating the receipt by the Drop Processor of unsolicited data from a device attached to a drop cable. The 84 Command is used by the Drop Processor to transmit to the Data Processor data received from a device which has transmitted a Service Request to the ECU (e.g., a subscriber has entered a channel selection request via SPU keyboard). This command message includes at least four bytes. The first byte contains the command code (hex 84). The second byte specifies the drop address (bits 0–2) and the device address (bits 3–7) to identify the particular drop and device sending the Unsolicited Data Response. The third byte specifies the number of data bytes being sent by the device. Finally, the fourth byte is a data byte. If the byte count is 00, an error has occurred. In such a case, an additional byte follows the data count byte specifying an error code. An error code of 01 indicates an ECU-to-SPU transmission (parity) error. An error code of 02 indicates an SPU-to-ECU transmission (parity) error.

C. Drop Processor Operation

Figure 9A:
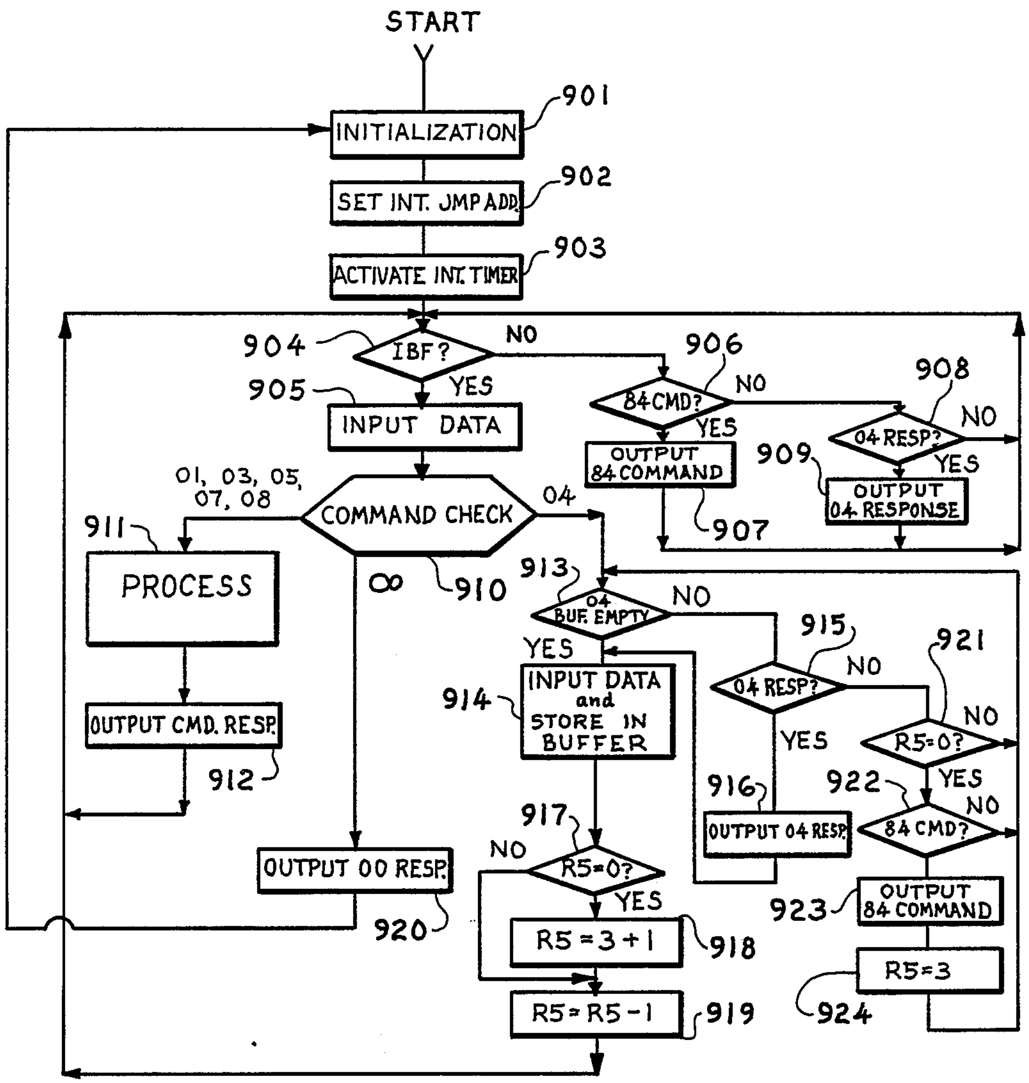
FIGS. 9*a*–*b* are flow charts illustrating the flow of a program controlling the operation of the so-called Drop Processor of the ECU.

FIGS. **9*a*–9*b* illustrate flow charts of a computer program utilized in one embodiment of the invention for controlling the operations of the Drop Processor. An object and source code computer program listing which will be readily understood by those skilled in the art for controlling the operations of the Drop Processor in accordance with the flow charts of FIGS. 9*a*–9*b*** is annexed as Appendix B.

Figure 9B:
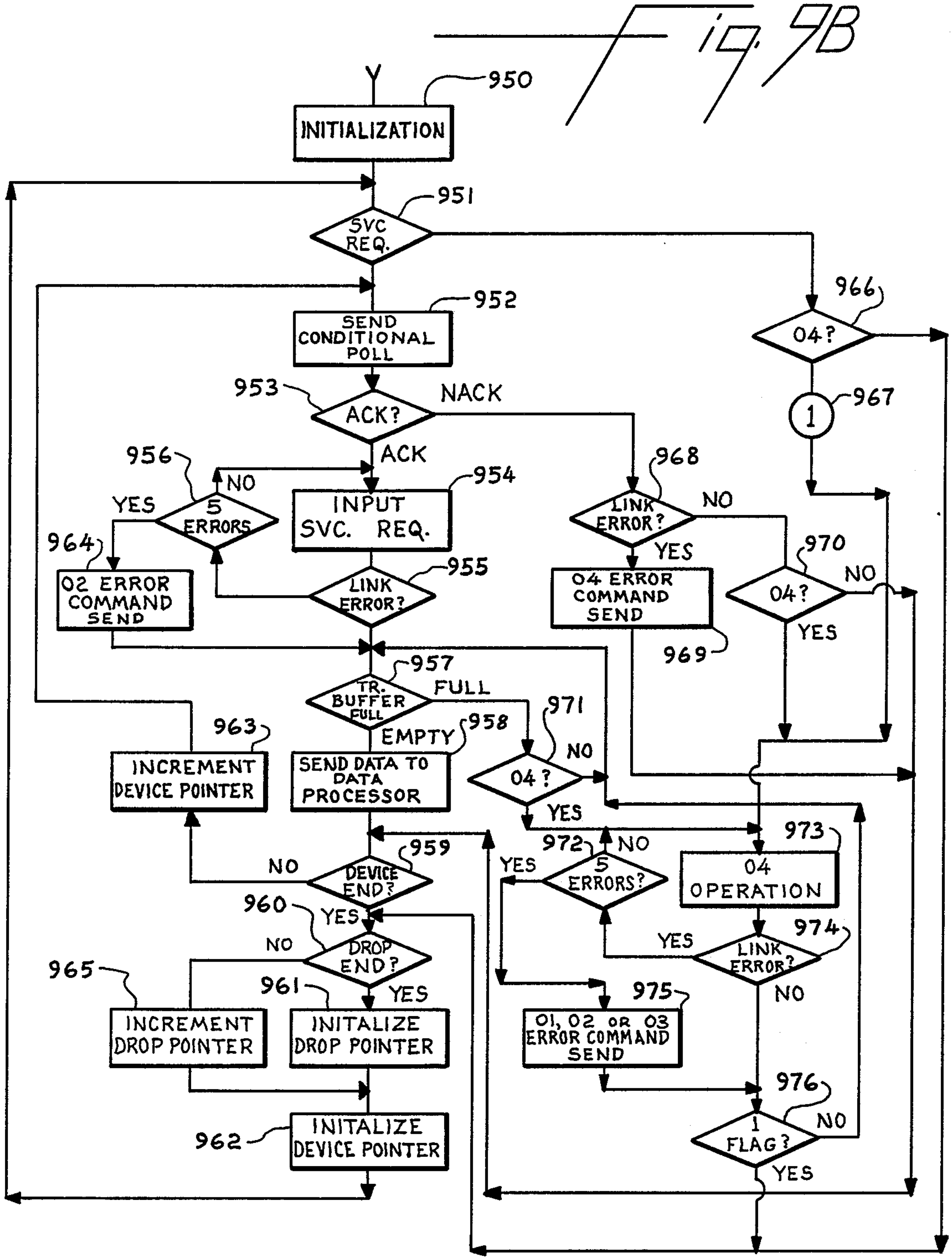

The program controlling the Drop Processor includes a Main Routine (FIG. **9*a*) and a Timer Interrupt Routine (FIG. 9*b***). Each of the two routines runs independently of the other. The Main Routine is periodically interrupted by the Timer Interrupt Routine, in a conventional manner, after a predetermined time period has elapsed as determined by the timing out of an interrupt timer. The function of the Drop Processor Main Routine is to (1) receive data from the Timer Interrupt Routine (e.g., a message from an SPU to the ECU) and send it to the Data Processor, and (2) to send data from the Data Processor to the Timer Interrupt Routine for, ultimately, transmission to SPUs. The function of the Timer Interrupt Routine is to (1) implement drop and device polling, (2) transmit messages to and receive messages from SPUs attached to the drops, and (3) send signals to and receive signals from the SUs.

1. Main Routine

As shown in FIG. **9*a*, the program flow of the Main Routine begins at step 901 where various buffers, counters, flags and ports are initialized. Also at step 901, drop polling and device polling are initialized, and register R5 (described in more detail below) is set to three. At steps 902 and 903**, the address for jumping to the Timer Interrupt Routine is set and the interrupt timer is activated.

Initialization is complete when the program flow advances to step 904. At step 904, the Main Routine interrogates the state of an Input Buffer Full ("IBF") flag. This flag is associated with a Drop Processor buffer which receives data passed to the Drop Processor from the Data Processor. If the IBF flag indicates that the input buffer is full, the program flow advances to step 905. Otherwise, the program flow branches to step 906.

Assuming first that the IBF buffer is not full the program advances to step 906, where the Drop Processor checks a buffer (the 84 Buffer) to determine whether or not a device attached to a drop has sent an Unsolicited Data Response (i.e., an 84 Command). If so, the program advances to step 907 to pass the 84 Command to the Data Processor. Otherwise, the program advances to step 908 where the Drop Processor determines if a device has sent an 04 Response. If "no", the program loops to step 904 to again check the IBF flag as earlier described. If "yes", the program advances to step 909 to pass the 04 Response to the Data Processor. From step 909 (or step 907 if the program advanced to that step), the program loops to step 904.

If at step 904 the IBF flag indicates that the input buffer is now full, the program advances to step 905 where the contents of the buffer are input and the IBF flag is cleared. The program flow then advances to step 910 where the Drop Processor determines what type of command (earlier described) was included in the message sent by the Data Processor. Depending upon the command, the program at step 910 may branch in any of three directions.

If command 00 (reset) was sent, the program flow advances to step 920, where the Drop Processor sends a 00 command response message to the Data Processor via an output buffer associated with the Drop Processor. The program flow then loops to step 901 to re-initialize the Drop Processor as previously described.

If at step 910 any of commands 00, 03, 05, 07 or 08 was sent by the Data Processor, the program flow advances to step 911. At step 911, the Drop Processor processes the particular command as earlier described. The program flow then advances to step 912, where the Drop Processor sends to the Data Processor an appropriate command response. From step 912, the program flow loops to step 904.

Finally, if step 910 determines that an 04 Command message was sent by the Data Processor, the program flow branches to step 913. At step 913, the Main Routine interrogates a flag indicating the state (empty or full) of an "04 Buffer" associated with the Drop Processor. The 04 Buffer contains data to be sent by the Drop Processor to a device attached to a drop. If the 04 Buffer is empty, the program branches to step 914. Otherwise, the program branches to step 915.

If the program at step 913 advances to step 914 (i.e., the 04 Buffer is empty), step 914 places data received from the Data Processor into the 04 Buffer. The program flow then advances to step 917, where register R5 is checked. If the contents of register R5 are not equal to 0, the program branches to step 919 to decrement the contents of register R5 by one. Otherwise, the program advances to (1) step 918, where the contents of register R5 are initialized to a value of three and incremented by one, and (2) step 919 where the contents of register R5 are decremented by one. From step 919, the program flow loops to step 904 to again check the input buffer.

Returning now to step 913, if the 04 Buffer is not empty the program branches to step 915. At step 915, the Main Routine determines whether or not the 04 Buffer contains an 04 Response from an attached device. If "yes", the program advances to step 916 to pass that 04 Response data to the Data Processor. From step 916, the flow advances to step 914 to input the data received from the Data Processor. On the other hand, if "no" at step 915, the program advances to step 921 where the contents of register R5 are checked. If the contents of register R5 are not equal to 0, the program loops to step 913 to again interrogate the state (empty or full) of the 04 Buffer. Otherwise, the program from step 921 advances to step 922 to check the state of the 84 Buffer. If the 84 Buffer is empty, the program immediately loops to step 913. However, if the 84 Buffer contains data at step 922, the program advances to (1) step 923 to pass the data to the Data Processor as an 84 Command, (2) step 924 to reset the R5 register to a count of three. The program then loops to step 913.

2. Timer Interrupt Routine

A flow chart of the Timer Interrupt Routine is illustrated in FIG. 9*b*. As shown in FIG. 9*b*, the Timer Interrupt Routine starts at step 950 to initialize the drop and device maps and clear various flags and buffers. The program then advances to step 951, where a determination is made as to whether ("yes") or not ("no") a Service Request exists on the drop to which the Drop Processor is connected via multiplexer 350 (FIG. 4).

Assuming first that no Service Request is detected at step 951, the program branches to step 966 where the 04 Buffer is checked to determine whether or not the Drop Processor has received an 04 Command from the Data Processor for transmission to a device attached to a drop cable. If not, the program advances to step 960 to update the drop polling map pointer. If the pointer is not pointing to the end of the drop map, the program increments the drop map pointer in step 965, initializes the device map pointer to the beginning of the device map, and loops to step 951 to listen for the presence of a Service Request on another drop. On the other hand, if at step 960 the program determines that the drop pointer is at the end of the drop map, the program advances to step 961 to reset the drop map pointer to the beginning of the drop map prior to advancing to step 962 and then to step 951 as described above.

Returning to step 966, if the 04 Buffer contains an 04 Command to send to a device, the program flow advances to step 973 after setting a flag ("1") in step 967. At step 973, the Drop Processor transmits the 04 Command message to the appropriate device. The program then advances to step 974 to determine whether or not a transmission error occurred. If an error occurred, the program branches to step 972. If less than five errors have occurred, the program advances from step 972 to step 973 to re-transmit the 04 Command. On the fifth error, however, the program branches from step 972 to step 975 where an 04 Response containing an appropriate error code is transmitted from the Drop Processor to the Data Processor as earlier described. From step 975 in the event of an error, or step 974 in the event of no error, the program advances to step 976 to check the state of the "1" flag. Because the program advanced from step 967, the "1" flag will earlier have been set. Accordingly, the program from step 976 advances to step 960 to increment or initialize the drop map pointer as previously described.

Assuming now that a Service Request is detected at step 951, the program advances to step 952 where a conditional poll command (earlier described) is transmitted on the drop on which the Service Request was detected. At step 953, the Drop Processor determines whether an ACK or a NACK (earlier described) is returned in response to the poll. Assuming first that a NACK is returned, the program branches to step 968 to determine whether or not a transmission error occurred. If "yes", the program advances to step 969 to return an appropriate error code to the Data Processor. Otherwise, the program advances to step 970 to determine whether or not an 04 Command has been received from the Data Processor for transmission to a device. If "yes", the program advances to step 973 to transmit the 04 Command as previously described. Otherwise, the program advances to step 959 to determine whether or not the device map pointer is at the end of the device poll map. If the program is not at the end of the device map, the device map pointer is incremented at step 963 and a conditional poll command to the next device is sent at step 952. If the program is at the end of the device map, the program advances from step 959 to step 960 to update the drop map pointer and loop as previously described.

Assuming now that an ACK is detected at step 953 (signifying that the polled device has an Unsolicited Data Response to transmit to the ECU), the program advances to step 954 to input the unsolicited data. Steps 955, 956 and 964 determine as previously described with respect to steps 972, 974 and 975 whether or not five transmission errors occurred. In the event of five errors, an appropriate error code is sent to the Data Processor at step 964. From step 964 or step 955, the program advances to step 957 to check an output buffer full ("OBF") flag indicating whether the Drop Processor's output buffer to the Data Processor is full or empty. If the buffer is empty, the program advances to step 958 where the unsolicited data is sent to the Data Processor as an 84 Command via the Drop Processor's output buffer. The program then advances to step 959 to update the drop and device map pointers as previously described. Alternatively, if the output buffer is full at step 957, the program advances to step 971 to determine whether or not the Data Processor has sent an 04 Command to the Drop Processor for a device attached to a drop cable. If there is no 04 Command to send at step 971, the program loops to step 957. On the other hand, if there is an 04 Command to transmit, the program advances to step 973 to transmit the 04 Command as previously described. At step 976, because the "1" flag this time is not set, the program loops back to step 957.

D. CCC/ECU Communication Protocol

1. Message Format

A typical data message format used in one embodiment of the invention for communicating information between the central control computer (CCC) at head end 12 and the plurality of ECUs connected to cable network 14 will now be described with reference to FIGS. 10 and 11.

Figure 10A:
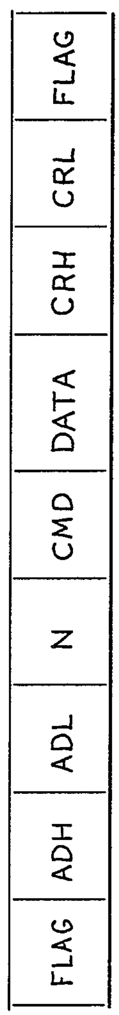
FIGS. 10*a*–*b* are diagrams of basic message formats used in an embodiment of the invention for data communication in the forward direction from the CCC to an ECU.

A basic message format for data communication in the forward direction (i.e., from the CCC to an ECU) is illustrated in FIG. 10*a*. As shown in FIG. 10*a*, each message is of a predetermined format, comprising: a FLAG byte, two ADDRESS bytes specifying an ECU address, a BYTE COUNT byte ("N"), a COMMAND byte ("CMD"), a plurality of DATA bytes, two CYCLIC REDUNDANCY CHECK ("CRC") bytes, and another FLAG byte. Each byte is comprised of 8 bits.

The FLAG bytes identify the beginning and end of a message. Each FLAG byte has a unique bit pattern ("01111110"). At the end of a message, if there are no more messages available for transmission by the CCC, the CCC transmits repetitive FLAG bytes to maintain synchronization on the communications link. Otherwise, the end FLAG byte serves as the start FLAG byte of the next message.

The two ADDRESS bytes typically specify the address of a particular ECU from 0001 (hex) through FFFE (hex). The use of two ADDRESS bytes in this matter to specify an ECU address allows the CCC to uniquely address a message to any particular one of 65,534 ECUs. The first address byte (ADH) specifies the high-order part of the address, and the second byte (ADL) specifies the low-order part. Two addresses have special meanings. Address FFFF (hex) is a global or broadcast address. All ECUs respond to a message containing the broadcast address. Address 0000 is a "mask" address, described in detail below.

The BYTE COUNT byte (N) specifies the number of bytes following in the message, exclusive of CRC and FLAG bytes. Following the BYTE COUNT byte is a COMMAND byte (CMD). As discussed in detail below, the COMMAND byte specifies the type of message being transmitted and the manner in which subsequent DATA bytes should be interpreted.

The CRC bytes (CRH and CRL) are two bytes which together form a conventional 16-bit CRC number. These two bytes are derived from a mathematical manipulation of all bits (exclusive of the FLAG bits) preceding the CRC bytes, and serve as a check that the message was accurately transmitted to and received by the ECU. The derivation of the CRC bytes is accomplished in a conventional manner in accordance with standards promulgated by international standards organizations, such as the CCITT.

Figure 10B:
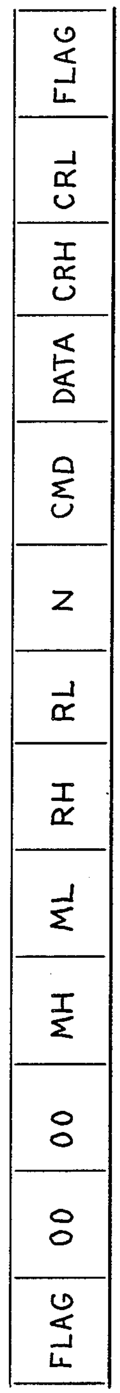

The use of ADDRESS 0000 (the mask address) enables a message to be directed to any particular ECU or group of ECUs. The basic format of a message having an address of 0000 is illustrated in FIG. 10*b*. As shown in FIG. 10*b*, a message having a mask address equal to 0000 differs from a basic message (FIG. 10*a*) by the inclusion of four additional bytes following the ADDRESS bytes. These four bytes are two MASK bytes ("MH" and "ML") followed by two REFERENCE bytes ("RH" and "RL"). Any ECU receiving a message having a 0000 mask address will logically AND the ECU's unique address with the values of the MASK bytes. If the result of this logical operation equals the values set forth in the REFERENCE bytes, the ECU will recognize the message as addressed to it and respond accordingly. Otherwise, the ECU will ignore the message. As will be readily apparent to those skilled in the art, the use of the mask address in this manner allows a single message to be transmitted to any one or a selected group of ECUs. For example, if the MASK bytes are 0001, and if the REFERENCE bytes also are 0001, then all ECUs having odd addresses will respond to the message. On the other hand, if the REFER- ENCE bytes are changed to 0000, then all ECUs having even addresses will respond to the message.

Figure 11:
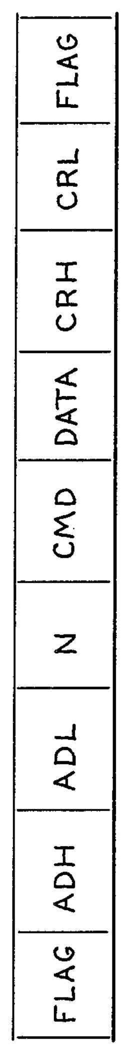
FIG. 11 is a diagram of a basic message format used in an embodiment of the invention for data communication in the reverse direction from an ECU to the CCC.

A basic message format in the reverse direction (i.e., from the ECUs to the CCC) is shown in FIG. 11, and is similar to the format for forward communication shown in FIG. 10*a*. Thus, unique FLAG ("01111110") bytes are used to identify the beginning and end of a message. Following the beginning FLAG byte are two ADDRESS bytes which specify the address of the particular ECU sending the message. Next follow a BYTE COUNT byte (N), a COMMAND byte (CMD), and DATA bytes. Two conventionally derived CRC bytes follow the last DATA byte as earlier described.

Referring now to FIGS. 12 through 17, there are shown illustrative examples of several typical messages sent between the CCC and an ECU in one embodiment of the invention. The messages of FIGS. 12 through 17 are formatted in accordance with the basic message formats of FIGS. 10–11.

FIG. 12 illustrates a WRITE message sent from the CCC to an ECU. The WRITE message may be used to write a program or data to any one or a plurality of ECUs commencing at a specified address in the ECU's memory. The use of the WRITE message in this way enables the cable system operator to add new functions and services to the ECU, or to modify existing ones. Thus, the operation of the cable system may be readily enhanced or modified without having to replace or modify the ECU or SPU hardware.

The WRITE message may be used to implement a variety of functions in an ECU. For example, the WRITE message may be used to download a Channel Authorization Map in an ECU specifying which television channels each associated subscriber is authorized to view. In one embodiment, the Channel Authorization Map comprises a string of 128 bytes of data stored in the ECU's memory, each byte associated with a different one of 128 so-called logical channels. A logical channel is that channel which a subscriber requests by entering a channel number into the SPU. Each of the first six bits of each byte in the Channel Authorization Map is associated with a different one of six SUs. A bit is set to "1" or to "0" depending respectively on whether or not the subscriber associated with that bit and SU is authorized to view the television channel associated with that byte. To transmit a Channel Authorization Map to an ECU, a WRITE command may be used specifying the start address of the map in the ECU's memory and the 128 bytes of logical channel data. The use of the WRITE command to transmit a new or replacement Channel Authorization Map enables the cable operator to add or delete authorized channels for particular subscribers as a function, e.g., of whether or not the subscriber has paid his or her bill, whether the subscriber has requested to subscribe to view additional or fewer channels, and so forth.

As another example, the WRITE command may be used to transmit to an ECU a so-called Channelization Map specifying a correlation between logical channels and physical channels. As earlier described, physical channels are the channels carried on the CATV feeder cable to which the converter/tuner in the SU tunes in response to subscriber requests to view a particular logical channel. For example, the Channelization Map might correlate logical channel 7 with physical channel 52, logical channel 9 with physical channel 15, and so on. In one embodiment having a single feeder cable, the Channelization Map in each ECU includes 128 bytes of data (in a two cable system, the Channelization Map would include 256 bytes of data). The data are grouped in pairs such that each pair of bytes is associated with a different one of 64 (or 128 in a two cable system) logical channels. Thus, the first byte pair is associated with logical channel 0, the second byte pair with logical channel 1, and so on. Each pair of bytes specifies the two MS numbers, earlier described, which are the tuning information required by the converter/tuner of each SU to tune to a particular physical channel. By changing the values of the MS numbers in the Channelization Map using the WRITE message, the CCC can dynamically (i.e., on any given day and at any given time) re-define the logical channel/physical channel correlation. This allows the cable system operator to transmit a television program on any available physical cable channel while allowing the subscriber to always view that program by selecting the same logical channel. This is important in situations of large amounts of noise on a particular physical channel which degrades the television signal. In such an event, the system operator can transmit a new Channelization Map to redefine the physical channel/logical channel correlation to associate a less noisy physical channel with the logical channel, and transmit the program on the less noisy channel. The subscriber, however, will still access the channel carrying the program the subscriber desires to view by keying into the SPU the same logical channel number.

As shown in FIG. 12, a WRITE message includes the usual two ADDRESS bytes (ADH and ADL) specifying the particular ECU to which the message is directed, and a BYTE COUNT byte (N) specifying the number of bytes following in the message. Next appears a COMMAND byte equal to hex FC ("11111100"). This COMMAND byte identifies the message as a WRITE message. After the COMMAND byte is a DATA COUNT byte (NN) specifying the number of bytes of data contained in the WRITE message to be written to the ECU's memory. Next, two bytes ("MDL" and "MDH") specify in low and high order parts, respectively, the specific ECU memory address at which the write operation should commence. Finally, there follow NN bytes of data to be written to the ECU's memory.

Another message sent from the CCC to an ECU is a READ message, illustrated in FIG. 13*a*. A READ message enables the CCC to obtain one or more bytes of data from an ECU commencing at a specified address of the ECU's memory. The READ message may be used for a variety of purposes. For example, the READ message may be used to determine which subscribers are authorized to view which channels, which subscribers should be charged a fee for viewing pay-per-view programs, and so forth. Also, the READ message may be used to examine various portions of an ECU's data or program memory to diagnose faulty or failing ECUs.

As shown in FIG. 13*a*, a READ message includes the usual ADDRESS (ADL and ADH) and BYTE COUNT (N) bytes. After these bytes is a COMMAND byte which may be any value equal to hex F8, F9, FA or FB (11111000, 11111001, 11111010 or 11111011). Each COMMAND byte F8 through FB specifies that the message is a READ message. However, each COMMAND byte also specifies by the values of the two least significant bits on which one of the four available reverse channels the ECU should return data to the CCC. Thus, COMMAND bytes F8, F9, FA and FB specify that the ECU should return data to the CCC on reverse channel 00, 01, 02 and 03, respectively. Following the COMMAND byte is (1) a DATA COUNT byte (NN) specifying how many data bytes to return to the CCC, and (2) two memory address bytes (MADL and MADH) specifying in low and high order parts the ECU memory address at which the data READ operation should commence.

In response to a READ message, the ECU returns to the CCC on the specified reverse channel a message as shown in FIG. 13*b* which includes the data requested by the READ message. The returned message includes the usual ADDRESS and BYTE COUNT bytes, followed by a COMMAND byte set to the value of the read command to which the return message is responsive. Next follow a DATA COUNT byte (NN) specifying the number of bytes of returned data, and the NN bytes of data requested by the READ message.

Still another message sent from the CCC to an ECU is an ECHO BACK message, illustrated in FIG. 14. An ECHO BACK message causes an addressed ECU to return to the CCC on a specified reverse channel a message which is identical to that received by the ECU. The ECHO BACK message may be used to test the cable network for signal degradation and transmission errors, and may also be used to locate nonoperating ECUs.

As shown in FIG. 14, an ECHO BACK message includes the usual ADDRESS (ADL and ADH) and BYTE COUNT (N) bytes. Next is a COMMAND byte which may be any value equal to hex F0, F1, F2 or F3 (11110000, 11110001, 111100010 or 11110011). As previously described with respect to the READ message, the last two bits of the COMMAND byte specify on which one of the four reverse channels the ECU should echo back the CCC's message. After the COMMAND byte is a DATA COUNT byte (NN) followed by NN bytes of data.

In response to the receipt of an ECHO BACK message, the addressed ECU returns a message to the CCC as shown in FIG. 14*b* on the specified reverse channel. Irrespective of the manner in which the message was addressed to the ECU (i.e., using a global, mask or specific address), the ECU's message includes the responding ECU's unique address in the ADH and ADL bytes, followed by a BYTE COUNT byte (N). Thereafter, the returned message is (assuming no transmission errors) identical to that originally sent from the CCC.

Yet another message sent from the CCC to an ECU is a FORCE TUNE message, illustrated in FIG. 15. This message is used to cause an addressed ECU to force tune any drop associated with that ECU to any channel. Force tuning may be used, for example, to cause all subscriber television sets connected to the CATV system to tune to a channel on which instructions and news may be communicated to subscribers in the event of a civil emergency. Also, this message may be used to automatically tune a subscriber's television set at the appropriate date and time to a channel carrying a pay-per-view program (such as a boxing match) which the subscriber requested to view.

As shown in FIG. 15, a typical FORCE TUNE message includes the usual ADDRESS (ADL and ADH) and BYTE COUNT (N) bytes. Next follow a COMMAND (CMD) byte equal to hex F4 (11110100) to identify the message as a FORCE TUNE message, and a DATA COUNT byte (NN) equal to 2. Thereafter, a SUBSCRIBER UNIT (SU) byte specifies the particular subscriber unit to be force tuned. In one embodiment, the SU byte specifies any one converter using the byte's three least significant bits. This requires a FORCE TUNE message to be transmitted for each converter to be force tuned. Alternatively, each bit of the SU byte may be associated with a different one of six converters such that a single message to an ECU can force tune more than one converter associated with the ECU. Finally, a logical channel (LC) byte specifies the logical channel number to which the specified converter should be force tuned. If the SU byte is associated with more than one converter, there would be a plurality of LC bytes, one for each converter being force tuned.

Another series of messages sent from the CCC to an ECU are SEND FUNCTION messages. These messages are used to cause an ECU to return to the CCC so-called send function data accumulated by the ECU from the ECU's associated subscribers. Send function data is data keyed into SPUs by subscribers in response to requests for such data from the CCC at head end 12. For example, send function data may represent voting or shop-at-home data keyed in by subscribers in connection with interactive viewer preference or shop-at-home services offered by the cable operator. In one embodiment, each ECU maintains in its memory a plurality of so-called send function bytes arranged in pairs. Each pair of send function bytes is associated with a different one of up to six subscribers. The first byte specifies the subscriber with which the byte pair is associated. The second byte contains the send function data. In addition to the byte pairs, the ECU maintains in its memory a send function count byte specifying the number of send function bytes in the ECU's memory. If the ECU's memory contains no send function data (e.g., no associated subscriber has entered send function data), the value of the send function count byte is zero.

Figure 16A:
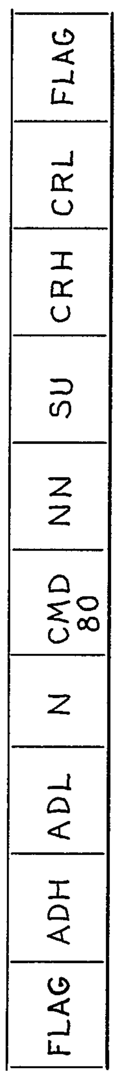
Figure 16B:
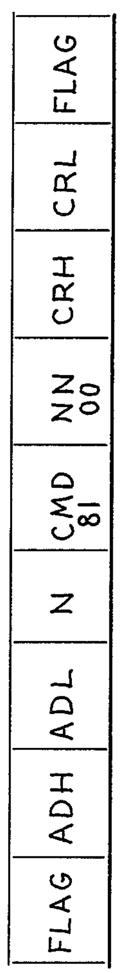
Figure 16C:
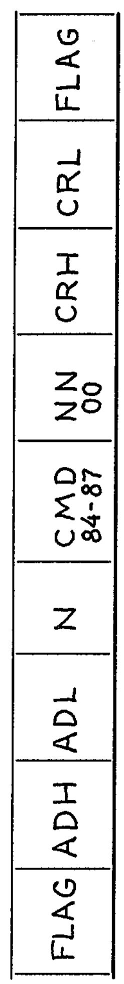

In one embodiment of the invention there are six SEND FUNCTION messages. These messages are illustrated in FIGS. 16*a* through 16*c*. The first message is the SEND FUNCTION ENABLE message, shown in FIG. 16*a*. In addition to the usual ADDRESS and BYTE COUNT bytes, this message has a command byte equal to hex 80, a DATA COUNT byte (NN), and a single DATA byte (SU). Each bit 0–5 of the (SU) byte is associated with a different one of six SUs. The SEND FUNCTION ENABLE message is used by the CCC to enable or disable the send function in an ECU with respect to particular SUs associated with that ECU. The send function with respect to a particular SU is enabled or disabled depending respectively on whether the setting of the bit of the SU byte associated with that SU is set to "1" or to "0".

The second message is the SEND FUNCTION CLEAR message, shown in FIG. 16*b*. This message includes a COMMAND byte equal to hex 81, and a DATA COUNT byte (NN) equal to 0. In response to the receipt of this message, the addressed ECU clears the send function data in its memory.

The third message is the SEND FUNCTION DATA message, shown in FIG. 16*c*. This message includes a COMMAND byte which may have any value equal to hex 84, 85, 86 or 87 (10000100, 10000101, 10000110 or 10000111). Upon receipt of this message, an addressed ECU will return to the CCC the send function data in its memory only if the ECU has any send function data to send to the CCC (as determined by the value of the ECU's send function count byte). As previously described with respect to the READ message, the data will be returned by the ECU on the reverse channel (00, 01, 02 or 03) specified by the values of the two least significant bits of the SEND FUNCTION DATA message's COMMAND byte. In response to a SEND FUNCTION DATA message, the ECU sends a message to the CCC which includes one or more pairs of data bytes, each pair associated with a different SU. The first byte of the pair specifies an SU (from 0–5), and the second byte is the send data for that SU.

Yet another message available to be sent from the CCC to an ECU is a PAY-PER-VIEW message. This message is used to (a) force tune an SU to a pay-per-view event requested by the subscriber, and (b) turn on the subscriber's television apparatus via the subscriber's SPU power relay.

Figure 17:
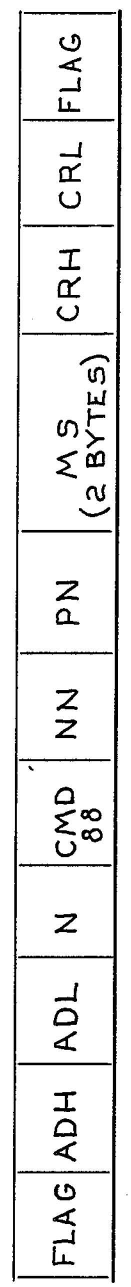

The PAY-PER-VIEW message used in one embodiment of the invention is shown in FIG. 17 as including a COMMAND byte equal to hex 88. Next follows a DATA COUNT byte (NN). A PROGRAM NUMBER (PN) byte specifies the so-called program number, described in more detail below, to which the message relates. Finally, two MS bytes specify the MS numbers, earlier described, required to tune the converter/tuner circuitry contained in the SUs to the particular physical channel carrying the pay-per-view event specified by the PROGRAM NUMBER byte.

The PAY-PER-VIEW message in one embodiment of the invention operates as follows. Each ECU includes an Event View byte in its memory. Each of bits 0–5 of this byte is associated with a different one of up to six SUs. When a subscriber tunes to a pay-per-view event, a bit of the Event View byte associated with the SU tuned to the pay-per-view event is set to "1". That bit is reset to "0" when the SU is tuned to a channel not associated with a pay-per-view event, or when the subscriber via the SPU turns off his or her television receiver. The Event View byte is used, as later described, to control the incrementing of a timer.

In addition to the foregoing, each ECU has a Program Event Map in its memory comprised of 128 pairs of bytes. Each byte pair of this map is associated with a different one of 128 program numbers. Each program number is associated with a different pay-per-view program event. Thus, the first byte pair of the Program Event Map is associated with program number or event 0, the second pair with program number or event 1, and so on. The byte pairs contain the MS numbers conveyed by the PAY-PER-VIEW message.

In addition to the Program Event Map, each ECU includes in its memory a Program Authorization Map. This map includes 768 bytes arranged in six groups of 128 bytes per group. Each group of 128 bytes is associated with a different SU, and each byte of each group is associated with a different one of 128 pay-per-view events. If a subscriber associated with a particular SU is authorized to view pay-per-view programs, and requests via the subscriber's SPU to view a particular pay-per-view program, the three least significant bits of the byte associated with that program and SU are set to the address of the SPU from which the pay-per-view request was received. The five most significant bits of the byte, each initially zero, are used as a preview timer as later described.

To order a desired pay-per-view event, a subscriber enters the program number associated with the pay-per-view event into the keyboard of the subscriber's SPU. If the subscriber is authorized to view pay-per-view events, the address of the SPU from which the request was received is placed in the appropriate byte of the Program Authorization Map as described above. When the event begins, the CCC transmits a PAY-PER-VIEW message specifying the program number and the MS tuning data required by the converter/tuners of the SUs to tune to the program. If a subscriber has requested to view pay-per-view program specified in the PAY-PER-VIEW message, the ECU force tunes the SU associated with that subscriber to the channel carrying the pay-per-view event. In addition, the ECU sends a command to the SPU to cause the SPU to (1) flash the SPU's eventorder LED to signify that the subscriber is viewing a pay-for-view event during the preview period, and (2) turn on the SPU's television relay to supply power to the subscriber's television set. Thus, at the appropriate date and time, the ECU will turn on and force tune the subscriber's television set to the requested pay-per-view event. Also, the ECU will initiate operation of a preview period timer. During the preview period, a subscriber may view the pay-per-view event free of charge. If the subscriber views more than a predetermined number of minutes of the pay-per-view program, the preview timer will time out and the ECU will send a command to the SPU to cause the event-order LED to glow continuously to signify that the subscriber will be charged a fee for viewing the event.

The preview timer operates as follows. Upon the timing out of a pay-per-view event timer, the ECU checks the state of the bit flags in the Event View byte. If the bit associated with an SU is set to "1", then a bit of the preview timer associated with the SU and program to which the SU is tuned (described above) is set to "1". Each of the five bits of the preview timers in the Program Authorization Map represents a fraction (i.e., onefifth) of the preview period. Each time that the pay-per-view event timer times out, and if the associated bit of the Event View byte is set to "1", another one of the five bits of the appropriate preview timer is set by the ECU. When all five bits of the preview timer have been set, the preview period is over and the subscriber will be charged for the pay-per-view event. The CCC periodically collects the preview timer information contained in the Program Authorization Map using READ messages to determine which subscribers should be charged for viewing which pay-per-view events.

Although several messages have been described in detail with respect to an embodiment of the invention, it will be apparent to those skilled in the art that the message format utilized in the present invention can accommodate numerous other messages sent between the CCC and the ECUs. It will also be apparent to those skilled in the art that the basic format of the CCC/ECU messages may be changed.

E. Data Processor Operation

The operation of the Data Processor will now be described for an embodiment of the invention using the message formats and messages illustrated in FIGS. 10–17. A source and object code computer program listing which will be readily understood by those skilled in the art for controlling the operation of the Data Processor is annexed at Appendix C.

Figure 18A:
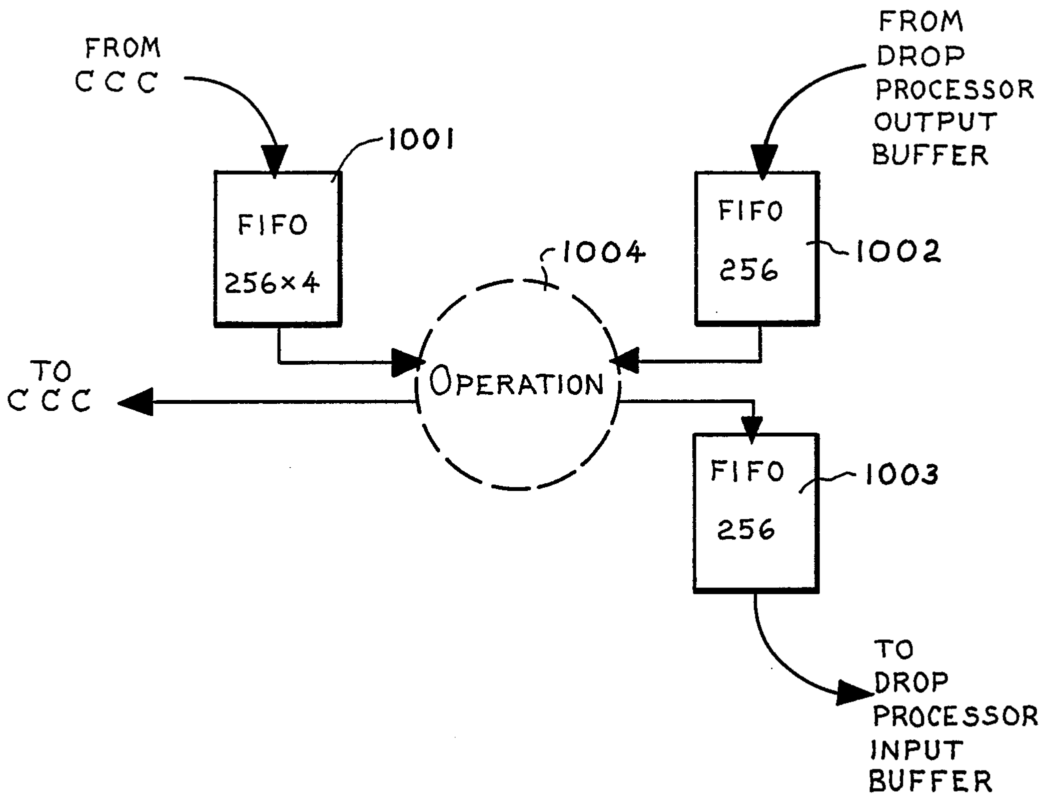
FIGS. 18*a*–*h* are flow charts illustrating the flow of a program controlling the operations of the so-called Data Processor of the ECU in an embodiment of the invention.

FIG. 18*a* illustrates the overall programmed operation of the Data Processor. As shown in FIG. 18*a*, data received from the CCC is placed by USART 400 of digital unit 55 (FIG. 5) in FIFO receive buffer 1001. This buffer is organized as a 256×4 byte buffer such that it can hold up to four 256-byte CCC messages at any one time. A buffer counter associated with the Data Processor points to the next empty buffer in the FIFO. Two other buffers shown in FIG. 18*a* are FIFO output buffer 1002 and FIFO input buffer 1003. Data received by the Data Processor from the Drop Processor is placed in output buffer 1002. Similarly, data passed to the Drop Processor from the Data Processor is placed in FIFO input buffer 1003. Each of these buffers contains 256 bytes and may buffer up to 25 10-byte messages. A buffer counter associated with each buffer points to the next empty buffer. The Data Processor receives data from FIFO buffers 1001 and 1002, operates on the data (FIG. 18*a*, item 1004), and sends data to FIFO buffer 1003 or to the CCC.

Figure 18B:
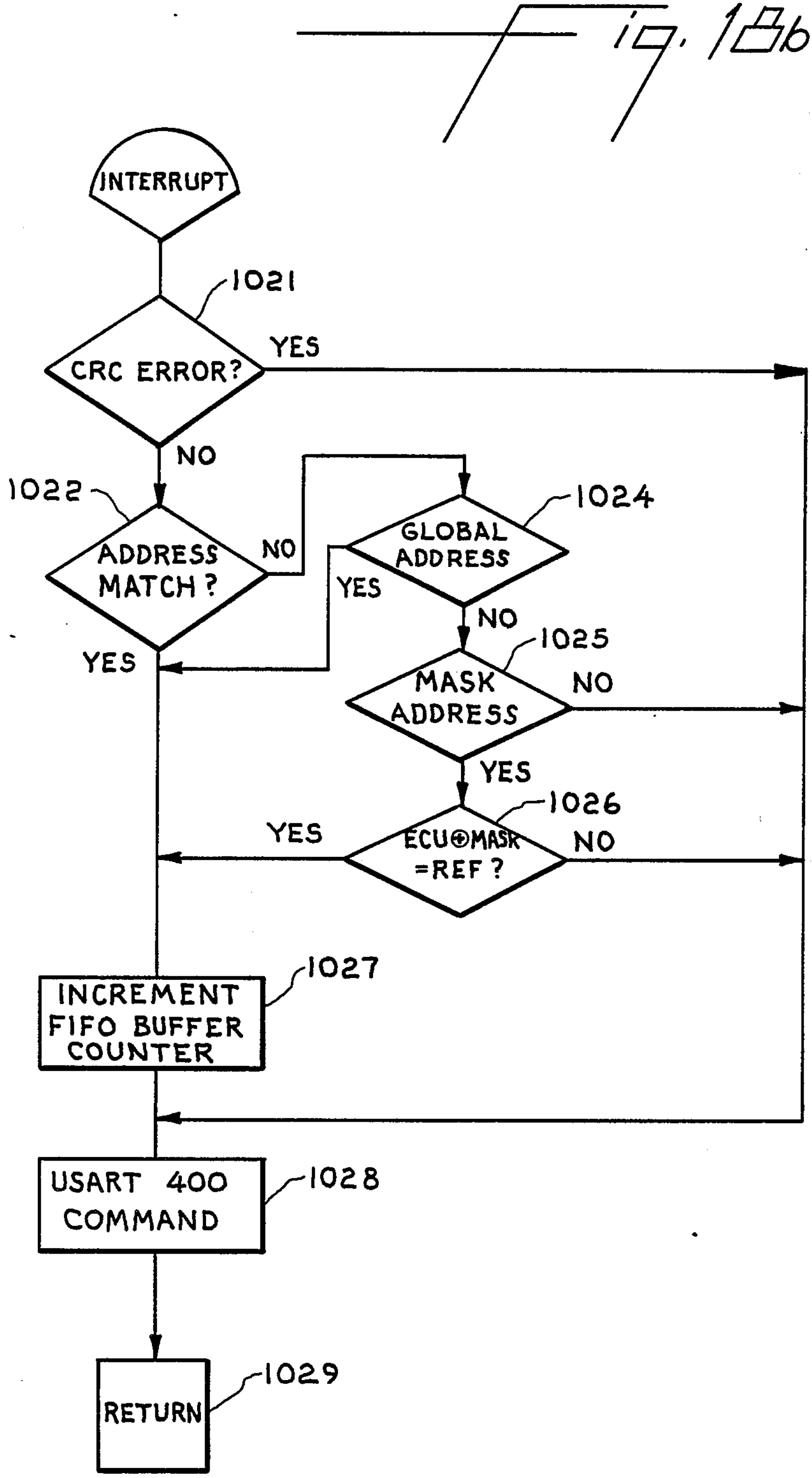

FIG. 18*b* illustrates a flow chart of a routine by which the Data Processor determines whether or not a message has been received from the CCC and, if so, whether or not the message is for that ECU. The routine of FIG. 18*b* is called whenever the Data Processor is interrupted by USART 400 (FIG. 5) to signify that a message has been received from the CCC.

The routine of FIG. 18*b* commences at step 1021, where the routine inhibits further input from USART 400 and determines from the CRC bytes of the received message whether or not a transmission error occurred. If an error occurred, the routine branches to step 1028 where input from USART 400 is again enabled. After step 1028, the interrupt service routine advances to step 1029 and returns to the calling program.

Alternatively at step 1021, if no transmission error occurred, the routine advances to step 1022 where the Data Processor checks the address bytes of the received message. If the address bytes match the ECU's address, the routine advances to step 1027 where the buffer counter associated with FIFO buffer 1001 (FIG. 18*a*) is incremented by one. The routine then advances to step 1028 where USART 400 is enabled as earlier described. Because the buffer counter value was incremented at step 1027, a subsequent CCC message received by USART 400 will be written into the next buffer and will not overwrite the contents of the buffer containing the previously received CCC message.

Returning to step 1022, if the address bytes of the received message do not match the ECU's address, the routine branches to step 1024, where the address bytes are checked for the presence of the global or broadcast address (hex FFFF). If this address is present, the message is for the ECU and the routine advances to step 1027 as previously described. Otherwise, the routine advances to step 1025 where the Data Processor checks for the mask address (hex 0000) in the CCC's message. If this address is not present, the message is not for the ECU and the routine branches to step 1028. Otherwise, the routine advances to step 1026 where the mask operation is performed as earlier described. The routine then branches to step 1027 or to step 1028 depending respectively on whether or not the result of the mask operation performed at step 1026 indicates that the message is for the ECU.

The operating program of the Data Processor will now be described with reference to FIGS. 18*c* through 18*h*. This program is comprised of two major parts: (1) a main routine, and (2) a collection of application programs to implement various functions within the ECU. The main routine is a task-driven program which branches to one or another application program depending upon the task to be performed. The application program performs its task (e.g., inputting keypress data from an SPU such as subscriber-entered channel requests, pay-per-view requests, send function data, etc.) and returns to the main routine. Because of the need to service a plurality of SPUs on a plurality of drop cables, it may occur that an application program must return to the main routine before the application program has completed its particular task. For example, if a subscriber enters a two-digit channel request into an SPU keyboard, the application program associated with that function may input the first digit and return to the main routine prior to the subscriber entering the second digit. In this event, the application program prior to returning to the main routine sets a time out value in a time table and a jump address in a jump address table. As more fully described below, the time out and jump address values enable the main routine to jump back to the application program at the appropriate time to continue at the point the application program left off.

Figure 18C:
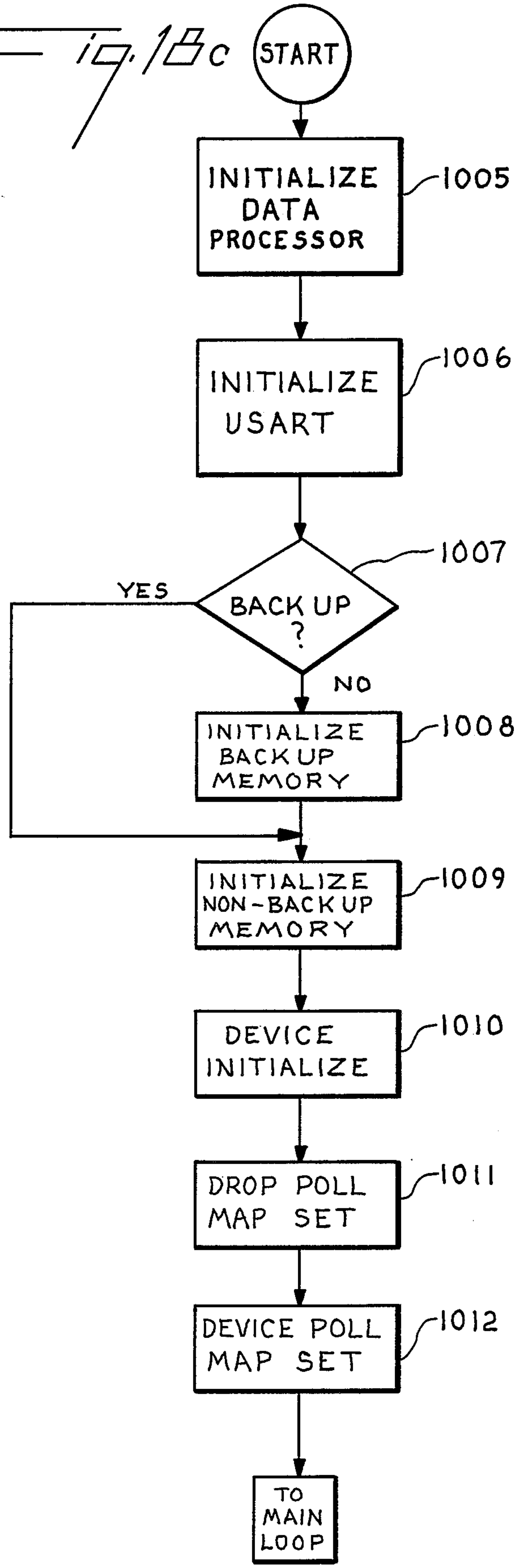

FIG. 18*c* illustrates a flow chart generally illustrating the operation of the main routine. As shown in FIG. 18*c*, the main routine begins at step 1005 upon ECU power up. At step 1005, the Data Processor initializes I/O and memory maps, an interrupt timer, direct memory access, and various registers and counters. The program then advances to step 1006, where the Data Processor initializes USART 400. At step 1007, the Data Processor 420 checks whether or not its back up memory requires initializing. If so, the program advances to step 1008 to initialize the back up memory. Otherwise, or after completing the back up memory initilization in step 1008, the program advances to step 1009 where other memory locations are initialized. Generally, steps 1008 and 1009 initialize such items as the Channel Authorization Map, Channelization Map, parental control codes, Program Event Map, Program Authorization Map, and so forth. In steps 1010, 1011 and 1012, the Data Processor initializes the drop and device polling maps and pointers.

Figure 18D:
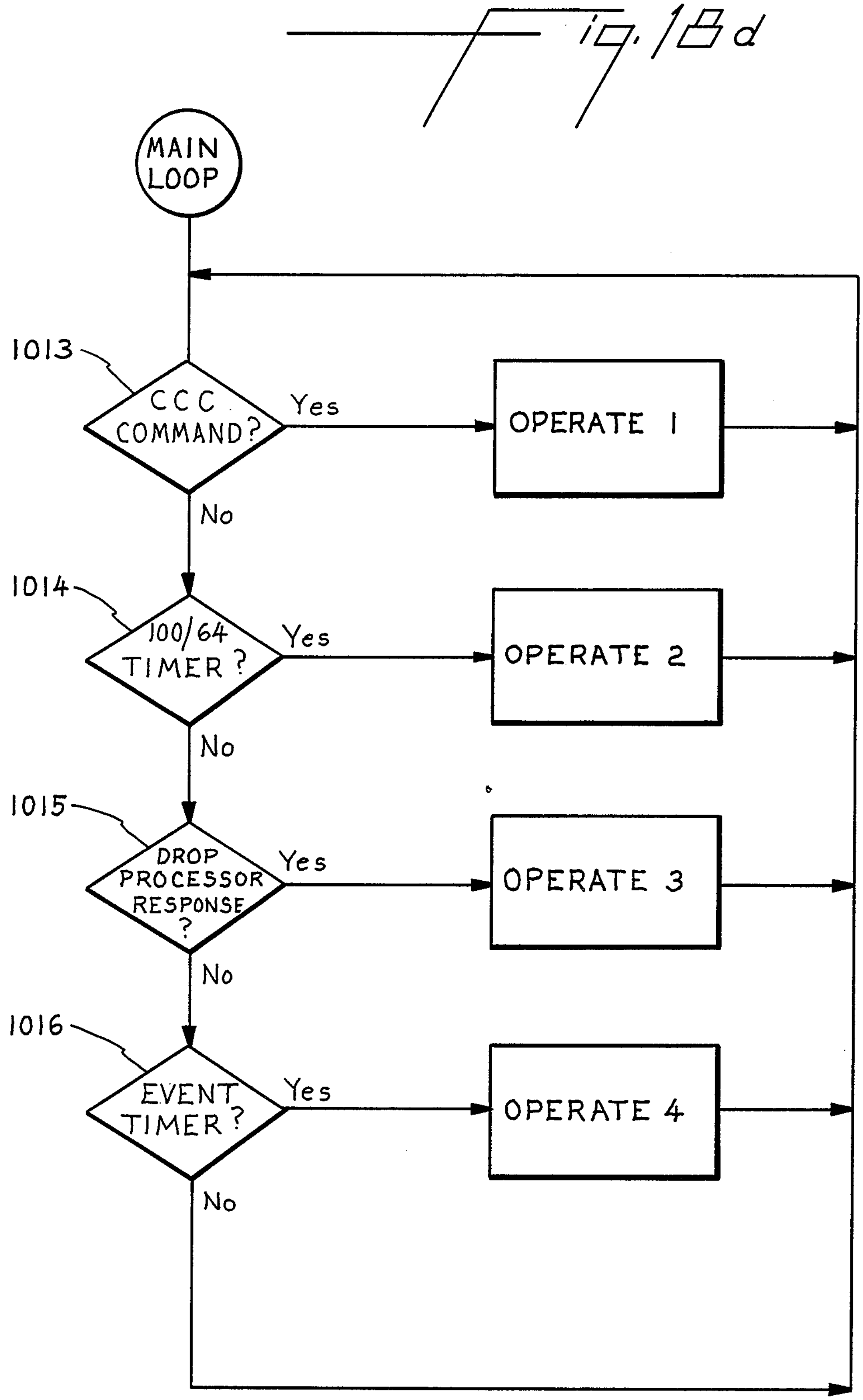

After initialization, the Drop Processor enters a main loop. The main loop is illustrated in the flow chart of FIG. 18*d*. As shown in FIG. 18*d*, the Data Processor in the main loop sequentially determines whether or not any of four events have occurred, viz., whether or not (1) the Data Processor has received a message from the CCC (step 1013), (2) a 100/64 millisecond pay-per-view eevent timer has timed out (step 1014), (3) the Drop Processor output buffer contains data for the Data Processor (step 1015), and (4) a pay-for-view event timer has timed out (step 1016). If any of the foregoing events have occurred, the Data Processor at the appropriate step 1013, 1014, 1015 or 1016 branches to an associated operation routine shown in FIG. 18*d* as Operate 1, Operate 2, Operate 3 and Operate 4, respectively. Otherwise, the program advances to the next numbered step in FIG. 18*d*. After step 1016, or after an operation routine, the program flow loops to step 1013.

The operation routines of FIG. 18*d* will now be described with reference to FIGS. 18*e*–18*h*.

Operate 1 Routine

Figure 18E:
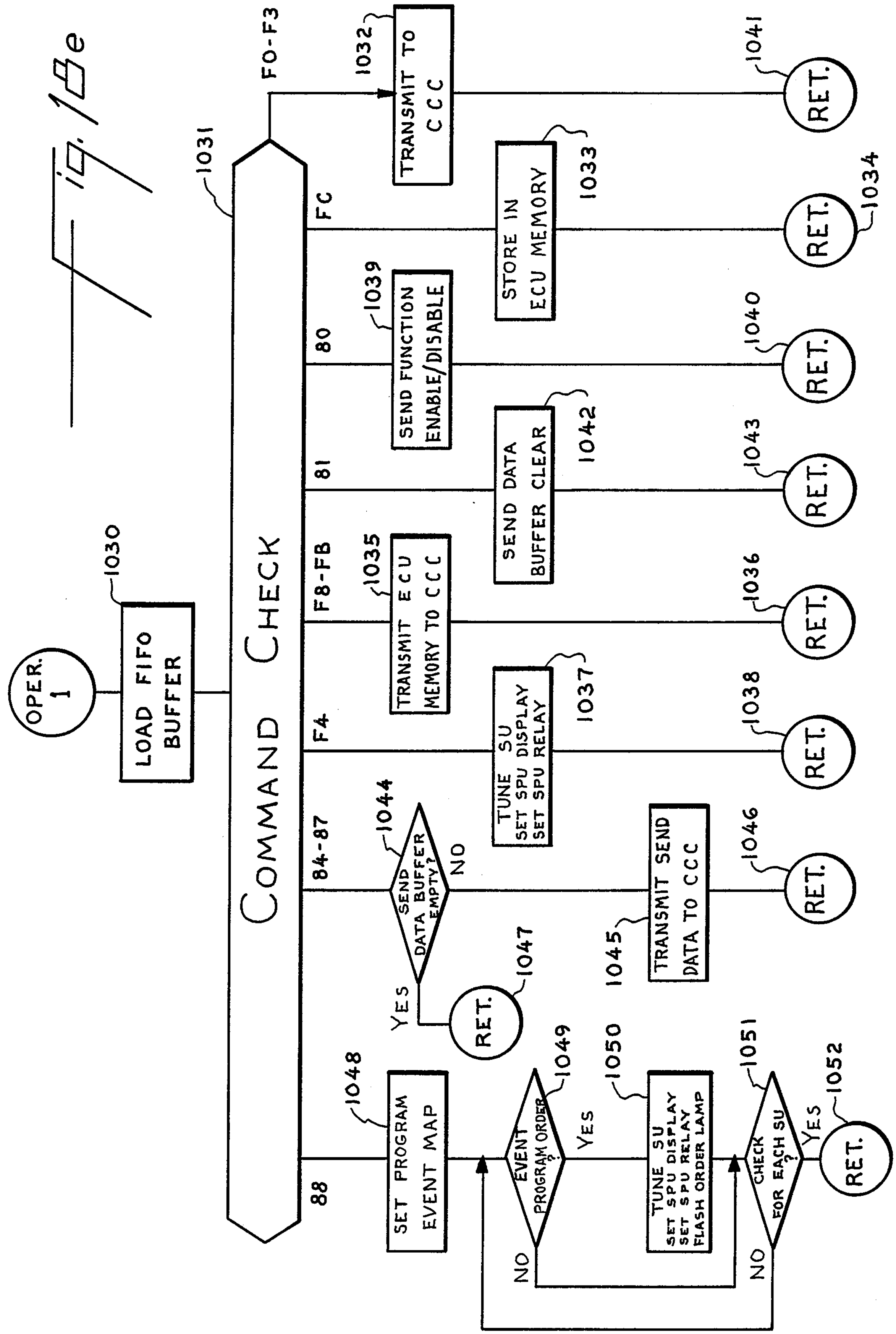

If the main routine detects at step 1013 (FIG. 18*d*) that a message addressed to the ECU has been received from the CCC, the program branches to the Operate 1 routine, shown in FIG. 18*e*, to respond to the CCC message.

The Operate 1 routine commences at step 1030, where the Data Processor loads a CCC message from buffer 1001 (FIG. 18*a*) into working memory. The program then advances to step 1031, where the COM- MAND byte of the CCC message is checked to determine what action the Data Processor should take.

At step 1031, if the COMMAND byte of the CCC message is hex F0–F3 (ECHO BACK), the program advances to step 1032 to transmit (echo) the received message back to the CCC. After transmitting the message, the program advances to step 1041 and returns to the main loop as earlier described.

If the COMMAND byte at step 1031 is hex FC (WRITE), the program advances to step 1033 to store the data contained in the WRITE message commencing at the location of the ECU's memory. From step 1033, the program advances to step 1034 and returns to the main loop as earlier described.

If the COMMAND byte at step 1031 is hex F8–FB (READ), the program advances to step 1035 to transmit to the CCC data from the ECU's memory specified in the WRITE message. From step 1035, the program advances to step 1043 and returns to the main loop as earlier described.

If the COMMAND byte at step 1031 is hex F4 (FORCE TUNE), the program advances to step 1037 where the converter of the specified SU is tuned to the specified channel, the SPU seven-segment display is set to display the logical channel to which the SU is being force tuned, and the power relay of the SPU associated with the SU is activated to turn on the subscriber's television. The program then advances to step 1038 and returns to the main loop as earlier described.

If the COMMAND byte at step 1031 is hex 80 (SEND FUNCTION ENABLE) or hex 81 (SEND FUNCTION CLEAR), the program advances respectively to step 1039 to enable/disable the send function in the SPU's or to step 1042 to clear the send function data buffer in the ECU. From steps 1039 or 1042, the program advances respectively to step 1040 or step 1043 and returns to to the main loop as earlier described.

If the COMMAND byte at step 1031 is hex 84–87 (SEND FUNCTION DATA), the program advances to step 1044 where the Data Processor checks the value of the send function data count byte to determine whether or not the ECU has any send function data to return to the CCC. If the ECU has no send function data, the program branches from step 1044 to step 1047 and returns to the main loop as earlier described. Otherwise, the program advances to step 1045 where the ECU's send function data is transmitted to the CCC. The program then advances to step 1046 and returns to the main loop as earlier described.

Finally, if the COMMAND byte at step 1031 is hex 88 (PAY-PER-VIEW), the program branches to step 1048 where the MS tuning data contained in the PAY-PER-VIEW message is stored in the ECU's Program Event Map. The program then advances to step 1049 where the Data Processor checks the Program Authorization Map to determine for a first subscriber whether or not the subscriber has ordered to view the pay-per-view program. If a subscriber has requested to view the pay-per-view event, the program advances to step 1050 where the SU associated with that subscriber is force tuned to the pay-per-view program, the associated five-minute preview timer is started, the event-order LED on the subscriber's SPU is set to flashing, and the SPU's power relay is activated to turn on the subscriber's television. The program then advances to step 1051 which causes the program to loop back to step 1049 for each of up to six subscribers. After looping for all subscribers, the program from step 1051 advances to step 1052 and returns to the main loop as earlier described.

Operate 2 Routine

Figure 18F:
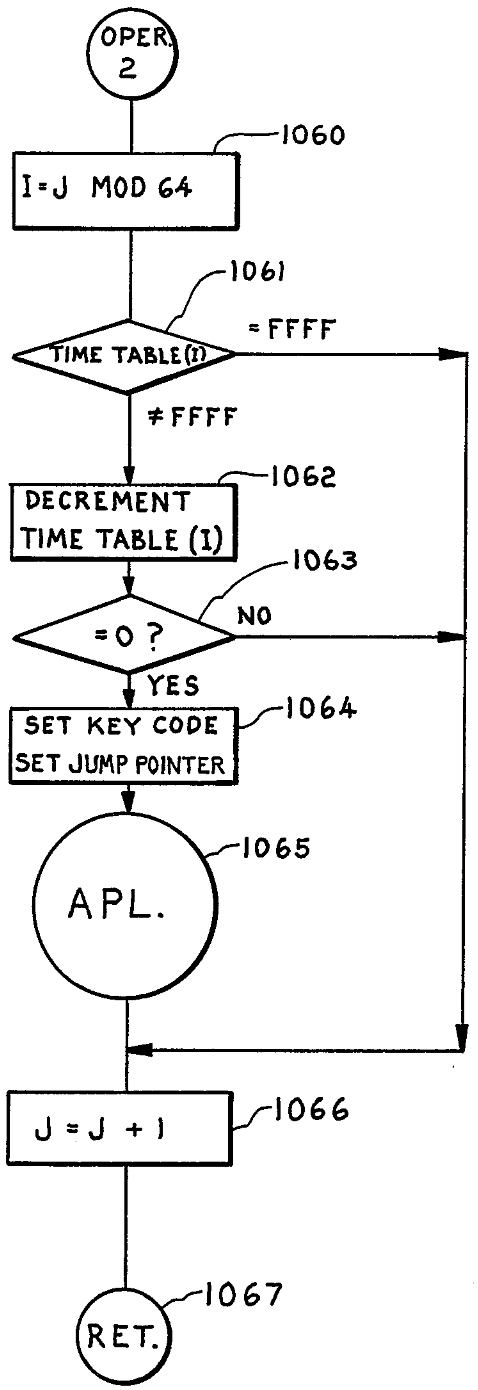

If the main routine detects at step 1014 (FIG. 18*d*) that the 100/64-second timer has timed out, the program branches to the Operate 2 routine, shown in FIG. 18*f*. The Operate 2 routine functions to transfer control of the Data Processor to any of a plurality of application programs. As earlier described, application programs implement a variety of functions, such as responding to SPU key presses and implementing the requested operation (e.g., channel selection pay-per-view, parental control), activating the SPU's power relay, activating (flashing or non-flashing) and deactivating the SPU order event LED, clearing the SPU seven-segment display, sending data (e.g., program or channel information) to the SPU display, and so forth.

The Operate 2 program operates as follows. The Data Processor maintains in memory a time table having a pluraliity of two-byte entries for each of up to 8 devices on each of up to 6 different drops associated with the ECU. In one embodiment, the time table has 64 entries (0–63), although in the described embodiment there may be no more than 6 drops with no more than 8 devices (up to 4 SPUs and up to 4 other devices) on each drop associated with each ECU. The entries in the time table are sequentially arranged by drop and device, such that entries 0–7 are associated with devices having addresses 0–7 on drop 0, entries 8–15 are associated with devices having addresses 0–7 on drop 1, and so on. As previously described, the entries in the time table are set by the various application programs as a time out value prior to a return to the main routine from the application program.

Upon entry into the Operate 2 routine, a time table pointer (I) is set to a value from 0–63 (step 1060) as a function of the value of a time table counter (J). The routine then advances to step 1061, where the I pointer is used to read the $I^{th}$ entry (associated with a particular device on a particular drop as described above) from the time table. If the value of that entry is hex FFFF (signifying that the timer is off), the routine branches to step 1066 where the time table counter J is incremented by one in preparation for the next pass through the Operate 2 routine. If the entry is other than hex FFFF, the routine advances to step 1062 where the time table entry is decremented by one. If the time table value after decrementing is not equal to zero (step 1063), the routine branches to step 1066 where the J counter is incremented as previously described.

On the other hand, if the timer entry is equal to zero, the timer has timed out and the routine advances to step 1064 where a zero is placed in a memory location (Key Code), and the value of the I pointer is used to interrogate a jump table. The jump table is a table maintained in the ECU's memory which is similar in organization to the time table. However, the jump table entries specify the memory location in an application program to which the program should jump. These values may point to the start of an application program, or to a point within an application program if the application program had previously returned to the main routine prior to completing the application program's task. Based upon the entry contained in the jump table, the Operate 2 routine then advances to step 1065, where the routine jumps to the point in an application program ("APL") specified by the jump table. When the application program returns to the Operate 2 routine, the Operate 2 routine advances to step 1066 where the J counter is incremented as earlier described. The routine then advances to step 1067 to return to the main loop.

Operate 3 Routine

Figure 18G:
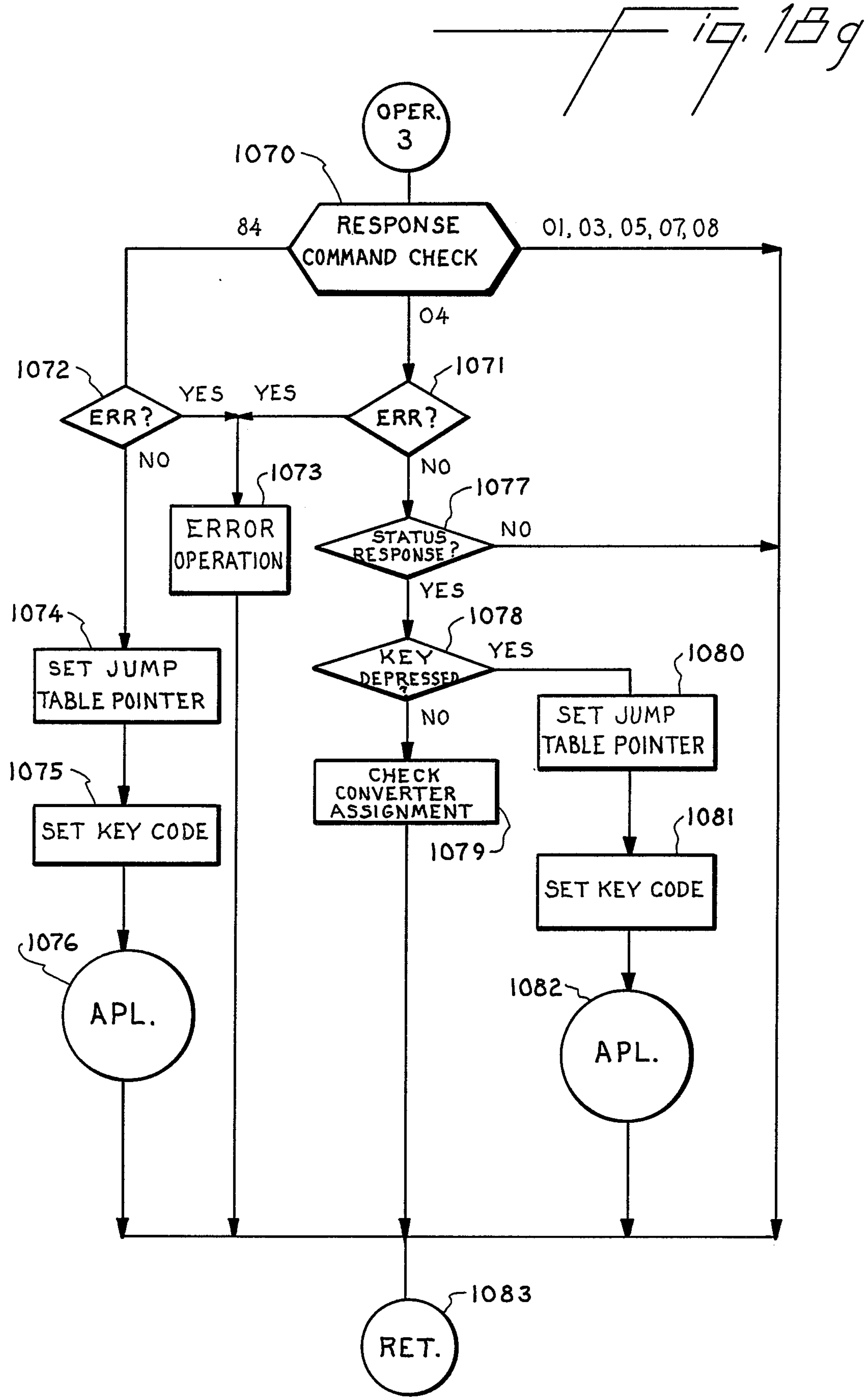

If the main routine determines t step 1015 (FIG. 18*d*) that the Drop Processor has data for the Data Processor, the program branches to the Operate 3 routine, shown in FIG. 18*g*. The Operate 3 routine functions to appropriately respond to data received from the Drop Processor. Such data may include 84 Commands (Unsolicited Data Responses), and 04 Responses received from associated SPUs.

As shown in FIG. 18*g*, the Operate 3 routine at step 1070 first determines what type of message is being sent from the Drop processor. If the message is an 01, 03, 05, 07 or 08 command response (earlier described), no action is required and the Operate 3 routine advances to step 1083 to return to the main routine as earlier described. Although in the flow chart of FIG. 18*g* no action is taken in response to an 01, 03, 05, 07 or 08 response, it will be apparent to those skilled in the art that various modifications may readily be made to the program flow to cause the Data Processor to respond to any or all of these command responses. For example, the program may be modified to cause the Data Processor upon detecting in an 01 response that power is not being received from a particular drop to notify the system operator of this fact.

If an 84 Command is detected at step 1070, the Operate 3 program branches to step 1072 to determine if an error has occurred. If "yes", the program branches to step 1073 where a device error counter is incremented in an error operation subroutine. If the counter reaches a predetermined value (e.g., 2), the error subroutine causes a re-initialization of pointers and jump table entries associated with the SPU or device sending the 84 Command. The program then advances to step 1083 to return to the main loop as earlier described. On the other hand, if no error is detected at step 1072, the program advances to (1) step 1074, where the jump table pointer is set, (2) step 1075, where the received data is placed in a memory location (Key Code), and (3) step 1076, where the program jumps via the jump table to the appropriate application program (APL). When the application program returns to the Operate 3 routine, the Operate 3 routine advances to step 1083 and returns to the main loop.

Finally, if an 04 Response is detected at step 1070, the Operate 3 routine advances to step 1071 to check for a transmission error. If an error has occurred, the routine branches to step 1073. Otherwise, the routine advances to step 1077 where the Data Processor determines if the 04 Response is a status response. If the 04 Response is not a status response, the program branches from step 1077 to step 1083 to return to the main loop as earlier described. Otherwise, the program advances to step 1078. At step 1078, if the status response indicates that a key has been recently depressed on the device keyboard, the routine branches to steps 1080, 1081 and 1082 to respond to the key press as described above with respect to steps 1074–1076. If the status response indicates that no key has been recently depressed, the program advances from step 1078 to step 1079 where the status byte is checked to determine the state of bit 7. As earlier described, bit 7 indicates as a function of the setting of SPU switch 780 (FIG. 7) whether the responding device is a master or slave SPU and, thus, to which converter (primary or secondary) the SPU is assigned. After step 1079, the program advances to step 1083 to return to the main loop as earlier described.

Operate 4 Routine

Figure 18H:
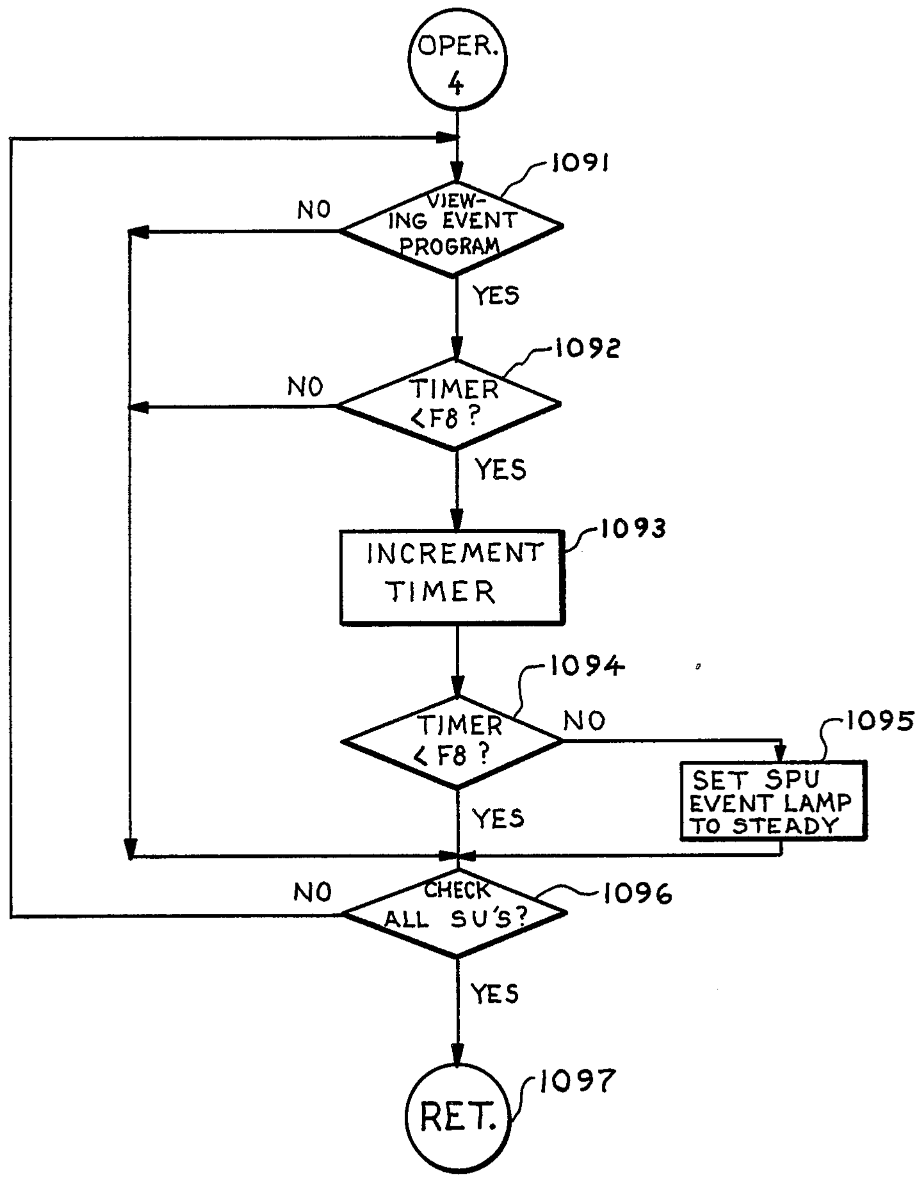

Lastly, if the main routine at step 1016 (FIG. 18*d*) determines that the pay-per-view timer has timed out, the program branches to the Operate 4 routine shown in FIG. 18*h*. This routine starts by entering a loop at step 1091 to determine for each subscriber whether or not the subscriber is viewing a pay-per-view program. If the subscriber is not viewing a pay-per-view program at step 1091, the routine branches to step 1096 where the routine loops back to step 1091 to make the foregoing determination for the next subscriber. If at step 1091 a pay-per-view event is being viewed by a subscriber, the routine advances to step 1092 to check the associated 5-bit preview timer in the appropriate byte of the Program Authorization Map. If the value of the byte is greater than or equal to F8, indicating that the byte's five most significant bits (i.e., the timer bits) are all set to "1" and the preview period has expired, the program branches to step 1096. However, if the value of the byte is less than hex F8, indicating that at least one of bits 3–7 of the byte is equal to zero and the preview period has not expired, then the program advances to step 1093 where the 5-minute timer is incremented by setting a timer bit to "1". The routine then advances to step 1094, where the value of the byte is again checked. If the five timer bits are now all set to "1", then the preview period has expired and the program branches to step 1095 to cause the order-event LED on the subscriber's SPU to glow steadily to indicate that the subscriber will be charged for the pay-per-view event. Otherwise, the program branches to step 1096. Step 1096 causes the routine to loop to setp 1091 to check for each subscriber whether or not a pay-for-view event is being viewed. At step 1096, after the routine has determined for each subscriber whether or not the subscriber is reviewing a pay-per-view event, the routine advances to step 1097 and returns to the main loop as earlier described.

F. Polling and Handshaking

In the above-described system, an ECU transmits a message to the CCC only if the ECU receives a CCC message which requires a return message (e.g., READ, ECHO BACK or SEND FUNCTION DATA messages). Otherwise, ECUs do not transmit messages to the CCC.

Thus, in the above-described system, it is possible for an ECU to have important information to send to the CCC (e.g., information received from a subscriber requesting additional services, or information from a medical monitoring device attached to the drop cable of an ECU), but be unable to notify the CCC of this fact. Also, because ECUs in the above-described system do not ordinarily respond to the CCC upon receipt of a CCC message, the CCC might not become alerted to an inoperative ECU or transmission link until a message requiring a response (e.g., READ) was addressed to the ECU and the responsive message was not received by the CCC.

To enable ECUs to send important information to the CCC in a timely fashion, and to provide for a check that ECUs are operative, a polling and handshaking communication protocol may be used. In view of the potential for a large number of ECUs (up to 65,536 on each of up to 4 banks) on the cable network of the present invention, an important consideration in designing such a protocol is to minimize the time required to poll and handshake with individual ECUs.

The present invention therefore provides for a handshaking scheme which informs the CCC of inoperative ECUs but which does not require the transmission of relatively lengthy formatted messages. In addition, the present invention provides for a polling scheme which allows an ECU to notify the CCC that the ECU has information for the CCC, but does not require the transmission of lengthy information messages to the CCC in response to the receipt by an ECU of a poll message. The polling scheme enables the CCC to gather information from the ECUs via two independently operating mechanisms. A first or "general" polling scheme allows the CCC to poll each ECU to determine if the ECU has information to send to the CCC. The general polling scheme allows for the detection in less than 20 seconds of all operative ECUs which require service. A second or "priority" polling scheme allows for the detection in less than 20 milliseconds of any one ECU having so-called priority information for the CCC. For both polling schemes, the response "level" is established by the CCC in advance of the poll to identify and obtain responses from only those ECUs having information falling within a predetermined level or threshold of importance. The level of information may be a function, e.g., of the value or timeliness of the information.

1. Message Format

The polling and handshaking protocols are described below with respect to an alternative basic message format from that earlier described and shown in FIGS. 10–11. This alternative basic message format is illustrated in FIGS. 19–20.

Figure 19:
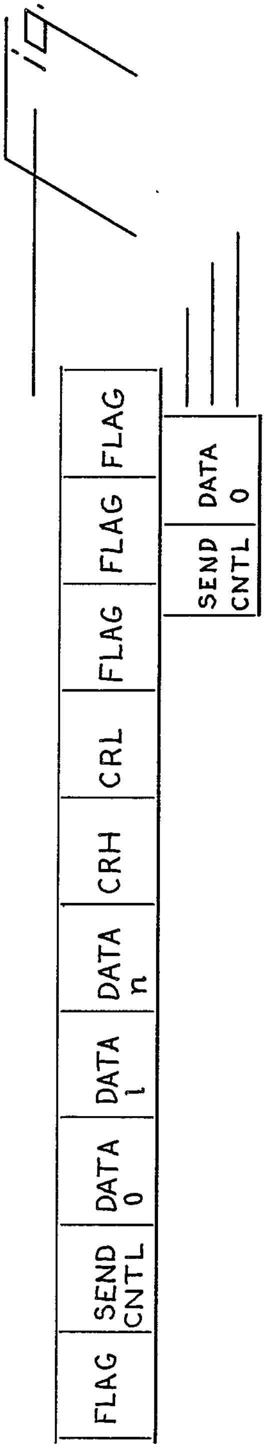
FIG. 19 is a diagram of a basic message format used in another embodiment of the invention for data communication in the forward direction from the CCC to an ECU.
Figure 20:
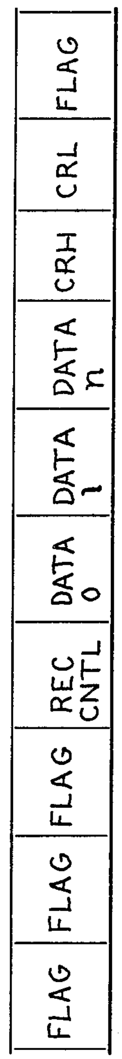
FIG. 20 is a diagram of a basic message format used in another embodiment of the invention for data communication in the reverse direction from an ECU to the CCC.

FIG. 19 shows an alternative basic message format for data communication in the forward direction (i.e., from the CCC to an ECU). Each message is of a predetermined format, comprising a FLAG byte, a SEND CONTROL ("SEND CNTL") byte, a plurality of DATA bytes, two CYCLIC REDUNDANCY CHECK ("CRC") bytes, and another FLAG byte. Each byte is comprised of 8 bits. The FLAG and CRC bytes are identical to and serve the same function as the FLAG and CRC bytes previously described.

The SEND CNTL byte in the message of FIG. 19 is used to define any of 256 unique commands. As described in greater detail below, SEND CNTL commands may cause an ECU to return information to the CCC, or may cause the ECU to perform a specified operation.

The DATA bytes may comprise from 0 to 255 bytes per message. The SEND CNTL byte specifies how the DATA bytes are to be interpreted by the ECU. If a message is transmitted to a particular ECU, the first two DATA bytes typically specify the ECU address from 0–65536. The first address byte ("ADL") specifies the low-order part of the address, and the second byte ("ADH") specifies the high-order part. Also, typically, the third DATA byte of a message addressed to a particular ECU is a CONTROL ("CTL") byte. The CTL byte may specify the ECU drop, if any, for which the message is designated, the particular reverse channel that the ECU should use to respond to the CCC, etc.

An alternative basic message format in the reverse direction (i.e., from the ECUs to the CCC) is shown in FIG. 20, and is similar to the format for forward communication. Thus, FLAG bytes are used to identify the beginning and end of a message. Following the beginning FLAG byte is a RECEIVE CONTROL ("REC CNTL") byte. The REC CNTL byte, which need not be identical to the SEND CNTL byte, specifies how subsequent DATA bytes, if any, contained in the message are to be interpreted by the CCC. Two CRC bytes, earlier described, follow the last DATA byte.

In addition to the foregoing basic messages, special ECU poll response bytes are utilized. These poll response bytes are comprised of one or two byte-times of carrier from an ECU. As described below, these poll response bytes are used as a handshake in response to polling and informational messages sent from the CCC.

2. General Level Polling Protocol

The first polling method is the so-called General Level Request ("GLR") poll. This mechanism is used to sequentially address a poll message to each ECU in the system to determine whether or not the ECU requires service (i.e., whether or not the ECU has information for the CCC). Prior to the poll, the CCC establishes the "level" at which the ECUs will respond to the poll. Once the CCC has established the poll level, an ECU responds to a GLR poll only if the ECU (a) requires service, and (b) has information to transmit to the head end 12 which is at a level equal to or less (i.e., more important) than the level previously established by the CCC. The addressed ECU upon receipt of a GLR poll responds by sending to the CCC one or two General Poll Response ("GPR") bytes. Each GPR byte consists of one byte-time of carrier from the ECU, or "11111111." If the CCC fails to detect a GPR byte from the polled ECU within a predetermined time interval (e.g., 350 microseconds), the CCC presumes the ECU to be inoperative. After a predetermined number of (e.g., five) unsuccessful attempts to contact the ECU, the CCC prints an appropriate error message to the head end operator.

If the addressed ECU transmits to the CCC a single GPR byte in response to a GLR poll, the CCC interprets this to mean that the ECU is operative and does not require servicing. The CCC then polls the ECU having the next sequential address. However, if the ECU returns two GPR bytes, the CCC interprets the response as a service request from an operative ECU. Using the GLR poll, the CCC periodically cycles through all active ECUs and constructs a Service Request table in memory. The CCC subsequently uses this table to selectively retrieve, using a Priority Information Request message later described, information from only those ECUs requiring service. At a forward data transmission rate of 200 Kbps, a complete general poll request cycle of 65,536 ECUs typically takes less than 20 seconds.

The GLR poll is implemented by the CCC as follows. First. the CCC transmits a General Level Request Threshold ("GLRT") message. A typical GLRT message is shown in FIG. **21*a* in accordance with the basic message format of FIG. 19. The GLRT message has a SEND CNTL byte equal to 08** and is used by the CCC to establish the response threshold level for the GLR poll, as earlier described. The response threshold is established by a level ("LVL") byte contained within the GLRT message. The first two bits of the CTL byte of the GLRT message specify how the ECU should interpret the LVL byte. If the first two bits of the CTL byte are "01", this is interpreted by the ECU to mean that the ECU should respond positively (i.e., with two GPR bytes) to subsequent poll messages only if the level of the ECU's information is equal to the level set forth in the LVL byte. If the first two CTL byte bits are "10", this means the the ECU should respond positively to poll messages if the level of information to be sent to the CCC is equal to or less than the LVL value.

Figures 21A, 21B:
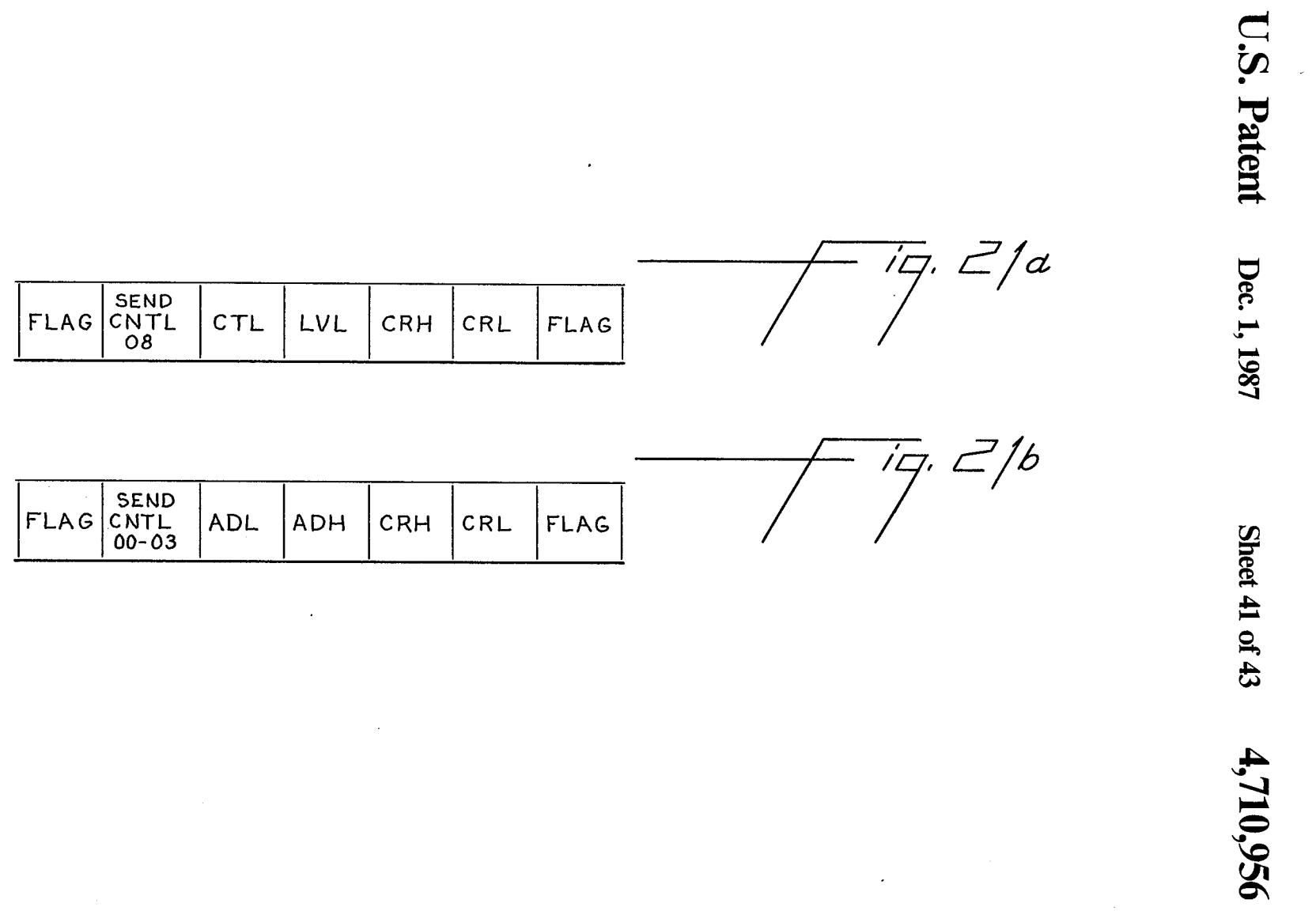

After sending the GLRT message to establish the poll level, the CCC transmits one or more General Level Request Poll ("GLRP") messages. A typical GLRP message is illustrated in FIG. 21b in accordance with the basic message format of FIG. 19. As shown in FIG. 21b, the SEND CNTL byte of a GLRP message may be any value equal to 0, 1, 2, or 3. The SEND CNTL byte of the message specifies to the addressed ECU that the message is a GLRP message, and further specifies on which reverse channel (0, 1, 2, or 3) the ECU should send GPR response bytes. If an ECU responds to the GLRP message with two GPR bytes on the specified reverse channel, this is interpreted by the CCC as a service request from an operative ECU as earlier described. If one GPR byte is returned, this is interpreted by the CCC as a response from an operative ECU not requiring service. If no GPR bytes are received, the CCC presumes the ECU to be inoperative.

3. Priority Polling Protocol

The second or priority polling method is the so-called Priority Information Window ("PIW") poll. This second method establishes a priority "window" on the cable network such that any ECU having information to send to the head end which falls within the pre-established priority window will alert the head end of this fact on a predetermined priority service request channel in response to the receipt of any general polling request addressed to any ECU.

Figure 22A:
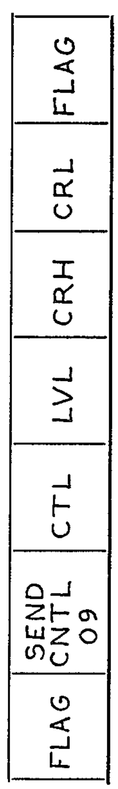

Priority polling is enabled by a Priority Information Request Window Control ("PIRWC") message sent from the CCC. The PIRWC message, illustrated in FIG. 22a in accordance with the format of FIG. 19, is used by the CCC to set the ECU priority response threshold level. As shown in FIG. 22a, a PIRWC message has a SEND CNTL byte equal to 9. A LVL byte of the PIRWC message specifies the priority response threshold level. The ECU interprets the LVL byte in a manner determined by the value of the bits in a control ("CTL") byte. Bits 0 and 1 of the CTL byte specify whether the ECU should respond if the level of its information is equal to the value of the LVL byte, or whether the ECU should respond if its level of information is equal to or less than the LVL value. In addition, bit 2 of the CTL byte specifies whether to turn the PIW function in the ECU on or off. Finally, bits 3 and 4 of the CTL byte specify on which of the four reverse channels the ECU should return a priority response. The values and functions of the bits of the CTL byte in one embodiment of the PIRWC message are set forth below:

TABLE E

| PIRWC CTL BYTE | | |
|---|---|---|
| B1 | B0 | Function |
| 0 | 1 | The ECU should respond to a priority poll only if the level of its information equals the value of LVL. |
| 1 | 0 | The ECU should respond to a priority poll only if the level of its information is equal to or less than the value of LVL. |

TABLE E-continued

| PIRWC CTL BYTE | | |
|---|---|---|
| B2 | | Function |
| 0 | | Set PIW in ECU off. |
| 1 | | Set PIW in ECU on. |
| B4 | B3 | Function |
| 0 | 0 | Return priority response on reverse channel 0. |
| 0 | 1 | Return priority response on reverse channel 1. |

After a PIRWC message is transmitted to and received by the ECUs, any ECU with priority information corresponding to the threshold level estalished by the PIRWC message will transmit to the CCC on the specified priority reverse channel a general poll response (GPR) byte after reception of any general level poll message. The reception by the CCC on the priority reverse channel of a GPR byte (there may be more than one response from a plurality of ECUs) alerts the CCC that an ECU (the identity of which is as yet unknown to the CCC) has priority information to send. Upon receipt of such a priority response, the CCC transmits a series of messages, described below, to disable the priority "window" and to locate within 20 milliseconds an ECU sending the priority poll response.

Figure 22B:
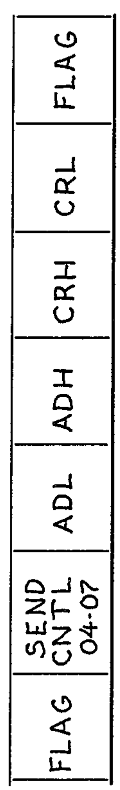

Assuming for the moment that the CCC has identified an ECU returning a priority response (or requesting service in response to the earlier described GLR poll), the CCC obtains the information from the identified ECU by addressing a Priority Information Request ("PIR") message to the ECU. There are four PIR messages PIRO, PIRI PIR2, and PIR3, having SEND CNTL bytes equal to 4, 5, 6, and 7 respectively (FIG. 22b). The PIRO, PIR1, PIR2 and PIR3 messages cause the ECU to send its priority information to the CCC on reverse channels 0, 1, 2, or 3, respectively.

In response to a PIR message, the addressed ECU transmits its priority information to the CCC using a Priority Information Request Response ("PIRR") message. The PIRR message allows an ECU to send to the CCC any of 256 different messages or values of numeric data for each drop associated with the ECU. A typical PIRR message is illustrated in FIG. 22c in accordance with the format of FIG. 20.

Figure 22C:
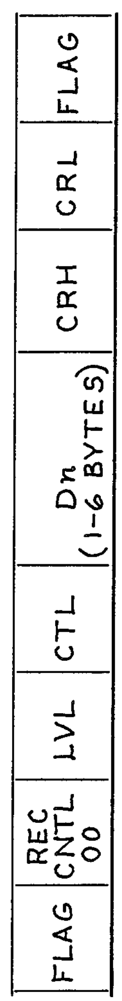
Figure 23A:
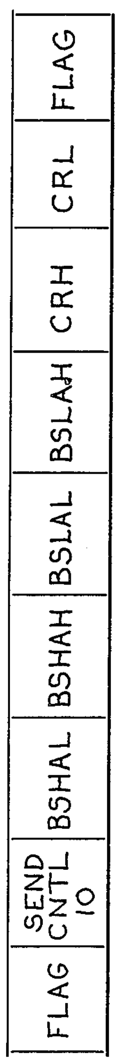
Figure 23B:
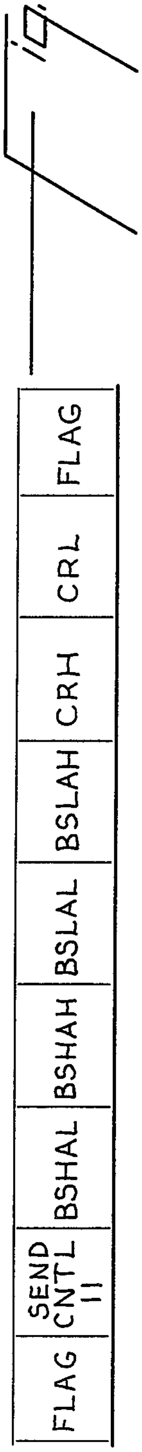
Figure 23C:
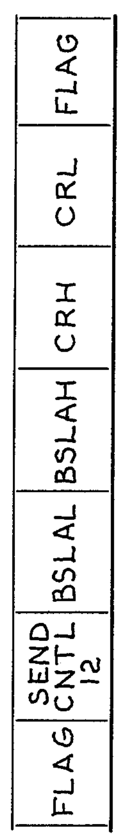
Figure 23D:
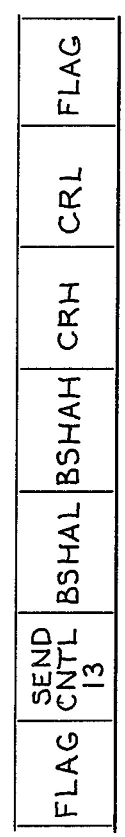

As shown in FIG. 22c, a PIRR message includes a REC CNTL byte equal to 0. A LEVEL ("LVL") byte specifies the threshold level assigned to the priority information which the ECU is transmitting to the CCC (the LVL byte will either match the level previously established, or be numerically less than that level, depending upon the information contained in the previously sent PIRWC message). Following the LVL byte is a CONTROL ("CTL") byte. The CTL byte specifies by the setting of bits 0–5 the drop or drops to which the priority information contained in the message relates. Each bit position 0–5 in the CTL byte is associated with a different ECU drop. For each drop as to which the ECU is sending priority information, the ECU sets to "1" the corresponding bit in the CTL byte. Following the CTL byte are up to 6 bytes of data (Dn), each byte representing a predetermined or "canned" priority message or numeric value with respect to a different one of the 6 drops associated with the ECU and specified in the CTL byte. The message concludes with the usual CRC and FLAG bytes.

Various divisions and definitions may be used for establishing the different levels of ECU priority information. For example, levels 0–7 may be associated with medical information obtained from medical monitoring devices attached to an ECU drop cable. Similarly, levels 16–23 may be associated with security information obtained from security devices attached to an ECU drop. Lower levels, such as levels 32–39, may be used by an ECU to inform the CCC of syntax or other errors contained in CCC messages received by the ECU. Similarly, information such as ECU status information, subscriber requests for additional services, subscriber responses to interactive two-way services, and other information may be associated with other priority levels.

The manner in which the CCC identifies an unknown ECU responding with a priority service request will now be described.

The CCC identifies an unknown ECU having priority information for the CCC using a binary sort method. The binary sort method involves dividing the population of ECUs having sequential addresses in the range of 0 to n into first and second groups of ECUs having respectively a first group address range from 0 to n/2, and a second group address range from n/2+1 to n. The CCC then transmits a message to the first group to determine whether or not any ECUs in the first group have priority information. If the first group includes an ECU (still unknown) having priority information, the CCC subdivides the first group into third and fourth groups in the manner earlier described, and sends a message directed now to the third group to determine whether or not any ECUs in the third group have priority information to send. If the third group includes an ECU having priority information, the CCC subdivides the third group into fifth and sixth groups and repeats the foregoing process. If the CCC at any time determines that the group (first, third, fifth, etc.) with which it is working does not have priority information, the CCC knows that the other respective group (second, fourth, sixth, etc.) must contain the ECU having the priority information. The CCC then transmits messages to and repetitively subdivides that group until, eventually, the CCC subdivides a group to a single ECU having priority information. As will be apparent to those skilled in the art, the foregoing binary sort method in the case of 65,536 ($2^{16}$) ECUs requires no more than 16 iterations to locate an ECU having priority information.

The messages used by the CCC in implementation of the binary sort method in an embodiment of the invention are shown in FIGS. **23*a–d*.**

The CCC initiates a search for an unknown ECU having priority information using a Binary Sort Initialization ("BSI") message, shown in FIG. **23*a*.** The BSI message has a SEND CNTL byte equal to 10, followed by two bytes specifying (in low and high order parts) a binary sort high address ("BSHAL" and "BSHAH") and two bytes specifying (in low and high order parts) a binary sort low address ("BSLAL" and "BSLAH"). The BSI message is sent by the CCC following receipt of a GPR byte on the priority information reverse channel. The BSI message is used by the CCC to turn the priority information window off, to specify the binary sort group high address, and to specify the binary sort group low address. No response to the BSI message is expected from any ECU.

After the binary sort is initialized with the BSI message, the CCC transmits a series of binary sort poll messages to locate an ECU having priority information to send. Each binary sort poll message turns the priority information window off and specifies a binary sort group address range. Upon receipt of a binary sort poll message, any ECU having priority information within the priority information threshold level and an address within the specified group address range responds by transmitting to the CCC a GPR byte on the priority information channel previously established by the CCC. Three binary sort poll messages, shown in FIGS. **23*b*–23*d*,** are utilized in one embodiment of the invention to define the binary sort group range.

FIG. **23*b*** shows a Binary Sort Poll High and Low ("BSPHL") message. This message is used by the CCC to specify a binary sort group address range bounded between a low address and a high address. The BSPHL message has a SEND CNTL byte equal to 11. Following the SEND CNTL byte are two bytes specifying the binary sort high address ("BSHAL" and "BSHAH"), and two bytes specifying the binary sort low address ("BSLAL" and "BSLAH"). Any ECU having priority information within the priority information threshold level and having an address within the low and high group address range specified in the BSPHL message responds to the CCC by transmitting a GPR byte on the priority information reverse channel.

FIG. **23*c*** shows a Binary Sort Poll Low ("BSPL") message. The BSPL message, having a SEND CNTL byte equal to 12, is similar to the BSPHL message except that the BSPL message specifies only a binary sort low group address ("BSLAL" and "BSLAH"). This message is used by the CCC to subdivide a group address range by modifying only the low address of the group range. The BSPL thus enables the CCC to subdivide a group address range without having to send both the low and high addresses of the range. Any ECU having priority information within the priority information threshold level and having an address which is greater than or equal to the specified group low address of the BSPL message and less than or equal to the previously specified high group address responds to the CCC by transmitting a GPR byte on the priority information reverse channel.

Finally, FIG. **23*d*** shows a Binary Sort Poll High ("BSPH") message. The BSPH message includes a SEND CNTL byte equal to 13. In this message, two bytes specify a binary sort group high address ("BSHAL" and "BSHAH"). This message is used similarly to the BSPL message to subdivide a group by modifying only one (i.e., the high) group address. Any ECU having priority information within the priority information threshold level and having an address which is less than or equal to the group high address of the BSPH message and greater than or equal to the previously specified low group address responds to the CCC by transmitting a GPR byte on the priority information reverse channel.

4. Information Protocol

When information, rather than a poll or status request, is transmitted from the CCC to an ECU, an informational protocol including a handshaking sequence is used to provide the CCC with positive feedback that (a) the ECU received the message, (b) the message syntax was proper, (c) there were no transmission errors, and (d) the ECUs are operative. The handshaking sequence does not require the transmission of lengthy formatted messages, thus minimizing the amount of time required to handshake with the CCC.

The handshaking response to informational messages is a General Poll Response Verification ("GPRV"), comprising one or two bytes of "11111111". If no GPRV is detected by the CCC, the CCC interprets this to mean that the ECU is inoperative. If a single byte is received, the CCC interprets this to mean that the message was not accepted by the ECU. If two bytes are received, the CCC interprets this to mean that the message was received by the ECU without error and that processing will occur. If a two-byte response is not received, the CCC will try a predetermined number of times (e.g., five) before logging and notifying the operator of an error.

While preferred embodiments of the invention have been set forth for purposes of the disclosure, modification to the disclosed embodiments may occur to those skilled in the art. Accordingly, the appended claims are intended to cover all embodiments of the invention and modifications to the disclosed embodiments which do not depart from the spirit and scope of the invention.

APPENDIX A

```
LOC  OBJ          SOURCE STATEMENT

                  ;------------------------------------------------------;
                  ;                                              7.1983.  ;
                  ;        main.asm        V1.0                           ;
                  ;                                    (TMP4740P)         ;
                  ;                                                       ;
                  ;                main      routine                      ;
                  ;                                                       ;
                  ;                                                       ;
                  ;------------------------------------------------------;

                  $nolist

                  $list

                  ;

ROM PAGE NO.15

03E0                      org      h'3e0
                  ;
                  ;
                  ; initialize
                  ;
03E0 3680         main:   diclr    il,0
                  ;
                  ; ram clear
                  ;
03E2 C0                   ld       h,£h'0
03E3 E0                   ld       l,£h'0
03E4 10                   mov      h,a
                  ;
03E5 1A           mai0:   st       a,@hl+
03E6 A5                   b        mai0
                  ;
03E7 38C1                 add      h,£h'1
03E9 A5                   b        mai0
                  ;
                  ; in / out port initialize
                  ;
03EA 3A89                 out      a,%op19          ; devider reset
03EC 3A8C                 out      a,%op1c          ; counter1 reset
03EE 3A8D                 out      a,%op1d          ; counter2 reset
                  ;
03F0 4F                   ld       a,£h'f
03F1 3AA1                 out      a,%op01          ; led display
03F3 3AA2                 out      a,%op02          ; led disolay
03F5 3AA4                 out      a,%op04          ; relay,keyscan out
03F7 3AA5                 out      a,%op05          ; keyscan out
03F9 3AA6                 out      a,%op06          ; led driver,vlfout
03FB 3AA7                 out      a,%op07          ; keyscan in
03FD 3AA8                 out      a,%op08          ; interrupts
03FF 3AA9                 out      a,%op09          ; no use
                  ;
                  ; stack pointer word initialize
                  ;

ROM PAGE NO.16 *

0401 4C                   ld       a,£h'c
0402 3FFF                 st       a,spw
                  ;
```

```
0404 4A          ld     a,£h'a
0405 3FCA        st     a,rwrpch          ; address h'a00
            ;
            ; led data set
            ;
0407 4F          ld     a,£h'f
0408 3F35        st     a,ldatm1
040A 3F39        st     a,ldasm1
            ;
040C 4B          ld     a,£h'b
040D 3F36        st     a,ldatm2
040F 3F3A        st     a,ldasm2
            ;
0411 4F          ld     a,£h'f
0412 3F37        st     a,ldatl1
0414 3F3B        st     a,ldasl1
            ;
0416 4B          ld     a,£h'b
0417 3F38        st     a,ldatl2
0419 3F3C        st     a,ldasl2
            ;
041B 4F          ld     a,£h'f
041C 3F8D        st     a,lecotl
041E 3F8E        st     a,lecotm
0420 3F8F        st     a,lecoth
            ;
            ; key data set
            ;
0422 4F          ld     a,£h'f
0423 3F2B        st     a,keyod
0425 3F42        st     a,kest0l
0427 3F43        st     a,kest0h          ;
            ;
            ; interrupts register intialize
            ;
0429 47          ld     a,£h'7
            ;
042A 3A89        out    a,%op19           ; devider start
            ;
042C 3F1C        st     a,eirb
042E 13          xch    a,eir             ; isio inhibit
            ;
            ;
            ; framing error bit on
            ;
042F 3931        set    spuvum,3          ; framing error
            ;
            ; timer on 11 bit time
            ;
0431 3B44        clr    %op04,0           ; timer clock start
            ;
0433 4F          ld     a,£h'f
0434 3FF6        st     a,timrhn
0436 47          ld     a,£h'7
0437 3FF5        st     a,timrmn
0439 4C          ld     a,£h'c
043A 3FF4        st     a,timrln
            ;
043C 44          ld     a,£h'4
043D 3A8C        out    a,%op1c           ; start
            ;
            ;
            ; enable interrupts
            ;
043F 3640        eiclr  il,0
            ;
            ;
            ; recent power on
            ;        & converter selection
            ;

ROM PAGE NO.17 *

0441 3922        set    spusl,2           ; spu status hi
            ;
0443 391F        set    servrc,1          ; service request
            ;
0445 3BA4        test   %op04,2
0447 8B          b      mai00
            ;
0448 3933        set    spush,3           ; hi channel converter
044A 8D          b      mai1
            ;
```

```
044B 3973       mai00:  clr     spush,3         ; lo channel converter
                ;
                ;
                ;  10 sec bit 'on' ?
                ;
                ;
044D 39E4       mai1:   testp   spuvdm,2
044F 8D                 b       mai1            ; 10 sec bit on
                ;
                ;
                ;  command execute bit 'on'
                ;
                ;
0450 39F4       mai20:  testp   spuvdm,3
0452 A9                 b       mai2            ; execute 'command'
                ;
                ;
                ;  keyscan ?
                ;
                ;
0453 39E5       mai4:   testp   spuvsl,2
0455 65DD               b       mai3            ; keyscan ready
                ;
                ;
                ;  cry enable ?
                ;
                ;
0457 39F1       mai5:   testp.  spuvum,3
0459 A0                 b       mai61
                ;
045A 3984               test    spuvdm,0
045C 8D                 b       mai1            ; cry enable
                ;
045D 2E0F               cmpr    servrc,£h'0
045F A3                 b       mai62
                ;
0460 3B36       mai61:  set     %op06,3
0462 8D                 b       mai1
                ;
0463 3B76       mai62:  clr     %op06,3
                ;
0465 3984               test    spuvdm,0
0467 A0                 b       mai61
                ;
0468 8D                 b       mai1
                ;
                ;
                ;
                ; command execute
                ;
                ;
0469 3C15       mai2:   ld      a,commah
046B D2                 cmpr    a,£h'2
046C 65D9               b       core                    ; not implied comma
nd
                ;
046E 3C14               ld      a,commal
                ;
0470 5F                 test    a,3
0471 64F5               b       coex0
                ;
                ; command '08' - '0f'
                ;
0473 D9                 cmpr    a,£1001b
0474 0E                 testp   zf
0475 649E               b       coe900                  ; read device data
                ;
0477 DA                 cmpr    a,£1010b
0478 0E                 testp   zf
0479 64A4               b       coea00                  ; display character
 at specified
                ;                                                 position
047B DB                 cmpr    a,£1011b
047C 0E                 testp   zf
047D 64ED               b       coeb00                  ; conditional poll
                ;
047F D8                 cmpr    a,£1000b

ROM PAGE NO. 18

0480 65D9               b       core                    ; not implied comma
nd
                ;
```

```
          ;
          ; insert character on device display
          ;
          ;
0482 3C37          ld      a,ldatl1
0484 3F35          st      a,ldatm1
0486 3C38          ld      a,ldatl2
0488 3F36          st      a,ldatm2
          ;
048A 3C81          ld      a,data0h
048C 30            xch     a,h
048D 3C80          ld      a,data0l
048F 31            xch     a,l
          ;
0490 2310          call    ledd
          ;
0492 30            xch     a,h
0493 3F38          st      a,ldatl2
          ;
0495 31            xch     a,l
0496 3F37          st      a,ldatl1
          ;
0498 2350          call    flash
          ;
049A 65D9          b       core
049C 65D9          b       core
          ;
          ;
          ; read device data
          ;
          ;
049E 2050 coe900:  call    rkce
          ;
04A0 65D9          b       core
04A2 65D9          b       core
          ;
          ;
          ; display character at specified position
          ;
          ;
04A4 3C83 coea00:  ld      a,data1h
04A6 30            xch     a,h
04A7 3C82          ld      a,data1l
04A9 31            xch     a,l
          ;
04AA 2310          call    ledd
          ;
04AC 3C80          ld      a,data0l
04AE 3833          and     a,£0011b
          ;
04B0 5C            test    a,0
04B1 64CC          b       coea10                  ; lsd   change
          ;
04B3 30            xch     a,h
04B4 3F36          st      a,ldatm2
          ;
04B6 31            xch     a,l
04B7 3F35          st      a,ldatm1
          ;
04B9 3C81          ld      a,data0h
04BB 3838          and     a,£1000b
04BD 0E            testp   zf
04BE 64DF          b       coea02
          ;
          ; msd flashing
          ;

ROM PAGE NO.19

04C0 3C33          ld      a,displw
04C2 3821          or      a,£0001b
04C4 3F33          st      a,displw
          ;
04C6 2350 coea01:  call    flash
          ;
04C8 65D9          b       core
04CA 65D9          b       core
          ;
          ;
04CC 30   coea10:  xch     a,h
04CD 3F38          st      a,ldatl2
          ;
04CF 31            xch     a,l
```

```
04D0 3F37             st      a,ldatl1             ; lsd change
                  ;
04D2 3C81             ld      a,data0h
04D4 3838             and     a,£1000b
04D6 0E               testp   zf
04D7 A6               b       coea03
                  ;
                  ; lsd flashing
                  ;
04D8 3C33             ld      a,displw
04DA 3822             or      a,£0010b
04DC 3F33             st      a,displw
                  ;
04DE 86               b       coea01
                  ;
04DF 3C33         coea02: ld  a,displw
04E1 383E             and     a,£1110b
04E3 3F33             st      a,displw             ; msd steady
                  ;
04E5 86               b       coea01
                  ;
04E6 3C33         coea03: ld  a,displw
04E8 383D             and     a,£1101b
04EA 3F33             st      a,displw             ; lsd steady
                  ;
04EC 86               b       coea01
                  ;
                  ;
                  ; conditional poll
                  ;
                  ;
04ED 395F         coeb00: clr servrc,1
                  ;
04EF 2050             call    rkce
                  ;
04F1 65D9             b       core
04F3 65D9             b       core
                  ;
                  ;
                  ; command '00' - '07'
                  ;
                  ;
04F5 D1           coex0:  cmpr    a,£0001b
04F6 0E               testp   zf
04F7 651B             b       coe100               ; indicator power c
ontrol
                  ;
04F9 D2               cmpr    a,£0010b
04FA 0E               testp   zf
04FB 6534             b       coe200               ; indicator mode se
lect
                  ;
04FD D3               cmpr    a,£0011b
04FE 0E               testp   zf
04FF 654E             b       coe300               ; device input cont
rol
                  ;

ROM PAGE NO.20 *

0501 D4               cmpr    a,£0100b
0502 0E               testp   zf
0503 6563             b       coe400               ; device output con
trol
                  ;
0505 D5               cmpr    a,£0101b
0506 0E               testp   zf
0507 6592             b       coe500               ; power relay contr
ol
                  ;
0509 D6               cmpr    a,£0110b
050A 0E               testp   zf
050B 65A2             b       coe600               ; clear device disp
lay
                  ;
050D D7               cmpr    a,£0111b
050E 0E               testp   zf
050F 65C4             b       coe700               ; divice display co
ntrol
```

```
                ; read device status
                ;
                ;
0511 39A2               test    spusl,2
0513 65D9               b       core
                ;
                ;
0515 3962       rds000: clr     spusl,2
                ;
0517 395F               clr     servrc,1                ;
                ;
0519 65A2               b       com600
                ;
                ;
                ;
                ; indicator power control
                ;
                ;
051B 3C80       com100: ld      a,data01
051D 0E                 testp   zf
051E AB                 b       com110
                ;
                ; indicator 'on'
                ;
051F 3C34               ld      a,dispiw
0521 3822               or      a,£0010b
0523 3F34               st      a,dispiw
                ;
0525 3903               set     spush,0                 ; indicator current
ly on
                ;
0527 2350       com120: call    flash
                ;
0529 65D9               b       core
                ;
                ; indicator 'off'
                ;
052B 3C34       com110: ld      a,dispiw
052D 383D               and     a,£1101b
052F 3F34               st      a,dispiw
                ;
0531 3943               clr     spush,0                 ; indicator current
ly off
                ;
0533 A7                 b       com120
                ;
                ;
                ; indicator mode select
                ;
                ;
0534 3C80       com200: ld      a,data01
0536 0E                 testp   zf
0537 6545               b       com210
                ;
0539 3C34               ld      a,dispiw
053B 3821               or      a,£0001b
053D 3F34               st      a,dispiw
                ;
053F 3913               set     spush,1                 ; indicator current
ly flashing
                ;

ROM PAGE NO.21 *

0541 2350       com220: call    flash
                ;
0543 65D9               b       core
                ;
0545 3C34       com210: ld      a,dispiw
0547 383E               and     a,£1110b
0549 3F34               st      a,dispiw
                ;
054B 3953               clr     spush,1                 ; indicator currntl
y non-flashing
                ;
054D 81                 b       com220
                ;
                ;
                ; device input control
                ;
                ;
054E 3C81       com300: ld      a,data0h
```

```
0550 5F                    test    a,3
0551 94                    b       coe310
                 ;
0552 65D9                  b       core
                 ;
0554 3680        coe310:   diclr   il,h'00
0556 40                    ld      a,£h'0
0557 3A8C                  out     a,%op1c
                 ;
0559 3935                  set     spuvsl,3
                 ;
055B 3B46                  clr     %op06,0
                 ;
055D 3B36                  set     %op06,3                 ; port set
                 ;
055F 3640                  eiclr   il,h'00
                 ;
0561 65D9                  b       core
                 ;
                 ;
                 ; device output control
                 ;
                 ;
0563 3C81        coe400:   ld      a,data0h
0565 5F                    test    a,3
0566 6585                  b       coe411                        ; vlf outpu
t disable
                 ;
0568 3955                  clr     spuvsl,1                      ; key board
 enable
                 ;
056A 3C80        coe410:   ld      a,data01
056C 5C                    test    a,0
056D B8                    b       coe420
                 ;
056E 36AA                  diclr   il,101010b
0570 47                    ld      a,£0111b
0571 3F1C                  st      a,eirb
0573 13                    xch     a,eir
0574 366A                  eiclr   il,101010b                    ; remote co
ntrol enable
                 ;
0576 65D9                  b       core
                 ;
0578 36AA        coe420:   diclr   il,101010b
057A 46                    ld      a,£0110b
057B 3F1C                  st      a,eirb
057D 13                    xch     a,eir
057E 40                    ld      a,£0000b
057F 3A8D                  out     a,%op1d                       ; timer 2 s
top

ROM PAGE NO.22 *

0581 366A                  eiclr   il,101010b                    ; remote co
ntrol disable
                 ;
0583 65D9                  b       core
                 ;
0585 36AA        coe411:   diclr   il,101010b
0587 3915                  set     spuvsl,1                      ; key board
 disable
0589 41                    ld      a,£h'1
058A 3F23                  st      a,spusk
058C 3F24                  st      a,spucp
                 ;
058E 2050                  call    rkce
                 ;
0590 6578                  b       coe420
                 ;
                 ;
                 ; power relay control
                 ;
                 ;
0592 3C80        coe500:   ld      a,data01
0594 0E                    testp   zf
0595 9C                    b       coe501
                 ;
0596 3B54                  clr     %op04,1                 ; power relay on
                 ;
0598 3932                  set     spusl,3                 ; power relay curre
ntly on
```

```
                        ;
059A 65D9                       b       core
                        ;
059C 3B14               coe501: set     %op04,1         ; power relay off
                        ;
059E 3972                       clr     spusl,3         ; power relay currently off
                        ;
05A0 65D9                       b       core
                        ;
                        ;
                        ; clear device display
                        ;
                        ;
05A2 4F                 coe600: ld      a,£h'f
05A3 3F35                       st      a,ldatm1
05A5 3F37                       st      a,ldatl1
05A7 3F39                       st      a,ldasm1
05A9 3F3B                       st      a,ldasl1
                        ;
05AB 3C36                       ld      a,ldatm2
05AD 3827                       or      a,£0111b
05AF 3F36                       st      a,ldatm2
                        ;
05B1 3C38                       ld      a,ldatl2
05B3 3827                       or      a,£0111b
05B5 3F38                       st      a,ldatl2
                        ;
05B7 3C3A                       ld      a,ldasm2
05B9 3827                       or      a,£0111b
05BB 3F3A                       st      a,ldasm2
                        ;
05BD 3C3C                       ld      a,ldasl2
05BF 3827                       or      a,£0111b

ROM PAGE NO.23 *

05C1 3F3C                       st      a,ldasl2
                        ;
05C3 99                         b       core
                        ;
                        ;
                        ; device display control
                        ;
                        ;
05C4 3C80               coe700: ld      a,data01
05C6 0E                         testp   zf
05C7 92                         b       coe701          ; display steady
                        ;
05C8 3C33                       ld      a,displw
05CA 3823                       or      a,£0011b
05CC 3F33                       st      a,displw        ; display flashing
                        ;
05CE 2350               coe703: call    flash
                        ;
05D0 99                         b       core
05D1 99                         b       core
                        ;
05D2 3C33               coe701: ld      a,displw
05D4 383C                       and     a,£1100b
05D6 3F33                       st      a,displw        ; display steady
                        ;
05D8 8E                         b       coe703
                        ;
                        ;
                        ; return
                        ;
                        ;
05D9 3974               core:   clr     spuvdm,3        ; clear 'command execute'
                        ;
05DB 6453                       b       mai4
                        ;
                        ;
                        ;
                        ; keyscan
                        ;
                        ;
05DD 3995               mai3:   test    spuvsl,1
05DF A4                         b       mai30
                        ;
05E0 3965                       clr     spuvsl,2
```

```
                 ;
05E2 6457                 b         mai5
                 ;
05E4 2100        mai30:   call      keys
                 ;
05E6 3965                 clr       spuvsl,2
                 ;
05E8 6457                 b         mai5
                 ;
                          end
```

ASSEMBLY COMPLETE,     0 PROGRAM ERROR(S)

SYMBOL TABLE

| | | | | | | | | | | | |
|---|---|---|---|---|---|---|---|---|---|---|---|
| | COE100 | 051B | | COE110 | 052B | | COE120 | 0527 | | COE200 | 0534 |
| | COE210 | 0545 | | COE220 | 0541 | | COE300 | 054E | | COE310 | 0554 |
| | COE400 | 0563 | * | COE410 | 056A | | COE411 | 0585 | | COE420 | 0578 |
| | COE500 | 0592 | | COE501 | 059C | | COE600 | 05A2 | | COE700 | 05C4 |
| | COE701 | 05D2 | | COE703 | 05CE | | COE900 | 049E | | COEA00 | 04A4 |
| | COEA01 | 04C6 | | COEA02 | 04DF | | COEA03 | 04E6 | | COEA10 | 04CC |
| | COEB00 | 04ED | | COEX0 | 04F5 | * | COMMAD | 0013 | | COMMAH | 0015 |
| | COMMAL | 0014 | | CORE | 05D9 | | DATA0H | 0081 | | DATA0L | 0080 |
| | DATA1H | 0083 | | DATA1L | 0082 | * | DATA2H | 0085 | * | DATA2L | 0084 |
| * | DATA3H | 0087 | * | DATA3L | 0086 | * | DATA4H | 0089 | * | DATA4L | 0088 |
| * | DATACT | 0200 | * | DCH | 00FE | * | DCL | 00FC | * | DISPA | 0032 |
| * | DISPH | 0031 | | DISPIW | 0034 | * | DISPL | 0030 | | DISPLW | 0033 |
| | EIRB | 001C | | FLASH | 0350 | * | INCOTH | 008C | * | INCOTL | 008A |
| * | INCOTM | 008B | * | KEST | 0022 | | KEST0H | 0043 | | KEST0L | 0042 |
| * | KEST1H | 0045 | * | KEST1L | 0044 | * | KEST2H | 0047 | * | KEST2L | 0046 |
| * | KEST3H | 0049 | * | KEST3L | 0048 | * | KEST4H | 004B | * | KEST4L | 004A |
| * | KEST5H | 004D | * | KEST5L | 004C | * | KESTBH | 0021 | * | KESTBL | 0020 |
| * | KEYND | 0029 | * | KEYNN | 002A | | KEYOD | 002B | * | KEYON | 002C |
| | KEYS | 0100 | * | KEYSB | 0250 | * | KEYSC | 000E | * | KEYT | 0300 |
| * | KEYTB | 00CB | * | LCICOT | 000D | | LDASL1 | 003B | | LDASL2 | 003C |
| | LDASM1 | 0039 | | LDASM2 | 003A | | LDATL1 | 0037 | | LDATL2 | 0038 |
| | LDATM1 | 0035 | | LDATM2 | 0036 | * | LDISP | 0800 | | LECOTH | 008F |
| | LECOTL | 008D | | LECOTM | 008E | | LEDD | 0310 | * | LIOVF1 | 0600 |
| * | LIOVF2 | 0D00 | * | LREMO | 0E00 | * | LVLFEX | 0C00 | | MAI0 | 03E5 |
| | MAI00 | 044B | | MAI1 | 044D | | MAI2 | 0469 | * | MAI20 | 0450 |
| | MAI3 | 05DD | | MAI30 | 05E4 | | MAI4 | 0453 | | MAI5 | 0457 |
| | MAI61 | 0460 | | MAI62 | 0463 | * | MAIN | 03E0 | * | OVER2A | 0072 |
| * | OVER2H | 0071 | * | OVER2L | 0070 | * | OVERA1 | 0012 | * | OVERH1 | 0011 |
| * | OVERL1 | 0010 | * | PARITT | 000C | * | PARITY | 000B | * | RDS000 | 0515 |
| * | READC | 0028 | * | READN | 0027 | * | REMD0 | 0060 | * | REMD1 | 0061 |
| * | REMD2 | 0062 | * | REMD3 | 0063 | * | REMD4 | 0064 | * | REMD5 | 0065 |
| * | REMD6 | 0066 | * | REMD7 | 0067 | * | REMOA | 006A | * | REMOH | 0069 |
| * | REMOL | 0068 | | RKCE | 0050 | * | RNH | 006B | * | RNL | 006D |
| * | RNM | 006C | | RWRPCH | 00CA | * | RWRPCL | 00C8 | * | RWRPCM | 00C9 |
| | SERVRC | 000F | | SPUCP | 0024 | | SPUSH | 0003 | | SPUSK | 0023 |
| | SPUSL | 0002 | * | SPUTT | 0018 | | SPUVDM | 0004 | * | SPUVSH | 0000 |
| | SPUVSL | 0005 | | SPUVUM | 0001 | | SPW | 00FF | * | SPWB | 00C7 |
| * | TABLE | 0000 | * | TIMR2H | 00FA | * | TIMR2L | 00F8 | * | TIMR2M | 00F9 |
| | TIMRHN | 00F6 | * | TIMRHO | 001B | | TIMRLN | 00F4 | * | TIMRLO | 0019 |
| | TIMRMN | 00F5 | * | TIMRMO | 001A | * | VLFC | 000A | * | VLFEC | 0016 |
| * | VLFRB | 0009 | * | VLFTB | 0008 | * | VLFTH | 0007 | * | VLFTL | 0006 |
| * | VLFXA | 0052 | * | VLFXH | 0051 | * | VLFXL | 0050 | * | WARPCL | 00C4 |
| * | WARPCM | 00C5 | * | WRITEH | 0026 | * | WRITEN | 0025 | | | |

DEFINED    171 USER SYMBOL(S)

LOC  OBJ     LINE        SOURCE STATEMENT

```
;-------------------------------------------------------------;
;                                                   7.1983.   ;
;       liovf1.asm        V1.0                                ;
;                               (TMP4740P)                    ;
;                                                             ;
;               vlf communication    routine                  ;
;                                                             ;
;                                                             ;
;-------------------------------------------------------------;

$nolist

$list

;;
```

ROM PAGE NO. 0

```
0010                    org     h'010                   ; routine table
0010
                ;
0010 66B2               b       r0                      ; start bit detect
                ;
0012 66FC               b       rmi                     ; mi bit detect
                ;
0014 6719               b       rca                     ; address detect
                ;
0016 673E               b       rcf                     ; command detect
                ;
0018 67D4               b       rcp                     ; parity in
                ;
001A 67EE               b       tra                     ; 'ack' or 'nack'
                ;
001C 67FA               b       rcstn                   ; stop bit in
                ;
001E 6834               b       rstd                    ; damy to rcstab
                ;
0020 6838               b       rcstab                  ; stop bit in
                ;
0022 6841               b       rdd                     ; data in
                ;
0024 6871               b       rdp                     ; parity in
                ;
0026 687F               b       tdack                   ; 'ack' or 'nack'
                ;
0028 6885               b       rdast
                ;
                ;;;;
                ;
002A 68C2               b       t0                      ; transmit
                ;
002C 68EB               b       td1                     ; data out
                ;
002E 68F1               b       trmi                    ; detect 'mi'
                ;
0030 6909               b       rdamy                   ; damy to rca
                ;
0032 6912               b       tdo                     ; data out
                ;
0034 6930               b       tp                      ; parity out
                ;
0036 693E               b       tlci                    ; 'lci' bit out
                ;
0038 6944               b       rtack                   ; receive 'ack'
                ;
003A 6983               b       tst                     ; out 'stop'
                ;
003C 6989               b       rst                     ; receive 'stop'
                ;
                ;;;;;;;;;;;;;;;;;;;;;;;;;;;;;;;;;;;;;;;;;;;;;;
                ;

ROM PAGE NO.24

0600                    org     h'600
                ;
                ;-------------------------------------------;
                ;       register push                       ;
                ;-------------------------------------------;
0600 3B06               set     %op06,0
0602 3F12       iovf1:  st      a,overal                    ;
0604 2910               xch     hl,overl1                   ;
                ;-------------------------------------------;
                ;       timer1.start                        ;
                ;-------------------------------------------;
0606 3C1B               ld      a,timrho                    ;
0608 3FF6               st      a,timrhn                    ;
060A 3C1A               ld      a,timrmo                    ;
060C 3FF5               st      a,timrmn                    ;
060E 3C19               ld      a,timrlo                    ;
0610 3FF4               st      a,timrln                    ;
                ;-------------------------------------------;
                ;       check mode                          ;
                ;               ( normal or not )           ;
                ;-------------------------------------------;
0612 3980               test    spuvsh,0
0614 B5                 b       vlf001                  ;routine for abnorm
al
                ;                                       ;             mod
e
```

```
          ;--------------------------------------;
          ;        check mode                    ;
          ;                ( transmit or not )   ;
          ;--------------------------------------;
0615 39D0              testp   spuvsh,1                 ;
0617 A3                b       vlf010                   ;routine for transmit
          ;                                                              mode
0618 3BC0              testp   %ip00,0                  ;
061A 9E                b       vlf100                   ;data ='1'
          ;
061B 3979              clr     vlfrb,3                  ;
061D AD                b       vlf200                   ;to warp
          ;
061E 2F1B      vlf100: add     parity,£h'1              ;parity counter inc
0620 3939              set     vlfrb,3                  ;
0622 AD                b       vlf200                   ;to warp
          ;
          ;--------------------------------------;
          ;        data out         ( vlf010 )   ;
          ;--------------------------------------;
0623 3988      vlf010: test    vlftb,0
0625 AB                b       vlf011
          ;
0626 2F1C              add     paritt,£h'1              ; parity count
          ;
0628 3B76              clr     %op06,3                  ; vlf output data '1'
062A AD                b       vlf200                   ; to warp
          ;
062B 3B36      vlf011: set     %op06,3                  ; vlf output data '0'
          ;
          ;--------------------------------------;
          ;        warp routine     ( vlf200 )   ;
          ;--------------------------------------;
062D 3CFF      vlf200: ld      a,spw                    ;
062F 3FC7              st      a,spwb                   ;
          ;
0631 40                ld      a,£h'0                   ;
0632 3FFF              st      a,spw                    ; spw changing
          ;
0634 2A                ret                              ; warp
          ;
          ;--------------------------------------;
          ;        routine for abnormal mode     ;
          ;                       ( vlf000 )     ;
          ;--------------------------------------;
0635 39D4      vlf001: testp   spuvdm,1                 ; 1200 bit time counting ?
0637 6647              b       vlf002                   ; branch on ' yes'
          ;
0639 39E4              testp   spuvdm,2                 ; 10sec couting ?
063B 6654              b       vlf003                   ; branch on 'yes'
          ;
063D 39F1              testp   spuvum,3                 ; framing error ?
063F AE                b       vlf004                   ; branch on 'yes'
          ;

ROM PAGE NO.25

0640 3904      vlf005: set     spuvdm,0                 ; cry enable on
0642 40                ld      a,£h'0
0643 3A8C              out     a,%op1c                  ; timer stop
0645 66AD              b       vlf300                   ; to return routine
          ;
          ;--------1200 bit counted --------------;
          ;
0647 3954      vlf002: clr     spuvdm,1                 ; clear '1200 bit counting'
0649 3941              clr     spuvum,0                 ; clear 'previous
          ;                                             ;   command needs data'
064B 3951              clr     spuvum,1                 ; clear 'previous
          ;                                             ;   command requires data'
064D 3921              set     spuvum,2                 ; 'command inhibit' on
064F 3900              set     spuvsh,0                 ; set normal mode
0651 3950              clr     spuvsh,1                 ; set receive mode
          ;
0653 80                b       vlf005                   ; branch on
```

```
                ;                                       ;   'set cry enable'
                ;
                ;--------- 10sec counted  --------------;
                ;
0654 3931       vlf003: set     spuvum,3                ; set framing error
0656 3964               clr     spuvdm,2                ; clear '10sec counting'
                ;
0658 3C23               ld      a,spusk
065A 3F24               st      a,spucp
                ;
065C 2050               call    rkce
                ;
065E 4F                 ld      a,£h'f
065F 3FF6               st      a,timrhn
0661 47                 ld      a,£h'7
0662 3FF5               st      a,timrmn
0664 4C                 ld      a,£h'c
0665 3FF4               st      a,timrln
                ;
0667 44                 ld      a,£h'4
0668 3A8C               out     a,%opic                 ; 11bit timer setting
                ;
066A 3975               clr     spuvsl,3                ; 1'st intr. enable
                ;
066C 66AD               b       vlf300                  ; to return routine
                ;
                ;----- framing error bit on ------------;
066E 3C18       vlf004: ld      a,sputt
0670 D0                 cmpr    a,£h'0
0671 66A3               b       vl0040
                ;
0673 3C53               ld      a,frame
0675 DF                 cmpr    a,£h'f
0676 6689               b       vl0060
                ;
0678 3B80               test    %ip00,0
067A 6698               b       vl0050
                ;
067C 40                 ld      a,£h'0
067D 3F53               st      a,frame
                ;
067F 4F                 ld      a,£h'f
0680 3FF6               st      a,timrhn
0682 47                 ld      a,£h'7
0683 3FF5               st      a,timrmn
0685 4C                 ld      a,£h'c
0686 3FF4               st      a,timrln
                ;
0688 AD                 b       vlf300
                ;
0689 3B80       vl0060: test    %ip00,0
068B 98                 b       vl0050
                ;
068C 3971               clr     spuvum,3                ; clear 'framing error'
068E 3921               set     spuvum,2                ; set 'command inhibit'
0690 3951               clr     spuvum,1                ; clear 'previous command
                ;                                       ;  requires an answer'
                ;       clr     spuvum,0                ; clear 'previous command
                ;                                       ;  needs data'
0692 3950               clr     spuvsh,1                ; set receive mode
0694 3900               set     spuvsh,0                ; set normal mode
                ;
0696 6640               b       vlf005                  ; to 'set cry enable'
                ;
0698 4F         vl0050: ld      a,£h'f
0699 3FF6               st      a,timrhn
069B 3FF5               st      a,timrmn
                ;
069D 3F53               st      a,frame
                ;
069F 4A                 ld      a,£h'a
06A0 3FF4               st      a,timrln
                ;
```

```
06A2 AD                  b       vlf300
                ;
06A3 40         vl0040:  ld      a,£h'0
06A4 3F18                st      a,sputt
                ;
06A6 3BC0                testp   %ip00,0
06A8 AD                  b       vlf300
                ;
06A9 4F                  ld      a,£h'f
06AA 3F53                st      a,frame
                ;
06AC 98                  b       vl0050
                ;
                ;-------------------------------------;
                ;        return routine   ( vlf300 )  ;
                ;-------------------------------------;
06AD 3C12       vlf300:  ld      a,overal             ;
06AF 2910                xch     hl,overll            ; pop register
                ;
06B1 2B                  reti
                ;
                ;-------------------------------------;
                ;          R0 routine                 ;
                ;                ( in start bit )     ;
                ;-------------------------------------;
                ;-------      start bit       --------;
                ;
06B2 3BC0       r0:      testp   %ip00,0              ;
06B4 66C2                b       r00000               ; it was not 'start
'
                ;
06B6 3935                set     spuvsl,3             ; external intr.
                ;                                           inhibit
                ;
06B8 3961                clr     spuvum,2             ; clear 'command in
hibit'
                ;
06BA 3944                clr     spuvdm,0             ; clear 'cry enable
'
06BC 3B36                set     %op06,3              ; port set
                ;
                ;-------      next intr.      --------;
                ;
06BE C1                  ld      h,£h'1
06BF E2                  ld      l,£h'2               ; to Rmi routine
                ;

ROM PAGE NO.27

06C0 41                  ld      a,£h'1               ; next intr. 1 bit
time
                ;
                ;-------      re-warp         --------;
                ;
06C1 2A         r00001:  ret
                ;
                ;-------  start bit not found --------;
                ;
06C2 3984       r00000:  test    spuvdm,0
06C4 89                  b       r01000               ; cry enable ?
                ;
06C5 40                  ld      a,£h'0
06C6 3A8C                out     a,%op1c              ; timer1 stop
                ;
06C8 81                  b       r00001               ; to re-warp
                ;
06C9 3940       r01000:  clr     spuvsh,0             ; to abnormal mode
                ;
06CB 3994                test    spuvdm,1
                ;
06CD AA                  b       r01110               ; must detect 'cry
enable'
                ;
                ;
                ; 1200 bit counting
                ;
06CE 3C8C       r01100:  ld      a,incoth
06D0 3FF6                st      a,timrhn
06D2 3C8B                ld      a,incotm
06D4 3FF5                st      a,timrmn
06D6 3C8A                ld      a,incotl
06D8 3FF4                st      a,timrln
                :
```

```
06DA 48                 ld      a,£h'8
06DB 3A8C               out     a,%op1c
                 ;
06DD 3B36               set     %op06,3
                 ;
                 ; return
                 ;
06DF 3CC7        r01111: ld     a,spwb
06E1 3FFF               st      a,spw
                 ;
06E3 3C12               ld      a,overal
06E5 2910               xch     hl,overll
                 ;
06E7 3B46               clr     %op06,0
                 ;
06E9 2B                 reti
                 ;
06EA 3C8C        r01110: ld     a,incoth
06EC 3FF6               st      a,timrhn
06EE 3C8B               ld      a,incotm
06F0 3FF5               st      a,timrmn
06F2 3C8A               ld      a,incotl
06F4 3FF4               st      a,timrln
                 ;
06F6 44                 ld      a,£h'4
06F7 3A8C               out     a,%op1c
                 ;
06F9 3B36               set     %op06,3
                 ;
06FB 9F                 b       r01111
                 ;
                 ;;;;;;;;;;;;;;;;;;;;;;;;;;;;;;;;;;;;;;;;;;;;;
                 ;;;;;;;;;;;;;;;;;;;;;;;;;;;;;;;;;;;;;;;;;;;;;
                 ;
                 ;---------------------------------------------;
                 ;       Rmi routine                           ;
                 ;              ( in mi bit )                  ;
                 ;---------------------------------------------;
                 ;
                 ;
06FC 39F9        rmi:   testp   vlfrb,3                 ;
06FE 670F               b       rmi000                  ; 'data' from ECU
                 ;
                 ;------ 'command' from ECU        --------;
                 ;

ROM PAGE NO.28

0700 C1                 ld      h,£h'1                  ;
0701 E4                 ld      l,£h'4                  ; to Rca routine
                 ;
0702 40                 ld      a,£h'0
0703 3F16               st      a,vlfec                 ; vlf error counter
clear
                 ;
0705 3941               clr     spuvum,0                ; 'previous command
                 ;                                         needs data'
0707 3951               clr     spuvum,1                ; 'previous command
                 ;                                         requires an ans
wer'
                 ;------ parity & VLF counter
                 ;              clear              --------;
                 ;
0709 2D0B        rmi001: st     £h'0,parity
070B 2D0A               st      £h'0,vlfc               ; parity counter
                 ;                                        & VLF counter cl
ear
                 ;
                 ;------          next intr.       --------;
                 ;
070D 41                 ld      a,£h'1                  ; next intr. 1bit t
ime
                 ;
                 ;------           re-warp         --------;
                 ;
070E 2A          rmi002: ret                            ; re-warp
                 ;
                 ;------  'data ' from ECU         --------;
                 ;
070F 3981        rmi000: test   spuvum,0
0711 95                 b       rmi003                  ; not need data
                 ;
```

```
0712 C2          ld      h,£h'2
0713 E2          ld      l,£h'2           ; to Rdd routine
             ;
0714 89          b       rmi001           ; to parity clear
             ;
             ;------  not need 'data'     --------;
             ;
0715 C1      rmi003: ld      h,£h'1
0716 EE          ld      l,£h'e           ; to Rstd routine
             ;
0717 43          ld      a,£h'3           ; next intr. 9bit t
ime
             ;
0718 8E          b       rmi002           ; to re-warp
             ;
             ;;;;;;;;;;;;;;;;;;;;;;;;;;;;;;;;;;;;;;;;;;;;
             ;;;;;;;;;;;;;;;;;;;;;;;;;;;;;;;;;;;;;;;;;;;;
             ;
             ;-----------------------------------------;
             ;       Rca routine                       ;
             ;               ( in command receive )    ;
             ;-----------------------------------------;
             ;
0719 2F1A    rca:    add     vlfc,£h'1        ; vlf counter
             ;                                          increament
071B 2E3A        cmpr    vlfc,£h'3
071D B4          b       rca000           ; vlfc <> 3
             ;
             ;-------   address check     --------;
             ;
071E 3C09        ld      a,vlfrb
0720 07          rorc    a
0721 3837        and     a,£h'7
0723 3F13        st      a,commad         ; address in
             ;
0725 3A20        in      %ip00,a
0727 07          rorc    a
0728 07          rorc    a
0729 3833        and     a,£h'3
072B 3802        add     a,£h'2           ; spu address
             ;
072D 3E13        cmpr    a,commad
072F BA          b       rca001           ; address check NG
             ;
             ;-------   next intr. address
             ;                   matched --------;
             ;
0730 C1          ld      h,£h'1
0731 E6          ld      l,£h'6           ; to Rgf routine
             ;
0732 41      rca002: ld      a,£h'1           ; next intr. 1bit t
ime
             ;
             ;-------        re-warp           --------;
             ;
0733 2A      rca003: ret                      ; re-warp
             ;
             ;-------        shift             --------;
             ;
0734 3C09    rca000: ld      a,vlfrb
0736 07          rorc    a                ; shift
0737 3F09        st      a,vlfrb
             ;
0739 B2          b       rca002           ; next intr. 1bit t
ime
             ;
             ;-------   next intr. address
             ;               miss matched  --------;
             ;
073A C1      rca001: ld      h,£h'1
073B EE          ld      l,£h'e           ; to Rstd
             ;
073C 42          ld      a,£h'2           ; next intr.
             ;                                 6 bit time
             ;
073D B3          b       rca003           ; re-warp
             ;
             ;;;;;;;;;;;;;;;;;;;;;;;;;;;;;;;;;;;;;;;;;;;;
             ;;;;;;;;;;;;;;;;;;;;;;;;;;;;;;;;;;;;;;;;;;;;
             ;
             ;-----------------------------------------;
             ;       Rcf routine                       ;
```

```
                ;                 ( in command receive )       ;
                ;-------------------------------------------;
                ;
                ;-------        data set            --------;
                ;
073E 2F1A       rcf:     add     vlfc,£h'1            ; VLF counter
                ;                                       increament
0740 2E7A                cmpr    vlfc,£h'7            ;
0742 0E                  testp   zf
0743 8F                  b       rcf000               ; branch on
                ;                                       command hi
0744 2E8A                cmpr    vlfc,£h'8
0746 0E                  testp   zf
0747 94                  b       rcf001               ; branch on
                ;                                       read function
                ;
0748 3C09                ld      a,vlfrb              ;
074A 07                  rorc    a                    ;
074B 3F09                st      a,vlfrb              ; data set
                ;
                ;-------       next intr.          --------;
                ;
074D 41         rcf002:  ld      a,£h'1               ; next intr. 1bit t
ime
                ;
                ;-------        re-warp            --------;
                ;
074E 2A         rcf006:  ret                          ; re-warp
                ;
                ;-------     read command lo       --------;
                ;
074F 3C09       rcf000:  ld      a,vlfrb
0751 3F14                st      a,commal
                ;
0753 8D                  b       rcf002               ; to next intr.
                ;
                ;-------     read command  hi      --------;
                ;
0754 3C09       rcf001:  ld      a,vlfrb
0756 07                  rorc    a
0757 07                  rorc    a
0758 07                  rorc    a
0759 3831                and     a,£0001b
075B 3822                or      a,£0010b
075D 3F15                st      a,commah
                ;
                ;-------    read , write  ?       --------;
                ;
075F 3FFD                st      a,dcm
0761 3C14                ld      a,commal
0763 3FFC                st      a,dcl
0765 4F                  ld      a,£h'f
0766 3FFE                st      a,dch
                ;
0768 33                  ldl     a,@dc
0769 3F25                st      a,writen
076B 32                  ldh     a,@dc+
076C 3F27                st      a,readn
                ;
076E D0                  cmpr    a,£h'0
076F 0E                  testp   zf
0770 BC                  b       rcf100               ; need not reading
                ;
                ; read command
                ;
0771 3901                set     spuvum,0             ; set previous comm
and need data
                ;
0773 40                  ld      a,£h'0
0774 3F28                st      a,readc              ; reading counter s
et
                ;
                ;-------    out 'mark' &
                ;                 next address      --------;
                ;
0776 3B76       rcf005:  clr     %op06,3              ; out 'mark'
                ;
0778 C1                  ld      h,£h'1
0779 E8                  ld      l,£h'8               ; to Rcp routine
                ;
077A 40                  ld      a,£h'0               ; next intr.1/2
                ;                                       bit time
```

```
                ;
077B 8E                 b       rcf006                  ; to re-warp routin
e
                ;
                ;------     write command ?    --------;
                ;
077C 3C25       rcf100: ld      a,writen
077E D0                 cmpr    a,£h'0
077F 0E                 testp   zf

ROM PAGE NO.30

0780 6776               b       rcf005                  ; to Rcp routine
                ;
                ;------     write command      --------;
                ;
0782 DF                 cmpr    a,£h'f
0783 0E                 testp   zf
0784 B5                 b       rcf110                  ; conditional poll
                ;
0785 3914               set     spuvdm,1                ; set previous comm
and require
                ;                                             answer
0787 2D1D               st      £h'1,lcicot
                ;
0789 D1                 cmpr    a,£0001b
078A 98                 b       rcf120                  ; 'read device data
'
                ;                                           command
                ;
                ; read spu status command
                ;
078B 41                 ld      a,£h'1
078C 3F24               st      a,spucp
                ;
078E 3C02               ld      a,spusl
0790 3F06               st      a,vlftl
0792 3C03               ld      a,spush
0794 3F07               st      a,vlfth
                ;
0796 6776               b       rcf005
                ;
                ;
                ; read device data command
                ;
                ;
0798 3C42       rcf120: ld      a,kest0l
079A 3F06               st      a,vlftl
079C 3C43               ld      a,kest0h
079E 3F07               st      a,vlfth
                ;
07A0 3C23               ld      a,spusk
07A2 0E                 testp   zf
07A3 AE                 b       rcf121
                ;
07A4 3F24               st      a,spucp
07A6 40                 ld      a,£h'0
07A7 3F17               st      a,spuff
                ;
07A9 44         rcf122: ld      a,£h'4
07AA 3F26               st      a,writeh
                ;
07AC 6776               b       rcf005
                ;
07AE 08         rcf121: inc     a
07AF 3F24               st      a,spucp
07B1 4F                 ld      a,£h'f
07B2 3F17               st      a,spuff                 ; no key stroke
                ;
07B4 A9                 b       rcf122
                ;
                ; conditional poll
                ;
07B5 3C42       rcf110: ld      a,kest0l
07B7 3F06               st      a,vlftl
07B9 3C43               ld      a,kest0h
07BB 3F07               st      a,vlfth                 ; data in
                ;
07BD 41                 ld      a,£h'1
07BE 3F0D               st      a,lcicot

ROM PAGE NO.31
```

```
07C0 3F24                st      a,spucp
             ;
07C2 3B76                clr     %op06,3
             ;
07C4 3914                set     spuvdm,1
             ;
07C6 3C23                ld      a,spusk
07C8 0E                  testp   zf
07C9 8F                  b       rcf111
             ;
07CA 40                  ld      a,£h'0
07CB 3F17                st      a,spuff
07CD 6776                b       rcf005
             ;
07CF 4F      rcf111:     ld      a,£h'f
07D0 3F17                st      a,spuff              ; no keystroke
07D2 6776                b       rcf005
             ;
             ;
             ;-------------------------------------------;
             ;      Rcp routine   ( command read )       ;
             ;-------------------------------------------;
             ;
             ;
07D4 39CB    rcp:        testp   parity,0
07D6 A9                  b       rcp000               ; parity error
             ;
07D7 3C25                ld      a,writen
07D9 DF                  cmpr    a,£h'f
07DA A1                  b       rcp100               ; not conditional p
oll
             ;
07DB 2E0F                cmpr    servrc,£h'0
07DD A1                  b       rcp100               ; data in
             ;
07DE 3954                clr     spuvdm,1             ; clear previous co
mmand
             ;                                          need answer bit
07E0 A9                  b       rcp000
             ;
07E1 3948    rcp100:     clr     vlftb,0              ; send 'ack'
             ;
             ;--------      mode change       ---------;
             ;
07E3 3910    rcp003:     set     spuvsh,1             ; change mode
             ;                                          to 'transmit'
             ;--------      next intr.        ---------;
             ;
07E5 C1      rcp004:     ld      h,£h'1
07E6 EA                  ld      l,£h'a               ; to Tra routine
             ;
07E7 40                  ld      a,£h'0               ; next intr. 1/2 bi
t
             ;                                          time
             ;-------       re-warp           ---------;
             ;
07E8 2A                  ret
             ;
             ;-------       parity error      ---------;
             ;
07E9 3921    rcp000:     set     spuvum,2             ; set 'command inhi
bit'
             ;
07EB 3908                set     vlftb,0              ; send 'nack'
07ED
07ED A3                  b       rcp003               ;
             ;
             ;
             ;;;;;;;;;;;;;;;;;;;;;;;;;;;;;;;;;;;;;;;;;;;;;
             ;;;;;;;;;;;;;;;;;;;;;;;;;;;;;;;;;;;;;;;;;;;;;
             ;
             ;-------------------------------------------;
             ;      Tra                                  ;
             ;-------------------------------------------;
             ;
             ;
             ;-----        mode change       ---------;
             ;
07EE 3950    tra:        clr     spuvsh,1             ; mode change
             ;                                          to receive mode
07F0 39E1                testp   spuvum,2
07F2 B7                  b       tra000               ; branch on
```

```
                 ;                                          'command inhibit
,
                 ;------      next  intr.          --------;
                 ;
07F3 C1                   ld      h,£h'1
07F4 EC                   ld      l,£h'c                   ; to Rcstn routine
                 ;
07F5 45          tra001:  ld      a,£h'5                   ; next intr.
                 ;                                                bit time
                 ;
                 ;------        re-warp            --------;
                 ;
07F6 2A                   ret
                 ;
                 ;------      next  intr.
                 ;                in parity error  --------;
                 ;
07F7 C2          tra000:  ld      h,£h'2
07F8 E0                   ld      l,£h'0                   ; to Rcstab routine
                 ;
07F9 B5                   b       tra001
                 ;
                 ;;;;;;;;;;;;;;;;;;;;;;;;;;;;;;;;;;;;;;;;;;;;;
                 ;;;;;;;;;;;;;;;;;;;;;;;;;;;;;;;;;;;;;;;;;;;;;
                 ;
                 ;-----------------------------------------;
                 ;        Rcstn    routine                 ;
                 ;-----------------------------------------;
                 ;
                 ;
07FA 39B9        rcstn:   test    vlfrb,3
07FC 6820                 b       rcstn0                   ; framing error
                 ;
                 ;-------        read ?            --------;
                 ;
07FE 3C27                 ld      a,readn

ROM PAGE NO.32

0800 D0                   cmpr    a,£0000b
0801 0E                   testp   zf
0802 97                   b       rcstn1                   ; branch on
                 ;                                                read comman
d
                 ;read or write command
                 ;
0803 3940        rcstn6:  clr     spuvsh,0                 ; to abnormal mode
                 ;
                 ;--------   1200 bit timer on    --------;
                 ;
0805 3914        rcstn2:  set     spuvdm,1                 ; '1200 bit timer '
on
                 ;
0807 42                   ld      a,£h'2
0808 3FF6                 st      a,timrhn
080A 4C                   ld      a,£h'c
080B 3FF5                 st      a,timrmn
080D 4F                   ld      a,£h'f
080E 3FF4                 st      a,timrln
                 ;
0810 48                   ld      a,£h'8
0811 3A8C                 out     a,%oplc                  ;
                 ;
                 ;-------     external intr.enable --------;
                 ;
0813 3975        rcstn3:  clr     spuvsl,3
                 ;
                 ;-------         return           --------;
                 ;
0815 66DF                 b       r01111
                 ;
0817 3C25        rcstn1:  ld      a,writen
0819 D0                   cmpr    a,£0000b
081A B1                   b       rcstn7                   ; branch on
                 ;                                          write command
                 ;
                 ; command ended
                 ;
081B 3940                 clr     spuvsh,0                 ; to abnormal mode
                 ;
081D 3934                 set     spuvdm,3                 ; 'command execute'
                 ;
081F 93                   b       rcstn3                   ; to return
```

```
                ;
                ;------        framing error        --------;
                ;
0820 3940       rcstn0: clr     spuvsh,0                ; to abnormal mode
                ;
0822 3931               set     spuvum,3                ; framing error
                ;
0824 4F                 ld      a,£h'f
0825 3F53               st      a,frame
0827 3FF6               st      a,timrhn
0829 3FF5               st      a,timrmn
                ;
082B 4A                 ld      a,£h'a
082C 3FF4               st      a,timrln
                ;
082E 3B36               set     %op06,3
                ;
0830 93                 b       rcstn3                  ; to return
                ;
0831 3910       rcstn7: set     spuvsh,1                ; to transmit mode
0833 83                 b       rcstn6
                ;
                ;;;;;;;;;;;;;;;;;;;;;;;;;;;;;;;;;;;;;;;;;;;;;;;;;;
                ;;;;;;;;;;;;;;;;;;;;;;;;;;;;;;;;;;;;;;;;;;;;;;;;;;
                ;
                ;--------------------------------------------;
                ;       Rstd    ( damy routine )             ;
                ;--------------------------------------------;
                ;
                ;
                ;-----          next intr.          --------;
                ;
0834 C2         rstd:   ld      h,£h'2
0835 E0                 ld      l,£h'0                  ; to Rcstab
                ;
0836 45                 ld      a,£h'5                  ; next intr.
                ;                                         11 bit time
                ;------          re-warp            --------;
                ;
0837 2A                 ret
                ;
                ;;;;;;;;;;;;;;;;;;;;;;;;;;;;;;;;;;;;;;;;;;;;;;;;;;
                ;;;;;;;;;;;;;;;;;;;;;;;;;;;;;;;;;;;;;;;;;;;;;;;;;;
                ;
                ;--------------------------------------------;
                ;       Rcstab                               ;
                ;--------------------------------------------;
                ;
                ;
                ;------       check stop bit        --------;
                ;
0838 3989       rcstab: test    vlfrb,3
083A A0                 b       rcstn0                  ; framing error
                ;
083B 3940       rcstai: clr     spuvsh,0                ; to abnormal mode
                ;
083D 3975               clr     spuvsl,3                ; external intr. en
able
                ;
083F 66DF               b       r01111                  ; return
                ;
                ;
                ;--------------------------------------------;
                ;       Rdd     ( data receive )             ;
                ;--------------------------------------------;
                ;
                ;

ROM PAGE NO.33 *

0841 2E3A       rdd:    cmpr    vlfc,£h'3
0843 0E                 testp   zf
0844 98                 b       rdd000                  ; data 1 set
                ;
0845 2E7A               cmpr    vlfc,£h'7
0847 A8                 b       rdd001
                ;
                ; data h set
                ;
0848 3C28               ld      a,readc
084A 05                 rolc    a
084B 3821               or      a,£0001b
```

```
084D 31          xch     &,1
084E C8          ld      h,£h'8
084F 3C09        ld      a,vlfrb
0851 0F          st      a,@hl                 ; data in
                ;
0852 3B76        clr     %op06,3               ; out 'mark'
                ;
                ; to Rdp routine
                ;
0854 C2          ld      h,£h'2
0855 E4          ld      l,£h'4                ; to Rdp
                ;
0856 40          ld      a,£h'0                ; next intr.
                ;                                1/2 bit time
                ;
                ; re-warp
                ;
0857 2A         rdd002: ret
                ;
                ; data in
                ;
0858 2F1A       rdd000: add  vlfc,£h'1
                ;
085A 3C28        ld      a,readc
085C 05          rolc    a
085D 383E        and     a,£1110b
085F 31          xch     a,l
0860 C8          ld      h,£h'8
0861 3C09        ld      a,vlfrb
0863 0F          st      a,@hl                 ; data in
                ;
0864 41          ld      a,£h'1
0865 C2          ld      h,£h'2
0866 E2          ld      l,£h'2
                ;
0867 97          b       rdd002                ; to return
                ;
                ; shift
                ;
0868 2F1A       rdd001: add  vlfc,£h'1         ; vlf counter
                ;                                increase
086A 3C09        ld      a,vlfrb
086C 07          rorc    a
086D 3F09        st      a,vlfrb               ; shift
                ;
086F 41          ld      a,£h'1
                ;
0870 97          b       rdd002                ; to return
                ;
                ;;;;;;;;;;;;;;;;;;;;;;;;;;;;;;;;;;;;;;;;;;;;
                ;;;;;;;;;;;;;;;;;;;;;;;;;;;;;;;;;;;;;;;;;;;;
                ;
                ;---------------------------------------;
                ;        Rdp     ( parity bit )         ;
                ;---------------------------------------;
                ;
                ;
0871 39CB       rdp:    testp   parity,0
0873 BC          b       rdp000                ; parity error
                ;
0874 3948        clr     vlftb,0               ; set 'ack'
                ;
0876 3910       rdp001: set     spuvsh,1       ; set to transmit mode
                ;
                ; to Tdack routine
                ;
0878 C2          ld      h,£h'2
0879 E6          ld      l,£h'6                ; to Tdack
                ;
087A 40          ld      a,£h'0                ; next intr.1/2 bit time
                ;
                ; re-warp
                ;
087B 2A          ret
                ;
                ; set 'nack'
                ;
087C 3908       rdp000: set     vlftb,0        ; set 'nack'
                ;
087E B6          b       rdp001                ; to return
```

```
          ;
          ;;;;;;;;;;;;;;;;;;;;;;;;;;;;;;;;;;;;;;;;;;;;;;
          ;;;;;;;;;;;;;;;;;;;;;;;;;;;;;;;;;;;;;;;;;;;;;;
          ;
          ;----------------------------------------;
          ;         Tdack  out ( 'ack' or 'nack' )  ;
          ;----------------------------------------;
          ;
          ;
087F 3950 tdack:  clr     spuvsh,1                ; to receive mode
          ;
          ; to Rdast routine
          ;

ROM PAGE NO.34 *

0881 C2           ld      h,£h'2
0882 E8           ld      l,£h'8                  ; to Rdast
          ;
0883 45           ld      a,£h'5                  ; next intr.
          ;                                         11 bit time
          ; re-warp
          ;
0884 2A           ret
          ;
          ;
          ;----------------------------------------;
          ;         Rdast      ( stop bit )         ;
          ;----------------------------------------;
          ;
          ;
0885 39B9 rdast:  test    vlfrb,3
0887 6820         b       restn0                  ; stop bit error
          ;
0889 39C8         testp   vlftb,0
088B AE           b       rdast4
          ;
088C 3C28 rdast6: ld      a,readc
088E 08           inc     a
088F 3F28         st      a,readc
0891 3E27         cmpr    a,readn
0893 0E           testp   zf
0894 A4           b       rdast3                  ; the end
          ;
          ; again
          ;       1200 bit timer start
          ;
0895 42           ld      a,£h'2
0896 3FF6         st      a,timrhn
0898 4C           ld      a,£h'c
0899 3FF5         st      a,timrmn
089B 4F           ld      a,£h'f
089C 3FF4         st      a,timrln
          ;
089E 48           ld      a,£h'8
089F 3A8C         out     a,%op1c                 ; timer start
          ;
08A1 3914         set     spuvdm,1                ; 1200bit timer bit
          ;                                                        on
08A3 A8           b       rdast1
          ;
          ; set 'command execute bit '
          ;
08A4 3934 rdast3: set     spuvdm,3                ;
          ;
08A6 3941         clr     spuvum,0                ; clear previous co
mmand need
          ;                                         data bit
          ; to return
          ;
08A8 3940 rdast1: clr     spuvsh,0                ; to abnormal mode
          ;
08AA 3975         clr     spuvsl,3                ; 1'st intr. enable
          ;
08AC 66DF         b       r01111                  ; return
          ;
08AE 3C16 rdast4: ld      a,vlfec
08B0 08           inc     a
08B1 3F16         st      a,vlfec
          ;
08B3 D5           cmpr    a,£h'5
08B4 BB           b       rdast5
```

```
                 ;
08B5 3924                  set     spuvdm,2            ; 10 sec bit on
08B7 3B36                  set     %op06,3
08B9 69B6                  b       rst004
                 ;
08BB 3C28        rdast5:   ld      a,readc
08BD 09                    dec     a
08BE 3F28                  st      a,readc
                 ;

ROM PAGE NO.35

08C0 688C                  b       rdast6
                 ;
                 ;
                 ;------------------------------------;
                 ;         T0 routine                  ;
                 ;------------------------------------;
                 ;
                 ;
                 ; start bit ?
                 ;
08C2 3BC0        t0:       testp   %ip00,0
08C4 94                    b       t00000              ; not start bit
                 ;
08C5 3935                  set     spuvsl,3            ; external intr.
                 ;                                        disable
08C7 40                    ld      a,£h'0
08C8 3F0C                  st      a,paritt            ; transmit parity
                 ;                                       reset
08CA 3C06                  ld      a,vlftl
08CC 3F08                  st      a,vlftb             ; transmit data in
                 ;
08CE 3B76                  clr     %op06,3             ; out   'mark'
                 ;
                 ;
                 ; next intr.
                 ;
08D0 C2                    ld      h,£h'2
08D1 EC                    ld      l,£h'c              ; to Td1 routine
                 ;
08D2 40                    ld      a,£h'0              ; 1/2 bit time
                 ;
                 ; re-warp
                 ;
08D3 2A                    ret
                 ;
                 ;
                 ; start bit error
                 ;
08D4 3914        t00000:   set     spuvdm,1            ; '1200 bit countin
g'
                 ;
08D6 3940                  clr     spuvsh,0            ; abnormal mode
                 ;
                 ; out 'space'
                 ;
08D8 3B36                  set     %op06,3             ; out 'space'
                 ;
                 ; 1200 bit timer continues
                 ;
08DA 3C8C                  ld      a,incoth
08DC 3FF6                  st      a,timrhn
08DE 3C8B                  ld      a,incotm
08E0 3FF5                  st      a,timrmn
08E2 3C8A                  ld      a,incotl
08E4 3FF4                  st      a,timrln
                 ;
08E6 48                    ld      a,£h'8
08E7 3A8C                  out     a,%op1c             ; 1200 bit timer co
ntinues
                 ;
                 ;
                 ; return
                 ;
08E9 66DF                  b       r01111
                 ;
                 ;
                 ;------------------------------------;
                 ;         Td1     routine             ;
                 ;------------------------------------;
                 ;
                 ;
```

```
                ; mode change
                ;
08EB 3950       tdi:    clr     spuvsh,1        ; receive mode
                ;
                ; next intr.
                ;
08ED C2                 ld      h,£h'2
08EE EE                 ld      l,£h'e          ; to Trmi
                ;
08EF 40                 ld      a,£h'0          ; next intr.1/2 bit
                                                          time
                ;
                ;
                ; re-warp
                ;
08F0 2A                 ret
                ;
                ;;;;;;;;;;;;;;;;;;;;;;;;;;;;;;;;;;;;;;;;;;;;;
                ;;;;;;;;;;;;;;;;;;;;;;;;;;;;;;;;;;;;;;;;;;;;;
                ;
                ;-----------------------------------------;
                ;       Trmi    routine                   ;
                ;-----------------------------------------;
                ;
                ;
                ; command ?
                ;
08F1 3989       trmi:   test    vlfrb,3         ; command ?
08F3 6903               b       trmi00          ; command
                ;
                ; next data
                ;
08F5 3910               set     spuvsh,1        ; to transmit mode
                ;
08F7 3C08               ld      a,vlftb
08F9 07                 rorc    a
08FA 3F08               st      a,vlftb         ; data set
                ;
08FC 41                 ld      a,£h'1
08FD 3F0A               st      a,vlfc          ; counter set
                ;
                ; next intr.
                ;
08FF C3                 ld      h,£h'3

ROM PAGE NO.36

0900 E2                 ld      l,£h'2          ; to Tdo
                ;
0901 41                 ld      a,£1            ; next intr. 1 bit
                                                          time
                ;
                ; re-warp
                ;
0902 2A         trmi01: ret
                ;
                ;
                ; command received
                ;
0903 3B36       trmi00: set     %op06,3         ; out 'space'
0905 C3                 ld      h,£h'3
0906 E0                 ld      l,£h'0          ; to Rdamymi
                ;
0907 40                 ld      a,£h'0          ; next intr.1/2 bit
                ;                                         time
                ; re-warp
                ;
0908 82                 b       trmi01          ; to re-warp
                ;
                ;;;;;;;;;;;;;;;;;;;;;;;;;;;;;;;;;;;;;;;;;;;;;
                ;;;;;;;;;;;;;;;;;;;;;;;;;;;;;;;;;;;;;;;;;;;;;
                ;
                ;-----------------------------------------;
                ;       Rdamymi routine                   ;
                ;-----------------------------------------;
                ;
                ;
                ; parity,counter clear
                ;
0909 40         rdamy:  ld      a,£h'0
090A 3F0B               st      a,parity
090C 3F0A               st      a,vlfc          ; counter clear
```

```
                ;
                ; next intr.
                ;
090E C1                 ld      h,£h'1
090F E4                 ld      l,£h'4                  ; to Rca
                ;
0910 40                 ld      a,£h'0                  ; next intr. 1/2 bi
t
                ;                                               time
                ; re-warp
                ;
0911 2A                 ret
                ;
                ;;;;;;;;;;;;;;;;;;;;;;;;;;;;;;;;;;;;;;;;;;
                ;;;;;;;;;;;;;;;;;;;;;;;;;;;;;;;;;;;;;;;;;;
                ;
                ;-----------------------------------------;
                ;       Tdo     routine                   ;
                ;-----------------------------------------;
                ;
                ;
                ; counter ?
                ;
0912 2E3A       tdo:    cmpr    vlfc,£h'3
0914 0E                 testp   zf
0915 A3                 b       tdo000                  ; next data set
                ;
0916 2E7A               cmpr    vlfc,£h'7
0918 0E                 testp   zf
0919 A8                 b       tdo001                  ; parity set
                ;
                ; data set
                ;
091A 3C08               ld      a,vlftb
091C 07                 rorc    a
091D 3F08               st      a,vlftb                 ; data set
                ;
                ; counter increase
                ;
091F 2F1A       tdo002: add     vlfc,£h'1
                ;
                ; next intr.                              no change address
                ;
0921 41                 ld      a,£h'1                  ; next intr. 1 bit
time
                ;
                ;
                ; re-warp
                ;
0922 2A                 ret
                ;
                ; counter equal 3
                ;
0923 3C07       tdo000: ld      a,vlfth
0925 3F08               st      a,vlftb                 ; transmit data rep
lace
                ;
0927 9F                 b       tdo002                  ; to re-warp
                ;
                ; counter equal 7
                ;
0928 3C0C       tdo001: ld      a,paritt
092A 3F08               st      a,vlftb                 ; parity data in
                ;
                ; next intr.
                ;
092C C3                 ld      h,£h'3
092D E4                 ld      l,£h'4                  ; to Tp
                ;
092E 41                 ld      a,£h'1                  ; next intr. 1 bit
                ;                                               time
                ; re-warp
                ;
092F 2A                 ret
                ;
                ;;;;;;;;;;;;;;;;;;;;;;;;;;;;;;;;;;;;;;;;;;
                ;;;;;;;;;;;;;;;;;;;;;;;;;;;;;;;;;;;;;;;;;;
                ;
                ;-----------------------------------------;
                ;       Tp      routine                   ;
                ;-----------------------------------------;
                ;
```

```
                ;
0930 3C0D       tp:       ld      a,lcicot
0932 3E24                 cmpr    a,spucp
0934 BB                   b       tp0000
                ;
                ; lci counter equals 'spucp'
                ;
0935 3908                 set     vlftb,0                   ; next data '1'
                ;
                ; to Tlci routine
                ;
0937 C3         tp0001:   ld      h,£h'3
0938 E6                   ld      l,£h'6                    ; to Tlci
                ;
0939 40                   ld      a,£h'0                    ; next intr. 1/2  b
it
                ;                                                   time
                ; re-warp
                ;
093A 2A                   ret
                ;
                ;
                ; lci counter not equal 'spucp'
                ;
093B 3948       tp0000:   clr     vlftb,0                   ; next data '0'
                ;
093D B7                   b       tp0001                    ; to return
                ;
                ;;;;;;;;;;;;;;;;;;;;;;;;;;;;;;;;;;;;;;;;;;;
                ;;;;;;;;;;;;;;;;;;;;;;;;;;;;;;;;;;;;;;;;;;;
                ;
                ;-----------------------------------------;
                ;         Tlci     routine                ;
                ;-----------------------------------------;
                ;
                ;
093E 3950       tlci:     clr     spuvsh,1                  ; to receive mode
                ;
                ;
                ; next intr.
                ;

ROM PAGE NO. 37

0940 C3                   ld      h,£h'3
0941 E8                   ld      l,£h'8                    ; to Rtack
                ;
0942 40                   ld      a,£h'0                    ; next intr. 1/2 bi
t
                ;                                                   time
                ;
                ; re-warp
                ;
0943 2A                   ret
                ;
                ;
                ;;;;;;;;;;;;;;;;;;;;;;;;;;;;;;;;;;;;;;;;;;;
                ;;;;;;;;;;;;;;;;;;;;;;;;;;;;;;;;;;;;;;;;;;;
                ;
                ;-----------------------------------------;
                ;         Rtack    routine                ;
                ;-----------------------------------------;
                ;
                ;
0944 3910       rtack:    set     spuvsh,1                  ; to transmit mode
                ;
0946 39F9                 testp   vlfrb,3                   ;
0948 AB                   b       rtack0                    ; 'nack' from ECU
                ;
                ; 'ack' from ECU
                ;
0949 3BF6                 testp   %ip06,3
094B 94                   b       rtack1                    ; lci counter
                ;                                               equal 'spucp'
094C 3948                 clr     vlftb,0                   ; transmit data
                ;                                               equal '0'
094E 3951                 clr     spuvum,1                  ; clear 'previous
                ;                                              command requires
 an answer'
                ;
                ; next intr.
                ;
```

```
0950 C3        rtack2: ld      h,£h'3
0951 EA                ld      l,£h'a          ; to Tst
               ;
0952 40                ld      a,£h'0          ; next intr. 1/2 bi
t
               ;                                  time
               ;
               ; re-warp
               ;
0953 2A                ret
               ;
0954 3908      rtack1: set     vlftb,0         ; transmit data
               ;                                  equil '1'
0956 3914              set     spuvdm,1        ; 1200 bit timer on
               ;
               ; transmit buffer replace
               ;
0958 3C26              ld      a,writeh
095A 30                xch     a,h
095B 3C0D              ld      a,lcicot
               ;
095D 3801              add     a,£h'1
               ;
095F 05                rolc    a
0960 383E              and     a,£h'e
0962 31                xch     a,l
               ;
0963 0C                ld      a,@hl
0964 3F06              st      a,vlftl
0966 18                inc     l
0967 0C                ld      a,@hl
0968 3F07              st      a,vlfth         ; key data in
               ;
096A 90                b       rtack2
               ;
               ; 'nack' from ECU
               ;
096B 3C16      rtack0: ld      a,vlfec
096D 08                inc     a
096E 3F16              st      a,vlfec         ; vlf error counter
               ;                                  increase
0970 D5                cmpr    a,£h'5
0971 B9                b       rtack3          ; error not equal
               ;                                  5'th times
0972 3948              clr     vlftb,0         ; transmit data '0'
               ;
0974 3954              clr     spuvdm,1        ; (1200 bit timer)
bit clear
               ;
0976 3924              set     spuvdm,2        ; 10sec timer bit o
n
               ;
0978 90                b       rtack2          ; to re-warp
               ;
               ; error not equal 5'th times
               ;
0979 3908      rtack3: set     vlftb,0         ; next data '1'
               ;
097B 3914              set     spuvdm,1        ; set '1200 bit tim
er bit '
               ;
097D 2FFD              add     lcicot,£h'f
               ;
097F 6950              b       rtack2
               ;
0981 6950              b       rtack2          ; to re-warp
               ;
               ;
               ;;;;;;;;;;;;;;;;;;;;;;;;;;;;;;;;;;;;;;;;;;;;;;
               ;;;;;;;;;;;;;;;;;;;;;;;;;;;;;;;;;;;;;;;;;;;;;;
               ;
               ;-------------------------------------------;
               ;       Tst      rouitne                    ;
               ;-------------------------------------------;
               ;
               ;
0983 3950      tst:    clr     spuvsh,1        ; receive mode
               ;
0985 C3                ld      h,£h'3
0986 EC                ld      l,£h'c          ; to Rst
               ;
0987 45                ld      a,£h'5          ; next intr. 11 bit
               ;                                  time
```

```
                    ;
                    ; re-warp
                    ;
 09B8 2A                     ret
                    ;
                    ;
                    ;------------------------------------------;
                    ;        Rst        routine               ;
                    ;------------------------------------------;
                    ;
                    ;
 09B9 39B9          rst:     test     vlfrb,3                 ;
 09BB AA                     b        rst000                  ; stop bit cann't f
ind
                    ;
 09BC 3BF6                   testp    %ip06,3                 ;
 09BE AE                     b        rst001                  ; out '0'
                    ;
 09BF 3C0D                   ld       a,lcicot
 0991 08                     inc      a
 0992 3F0D                   st       a,lcicot                ; lci counter decre
ase
                    ;
 0994 3910                   set      spuvsh,1                ; to transmit mode
                    ;
 0996 3914                   set      spuvdm,1                ; '1200 bit timr.'
                    ;
 0998 42                     ld       a,£h'2
 0999 3FF6                   st       a,timrhn
 099B 4C                     ld       a,£h'c
 099C 3FF5                   st       a,timrmn
 099E 4F                     ld       a,£h'f
 099F 3FF4                   st       a,timrln
                    ;
 09A1 48                     ld       a,£h'8
 09A2 3A8C                   out      a,%oplc
                    ;
 09A4 3940          rst002:  clr      spuvsh,0                ; abnormal mode
                    ;
 09A6 3975                   clr      spuvsl,3                ; external intr.ena
ble
                    ;
 09A8 66DF                   b        r01111
                    ;
 09AA 3951          rst000:  clr      spuvum,1
                    ;
 09AC 6820                   b        rcstn0                  ; framing error
                    ;
                    ;
 09AE 39E4          rst001:  testp    spuvdm,2                ; '10 sec bit' on ?
 09B0 B6                     b        rst004
                    ;
                    ; 'command execute bit' on
                    ;
 09B1 3934                   set      spuvdm,3                ;
                    ;
 09B3 3951                   clr      spuvum,1                ; previous command
need data
                    ;                                            bit clear
 09B5 A4                     b        rst002
                    ;
 09B6 3940          rst004:  clr      spuvsh,0                ; abnormal mode
                    ;
                    ; 10 sec timer start
                    ;
 09B8 46                     ld       a,£h'6
 09B9 3FF6                   st       a,timrhn
 09BB 47                     ld       a,£h'7
 09BC 3FF5                   st       a,timrmn
 09BE 47                     ld       a,£h'7
 09BF 3FF4                   st       a,timrln
                    ;

 ROM PAGE NO.39 *

 09C1 40                     ld       a,£h'0
 09C2 3A8C                   out      a,%oplc
                    ;
 09C4 49                     ld       a,£h'9
 09C5 3A8C                   out      a,%oplc                 ; start
                    ;
 09C7 3954                   clr      spuvdm,1                ; 1200 bit timer bi
t
```

```
          ;                                                  clear
09C9 66DF           b       r01111                         ; return
          ;
          ;
          ;
          ;;;;;;;;;;;;;;;;;;;;;;;;;;;;;;;;;;;;;;;;;;;;;;;
          ;;;;;;;;;;;;;;;;;;;;;;;;;;;;;;;;;;;;;;;;;;;;;;;
          ;
          ;--------------------------------------;
          ;         re-warp   routine            ;
          ;--------------------------------------;
          ;
0A00                org     h'a00
          ;
          ; re-warp
          ;
0A00 D0             cmpr    a,£h'0
0A01 0E             testp   zf
0A02 9B             b       rwarp0                         ; next intr.1/2 bit
          ;                                                  time
0A03 D1             cmpr    a,£h'1
0A04 0E             testp   zf
0A05 A4             b       rwarp1                         ; next  intr. 1 bit
          ;                                                  time
0A06 D2             cmpr    a,£h'2
0A07 0E             testp   zf
0A08 AD             b       rwarp2                         ; next intr. 6 bit
          ;                                                  time
0A09 D3             cmpr    a,£h'3
0A0A 0E             testp   zf
0A0B B7             b       rwarp3                         ; next intr. 9 bit
          ;                                                  time
          ;                                                  time
          ; 11 bit timer
          ;
0A0C 4F             ld      a,£h'f
0A0D 3F1B           st      a,timrho
0A0F 47             ld      a,£h'7
0A10 3F1A           st      a,timrmo
0A12 4C             ld      a,£h'c
0A13 3F19           st      a,timrlo
          ;
          ; next warp
          ;
0A15 29C4 rwarp4:   xch     hl,warpcl
0A17 28C4           ld      hl,warpcl
          ;
0A19 66DF           b       r01111                         ; return
          ;
          ;
          ; 1/2 bit timer
          ;
0A1B 4F   rwarp0:   ld      a,£h'f
0A1C 3F1B           st      a,timrho
0A1E 3F1A           st      a,timrmo
0A20 4A             ld      a,£h'a
0A21 3F19           st      a,timrlo
          ;
0A23 95             b       rwarp4
          ;
          ; 1 bit timer
          ;
0A24 4F   rwarp1:   ld      a,£h'f
0A25 3F1B           st      a,timrho
0A27 3F1A           st      a,timrmo
0A29 44             ld      a,£h'4
0A2A 3F19           st      a,timrlo
          ;
0A2C 95             b       rwarp4
          ;
          ;
          ; 6 bit timer
          ;
0A2D 4F   rwarp2:   ld      a,£h'f
0A2E 3F1B           st      a,timrho
0A30 4B             ld      a,£h'b
0A31 3F1A           st      a,timrmo
0A33 48             ld      a,£h'8
0A34 3F19           st      a,timrlo
          ;
0A36 95             b       rwarp4
          ;
          ; 9 bit timer
```

```
                ;
0A37 4F         rwarp3: ld      a,£h'f
0A38 3F1B               st      a,timrho
0A3A 49                 ld      a,£h'9
0A3B 3F1A               st      a,timrmo
0A3D 44                 ld      a,£h'4
0A3E 3F19               st      a,timrlo
                ;

ROM PAGE NO.41

0A40 6A15               b       rwarp4
                ;
                        end

ASSEMBLY COMPLETE,      0 PROGRAM ERROR(S)
```

SYMBOL TABLE

| | | | | | | | |
|---|---|---|---|---|---|---|---|
| COMMAD | 0013 | COMMAH | 0015 | COMMAL | 0014 | * DAAT0H | 0081 |
| *. DATA0L | 0080 | * DATA1H | 0083 | * DATA1L | 0082 | * DATA2H | 0085 |
| * DATA2L | 0084 | * DATA3H | 0087 | * DATA3L | 0086 | * DATA4H | 0089 |
| * DATA4L | 0088 | * DATACT | 0200 | DCH | 00FE | DCL | 00FC |
| DCM | 00FD | * DISPA | 0032 | * DISPH | 0031 | * DISPIW | 0034 |
| * DISPL | 0030 | * DISPLW | 0033 | FRAME | 0053 | INCOTH | 008C |
| INCOTL | 008A | INCOTM | 008B | * IOVF1 | 0602 | * KEST | 0022 |
| KEST0H | 0043 | KEST0L | 0042 | * KEST1H | 0045 | * KEST1L | 0044 |
| * KEST2H | 0047 | * KEST2L | 0046 | * KEST3H | 0049 | * KEST3L | 0048 |
| * KEST4H | 004B | * KEST4L | 004A | * KEST5H | 004D | * KEST5L | 004C |
| * KESTBH | 0021 | * KESTBL | 0020 | * KEYND | 0029 | * KEYNN | 002A |
| * KEYOD | 002B | * KEYON | 002C | * KEYS | 0100 | * KEYSB | 0250 |
| * KEYSC | 000E | * KEYT | 0300 | * KEYTB | 00CB | LCICOT | 000D |
| * LDATL1 | 0037 | * LDATL2 | 0038 | * LDATM1 | 0035 | * LDATM2 | 0036 |
| * LDISP | 0B00 | * LECOTH | 008F | * LECOTL | 008D | * LECOTM | 008E |
| * LIOVF2 | 0D00 | * LMAIN | 03E0 | * LREMO | 0E00 | * LTABLE | 0000 |
| * LVLFEX | 0C00 | * OVER2A | 0072 | * OVER2H | 0071 | * OVER2L | 0070 |
| OVERA1 | 0012 | * OVERH1 | 0011 | OVERL1 | 0010 | PARITT | 000C |
| PARITY | 000B | R0 | 06B2 | R00000 | 06C2 | R00001 | 06C1 |
| R01000 | 06C9 | * R01100 | 06CE | R01110 | 06EA | R01111 | 06DF |
| RCA | 0719 | RCA000 | 0734 | RCA001 | 073A | RCA002 | 0732 |
| RCA003 | 0733 | RCF | 073E | RCF000 | 074F | RCF001 | 0754 |
| RCF002 | 074D | RCF005 | 0776 | RCF006 | 074E | RCF100 | 077C |
| RCF110 | 07B5 | RCF111 | 07CF | RCF120 | 0798 | RCF121 | 07AE |
| RCF122 | 07A9 | RCP | 07D4 | RCP000 | 07E9 | RCP003 | 07E3 |
| * RCP004 | 07E5 | RCP100 | 07E1 | * RCSTA1 | 083B | RCSTAB | 0838 |
| RCSTN | 07FA | RCSTN0 | 0820 | RCSTN1 | 0817 | * RCSTN2 | 0805 |
| RCSTN3 | 0813 | RCSTN6 | 0803 | RCSTN7 | 0831 | RDAMY | 0909 |
| RDAST | 0885 | RDAST1 | 08A8 | RDAST3 | 08A4 | RDAST4 | 08AE |
| RDAST5 | 08BB | RDAST6 | 088C | RDD | 0841 | RDD000 | 0858 |
| RDD001 | 0868 | RDD002 | 0857 | RDP | 0871 | RDP000 | 087C |
| RDP001 | 0876 | READC | 0028 | READN | 0027 | * REMD0 | 0060 |
| * REMD1 | 0061 | * REMD2 | 0062 | * REMD3 | 0063 | * REMD4 | 0064 |
| * REMD5 | 0065 | * REMD6 | 0066 | * REMD7 | 0067 | * REMOA | 006A |
| * REMOH | 0069 | * REMOL | 0068 | RKCE | 0050 | RMI | 06FC |
| RMI000 | 070F | RMI001 | 0709 | RMI002 | 070E | RMI003 | 0715 |
| * RNH | 006B | * RNL | 006D | * RNM | 006C | RST | 0989 |
| RST000 | 09AA | RST001 | 09AE | RST002 | 09A4 | RST004 | 09B6 |
| RSTD | 0834 | RTACK | 0944 | RTACK0 | 096B | RTACK1 | 0954 |
| RTACK2 | 0950 | RTACK3 | 0979 | RWARP0 | 0A1B | RWARP1 | 0A24 |
| RWARP2 | 0A2D | RWARP3 | 0A37 | RWARP4 | 0A15 | * RWRPCH | 00CA |
| * RWRPCL | 00C8 | * RWRPCM | 00C9 | SERVRC | 000F | SPUCP | 0024 |
| SPUFF | 0017 | SPUSH | 0003 | SPUSK | 0023 | SPUSL | 0002 |
| SPUTT | 0018 | SPUVDM | 0004 | SPUVSH | 0000 | SPUVSL | 0005 |
| SPUVUM | 0001 | SPW | 00FF | SPWB | 00C7 | T0 | 08C2 |
| T00000 | 08D4 | TD1 | 08EB | TDACK | 087F | TDO | 0912 |
| TDO000 | 0923 | TDO001 | 0928 | TDO002 | 091F | * TIMR2H | 00FA |
| * TIMR2L | 00F8 | * TIMR2M | 00F9 | TIMRHN | 00F6 | TIMRHO | 001B |
| TIMRLN | 00F4 | TIMRLO | 0019 | TIMRMN | 00F5 | TIMRMO | 001A |
| TLCI | 093E | TP | 0930 | TP0000 | 093B | TP0001 | 0937 |
| TRA | 07EE | TRA000 | 07F7 | TRA001 | 07F5 | TRMI | 08F1 |
| TRMI00 | 0903 | TRMI01 | 0902 | TST | 0983 | VL0040 | 06A3 |
| VL0050 | 0698 | VL0060 | 0689 | VLF001 | 0635 | VLF002 | 0647 |
| VLF003 | 0634 | VLF004 | 066E | VLF005 | 0640 | VLF010 | 0623 |
| VLF011 | 062B | VLF100 | 061E | VLF200 | 062D | VLF300 | 06AD |
| VLFC | 000A | VLFEC | 0016 | VLFRB | 0009 | VLFTB | 0008 |
| VLFTH | 0007 | VLFTL | 0006 | * VLFXA | 0052 | * VLFXH | 0051 |
| * VLFXL | 0050 | WARPCL | 00C4 | * WARPCM | 00C5 | WRITEH | 0026 |
| WRITEN | 0025 | | | | | | |

DEFINED 233 USER SYMBOL(S)

```
LOC  OBJ           SOURCE STATEMENT

                   ;-------------------------------------------------------;
                   ;                                             7.1983.   ;
                   ;        lvlfex.asm        V1.0                         ;
                   ;                                (TMP4740P)             ;
                   ;                                                       ;
                   ;              vlf communication    routine             ;
                   ;                                                       ;
                   ;                                                       ;
                   ;-------------------------------------------------------;

                   $nolist

                   $list

                   ;
                   ;
                   ;

ROM PAGE NO.48

0C00                       org      h'c00
                   ;
                   ; disable ?
                   ;
0C00 39F5          vlfex:  testp    spuvsl,3
0C02 6C42                  b        vlfx00                  ; 1'st intr. disabl
                   ;
                   ; push register
                   ;
0C04 3F52                  st       a,vlfxa
0C06 2950                  xch      hl,vlfxl                ; push register
                   ;
                   ; clear external counter
                   ;
0C08 40                    ld       a,£h'0
0C09 3A8C                  out      a,%op1c
0C0B 3B04                  set      %op04,0
0C0D 3B44                  clr      %op04,0                 ; event timer start
                   ;
                   ; timer start
                   ;
0C0F 3CF6                  ld       a,timrhn
0C11 3F8C                  st       a,incoth
0C13 3CF5                  ld       a,timrmn
0C15 3F8B                  st       a,incotm
0C17 3CF4                  ld       a,timrln
0C19 3F8A                  st       a,incotl
                   ;
0C1B 4F                    ld       a,£h'f
0C1C 3FF6                  st       a,timrhn
0C1E 3FF5                  st       a,timrmn
0C20 4A                    ld       a,£h'a
0C21 3FF4                  st       a,timrln
0C23 44                    ld       a,£h'4
0C24 3A8C                  out      a,%op1c                 ; timer start
                   ;                                          ( 1/2 bit time )
                   ; framing error ?
                   ;
0C26 39F1                  testp    spuvum,3
0C28 6C43                  b        vlfx01                  ; framing error
                   ;
                   ; mode change from abnormal to normal
                   ;
0C2A 3900                  set      spuvsh,0                ; to normal mode
                   ;
                   ; transmit ?
                   ;
0C2C 39D0                  testp    spuvsh,1
0C2E 6C57                  b        vlfx02                  ; transmit mode
                   ;
                   ; next routine
                   ;
0C30 40                    ld       a,£h'0
0C31 3FC4                  st       a,warpcl
0C33 41                    ld       a,£h'1
0C34 3FC5                  st       a,warpcm                ; address h'010
```

```
               ;
               ; next timer setting
               ;
0C36 4F                  ld      a,£h'f
0C37 3F1B                st      a,timrho
0C39 3F1A                st      a,timrmo
0C3B 44                  ld      a,£h'4
0C3C 3F19                st      a,timrlo
               ;
               ; pop register
               ;
0C3E 3C52      vlfx03:   ld      a,vlfxa

ROM PAGE NO.49

0C40 2950                xch     hl,vlfxl
               ;
               ; return
               ;
0C42 2B        vlfx00:   reti
               ;
               ;
               ; framing error
               ;
0C43 00        vlfx01:   nop
0C44 4F                  ld      a,£h'f
0C45 3F18                st      a,sputt
               ;
               ;         ld      a,£h'f
               ;         st      a,timrhn
               ;         ld      a,£h'7
               ;         st      a,timrmn
               ;         ld      a,£h'c
               ;         st      a,timrln
               ;
               ;         ld      a,£h'4
               ;         out     a,%op1c                ; timer start 11 bi
t
               ;                                           time
0C47 3C8C                ld      a,incoth
0C49 3F1B                st      a,timrho
0C4B 3C8B                ld      a,incotm
0C4D 3F1A                st      a,timrmo
0C4F 3C8A                ld      a,incotl
0C51 3F19                st      a,timrlo
               ;
0C53 3B36                set     %op06,3
               ;
0C55 6C3E                b       vlfx03
               ;
               ;
               ; transmit mode
               ;
0C57 3B76      vlfx02:   clr     %op06,3                ; out 'mark'
               ;
0C59 3C06                ld      a,vlftl
0C5B 3F08                st      a,vlftb                ; transmit buffer
                                                            clear
               ;
0C5D 4F                  ld      a,£h'f
0C5E 3F1B                st      a,timrho
0C60 3F1A                st      a,timrmo
0C62 4A                  ld      a,£h'a
0C63 3F19                st      a,timrlo               ; timer set
               ;
0C65 42                  ld      a,£h'2
0C66 3FC5                st      a,warpcm
0C68 4A                  ld      a,£h'a
0C69 3FC4                st      a,warpcl               ; next routin
               ;
0C6B 6C3E                b       vlfx03                 ; to return
               ;
               ;
                         end

ASSEMBLY COMPLETE,       0 PROGRAM ERROR(S)

                         SYMBOL TABLE

* COMMAD   0013   * COMMAH   0015   * COMMAL   0014   * DATA0H   0081
* DATA0L   0080   * DATA1H   0083   * DATA1L   0082   * DATA2H   0085
* DATA2L   0084   * DATA3H   0087   * DATA3L   0086   * DATA4H   0089
* DATA4L   0088   * DATACT   0200   * DCH      00FE   * DCL      00FC
```

```
* DCM      00FD   * DISPA    0032   * DISPH    0031   * DISPIW   0034
* DISPL    0030   * DISPLW   0033   * FLASH    0350     INCOTH   008C
  INCOTL   008A     INCOTM   008B   * KEST     0022   * KEST0H   0043
* KEST0L   0042   * KEST1H   0045   * KEST1L   0044   * KEST2H   0047
* KEST2L   0046   * KEST3H   0049   * KEST3L   0048   * KEST4H   004B
* KEST4L   004A   * KEST5H   004D   * KEST5L   004C   * KESTBH   0021
* KESTBL   0020   * KEYND    0029   * KEYNN    002A   * KEYOD    002B
* KEYON    002C   * KEYS     0100   * KEYSB    0250   * KEYSC    000E
* KEYT     0300   * KEYTB    00CB   * LCICOT   000D   * LDASL1   003B
* LDASL2   003C   * LDASM1   0039   * LDASM2   003A   * LDATL1   0037
* LDATL2   0038   * LDATM1   0035   * LDATM2   0036   * LDISP    0B00
* LECOTH   008F   * LECOTL   008D   * LECOTM   008E   * LEDD     0310
* LIOVF1   0600   * LIOVF2   0D00   * LMAIN    03E0   * LREMO    0E00
* LTABLE   0000   * LVLFEX   0C00   * OVER2A   0072   * OVER2H   0071
* OVER2L   0070   * OVERA1   0012   * OVERH1   0011   * OVERL1   0010
* PARITT   000C   * PARITY   000B   * READC    0028   * READN    0027
* REMD0    0060   * REMD1    0061   * REMD2    0062   * REMD3    0063
* REMD4    0064   * REMD5    0065   * REMD6    0066   * REMD7    0067
* REMOA    006A   * REMOH    0069   * REMOL    0068   * RKCE     0050
* RNH      006B   * RNL      006D   * RNM      006C   * RWRPCH   00CA
* RWRPCL   00C8   * RWRPCM   00C9   * SERVRC   000F   * SPUCP    0024
* SPUSH    0003   * SPUSK    0023   * SPUSL    0002     SPUTT    0018
* SPUVDM   0004     SPUVSH   0000     SPUVSL   0005     SPUVUM   0001
* SPW      00FF   * SPWB     00C7   * TIMR2H   00FA   * TIMR2L   00F8
* TIMR2M   00F9     TIMRHN   00F6     TIMRHO   001B     TIMRLN   00F4
  TIMRLO   0019     TIMRMN   00F5     TIMRMO   001A   * VLFC     000A
* VLFEC    0016   * VLFEX    0C00   * VLFRB    0009     VLFTB    0008
* VLFTH    0007     VLFTL    0006     VLFX00   0C42     VLFX01   0C43
  VLFX02   0C57     VLFX03   0C3E     VLFXA    0052   * VLFXH    0051
  VLFXL    0050     WARPCL   00C4     WARPCM   00C5   * WRITEH   0026
* WRITEN   0025

DEFINED    137 USER SYMBOL(S)

LOC  OBJ       LINE        SOURCE STATEMENT

                  1 ;------------------------------------------------------;
                  2 ;                                               7.1983. ;
                  3 ;        lremo.asm       V1.0                           ;
                  4 ;                               (TMP4740P)              ;
                  5 ;                                                       ;
                  6 ;               remote.       routine                   ;
                  7 ;                                                       ;
                  8 ;                                                       ;
                  9 ;------------------------------------------------------;

                  $nolist

                  $list

                258 ;

ROM PAGE NO.56

0E00            259          org     h'e00
                260 ;
                261 ;
                262   ;;;;   r escape
                263 ;
0E00 3F6A       264          st      a,remoa
0E02 44         265          ld      a,£10100b
0E03 13         266          xch     a,eir
0E04 366F       267          eiclr   il,101111b
0E06 2968       268          xch     hl,remol
                269 ;
                270 ;;;;     to stop timer2
                271 ;
0E08 40         272          ld      a,£0
0E09 3A8D       273          out     a,%opld
                274 ;;;;     check N1
                275 ;
0E0B 3C6B       276          ld      a,rnh
0E0D D3         277          cmpr    a,£h'3
0E0E 0E         278          testp   zf
0E0F 6E5C       279          b       int100
                280 ;
0E11 D2         281          cmpr    a,£2
0E12 0E         282          testp   zf
0E13 A4         283          b       int200
```

```
                    ;
                    ;;;      N1=1 or 0
0E14 41                      ld       a,£1
0E15 3F6B                    st       a,rnh               ;
                    ;
                    ;;       setting timer2 on 4.5ms
                    ;
0E17 4F                      ld       a,£h'f
0E18 3FFA                    st       a,timr2h
0E1A 4E                      ld       a,£h'e
0E1B 3FF9                    st       a,timr2m
0E1D 3FF8                    st       a,timr2l
                    ;
0E1F 48                      ld       a,£8
0E20 3A8D                    out      a,%op1d
0E22 6EE7                    b        ret2
                    ;
                    ;;;      N1=2
                    ;
0E24 3CF8           int200:  ld       a,timr2l            ; timer check
0E26 3802                    add      a,£h'2
0E28 05                      rolc     a
0E29 04                      testp    cf                  ;
0E2A BE                      b        int210              ;jump on carry '1'
                    ;
                    ;;       setting timer2
                    ;
0E2B 3B06           in2000:  set      %op06,0
                    ;
0E2D 4E                      ld       a,£h'e
0E2E 3FFA                    st       a,timr2h
0E30 47                      ld       a,£h'7
0E31 3FF9                    st       a,timr2m
0E33 4C                      ld       a,£h'c
0E34 3FF8                    st       a,timr2l
                    ;
0E36 48                      ld       a,£8
0E37 3A8D                    out      a,%op1d             ;start
                    ;
0E39 40                      ld       a,£0
0E3A 3F6B                    st       a,rnh               ;N1=0
                    ;
0E3C 6EE7                    b        ret2
                    ;
                    ;;       start data receive
                    ;
0E3E 3CF9           int210:  ld       a,timr2m

ROM PAGE NO.57

0E40 DF                      cmpr     a,£h'f
0E41 6E2B                    b        in2000
                    ;
0E43 43                      ld       a,£3
0E44 3F6B                    st       a,rnh               ;N1=3
                    ;
                    ;        ram clear
                    ;
0E46 C6                      ld       h,£6
0E47 E0                      ld       l,£0
                    ;
0E48 11                      mov      l,a
                    ;
0E49 0F             int211:  st       a,@hl
0E4A 18                      inc      l
0E4B 3898                    cmpr     l,£8
0E4D 0E                      testp    zf
0E4E 90                      b.       int212
0E4F 89                      b        int211
                    ;
                    ;        setting timer2
                    ;
0E50 3FF8           int212:  st       a,timr2l
0E52 4F                      ld       a,£h'f
0E53 3FF9                    st       a,timr2m
0E55 3FFA                    st       a,timr2h
                    ;
0E57 48                      ld       a,£8
0E58 3A8D                    out      a,%op1d
                    ;
0E5A 6EE7                    b        ret2
                    ;
```

```
          ;;;      data receive
          ;                 N1=3
0E5C 3C6C  int100: ld       a,rnm
0E5E 31            xch      a,l       ;l <--- N2
          ;
0E5F C6            ld       h,£6
          ;
0E60 3CF8          ld       a,timr2l
          ;
0E62 3809          add      a,£9
          ;
0E64 6E87          b        int130    ;carry '0'
          ;
0E66 3C6D  int110: ld       a,rnl     ;a <000 N3
0E68 D0            cmpr     a,£0      ;N3=0 ?
0E69 0E            testp    zf
0E6A B8            b        int121
          ;
0E6B D1            cmpr     a,£1      ;N3=1 ?
0E6C 0E            testp    zf
0E6D BE            b        int122
          ;
0E6E D2            cmpr     a,£2      ;N3=2 ?
0E6F 0E            testp    zf
0E70 6E83          b        int123
          ;
          ;        N3=3 I J"12
0E72 0C            ld       a,@hl
0E73 3821          or       a,£1
0E75 0F            st       a,@hl
0E76 6E87          b        int130
          ;
0E78 0C    int121: ld       a,@hl
0E79 3828          or       a,£8
0E7B 0F            st       a,@hl
0E7C 6E87          b        int130
          ;
0E7E 0C    int122: ld       a,@hl
0E7F 3824          or       a,£4

ROM PAGE NO.58 *

0E81 0F            st       a,@hl
0E82 87            b        int130
          ;
0E83 0C    int123: ld       a,@hl
0E84 3822          or       a,£2
0E86 0F            st       a,@hl
          ;
0E87 3C6D  int130: ld       a,rnl
0E89 3801          add      a,£1
0E8B 3F6D          st       a,rnl
          ;
0E8D D4            cmpr     a,£4
0E8E 9B            b        int140              ;jump on N3<4
          ;
0E8F 40            ld       a,£0
0E90 3F6D          st       a,rnl               ; N3 <--- 0
          ;
0E92 3C6C          ld       a,rnm
0E94 3801          add      a,£1                ;a <--- N2+1
0E96 3F6C          st       a,rnm
          ;
0E98 D8            cmpr     a,£8
0E99 0E            testp    zf
0E9A A8            b        int150              ;jump N2=8
          ;
          ;        setting timer2.
          ;
0E9B 4F    int140: ld       a,£h'f
0E9C 3FFA          st       a,timr2h
0E9E 3FF9          st       a,timr2m
0EA0 40            ld       a,£0
0EA1 3FF8          st       a,timr2l
          ;
0EA3 48            ld       a,£8
0EA4 3A8D          out      a,%op1d
0EA6 6EE7          b        ret2
          ;
          ;;;      data check & convert
          ;;       check code was complete or not
          ;
```

```
0EA8 E0     int150: ld      l,£0
0EA9 0C             ld      a,@hl
                ;
0EAA D1             cmpr    a,£1
0EAB 6EE0           b       int160
                ;
0EAD E3             ld      l,£3
                ;
0EAE 0C             ld      a,@hl
                ;
0EAF DD             cmpr    a,£h'd
0EB0 6EE0           b       int160          ;received data was error
                ;
                ;           check data was complete or not
                ;
0EB2 4F             ld      a,£h'f
                ;
0EB3 E7             ld      l,£7
                ;
0EB4 1F             xor     a,@hl
                ;
0EB5 E5             ld      l,£5
                ;
0EB6 16             cmpr    a,@hl
0EB7 6EE0           b       int160          ;data was not complete
                ;
                ;           data convert
                ;
0EB9 0C             ld      a,@hl
                ;
0EBA D0             cmpr    a,£0
0EBB 0E             testp   zf
0EBC 6EC2           b       int171  ;
                ;
0EBE 4C             ld      a,£h'c
0EBF 3FFD           st      a,dcm           ;data counter setting

ROM PAGE NO.59 *

0EC1 85             b       int172
                ;
0EC2 4D     int171: ld      a,£h'd
0EC3 3FFD           st      a,dcm           ;data countersetting
                ;
0EC5 19     int172: dec     l        ;l<--- £4
                ;
0EC6 0C             ld      a,@hl
                ;
0EC7 3FFC           st      a,dcl           ;data counter setting
                ;
0EC9 4F             ld      a,£h'f
0ECA 3FFE           st      a,dch           ; data counter setting
                ;
                ;;
0ECC 33             ldl     a,@dc
0ECD 31             xch     a,l
                ;
0ECE 32             ldh     a,@dc+
0ECF 30             xch     a,h
                ;
0ED0 2250           call    keysb
                ;
0ED2 3930           set     spuvsh,3        ; remote flag on
                ;
                ;           setting timer2
0ED4 4F             ld      a,£h'f
0ED5 3FFA           st      a,h'fa
0ED7 43             ld      a,£h'3
0ED8 3FF9           st      a,h'f9
0EDA 40             ld      a,£h'0
0EDB 3FF8           st      a,h'f8
                ;
0EDD 48             ld      a,£8
0EDE 3A8D           out     a,%opld ;
                ;
                ;;          N<--0
                ;
0EE0 40     int160: ld      a,£0
0EE1 3F6B           st      a,rnh
0EE3 3F6C           st      a,rnm
0EE5 3F6D           st      a,rnl
                ;
```

```
                        ;;;      return routine
                        ;
0EE7 2968               ret2:    xch      hl,remol
0EE9 47                          ld       a,#0111b
0EEA 36AF                        diclr    il,101111b
0EEC 13                          xch      a,eir
0EED 3C6A                        ld       a,remoa
                        ;;
0EEF 3B46                        clr      %op06,0
                        ;
0EF1 2B                          reti
                        ;;
                        ;
                        ;
                        ;
                                 end

ASSEMBLY COMPLETE,      0 PROGRAM ERROR(S)
```

SYMBOL TABLE

| | | | | | | | |
|---|---|---|---|---|---|---|---|
| * COMMAD | 0013 | * COMMFC | 0015 | * COMMGR | 0014 | * DATACT | 0200 |
| DCH | 00FE | DCL | 00FC | DCM | 00FD | * DISPA | 0032 |
| * DISPH | 0031 | * DISPIW | 0034 | * DISPL | 0030 | * DISPLW | 0033 |
| IN2000 | 0E2B | * INCOTH | 003B | * INCOTL | 0039 | * INCOTM | 003A |
| INT100 | 0E5C | * INT110 | 0E66 | INT121 | 0E78 | INT122 | 0E7E |
| INT123 | 0E83 | INT130 | 0E87 | INT140 | 0E9B | INT150 | 0EA8 |
| INT160 | 0EE0 | INT171 | 0EC2 | INT172 | 0EC5 | INT200 | 0E24 |
| INT210 | 0E3E | INT211 | 0E49 | INT212 | 0E50 | * KEST | 0043 |
| * KEST0H | 0023 | * KEST0L | 0022 | * KEST1H | 0025 | * KEST1L | 0024 |
| * KEST2H | 0027 | * KEST2L | 0026 | * KEST3H | 0029 | * KEST3L | 0028 |
| * KEST4H | 002B | * KEST4L | 002A | * KESTBH | 0041 | * KESTBL | 0040 |
| * KEYND | 002C | * KEYNN | 002D | * KEYOD | 002E | * KEYON | 002F |
| * KEYS | 0100 | KEYSB | 0250 | * KEYSC | 000E | * KEYTB | 00CB |
| * LCICOT | 000D | * LDATL1 | 0037 | * LDATL2 | 0038 | * LDATM1 | 0035 |
| * LDATM2 | 0036 | * LDISP | 0B00 | * LECOTH | 003E | * LECOTL | 003C |
| * LECOTM | 003D | * LIOVF1 | 0600 | * LIOVF2 | 0D00 | * LMAIN | 03E0 |
| * LTABLE | 0000 | * LVLFEX | 0C00 | * OVERA1 | 0012 | * OVERH1 | 0011 |
| * OVERL1 | 0010 | * PARITT | 000C | * PARITY | 000B | * REMD0 | 0060 |
| * REMD1 | 0061 | * REMD2 | 0062 | * REMD3 | 0063 | * REMD4 | 0064 |
| * REMD5 | 0065 | * REMD6 | 0066 | * REMD7 | 0067 | REMOA | 006A |
| * REMOH | 0069 | REMOL | 0068 | RET2 | 0EE7 | * RKCE | 0050 |
| RNH | 006B | RNL | 006D | RNM | 006C | * RWRPCH | 00CA |
| * RWRPCL | 00C8 | * RWRPCM | 00C9 | * SERVRC | 000F | * SPUCP | 0021 |
| * SPUSH | 0003 | * SPUSK | 0020 | * SPUSL | 0002 | * SPUVDM | 0004 |
| SPUVSH | 0000 | * SPUVSL | 0005 | * SPUVUM | 0001 | * SPW | 00FF |
| * SPWB | 00C7 | TIMR2H | 00FA | TIMR2L | 00F8 | TIMR2M | 00F9 |
| * TIMRHN | 00F6 | * TIMRHO | 001B | * TIMRLN | 00F4 | * TIMRLO | 0019 |
| * TIMRMN | 00F5 | * TIMRMO | 001A | * VDATAH | 0018 | * VDATAL | 0017 |
| * VLFC | 000A | * VLFEC | 0016 | * VLFRB | 0009 | * VLFTB | 0008 |
| * VLFTH | 0007 | * VLFTL | 0006 | * VLFXA | 0052 | * VLFXH | 0051 |
| * VLFXL | 0050 | * WARPCL | 00C4 | * WARPCM | 00C5 | | |

DEFINED 123 USER SYMBOL(S)

```
LOC  OBJ       LINE        SOURCE STATEMENT

                     ;------------------------------------------------------------;
                     ;                                                 7.1983.    ;
                     ;         subroutine        V1.0                             ;
                     ;                                  (TMP4740P)                ;
                     ;                                                            ;
                     ;                                                            ;
                     ;                                                            ;
                     ;------------------------------------------------------------;

                     $nolist

                     $list

                     ;

ROM PAGE NO. 1

0050                              org      h'050
                     ;
0050 3C17            rkce:        ld       a,spuff
0052 DF                           cmpr     a,#h'f
0053 98                           b        rkce5
```

```
                 ;
0054 40                  ld      a,£h'0
0055 3F17                st      a,spuff
0057 AB                  b       rkce4                  ; to return
                 ;
0058 3C23        rkce5:  ld      a,spusk
005A 3E24                cmpr    a,spucp
005C AC                  b       rkce0                  ; branch on
                 ;                                        spusk<>spucp
005D 394F                clr     servrc,0               ; clear service req
uest
                 ;
005F 3942                clr     spusl,0                ; new character ava
ilable
                 ;
0061 4F                  ld      a,£h'f
0062 3F42                st      a,kest0l               ;
0064 3F43                st      a,kest0h               ; no keystroke
                 ;
                 ; spusk,spucp clear
                 ;
0066 40                  ld      a,£h'0
0067 3F23                st      a,spusk
0069 3F24                st      a,spucp
                 ;
                 ; return
                 ;
006B 2A          rkce4:  ret
                 ;
                 ;
                 ; buffer
                 ;
006C 3C24        rkce0:  ld      a,spucp
006E 08                  inc     a
006F 3F0E                st      a,keysc
                 ;
0071 3C0E        rkce1:  ld      a,keysc
0073 05                  rolc    a
0074 383E                and     a,£1110b
                 ;
0076 31                  xch     a,l
0077 C4                  ld      h,£h'4
                 ;
0078 0C          rkce2:  ld      a,@hl
                 ;
0079 388E                add     l,£h'e                 ; l<-- l-2
                 ;
007B 0F                  st      a,@hl
                 ;
007C 3883                add     l,£h'3                 ; l<-- l+3
                 ;
007E 0C                  ld      a,@hl
                 ;
007F 388E        rkce3:  add     l,£h'e                 ; l<-- l-2
                 ;

ROM PAGE NO. 2 *

0081 0F                  st      a,@hl
                 ;
0082 3883                add     l,£h'3
                 ;
0084 389C                cmpr    l,£h'c                 ; buffer bottom ?
0086 6078                b       rkce2
                 ;
0088 2FFE                add     keysc,£h'f             ; keysc<-- keysc-1
                 ;
008A 2E1E                cmpr    keysc,£h'1
008C 6071                b       rkce1
                 ;
                 ; spusk<-- ( spusk-spucp )
                 ;
008E 04                  testp   cf                     ; cf <-- 1
                 ;
008F C2                  ld      h,£h'2
0090 E3                  ld      l,£h'3                 ; spusk = m( hl )
                 ;
0091 3C24                ld      a,spucp
                 ;
0093 14                  subrc   a,@hl                  ; spusk-spucp
                 ;
0094 0F                  st      a,@hl                  ;
```

```
                  ;
0095 40                    ld      a,£h'0
0096 3F24                  st      a,spucp                  ; spucp <-- 0
                  ;
0098 606B                  b       rkce4                    ; to return
                  ;
                  ;
                  ;

ROM PAGE NO. 4

0100                       org     h'100
                  ;
0100 4F           keys:    ld      a,£h'f
0101 3F0E                  st      a,keysc
0103 3F29                  st      a,keynd
                  ;
0105 E0                    ld      1,£h'0
0106 4E                    ld      a,£h'e
                  ;
0107 3AA5         key001:  out     a,%op05          ;
                  ;
0109 2300                  call    keyt             ; timer
                  ;
010B 30                    xch     a,h
                  ;
010C 3A27                  in      %ip07,a          ;
                  ;
010E DF                    cmpr    a,£h'f           ;
010F 0E                    testp   zf               ;
0110 98                    b       key002           ;
                  ;
0111 18                    inc     1
0112 3F29                  st      a,keynd          ;
0114 3C0E                  ld      a,keysc          ;
0116 3F2A                  st      a,keynn          ;
                  ;
0118 2F1E         key002:  add     keysc,£1         ;
011A 2E3E                  cmpr    keysc,£h'3       ;
011C B2                    b       key003           ;
                  ;
011D 2CF5                  out     £h'f,%op05       ;
011F 3B74                  clr     %op04,3          ;
                  ;
0121 2300                  call    keyt
                  ;
0123 3A27                  in      %ip07,a          ;
0125 3B34                  set     %op04,3          ;
                  ;
0127 DF                    cmpr    a,£h'f           ;
0128 0E                    testp   zf               ;
0129 B6                    b       key004           ;
                  ;
012A 18                    inc     1
012B 3F29                  st      a,keynd
012D 3C0E                  ld      a,keysc
012F 3F2A                  st      a,keynn
0131 B6                    b       key004
                  ;
0132 30           key003:  xch     a,h
0133 05                    rolc    a
0134 87                    b       key001
0135 87                    b       key001
                  ;
0136 30           key004:  xch     a,h
0137 3C29                  ld      a,keynd
                  ;
0139 DF                    cmpr    a,£h'f
013A 0E                    testp   zf               ;
013B 617D                  b       key005           ; key released
                  ;
013D 3891                  cmpr    1,£h'1           ;
013F 0E                    testp   zf               ;

ROM PAGE NO. 5

0140 82                    b       key020           ;
0141 B3                    b       key006           ;
                  ;
0142 3C29         key020:  ld      a,keynd
                  ;
0144 DE                    cmpr    a,£h'e
```

```
0145 0E                 testp   zf
0146 91                 b       key021
                ;
0147 DD                 cmpr    a,£h'd
0148 0E                 testp   zf
0149 91                 b       key021
                ;
014A DB                 cmpr    a,£h'b
014B 0E                 testp   zf
014C 91                 b       key021
                ;
014D D7                 cmpr    a,£h'7
014E 0E                 testp   zf
014F 91                 b       key021
0150 B3                 b       key006
                ;
0151 3C2B       key021: ld      a,keyod
0153 3E29               cmpr    a,keynd
0155 A8                 b       key007
                ;
0156 3C2C               ld      a,keyon
0158 3E2A               cmpr    a,keynn
015A A8                 b       key007
                ;
015B 39E0               testp   spuvsh,2
015D B8                 b       key022
                ;
                ;
015E 3985       key030: test    spuvsl,0        ;
0160 B2                 b       key010          ;
                ;
                ;
0161 2200               call    datact
                ;
0163 2250               call    keysb
                ;
                ;
0165 3945               clr     spuvsl,0        ;
0167 AA                 b       key008          ;
                ;
0168 3905       key007: set     spuvsl,0        ;
                ;
016A 3C29       key008: ld      a,keynd         ;
016C 3F2B               st      a,keyod         ;
016E 3C2A               ld      a,keynn         ;
0170 3F2C               st      a,keyon         ;
                ;
                ;
0172 2A         key010: ret                     ;return
                ;
0173 3945       key006: clr     spuvsl,0
0175 3920               set     spuvsh,2
0177 AA                 b       key008
                ;
0178 3905       key022: set     spuvsl,0
017A 3960               clr     spuvsh,2
017C AA                 b       key008
                ;
                ;
                ;
017D 3C2B       key005: ld      a,keyod         ;
                ;
017F DF                 cmpr    a,£h'f          ;

ROM PAGE NO. 6

0180 6168               b       key007          ;
                ;
0182 3985               test    spuvsl,0        ;
0184 616A               b       key008          ;
                ;
0186 3945               clr     spuvsl,0        ;
                ;
                ;
0188 3952               clr     spusl,1         ;
                ;
018A 6173               b       key006
                ;
                ;

ROM PAGE NO. 8
```

```
0200                          org     h'200
                    ;
0200 3C2A           datact:   ld      a,keynn          ;
0202 30                       xch     a,h              ;
                    ;
0203 10                       mov     h,a              ;
0204 DF                       cmpr    a,£h'f           ;
0205 0E                       testp   zf               ;
0206 AA                       b       data04           ;
                    ;
0207 3C29                     ld      a,keynd          ;
0209 5C                       test    a,0              ;
020A 9E                       b       data01           ;
                    ;
020B 5D                       test    a,1              ;
020C A2                       b       data02           ;
                    ;
020D 5E                       test    a,2              ;
020E A6                       b       data03           ;
                    ;
020F 30                       xch     a,h              ;
                    ;
0210 30             data05:   xch     a,h              ;
0211 4F                       ld      a,£h'f           ;
0212 3FFD                     st      a,dcm            ;
0214 3FFE           data06:   st      a,dch            ;
0216 10                       mov     h,a              ;
0217 3FFC                     st      a,dcl            ;
                    ;
0219 33                       ldl     a,@dc            ;
021A 31                       xch     a,l              ;
                    ;
021B 32                       ldh     a,@dc+           ;
021C 30                       xch     a,h              ;
                    ;
021D 2A             data10:   ret                      ;
                    ;
021E 30             data01:   xch     a,h              ;
021F 3824                     or      a,£h'4           ;
0221 90                       b       data05           ;
                    ;
0222 30             data02:   xch     a,h              ;
0223 3828                     or      a,£h'8           ;
0225 90                       b       data05           ;
                    ;
0226 30             data03:   xch     a,h              ;
0227 382C                     or      a,£h'c           ;
0229 90                       b       data05           ;
                    ;
022A 3C29           data04:   ld      a,keynd          ;
022C 30                       xch     a,h              ;
022D 4E                       ld      a,£h'e           ;
022E 3FFD                     st      a,dcm            ;
0230 4F                       ld      a,£h'f           ;
0231 94                       b       data06           ;
                    ;
0232
0232
                    ;
ROM PAGE NO. 9

0250                          org     h'250
                    ;
0250 2920           keysb:    xch     hl,kestbl
                    ;
0252 3C23                     ld      a,spusk
                    ;
0254 3912                     set     spusl,1                  ; key currently dep
ression
                    ;
0256 D5                       cmpr    a,£h'5
0257 0E                       testp   zf
0258 AC                       b       keysb4
                    ;
0259 3902                     set     spusl,0                  ; new character ava
ilable
                    ;
025B 390F                     set     servrc,0                 ; service request
                    ;
025D 08                       inc     a
                    ;
025E 3F23                     st      a,spusk
```

```
                ;
0260 05                 rolc    a
                ;
0261 383E               and     a,£h'e
                ;
0263 31                 xch     a,l
                ;
0264 C4                 ld      h,£h'4
                ;
0265 3C20               ld      a,kestbl
0267 0F                 st      a,@hl
                ;
0268 18                 inc     l
                ;
0269 3C21               ld      a,kestbh
026B 0F                 st      a,@hl
                ;
026C 2A         keysb4: ret
                ;

ROM PAGE NO.12

0300                    org     h'300
                ;
                ; keyt routine
                ;
0300 3FCB       keyt:   st      a,keytb
                ;
0302 40                 ld      a,£h'0
                ;
0303 08         keyt0:  inc     a
0304 00                 nop
0305 00                 nop
0306 00                 nop
0307 0E                 testp   zf
0308 8A                 b       keyt1
                ;
0309 83                 b       keyt0
                ;
030A 3CCB       keyt1:  ld      a,keytb
                ;
030C 2A                 ret
                ;
                ;
                ;
                ;;;
                ;;;
                ;;;
                ;;;

ROM PAGE NO.12

0315                    org     h'315
                ;
                ; ledd
                ;
0315 10         ledd:   mov     h,a
                ;
0316 5F                 test    a,3
0317 99                 b       ledd01
0318 A8                 b       ledd00
                ;
                ; ascii code
                ;
0319 3804       ledd01: add     a,£h'4
031B 3FFD               st      a,dcm
031D 4F                 ld      a,£h'f
031E 3FFE               st      a,dch
0320 31                 xch     a,l
0321 3FFC               st      a,dcl
                ;
0323 33                 ldl     a,@dc
0324 31                 xch     a,l
                ;
0325 32                 ldh     a,@dc+
0326 30                 xch     a,h
                ;
0327 2A                 ret
                ;
                ;
                ; for each sequement
                ;
```

```
0328 2920      ledd00: xch     hl,kestbl
               ;
032A E0                ld      l,£0
032B C2                ld      h,£2
               ;
032C 4F                ld      a,£h'f
032D 1F                xor     a,@hl
               ;
032E 0F                st      a,@hl
               ;
032F 18                inc     l
0330 4F                ld      a,£h'f
               ;
0331 1F                xor     a,@hl
0332 0F                st      a,@hl
               ;
0333 2920              xch     hl,kestbl
               ;
0335 2A                ret
               ;
               ;
               ;
               ;;;
               ;;;
               ;;;

ROM PAGE NO.13

0350                   org     h'350
               ;
               ; flash routine
               ;
0350 3C35      flash:  ld      a,ldatm1
0352 3F39              st      a,ldasm1
0354 3C36              ld      a,ldatm2
0356 3F3A              st      a,ldasm2
0358 3C37              ld      a,ldatl1
035A 3F3B              st      a,ldasl1
035C 3C38              ld      a,ldatl2
035E 3F3C              st      a,ldasl2
               ;
0360 3C33              ld      a,displw
0362 5C                test    a,0
0363 A9                b       flash0                          ; msd not flashing
               ;
               ; msd flashing
               ;
0364 4F                ld      a,£h'f
0365 3F39              st      a,ldasm1
0367 3F3A              st      a,ldasm2
               ;
0369 3C33      flash0: ld      a,displw
036B 5D                test    a,1
036C B2                b       flash1                          ; lsd not flashing
               ;
               ; lsd flashing
               ;
036D 4F                ld      a,£h'f
036E 3F3B              st      a,ldasl1
0370 3F3C              st      a,ldasl2
               ;
0372 3C34      flash1: ld      a,dispiw
0374 5D                test    a,1
0375 63AC              b       flas30                          ; indicator 'off'
               ;
0377 5C                test    a,0
0378 6393              b       flas20                          ; indicator 'on'
               ;
               ;
               ; indicator flashing
               ;
037A 3C36              ld      a,ldatm2
037C 3837              and     a,£0111b
037E 3F36              st      a,ldatm2
               ;

ROM PAGE NO.14

0380 3C38              ld      a,ldatl2
0382 3837              and     a,£0111b
0384 3F38              st      a,ldatl2                        ; indicator 'on' pe
riod
```

```
                    ;
0386 3C3A                   ld      a,ldasm2
0388 3828                   or      a,£1000b
038A 3F3A                   st      a,ldasm2
                    ;
038C 3C3C                   ld      a,ldasl2
038E 3828                   or      a,£1000b
0390 3F3C                   st      a,ldasl2                ; indicator 'off' p
eriod
                    ;
0392 2A                     ret
                    ;
                    ;
                    ;
                    ; indicator 'on'
                    ;
0393 3C36           flas20: ld      a,ldatm2
0395 3837                   and     a,£0111b
0397 3F36                   st      a,ldatm2
                    ;
0399 3C38                   ld      a,ldatl2
039B 3837                   and     a,£0111b
039D 3F38                   st      a,ldatl2
                    ;
039F 3C3A                   ld      a,ldasm2
03A1 3837                   and     a,£0111b
03A3 3F3A                   st      a,ldasm2
                    ;
03A5 3C3C                   ld      a,ldasl2
03A7 3837                   and     a,£0111b
03A9 3F3C                   st      a,ldasl2
                    ;
03AB 2A                     ret
                    ;
                    ; indicator 'off'
                    ;
03AC 3C36           flas30: ld      a,ldatm2
03AE 3828                   or      a,£1000b
03B0 3F36                   st      a,ldatm2
                    ;
03B2 3C38                   ld      a,ldatl2
03B4 3828                   or      a,£1000b
03B6 3F38                   st      a,ldatl2
                    ;
03B8 3C3A                   ld      a,ldasm2
03BA 3828                   or      a,£1000b
03BC 3F3A                   st      a,ldasm2
                    ;
03BE 3C3C                   ld      a,ldasl2

ROM PAGE NO.15

03C0 3828                   or      a,£1000b
03C2 3F3C                   st      a,ldasl2
                    ;
03C4 2A                     ret
                    ;
                            end

ASSEMBLY COMPLETE,      0 PROGRAM ERROR(S)
```

SYMBOL TABLE

| | | | | | | | |
|---|---|---|---|---|---|---|---|
| * COMMAD | 0013 | * COMMAH | 0015 | * COMMAL | 0014 | DATA01 | 021E |
| DATA02 | 0222 | DATA03 | 0226 | DATA04 | 022A | DATA05 | 0210 |
| DATA06 | 0214 | * DATA0H | 0081 | * DATA0L | 0080 | * DATA10 | 021D |
| * DATA1H | 0083 | * DATA1L | 0082 | * DATA2H | 0085 | * DATA2L | 0084 |
| * DATA3H | 0087 | * DATA3L | 0086 | * DATA4H | 0089 | * DATA4L | 0088 |
| DATACT | 0200 | DCH | 00FE | DCL | 00FC | DCM | 00FD |
| * DISPA | 0032 | * DISPH | 0031 | DISPIW | 0034 | * DISPL | 0030 |
| DISPLW | 0033 | FLAS20 | 0393 | FLAS30 | 03AC | * FLASH | 0350 |
| FLASH0 | 0369 | FLASH1 | 0372 | * INCOTH | 008C | * INCOTL | 008A |
| * INCOTM | 008B | * KEST | 0022 | KEST0H | 0043 | KEST0L | 0042 |
| * KEST1H | 0045 | * KEST1L | 0044 | * KEST2H | 0047 | * KEST2L | 0046 |
| * KEST3H | 0049 | * KEST3L | 0048 | * KEST4H | 004B | * KEST4L | 004A |
| * KEST5H | 004D | * KEST5L | 004C | KESTBH | 0021 | KESTBL | 0020 |
| KEY001 | 0107 | KEY002 | 0118 | KEY003 | 0132 | KEY004 | 0136 |
| KEY005 | 017D | KEY006 | 0173 | KEY007 | 0168 | KEY008 | 016A |
| KEY010 | 0172 | KEY020 | 0142 | KEY021 | 0151 | KEY022 | 0178 |
| * KEY030 | 015E | KEYND | 0029 | KEYNN | 002A | KEYOD | 002B |
| KEYON | 002C | * KEYS | 0100 | KEYSB | 0250 | KEYSB4 | 026C |
| KEYSC | 000E | KEYT | 0300 | KEYT0 | 0303 | KEYT1 | 030A |
| KEYTB | 00CB | * LCICOT | 000D | LDASL1 | 003B | LDASL2 | 003C |

```
  LDASM1  0039     LDASM2  003A     LDATL1  0037     LDATL2  0038
  LDATM1  0035     LDATM2  0036   * LDISP   0B00   * LECOTH  008F
* LECOTL  008D   * LECOTM  008E   * LEDD    0315     LEDD00  0328
  LEDD01  0319   * LIOVF1  0600   * LIOVF2  0D00   * LMAIN   03E0
* LREMO   0E00   * LTABLE  0000   * LVLFEX  0C00   * OVER2A  0072
* OVER2H  0071   * OVER2L  0070   * OVERA1  0012   * OVERH1  0011
* OVERL1  0010   * PARITT  000C   * PARITY  000B   * READC   0028
* READN   0027   * REMD0   0060   * REMD1   0061   * REMD2   0062
* REMD3   0063   * REMD4   0064   * REMD5   0065   * REMD6   0066
* REMD7   0067   * REMOA   006A   * REMOH   0069   * REMOL   0068
* RKCE    0050     RKCE0   006C     RKCE1   0071     RKCE2   0078
* RKCE3   007F     RKCE4   006B     RKCE5   0058   * RNH     006B
* RNL     006D   * RNM     006C   * RWRPCH  00CA   * RWRPCL  00C8
* RWRPCM  00C9     SERVRC  000F     SPUCP   0024     SPUFF   0017
* SPUSH   0003     SPUSK   0023     SPUSL   0002   * SPUVDM  0004
  SPUVSH  0000     SPUVSL  0005   * SPUVUM  0001   * SPW     00FF
* SPWB    00C7   * TIMR2H  00FA   * TIMR2L  00F8   * TIMR2M  00F9
* TIMRHN  00F6   * TIMRHO  001B   * TIMRLN  00F4   * TIMRLO  0019
* TIMRMN  00F5   * TIMRMO  001A   * VLFC    000A   * VLFEC   0016
* VLFRB   0009   * VLFTB   0008   * VLFTH   0007   * VLFTL   0006
* VLFXA   0052   * VLFXH   0051   * VLFXL   0050   * WARPCL  00C4
* WARPCM  00C5   * WRITEH  0026   * WRITEN  0025

DEFINED    167 USER SYMBOL(S)
  LOC  OBJ       LINE         SOURCE STATEMENT

                   1 ;-------------------------------;
                   2 ;                               ;
                   3 ;        data table             ;
                   4 ;                               ;
                   5 ;-------------------------------;
                   6 ;
                   7 ; command coding table
                   8 ;

  ROM PAGE NO.60

  0F20             9         org     h'f20
                  10 ;
  0F20 01         11         data    h'01          ; '00' read status
  0F21 10         12         data    h'10          ; '01' indicator power cont
rol
  0F22 10         13         data    h'10          ; '02' indicator mode
  0F23 10         14         data    h'10          ; '03' device input control
  0F24 10         15         data    h'10          ; '04' device output contro
l
  0F25 10         16         data    h'10          ; '05' power relay control
  0F26 00         17         data    h'00          ; '06' clear display
  0F27 10         18         data    h'10          ; '07' device disolay contr
ol
                  19 ;
  0F28 10         20         data    h'10          ; '08' insert character
  0F29 02         21         data    h'02          ; '09' read device data
  0F2A 20         22         data    h'20          ; '0a' display character at
 specified position
  0F2B 0F         23         data    h'0f          ; '0b' conditional poll
  0F2C 00         24         data    h'00          ; blank
  0F2D 00         25         data    h'00          ; blank
  0F2E 00         26         data    h'00          ; blank
  0F2F 00         27         data    h'00          ; blank
                  28 ;
  0F30 00         29         data    h'00          ; blank
  0F31 00         30         data    h'00          ; blank
  0F32 00         31         data    h'00          ; blank
  0F33 00         32         data    h'00          ; blank
  0F34 00         33         data    h'00          ; blank
  0F35 00         34         data    h'00          ; blank
  0F36 00         35         data    h'00          ; blank
  0F37 00         36         data    h'00          ; blank
                  37 ;
  0F38 00         38         data    h'00          ; blank
  0F39 00         39         data    h'00          ; blank
  0F3A 00         40         data    h'00          ; blank
  0F3B 00         41         data    h'00          ; blank
  0F3C 00         42         data    h'00          ; blank
  0F3D 00         43         data    h'00          ; blank
  0F3E 00         44         data    h'00          ; blank
  0F3F 20         45         data    h'20          ; command expansion
                  46 ;
                  47 ;
                  48 ; ascii coding
                  49 ;

  ROM PAGE NO.61
```

```
0F40               org     h'f40
                ;
                ; f40-f4f
                ;
                ;
                ;   f40 -f6f -> h'ff 'blank'
                ;
0F40 FF                 data    h'ff
0F41 FF                 data    h'ff
0F42 FF                 data    h'ff
0F43 FF                 data    h'ff
0F44 FF                 data    h'ff
0F45 FF                 data    h'ff
0F46 FF                 data    h'ff
0F47 FF                 data    h'ff
                ;
0F48 FF                 data    h'ff
0F49 FF                 data    h'ff
0F4A FF                 data    h'ff
0F4B FF                 data    h'ff
0F4C FF                 data    h'ff
0F4D FF                 data    h'ff
0F4E FF                 data    h'ff
0F4F FF                 data    h'ff
                ;
                ; f50-f5f
                ;
0F50 FF                 data    h'ff
0F51 FF                 data    h'ff
0F52 FF                 data    h'ff
0F53 FF                 data    h'ff
0F54 FF                 data    h'ff
0F55 FF                 data    h'ff
0F56 FF                 data    h'ff
0F57 FF                 data    h'ff
                ;
0F58 FF                 data    h'ff
0F59 FF                 data    h'ff
0F5A FF                 data    h'ff
0F5B FF                 data    h'ff
0F5C FF                 data    h'ff
0F5D FF                 data    h'ff
0F5E FF                 data    h'ff
0F5F FF                 data    h'ff
                ;
                ; f60-f6f
                ;
0F60 FF                 data    h'ff
0F61 FF                 data    h'ff
0F62 FF                 data    h'ff
0F63 FF                 data    h'ff
0F64 FF                 data    h'ff
0F65 FF                 data    h'ff
0F66 FF                 data    h'ff
0F67 FF                 data    h'ff
                ;
0F68 FF                 data    h'ff
0F69 FF                 data    h'ff
0F6A FF                 data    h'ff
0F6B FF                 data    h'ff
0F6C FF                 data    h'ff
0F6D FF                 data    h'ff
0F6E FF                 data    h'ff
0F6F FF                 data    h'ff
                ;
                ; f70-f7f
                ;
0F70 C0                 data    h'c0     ; 0
0F71 F9                 data    h'f9     ; 1
0F72 A4                 data    h'a4     ; 2
0F73 B0                 data    h'b0     ; 3
0F74 99                 data    h'99     ; 4
0F75 92                 data    h'92     ; 5
0F76 82                 data    h'82     ; 6
0F77 D8                 data    h'd8     ; 7
                ;
0F78 80                 data    h'80     ; 8
0F79 90                 data    h'90     ; 9
0F7A FF                 data    h'ff     ; blank
0F7B C9                 data    h'c9     ; 11
0F7C FF                 data    h'ff     ; blank
0F7D B7                 data    h'b7     ; =
```

```
0F7E FF          data   h'ff   ; blank
0F7F FF          data   h'ff   ; blank
               ;
               ; f80-f8f
               ;

ROM PAGE NO.62

0F80 FF          data   h'ff   ; blank
0F81 88          data   h'88   ; A
0F82 83          data   h'83   ; b
0F83 C6          data   h'c6   ; C
0F84 A1          data   h'a1   ; d
0F85 86          data   h'86   ; E
0F86 8E          data   h'8e   ; F
0F87 82          data   h'82   ; G
               ;
0F88 89          data   h'89   ; H
0F89 CF          data   h'cf   ; I
0F8A E1          data   h'e1   ; J
0F8B FF          data   h'ff   ; blank
0F8C C7          data   h'c7   ; L
0F8D FF          data   h'ff   ; blank
0F8E FF          data   h'ff   ; blank
0F8F C0          data   h'c0   ; O
               ;
               ; f90-f9f
               ;
0F90 8C          data   h'8c   ; P
0F91 FF          data   h'ff   ; blank
0F92 AF          data   h'af   ; r
0F93 92          data   h'92   ; S
0F94 FF          data   h'ff   ; blank
0F95 C1          data   h'c1   ; U
0F96 FF          data   h'ff   ; blank
0F97 FF          data   h'ff   ; blank
               ;
0F98 FF          data   h'ff   ; blank
0F99 FF          data   h'ff   ; blank
0F9A FF          data   h'ff   ; blank
0F9B FF          data   h'ff   ; blank
0F9C FF          data   h'ff   ; blank
0F9D FF          data   h'ff   ; blank
0F9E FF          data   h'ff   ; blank
0F9F BF          data   h'bf   ; blank
               ;
               ; fa0-faf
               ;
0FA0 FF          data   h'ff   ; blank
0FA1 88          data   h'88   ; A
0FA2 83          data   h'83   ; b
0FA3 C6          data   h'c6   ; C
0FA4 A1          data   h'a1   ; d
0FA5 86          data   h'86   ; E
0FA6 8E          data   h'8e   ; F
0FA7 82          data   h'82   ; G
               ;
0FA8 89          data   h'89   ; H
0FA9 CF          data   h'cf   ; I
0FAA E1          data   h'e1   ; J
0FAB FF          data   h'ff   ; blank
0FAC C7          data   h'c7   ; L
0FAD FF          data   h'ff   ; blank
0FAE FF          data   h'ff   ; blank
0FAF C0          data   h'c0   ; O
               ;
               ; fb0-fbf
               ;
0FB0 8C          data   h'8c   ; P
0FB1 FF          data   h'ff   ; blank
0FB2 AF          data   h'af   ; r
0FB3 92          data   h'92   ; S
0FB4 FF          data   h'ff   ; blank
0FB5 C1          data   h'c1   ; blank
0FB6 FF          data   h'ff   ; blank
0FB7 FF          data   h'ff   ; blank
               ;
0FB8 FF          data   h'ff   ; blank
0FB9 FF          data   h'ff   ; blank
0FBA FF          data   h'ff   ; blank
0FBB FF          data   h'ff   ; blank
0FBC FF          data   h'ff   ; blank
```

```
0FBD FF          data   h'ff    ; blank
0FBE FF          data   h'ff    ; blank
0FBF FF          data   h'ff    ; blank
               ;
               ;
               ;*remote control data
               ;
ROM PAGE NO.63

0FC0             org    h'fc0
               ;
0FC0 FF          data   h'ff
0FC1 FF          data   h'ff
0FC2 FF          data   h'ff
0FC3 FF          data   h'ff
0FC4 13          data   h'13    ; on / off
0FC5 11          data   h'11    ; event
0FC6 FF          data   h'ff
0FC7 16          data   h'16    ; clear
0FC8 FF          data   h'ff
0FC9 FF          data   h'ff
0FCA FF          data   h'ff
0FCB FF          data   h'ff
0FCC FF          data   h'ff
0FCD 12          data   h'12    ; auth
0FCE FF          data   h'ff
0FCF 17          data   h'17    ; send
               ;
0FD0 FF          data   h'ff
0FD1 38          data   h'38    ; 8
0FD2 34          data   h'34    ; 4
0FD3 10          data   h'10    ; +
0FD4 32          data   h'32    ; 2
0FD5 14          data   h'14    ; -
0FD6 36          data   h'36    ; 6
0FD7 FF          data   h'ff
0FD8 31          data   h'31    ; 1
0FD9 39          data   h'39    ; 9
0FDA 35          data   h'35    ; 5
0FDB FF          data   h'ff
0FDC 33          data   h'33    ; 3
0FDD 30          data   h'30    ; 0
0FDE 37          data   h'37    ; 7
0FDF 15          data   h'15    ; scan
               ;
               ;
ROM PAGE NO.63

0FE7             org    h'fe7
               ;
               ;* keyscan data
               ;
0FE7 37          data   h'37            ; '7'
0FE8 00          data   h'00            ;
0FE9 00          data   h'00            ;
0FEA 00          data   h'00            ; no use
0FEB 32          data   h'32            ; '2'
0FEC 00          data   h'00            ; no use
0FED 34          data   h'34            ; '4'
0FEE 13          data   h'13            ; 'on/off'
0FEF 00          data   h'00            ; no use
0FF0 14          data   h'14            ; '-'
0FF1 15          data   h'15            ; pc/fc scan
0FF2 16          data   h'16            ; 'c'
0FF3 36          data   h'36            ; '6'
0FF4 17          data   h'17            ; s/send
0FF5 00          data   h'00            ; no use
0FF6 00          data   h'00            ; no use
0FF7 12          data   h'12            ; a/auth
0FF8 10          data   h'10            ; '+'
0FF9 11          data   h'11            ; e/event
0FFA 35          data   h'35            ; '5'
0FFB 33          data   h'33            ; '3'
0FFC 30          data   h'30            ; '0'
0FFD 39          data   h'39            ; '9'
0FFE 38          data   h'38            ; '8'
0FFF 31          data   h'31            ; '1'
               ;
               ;
                 end

ASSEMBLY COMPLETE,      0 PROGRAM ERROR(S)
DEFINED     0 USER SYMBOL(S)
```

```
LOC  OBJ      LINE      SOURCE STATEMENT

                 ;-----------------------------------------------------;
                 ;                                            7.1983.  ;
                 ;        ldisp.asm        V1.0                        ;
                 ;                               (TMP4740P)            ;
                 ;                                                     ;
                 ;               display      routine                  ;
                 ;                                                     ;
                 ;                                                     ;
                 ;-----------------------------------------------------;

                 $nolist

                 $list

                 ;
                 ;

ROM PAGE NO.44

0B00                     org     h'b00
                 ;
                 ; interrupts enable
                 ;
0B00 3F32                st      a,dispa
0B02 44                  ld      a,£0100b
0B03 13                  xch     a,eir
0B04 366F                eiclr   il,101111b
                 ;
                 ;
                 ;
                 ;  push register
                 ;
                 ;
0B06 2930                xch     hl,displ
                 ;
                 ;  count up led counter
                 ;
0B08 3C8D                ld      a,lecotl
0B0A 08                  inc     a
0B0B 3F8D                st      a,lecotl
                 ;
0B0D D0                  cmpr    a,£h'0
0B0E B3                  b       displ0
                 ;
0B0F 3C8E                ld      a,lecotm
0B11 08                  inc     a
0B12 3F8E                st      a,lecotm
                 ;
0B14 D0                  cmpr    a,£h'0
0B15 B3                  b       displ0
                 ;
0B16 3C8F                ld      a,lecoth
0B18 08                  inc     a
0B19 3F8F                st      a,lecoth
                 ;
0B1B D0                  cmpr    a,£h'0
0B1C B3                  b       displ0
                 ;
                 ;
                 ;  counter over flow
                 ;
                 ;
0B1D 4F                  ld      a,£h'f
0B1E 3F8F                st      a,lecoth
0B20 43                  ld      a,£h'3
0B21 3F8E                st      a,lecotm
0B23 40                  ld      a,£h'0
0B24 3F8D                st      a,lecotl
                 ;
0B26 3C33                ld      a,displw                ; invert flag
0B28
0B28 5E                  test    a,2
0B29 AF                  b       displ2
                 ;
0B2A 383B                and     a,£1011b
                 ;
0B2C 3F33                st      a,displw                ; '1'->'0'
0B2E B3                  b       displ0
```

```
                    363 ;
0B2F 3824           364 displ2: or      a,£0100b
0B31 3F33           365         st      a,displw                        ; '0'->'1'
                    366 ;
                    367 ;
                    368 ;  led "on"
                    369 ;
                    370 ;
0B33 3C33           371 displ0: ld      a,displw
0B35 5E             372         test    a,2
0B36 6B63           373         b       displ1                          ; imaginaly part
                    374 ;
                    375 ;
                    376 ; real part
                    377 ;
                    378 ;
                    379 ;
                    380 ; lsd 'on'
                    381 ;
0B38 5F             382         test    a,3                             ;
0B39 6B4F           383         b       displ3                          ; lsd 'on'
                    384 ;
                    385 ; msd 'on'
                    386 ;
0B3B 3837           387         and     a,£0111b
0B3D 3F33           388         st      a,displw
0B3F 3C35           389         ld      a,ldatm1
ROM PAGE NO.45 *

0B41 3AA1           390         out     a,%op01
0B43 3C36           391         ld      a,ldatm2
0B45 3AA2           392         out     a,%op02
0B47 3B56           393         clr     %op06,1
0B49 3B26           394         set     %op06,2
                    395 ;
0B4B 3925           396         set     spuvsl,2                        ; 'keyscan ready' o
n
                    397 ;
0B4D 6B89           398         b       dispi0
                    399 ;
                    400 ; lsd 'on'
                    401 ;
0B4F 3828           402 displ3: or      a,£1000b
0B51 3F33           403         st      a,displw
                    404 ;
0B53 3C37           405         ld      a,ldatl1
0B55 3AA1           406         out     a,%op01
0B57 3C38           407         ld      a,ldatl2
0B59 3AA2           408         out     a,%op02
0B5B 3B16           409         set     %op06,1
0B5D 3B66           410         clr     %op06,2
                    411 ;
0B5F 6B89           412         b       dispi0
                    413 ;
                    414 ;
                    415 ;  imaginaly part
                    416 ;
                    417 ;
                    418 ; key scan ready
                    419 ;
0B61 3925           420         set     spuvsl,2
                    421 ;
0B63 5F             422 displ1: test    a,3
0B64 B9             423         b       displ4
                    424 ;
                    425 ; msd 'on'
                    426 ;
0B65 3837           427         and     a,£0111b
0B67 3F33           428         st      a,displw
                    429 ;
0B69 3C39           430         ld      a,ldasm1
0B6B 3AA1           431         out     a,%op01
0B6D 3C3A           432         ld      a,ldasm2
0B6F 3AA2           433         out     a,%op02
                    434 ;
0B71 3B26           435         set     %op06,2
0B73 3B56           436         clr     %op06,1
                    437 ;
0B75 3925           438         set     spuvsl,2                        ; key scan ready
                    439 ;
0B77 6B89           440         b       dispi0
                    441 ;
                    442 ; lsd 'on'
```

```
                          ;
0B79 3828          displ4: or       a,£1000b
0B7B 3F33                  st       a,displw
                          ;
0B7D 3C3B                  ld       a,ldasl1
0B7F 3AA1                  out      a,%op01

ROM PAGE NO.46 *

0B81 3C3C                  ld       a,ldasl2
0B83 3AA2                  out      a,%op02
                          ;
0B85 3B16                  set      %op06,1
0B87 3B66                  clr      %op06,2
                          ;
                          ;
                          ;  return
                          ;
                          ;
0B89 2930          displ0: xch      hl,displ
                          ;
0B8B 47                    ld       a,£h'7
                          ;
0B8C 36AF                  diclr    il,101111b
                          ;
0B8E 3C1C                  ld       a,eirb
0B90 13                    xch      a,eir
0B91 3C32                  ld       a,dispa
                          ;
0B93 2B                    reti
                          ;
                           end

ASSEMBLY COMPLETE,        0 PROGRAM ERROR(S)
```

SYMBOL TABLE

```
* COMMAD   0013   * COMMAH   0015   * COMMAL   0014   * DATA0H   0081
* DATA0L   0080   * DATA1H   0083   * DATA1L   0082   * DATA2H   0085
* DATA2L   0084   * DATA3H   0087   * DATA3L   0086   * DATA4H   0089
* DATA4L   0088   * DATACT   0200   * DCH      00FE   * DCL      00FC
* DCM      00FD     DISPA    0032   * DISPH    0031     DISPI0   0B89
* DISPIW   0034     DISPL    0030     DISPL0   0B33     DISPL1   0B63
  DISPL2   0B2F     DISPL3   0B4F     DISPL4   0B79     DISPLW   0033
  EIRB     001C   * FLASH    0350   * INCOTH   008C   * INCOTL   008A
* INCOTM   008B   * KEST     0022   * KEST0H   0043   * KEST0L   0042
* KEST1H   0045   * KEST1L   0044   * KEST2H   0047   * KEST2L   0046
* KEST3H   0049   * KEST3L   0048   * KEST4H   004B   * KEST4L   004A
* KEST5H   004D   * KEST5L   004C   * KESTBH   0021   * KESTBL   0020
* KEYND    0029   * KEYNN    002A   * KEYOD    002B   * KEYON    002C
* KEYS     0100   * KEYSB    0250   * KEYSC    000E   * KEYT     0300
* KEYTB    00CB   * LCICOT   000D     LDASL1   003B     LDASL2   003C
  LDASM1   0039     LDASM2   003A     LDATL1   0037     LDATL2   0038
  LDATM1   0035     LDATM2   0036     LECOTH   008F     LECOTL   008D
  LECOTM   008E   * LEDD     0310   * LIOVF1   0600   * LIOVF2   0D00
* LMAIN    03E0   * LREMO    0E00   * LVLFEX   0C00   * OVER2A   0072
* OVER2H   0071   * OVER2L   0070   * OVERA1   0012   * OVERH1   0011
* OVERL1   0010   * PARITT   000C   * PARITY   000B   * READC    0028
* READN    0027   * REMD0    0060   * REMD1    0061   * REMD2    0062
* REMD3    0063   * REMD4    0064   * REMD5    0065   * REMD6    0066
* REMD7    0067   * REMOA    006A   * REMOH    0069   * REMOL    0068
* RKCE     0050   * RNH      006B   * RNL      006D   * RNM      006C
* RWRPCH   00CA   * RWRPCL   00C8   * RWRPCM   00C9   * SERVRC   000F
* SPUCP    0024   * SPUSH    0003   * SPUSK    0023   * SPUSL    0002
* SPUVDM   0004   * SPUVSH   0000     SPUVSL   0005   * SPUVUM   0001
* SPW      00FF   * SPWB     00C7   * TABLE    0000   * TIMR2H   00FA
* TIMR2L   00F8   * TIMR2M   00F9   * TIMRHN   00F6   * TIMRHO   001B
* TIMRLN   00F4   * TIMRLO   0019   * TIMRMN   00F5   * TIMRMO   001A
* VLFC     000A   * VLFEC    0016   * VLFRB    0009   * VLFTB    0008
* VLFTH    0007   * VLFTL    0006   * VLFXA    0052   * VLFXH    0051
* VLFXL    0050   * WARPCL   00C4   * WARPCM   00C5   * WRITEH   0026
* WRITEN   0025

DEFINED    137 USER SYMBOL(S)
LOC  OBJ       LINE        SOURCE STATEMENT

  ;---------------------------------------------------------------;
  ;                                                       7.1983. ;
  ;          ltable.asm        V1.0                               ;
  ;                                  (TMP4740P)                   ;
  ;                                                               ;
  ;               table          routine                          ;
  ;                                                               ;
  ;                                                               ;
  ;---------------------------------------------------------------;
```

```
$nolist

$list

                 27 ;

ROM PAGE NO. 0

0000             28         org      h'000
0000 63E0        29         b        lmain
                 30 ;
0002 6C00        31         b        lvlfex
                 32 ;
0004 2B          33         reti
0005 00          34         nop
                 35 ;
0006 6600        36         b        liovf1
                 37 ;
0008 6D00        38         b        liovf2
                 39 ;
000A 6B00        40         b        ldisp
                 41 ;
000C 6E00        42         b        lremo
                 43 ;
                 44         end

ASSEMBLY COMPLETE,      0 PROGRAM ERROR(S)
                         SYMBOL TABLE

 LDISP   0B00    LIOVF1  0600    LIOVF2  0D00    LMAIN   03E0
 LREMO   0E00    LVLFEX  0C00

DEFINED     6 USER SYMBOL(S)

  LOC  OBJ      LINE        SOURCE STATEMENT

                  1 ;-----------------------------------------------------;
                  2 ;                                             7.1983. ;
                  3 ;        liovf2.asm       V1.0                        ;
                  4 ;                                (TMP4740P)           ;
                  5 ;                                                     ;
                  6 ;               remote con.      routine              ;
                  7 ;                                                     ;
                  8 ;                                                     ;
                  9 ;-----------------------------------------------------;

$nolist

$list

                268 ;

ROM PAGE NO.52

0D00            269         org      h'd00
                270 ;
                271 ;
                272 ;
                273 ; push register
                274 ;
                275 ;
0D00 3F72       276         st       a,over2a
0D02 44         277         ld       a,£0100b
0D03 13         278         xch      a,eir
0D04 366F       279         eiclr    il,101111b
0D06 2970       280         xch      hl,over2l
                281 ;;
                282 ;;      timer2 stop
                283 ;;
0D08 40         284         ld       a,£0
0D09 3A8D       285         out      a,%opld
                286 ;;;;;;;;;;;;;;;;;;;;;;;;;;;;;;;;;;;;;;;;;;;;;;;;;;;;
                287 ;;;;;;;;;;;;;;;;;;;;;;;;;;;;;;;;;;;;;;;;;;;;;;;;;;;;
                288 ;
                289 ;;      check    N1  routine
                290 ;
0D0B 3C6B       291         ld       a,rnh
```

```
0D0D D1              cmpr    a,£1
0D0E 6D43            b       rem100      ; N1 was not '1'
          ;;
          ;;         N1=1
          ;;
0D10 3BD0            testp   %00,1       ; check port for remote
0D12 AF              b       rem200      ; port was '1' ,it was not
start bit
          ;
          ;;         it was start bit
          ;
0D13 42              ld      a,£2
0D14 3F6B            st      a,rnh       ; N2=2
          ;
          ;          setting timer2
0D16 3B06            set     %op06,0
0D18 4F              ld      a,£h'f
0D19 3FFA            st      a,timr2h
0D1B 4D              ld      a,£h'd
0D1C 3FF9            st      a,timr2m
0D1E 47              ld      a,£7
0D1F 3FF8            st      a,timr2l
          ;;
0D21 48              ld      a,£8
0D22 3A8D            out     a,%op1d     ; timer2 start
          ;;
          ;;;        return routine
          ;;
0D24 2970   rem300:  xch     hl,over2l
0D26 47              ld      a,£0111b
0D27 36AF            diclr   il,101111b
0D29 13              xch     a,eir
0D2A 3C72            ld      a,over2a
          ;;
0D2C 3B46            clr     %op06,0
0D2E 2B              reti
          ;
          ;;
0D2F 39F0   rem200:  testp   spuvsh,3    ;
0D31 B3              b       rem210
          ;
0D32 A4              b       rem300      ; jump to return routine
          ;
          ;
0D33 3B06   rem210:  set     %op06,0
0D35 4F              ld      a,£h'f
0D36 3FFA            st      a,timr2h
0D38 45              ld      a,£5
0D39 3FF9            st      a,timr2m
0D3B 4E              ld      a,£h'e
0D3C 3FF8            st      a,timr2l
          ;;
0D3E 48              ld      a,£8
0D3F 3A8D            out     a,%op1d
          ;;

ROM PAGE NO.53 *

0D41 6D24            b       rem300
          ;;;;;;;;;;;;;;;;;;;;;;;;;;
          ;;;;;;;;;;;;;;;;;;;;;;;;;;
          ;;;;;;;;;;;;;;;;;;;;;;;;;;
          ;
          ;
          ;          N1 was not '1'
          ;
0D43 3C6B   rem100:  ld      a,rnh
0D45 D0              cmpr    a,£0
0D46 0E              testp   zf
0D47 92              b       rem110
0D48 88     re1000:  b       re1000
          ;;
          ;
0D49 40     rem120:  ld      a,£0
0D4A 3F6B            st      a,rnh
0D4C 3F6C            st      a,rnm
0D4E 3F6D            st      a,rnl
          ;
0D50 6D24            b       rem300
          ;;;
          ;;;
          ;;;
```

```
0D52 39B0       370 rem110: test    spuvsh,3
0D54 89         371         b       rem120          ; F1 was not '1'
                372 ;
                373 ;       data creat routine
                374 ;
0D55 3970       375         clr     spuvsh,3
                376 ;
0D57 3952       377         clr     spusl,1         ; (key currently deprressed
 ) off
                378 ;
0D59 6D24       379         b       rem300          ; return
                380 ;
                381         end

ASSEMBLY COMPLETE,      0 PROGRAM ERROR(S)

                        SYMBOL TABLE

* COMMAD  0013   * COMMFC  0015   * COMMGR  0014   * DATACT  0200
* DCH     00FE   * DCL     00FC   * DCM     00FD   * DISPA   0032
* DISPH   0031   * DISPIW  0034   * DISPL   0030   * DISPLW  0033
* INCOTH  003B   * INCOTL  0039   * INCOTM  003A   * KEST    0043
* KEST0H  0023   * KEST0L  0022   * KEST1H  0025   * KEST1L  0024
* KEST2H  0027   * KEST2L  0026   * KEST3H  0029   * KEST3L  0028
* KEST4H  002B   * KEST4L  002A   * KESTBH  0041   * KESTBL  0040
* KEYND   002C   * KEYNN   002D   * KEYOD   002E   * KEYON   002F
* KEYS    0100   * KEYSB   0250   * KEYSC   000E   * KEYTB   00CB
* LCICOT  000D   * LDATL1  0037   * LDATL2  0038   * LDATM1  0035
* LDATM2  0036   * LDISP   0B00   * LECOTH  003E   * LECOTL  003C
* LECOTM  003D   * LIOVF1  0600   * LMAIN   03E0   * LREMO   0E00
* LVLFEX  0C00     OVER2A  0072   * OVER2H  0071     OVER2L  0070
* OVERA1  0012   * OVERH1  0011   * OVERL1  0010   * PARITT  000C
* PARITY  000B     RE1000  0D48     REM100  0D43     REM110  0D52
  REM120  0D49     REM200  0D2F     REM210  0D33     REM300  0D24
* REMD0   0060   * REMD1   0061   * REMD2   0062   * REMD3   0063
* REMD4   0064   * REMD5   0065   * REMD6   0066   * REMD7   0067
* REMOA   006A   * REMOH   0069   * REMOL   0068   * RKCE    0050
  RNH     006B     RNL     006D     RNM     006C   * RWRPCH  00CA
* RWRPCL  00C8   * RWRPCM  00C9   * SERVRC  000F   * SPUCP   0021
* SPUSH   0003   * SPUSK   0020     SPUSL   0002   * SPUVDM  0004
  SPUVSH  0000   * SPUVSL  0005   * SPUVUM  0001   * SPW     00FF
* SPWB    00C7   * TABLE   0000     TIMR2H  00FA     TIMR2L  00F8
  TIMR2M  00F9   * TIMRHN  00F6   * TIMRHO  001B   * TIMRLN  00F4
* TIMRLO  0019   * TIMRMN  00F5   * TIMRMO  001A   * VDATAH  0018
* VDATAL  0017   * VLFC    000A   * VLFEC   0016   * VLFRB   0009
* VLFTB   0008   * VLFTH   0007   * VLFTL   0006   * VLFXA   0052
* VLFXH   0051   * VLFXL   0050   * WARPCL  00C4   * WARPCM  00C5

DEFINED    116 USER SYMBOL(S)
```

APPENDIX D

```
LOCATION OBJECT CODE LINE      SOURCE LINE

              1 '8041'
              2 ;*****************************************************************************
              3 ;*                                                                           *
              4 ;*             8042   Drop Processor Main Routine                             *
              5 ;*                                                                           *
              6 ;*****************************************************************************
              7 ;       <<<<<<<<<<<<   Using Register  >>>>>>>>>>>>>>>>>>>
              8 ;                                   Bank 0
              9 ;R0 ------ General  Register   --Converter
             10 ;R1 ------ General  Register   --Used in drop poll map
             11 ;R2 ------ General  Register   --Converter
             12 ;R3 ------ Genelal  Register   --Converter   , Soft counter
             13 ;R4 ------ General  Register , RF cable switch ( Store cable num. )
             14 ;R5 ------ Counter  for  count 04 CMD
             15 ;R6 ------
             16 ;R7 ------ Interrupt routine start address
             17 ;----------------------------------------------------------------------------
             18 ;     <<<<<<<<<<<<  Port                  >>>>>>>>>>>>>>>>>>
             19 ;P1 <5> <4> <3> <2> <1> <0>    Subscriber  Select
             20 ;P1 <7>                        Test switch ( Reset out ( 15 us,10 us))
             21 ;P4 <3> <2> <1> <0>            Converter Control
             22 ;P5 <3> <2> <1>                Drop Scan Switch   S2,S1,S0
             23 ;P5 <4>                        VLF OUT
             24 ;P6 <3> <2> <1> <0>            Power Detect I
             25 ;P7 <1> <0>                                 II
             26 ;P7 <3> <2>                    ECU Address
             27 ;
             28 ;____________________________________________________________________________
```

```
                ;CODE               Address       Coment                                  pin out
<0009>          DAT_1       EQU     00001001B     ; Tuning data  '1'                          Q 1
<0001>          DAT_0       EQU     00000001B     ; Tuning data  '0'                          Q 1
<0008>          CLKDAT      EQU     00001000B     ; Clock data   '1'                          Q 0
<000A>          LODDAT      EQU     00001010B     ; Load pulse data  '1'                      Q 2
<0004>          PWRDT0      EQU     00000100B     ; Power off                                 Q 4
<000C>          PWRDT1      EQU     00001100B     ; Power on                                  Q 4
<0003>          CABL_A      EQU     00000011B     ; Cable Select A                            Q 3
<000B>          CABL_B      EQU     00001011B     ; Cable Select B                            Q 3
<000D>          DETDAT      EQU     00001101B     ; Power check                               Q 5
<0006>          CABL_C      EQU     00000110B     ; Cable Select C                            Q 6
<000E>          CABL_D      EQU     00001110B     ; Cable Select D                            Q 6
                ;
                ;----------  Valiable  constant    -------------------------
<0003>          COUNT_R5 EQU    3              ; 04:84 Priority label
                ;----------  Sub. Command constant  -------------------------
                ;DEVCNT     EQU     00H           ; Device control
                ;DSPCNT     EQU     01H           ; Device display control
                ;SETDAT     EQU     02H           ; Set data to device
                ;REDDAT     EQU     03H           ; Read data
                ;----------  Memory loc.  ----------------------------------
                ;Label          head addess       Comment
<0020>          PWRDET      EQU     20H           ; 01 Command
<0021>          CHANEL      EQU     21H           ; 03 Command
<0024>          SUBMES      EQU     24H           ; 04 Command SUB
<0025>          SNDMES      EQU     25H           ; 04 Command
<002D>          SUBPWR      EQU     2DH           ; 05 Command
<002F>          SUBSWT      EQU     2FH           ; 06 Command
<0031>          DRPPOL      EQU     31H           ; 07 Command
<0038>          DEVPOL      EQU     38H           ; 08 Command
<0056>          FOR84       EQU     56H           ; 84 Command
                ;-------------------------------------------------------------
                            ORG      0H
0000 15                     DIS      I                  ;  Disnable  ext interrupt
0001 0409                   JMP      START              ;  Start Address
                            ORG        3H               ;
0003 93                     RETR                        ;
                ;           ORG        7H               ;
                ;           JMP      TIMINT             ;  TIMER INT.
                ;-------------------------------------------------------------
                            ORG        09H
0009            START:
                ;
0009 237F                   MOV      A,#07FH            ;
000B 39                     OUTL     P1,A               ;  RESET PULSE FOR PERIFERAL PROCESSOR
000C 23FF                   MOV      A,#0FFH            ;
000E 39                     OUTL     P1,A               ;
                ;
000F F5                     EN       FLAGS              ;  enable flags IBF,OBF
0010 A5                     CLR      F1                 ;  F1 -- use for command header ( A0 )
0011 35         STARTU:     DIS      TCNTI              ;
0012 65                     STOP     TCNT               ;
                                                        ;======= Initialize ==============
                                                        ; 04 command buffer clear
0013 B826                   MOV      R0,#SNDMES+1       ;
0015 B040                   MOV      @R0,#040H          ;
                ;
                                                        ; 84 command buffer clear
0017 B857                   MOV      R0,#FOR84+1        ;
0019 B0FF                   MOV      @R0,#0FFH          ;
                ;
001B B81C                   MOV      R0,#01CH           ; register bank 1  R4
001D B031                   MOV      @R0,#DRPPOL        ;   Set Drop poll map head address
                ;                                       ;   for  interrupt initial start.
001F B831                   MOV      R0,#DRPPOL         ;
0021 BB07                   MOV      R3,#7              ;
0023 B0FF       INILP1:     MOV      @R0,#0FFH          ; Drop Poll Map initialization.
0025 18                     INC      R0                 ;
0026 EB23                   DJNZ     R3,INILP1          ;
                ;
0028 B838                   MOV      R0,#DEVPOL         ;
002A BA06                   MOV      R2,#6              ;
002C BB05       INILP2:     MOV      R3,#5              ; Device Poll Map initialization.
002E B0FF       INILP3:     MOV      @R0,#0FFH          ;
0030 18                     INC      R0                 ;
0031 EB2E                   DJNZ     R3,INILP3          ;
0033 EA2C                   DJNZ     R2,INILP2          ;
                ;
0035 BF04                   MOV      R7,#04H            ;  Initialize  address Register.
                                                        ;        for  interrupt routine starting
```

```
                  ;
0037 2304                  MOV    A,#PWRDT0        ;  All coverter switch off
0039 14D2                  CALL   ALLCNT           ;
003B 2303                  MOV    A,#CABL_H        ;
003D 14D2                  CALL   ALLCNT           ;
                  ;        MOV    A,#CABL_C        ;   Clear Subscriber data
                  ;        CALL   ALLCNT           ;
                  ;
003F 5454                  CALL   INIT_P           ;  Power detect line Initialization
                  ;
0041 C5                    SEL    RB0              ;
0042 230A                  MOV    A,#010           ;
0044 62                    MOV    T,A              ;  Timer counter set ' 010h '
0045 BD03                  MOV    R5,#COUNT_R5     ;
                  ;
0047 25                    EN     TCNTI            ;
0048 45                    STRT   CNT              ;  ==== initialize end =======
                  ;------------------------------------------------------------------
                  ;
0049 D676         START2:  JNIBF  CONT1            ;  IBF full ?
004B 7650                  JF1    START3           ;  ---
                  ;                                    Case of using command port
004D 22           START4:  IN     A,DBB            ;
004E 0449                  JMP    START2           ; Error  -- Data Comming ignored
                  ;
0050 A5           START3:  CLR    F1               ;  F1 flag clear
0051 22                    IN     A,DBB            ;   Input Command
0052 AB                    MOV    R3,A             ;
0053 03F7                  ADD    A,#-9            ;    If enter command is invalid one  ( GT.8 ),then ignore
0055 F649                  JC     START2           ;         ( input )  ======
0057 FB                    MOV    A,R3             ;
0058 035B                  ADD    A,#COMMAND       ;
005A B3                    JMPP   @A               ;   Estimate jump address
                  ;        ---------------------------------------------
005B 64           COMMAND: DB     COM0             ;
005C 66                    DB     COM1             ;
005D 68                    DB     COM2             ;
005E 6A                    DB     COM3             ;
005F 6C                    DB     COM4             ;
0060 6E                    DB     COM5             ;
0061 70                    DB     COM6             ;
0062 72                    DB     COM7             ;
0063 74                    DB     COM8             ;
                  ;        -------------
0064 048F         COM0:    JMP    RESET            ;  reset command
0066 0497         COM1:    JMP    RPDL             ;  read power detect line
0068 0449         COM2:    JMP    START2           ;  not assigned
006A 04B4         COM3:    JMP    CTFC             ;  command tuner frequency change
006C 04DA         COM4:    JMP    SMTD             ;  send message to device response
006E 244C         COM5:    JMP    SPC              ;  subscriver power.cable control
0070 0449         COM6:    JMP    START2           ;  not assigned
0072 247F         COM7:    JMP    SDPS             ;  define drop poll sequence
0074 24D4         COM8:    JMP    SDEPS            ;  define device poll sequense
                  ;------------------------------------------------------------------
                  ; ( 84 Command response  )         ;
0076 B857         CONT1:   MOV    R0,#FOR84+1      ;  84 command was occured
0078 F0                    MOV    A,@R0            ;
0079 F284                  JB7    CONT2            ;
007B 5438                  CALL   RESP84           ;
007D 0449                  JMP    START2           ;
                  ;------------------------------------------------------------------
                  ;  ( 04 Command response  )
007F 2300         START5:  MOV    A,#00H           ; Status  flag 04 ready
0081 90                    MOV    STS,A            ;
0082 0449                  JMP    START2           ;
                  ;
0084 B826         CONT2:   MOV    R0,#SNDMES+1     ;
0086 F0                    MOV    A,@R0            ;
0087 F249                  JB7    START2           ; 04 response is not exist ,return.
0089 D27F                  JB6    START5           ; 04 response is not exist,reset status & return.
                  ;
008B 541D                  CALL   RES04            ;     Send to Data_Processor
                  ;                                ;
008D 0449                  JMP    START2           ; return main routine
                  ;
                  ;****************************************************************
                  ;****************************************************************
008F BA00         RESET:   MOV    R2,#00           ;   Send response "00" before  reset.
0091 BB01                  MOV    R3,#01           ;
0093 34FC                  CALL   RESOUT           ;
0095 0411                  JMP    START0           ;   ===== reset =====
                  ;##############################
                  ;   ( Read power detect line  & Read ECU Address   )
0097 0E           RPDL:    MOVD   A,P6             ;  power detect  3 2 1 0
0098 530F                  ANL    A,#0FH           ;
009A AB                    MOV    R3,A             ;
009B 0F                    MOVD   A,P7             ;  power detect  X X 5 4
                  ;                                ;   & ECU Address
```

```
009C 47                 SWAP    A              ;
009D 4B                 ORL     A,R3           ;  A -- power det. 0 ~ 5
009E B820               MOV     R0,#PWRDET     ;
00A0 A0                 MOV     @R0,A          ;
00A1 BA01               MOV     R2,#01H        ;
00A3 BB02               MOV     R3,#02H        ;  2 byte send to data processor
                   ;
00A5 34FC               CALL    RESOUT         ;    Send to Data_Processor
00A7 14AB               CALL    PS             ; Call subscrivers power check
00A9 0449               JMP     START2         ;  (  set power detect line all high)
                   ;
                   ;
00AB B820          PS:  MOV     R0,#PWRDET     ; try !! subscriver power on
00AD F0                 MOV     A,@R0          ;
00AE 43C0               ORL     A,#11000000B   ; ( For  Subscriber that powered off )
00B0 AA                 MOV     R2,A           ;
00B1 54C8               CALL    PWRCHK         ;
00B3 83                 RET                    ;
                   ;################################
                   ;      ( Change Tuner Frequency Change  )
                   ;
0084 B821          CTFC:     MOV     R0,#CHANEL     ;
00B6 BB03               MOV     R3,#03H        ;
00B8 5410               CALL    INPCOM         ;  Stored  N  &  S C converter number
00BA 23FF               MOV     A,#0FFH        ;
00BC DB                 XRL     A,R3           ;
00BD C64D               JZ      START4         ;  Error - input data is invalid one.
                   ;
00BF B821               MOV     R0,#CHANEL     ;
00C1 F0                 MOV     A,@R0          ;
00C2 03FA               ADD     A,#-06H        ;
00C4 F649               JC      START2         ;  Error - Drop number is invalid.
                   ;
00C6 5466               CALL    TUNER          ;   Changing frequency
00C8 BA03               MOV     R2,#03H        ;
00CA BB02               MOV     R3,#02H        ;
00CC B821               MOV     R0,#CHANEL     ;
                   ;
00CE 34FC               CALL    RESOUT         ;  Send to Data_Processor  response " 03 "
                   ;
00D0 0449               JMP     START2         ;  return main routine
                   ;
                   ;-------------------------------
00D2 3C            ALLCNT:  MOVD    P4,A       ;  Select  6 subscriber
00D3 BAC0               MOV     R2,#0C0H       ;
00D5 54AE               CALL    SELECT         ;
00D7 83                 RET
                   ;################################
                   ;      ( Send Message to Device )
00D8 544C          FIND84:  CALL    WAIT_84    ;  if 84 CMD is exist,then send it to Data_Processor
00DA B826          SMTD:    MOV     R0,#SNDMES+1   ;
00DC F0                 MOV     A,@R0          ;  See that buffer for 04 command is empty
00DD F2D8               JB7     FIND84         ;  if buffer is full,then this routine wait
00DF D2E3          SMTD0:   JB6     SMTD1      ;           for sending to device by int. routine
00E1 541D               CALL    RES04          ;  Send 04 response to Data Processor
                   ;
00E3 2310          SMTD1:   MOV     A,#00010000B  ; Set 04 command busy
00E5 90                 MOV     STS,A          ;
00E6 C8                 DEC     R0             ;
00F7 BB02               MOV     R3,#002H       ; input 2 byte ( device ID ,BYTE COUNT )
00E9 5410               CALL    INPCOM         ;
00EB FB                 MOV     A,R3           ;
00EC D3FF               XRL     A,#0FFH        ;
00EE C64D               JZ      START4         ;
                   ;
00F0 B826               MOV     R0,#SNDMES+1   ;  See the number of send bytes
00F2 F0                 MOV     A,@R0          ;                   for ata processor
00F3 AB                 MOV     R3,A           ;
                   ;
00F4 03F9               ADD     A,#-7H         ;  If BYTE COUNT is greater than 6
00F6 E6FA               JNC     SMTD4          ;   then,input data was aborted .
00F8 2438               JMP     SMTD2          ;  abort command ( illigal return)
                   ;
00FA 18            SMTD4:   INC     R0         ;  input message data
00FB 5410               CALL    INPCOM         ;
                   ;
00FD FB                 MOV     A,R3           ;
00FE D3FF               XRL     A,#0FFH        ;
0100 C67A               JZ      START7         ;
                   ;
                   ;-------- sub command set routine
0102 B827               MOV     R0,#SNDMES+2   ; command ,address
0104 B924               MOV     R1,#SUBMES     ; Sub. message for intr. routine
0106 F0                 MOV     A,@R0          ;
0107 53F8               ANL     A,#0F8H        ;
0109 77                 RR      A              ;
010A 77                 RR      A              ;
```

```
010B 77                 RR       A                 ;
010C AA                 MOV      R2,A              ;
010D D31F               XRL      A,#1FH            ;
010F C62D               JZ       EXPAND            ;
0111 FA                 MOV      A,R2              ;
0112 97                 CLR      C                 ;
0113 67                 RRC      A                 ;
0114 033C               ADD      A,#FNCTBL         ;
0116 A3                 MOVP     A,@A              ;
0117 A1                 MOV      @R1,A             ;
0118 FA                 MOV      A,R2              ;
0119 1231               JB0      ODDFNC            ;
011B 230F               MOV      A,#0FH            ;
011D 51                 ANL      A,@R1             ;
011E A1                 MOV      @R1,A             ;
              ;---------------------------------
              ;
011F B826     SUBCOM:   MOV      R0,#SNDMES+1      ;
0121 F0                 MOV      A,@R0             ;
0122 43C0               ORL      A,#0C0H           ; Set 04 Buffer full ( active )
0124 A0                 MOV      @R0,A             ;
              ;
              ;         count down  R5  ( Count time which 04 command ocured )
              ;
0125 FD                        MOV      A,R5             ;
0126 962A                      JNZ      SET_R5           ;
0128 BD04                      MOV      R5,#COUNT_R5+1   ;
012A CD       SET_R5:          DEC      R5               ;
              ;
              ;
012B 0449               JMP      START2            ;
              ;
012D B102     EXPAND:   MOV      @R1,#02H          ; expand command is fixed .
012F 241F               JMP      SUBCOM            ;     send to device
0131 23F0     ODDFNC:   MOV      A,#0F0H           ;
0133 51                 ANL      A,@R1             ;
0134 47                 SWAP     A                 ;
0135 A1                 MOV      @R1,A             ;
0136 241F               JMP      SUBCOM            ;
              ;
0138 B040     SMTD2:    MOV      @R0,#40H          ;  Set status " buffer empty "
013A 0449               JMP      START2            ;
              ;
              ;         Kind of function  define table
              ;          number of command  are  as follow.
              ;             1 ----  device contorl
              ;             2 ----  send device data
              ;             3 ----  read device information
              ;
              ;                                    ; command number
013C 23       FNCTBL:   DB       23H               ;  1,0
013D 22                 DB       22H               ;  3,2
013E 22                 DB       22H               ;  5,4
013F 21                 DB       21H               ;  7,6  Specified
0140 32                 DB       32H               ;  9,8
0141 32                 DB       32H               ;  B,A  __________________
0142 11                 DB       11H               ;  D,C
0143 11                 DB       11H               ;  F,E   device control
0144 11                 DB       11H               ; 11,10 __________________
0145 22                 DB       22H               ; 13,12
0146 22                 DB       22H               ; 15,14  send data  n to device
0147 22                 DB       22H               ; 17,16         n = 1 to 5
0148 22                 DB       22H               ; 19,18 __________________
0149 33                 DB       33H               ; 1B,1A
014A 33                 DB       33H               ; 1D,1C  read device information
014B 33                 DB       33H               ; 1F,1E __________________
                                                   ; other  send data
              ;################################
              ;    (     Subscriver power control & Subscriver Switch Control      )
              ;
014C B82D     SPC:      MOV      R0,#SUBPWR        ;
014E BB01               MOV      R3,#01H           ;
0150 5410               CALL     INPCOM            ;  input
              ;
0152 FB                 MOV      A,R3              ;
0153 D3FF               XRL      A,#0FFH           ;  Check Error indicater.
0155 C67A               JZ       START7            ;
              ;
0157 B82D               MOV      R0,#SUBPWR        ;
0159 F0                 MOV      A,@R0             ;
015A 5307               ANL      A,#07H            ;
```

```
015C AB          MOV    R3,A        ; Drop Number
015D AC          MOV    R4,A        ;        //
015E F0          MOV    A,@R0       ;
015F F272        JB7    SPC0        ;   bit 7 equal  1- power on  0- power o
                ;
0161 54BC  SPC1: CALL   PWROFF      ;
                ;
                ;
0163       SPCCOM:
0163 FC          MOV    A,R4        ;
0164 AB          MOV    R3,A        ;  Restore  Converter Number
0165 F0          MOV    A,@R0       ;
0166 D276        JB6    SSC1        ;   bit 6 equal 1- sel. cable A
                ;                                 0- sel. cable B
0168 54C0  SSC0: CALL   CABLEA      ;
                ;
016A       SSCCOM:
                ;
016A BA05        MOV    R2,#05H     ; Send response " 05 "
016C BB02        MOV    R3,#02H     ;
016E 34FC        CALL   RESOUT      ;   R0 -- SUBPWR
0170 0449        JMP    START2      ;
                ;
0172 54B4  SPC0: CALL   PWRON       ;
0174 2463        JMP    SPCCOM      ;
                ;
0176 54C4  SSC1: CALL   CABLEB      ;
0178 246A        JMP    SSCCOM      ;
                ;
                ;
017A 044D  START7: JMP  START4      ;
                ;################################
                ;     (  Define Drop Poll Sequence  )
                ;
017C BBFF  CHGFAL: MOV  R3,#0FFH    ;
017E 83          RET                ;
                ;
017F B831  SDPS: MOV    R0,#DRPPOL  ;
0181 BB03        MOV    R3,#03      ;
                ;
0183 3494        CALL   CHANGE      ;
                ;
0185 FB          MOV    A,R3        ;
0186 D3FF        XRL    A,#0FFH     ;
0188 C67A        JZ     START7      ;
                ;
018A BA07        MOV    R2,#07H     ;
018C BB01        MOV    R3,#01H     ;
018E 34FC        CALL   RESOUT      ;
0190 0449        JMP    START2      ;
                ;
0192 0450  START9: JMP  START3      ;
                ;
0194 D694  CHANGE: JNIBF CHANGE     ; Change Drop poll map format
0196 767C        JF1    CHGFAL      ;
0198 22          IN     A,DBB       ;
0199 A0          MOV    @R0,A       ;
019A 7285        JB3    NOPOL       ;
                ;
019C 47    RETPOL: SWAP A           ;
019D 18          INC    R0          ;
019E A0          MOV    @R0,A       ;
                ;
019F 18          INC    R0          ;
01A0 EB94        DJNZ   R3,CHANGE   ;
                ;
01A2 D6A2  POLMOD: JNIBF POLMOD     ;
01A4 767C        JF1    CHGFAL      ;
01A6 22          IN     A,DBB       ;
                ;
01A7 2A          XCH    A,R2        ;
01A8 B931        MOV    R1,#DRPPOL  ;
01AA F1          MOV    A,@R1       ;
01AB A0          MOV    @R0,A       ;
01AC 2A          XCH    A,R2        ;
                ;
01AD 34C9        CALL   SETR7       ;
                ;
01AF C8          DEC    R0          ;
```

```
01B0 F0                        MOV     A,@R0          :
01B1 4380                      ORL     A,#80H         :
01B3 A0                        MOV     @R0,A          :
                      ;
01B4 83               CHGEND:  RET                    :
                      ;
                      ;
01B5 2A               NOPOL:   XCH     A,R2           :
01B6 FB                        MOV     A,R3           :
01B7 D303                      XRL     A,#03H         :
01B9 C6C1                      JZ      RETSTP         :
                      ;
01BB C8                        DEC     R0             :
01BC F0                        MOV     A,@R0          ;
01BD 4380                      ORL     A,#80H         :
01BF A0                        MOV     @R0,A          ;
                      ;
01C0 18                        INC     R0             ;
                      ;
01C1 2A               RETSTP:  XCH     A,R2           :
01C2 249C                      JMP     RETPOL         ;
                      ;
                      ;
01C4 F1               RNDRBN:  MOV     A,@R1          :
01C5 53DF                      ANL     A,#11011111B   ;
01C7 A1                        MOV     @R1,A          ;
01C8 83                        RET     .              :
                      :
01C9 D3FF             SETR7:   XRL     A,#0FFH        :
01CB B91F                      MOV     R1,#31         :
01CD 96C4                      JNZ     RNDRBN         :
                      ;
01CF F1                        MOV     A,@R1          ;
01D0 4320                      ORL     A,#00100000B   :
01D2 A1                        MOV     @R1,A          ;
01D3 83                        RET     .              ;
                      ;
                      ;
                      ;
                      ;#########################################################
                      ;    (      Define  Device  Poll Sequence     )
                      ;
01D4 D6D4             SDEPS:   JNIBF   SDEPS          ;
01D6 76FA                      JF1     START8         :
01D8 B838                      MOV     R0,#DEVPOL     ;
01DA 22                        IN      A,DBB          :
01DB 5307                      ANL     A,#07H         :
01DD AB                        MOV     R3,A           :
01DE AC                        MOV     R4,A           :
01DF C6E7                      JZ      SDEPS1         :
                      :
01E1 F8               SDEPS0:  MOV     A,R0           :
01E2 0305                      ADD     A,#05H         :
01E4 A8                        MOV     R0,A           :
01E5 EBE1                      DJNZ    R3,SDEPS0      ;
                      ;
01E7 BB05             SDEPS1:  MOV     R3,#05H        :
01E9 5410                      CALL    INPCOM         :
01EB FB                        MOV     A,R3           ;
01EC D3FF                      XRL     A,#0FFH        :
01EE C6FA                      JZ      START8         ;
                      ;
01F0 BA08                      MOV     R2,#08H        :
01F2 BB02                      MOV     R3,#02H        :
01F4 B804                      MOV     R0,#04H        :
01F6 34FC                      CALL    RESOUT .       :
01F8 0449                      JMP     START2         ;
                      ;
01FA 044D             START8:  JMP     START4         :
                      ;##############################
                      ;-------    Response Output Routine  ----------------------------
01FC 86FC             RESOUT:  JOBF    RESOUT         :  Check olut buffer full ?
01FE 95                        CPL     F0             ;
01FF FA                        MOV     A,R2           :
0200 02                        OUT     DBB,A          :    <<<<< output  Command...>>>>>
                      :
0201 CB                        DEC     R3             ;
0202 FB                        MOV     A,R3           :
                      ;
```

```
0203 C60D                 JZ      RESEND          ;  Command only
                ;
0205 8605       RESCNT:   JOBF    RESCNT          ;
0207 85                   CLR     F0              ;
0208 F0                   MOV     A,@R0           ;
0209 02                   OUT     DBB,A           ;  <<<<< output . data....  >>
020A 18                   INC     R0              ;
020B EB0E                 DJNZ    R3,RESCN1       ;
020D 83         RESEND:   RET                     ;
020E 4405       RESCN1:   JMP     RESCNT          ;
                ;
                ;-------------------------------------------------------------
                ;--------   input command and  data ______________________________
                ;
                ;         R0 -----   response Data head address
                ;         R3 -----   Bytes of input data
0210 D610       INPCOM:   JNIBF   INPCOM          ;
0212 761A                 JF1     INPEND          ; comming data is not a command
0214 22                   IN      A,DBB           ;     <<<< input...... >>>>
0215 A0                   MOV     @R0,A           ;  Store Data
0216 18                   INC     R0              ;
0217 EB10                 DJNZ    R3,INPCOM       ;
0219 83                   RET                     ;
021A BBFF       INPEND:   MOV     R3,#0FFH        ;     R3=0ffh
021C 83                   RET                     ;  data failure
                ;
                ;
                ;
                ;       04 response output  routine
                ;
                ;
021D F0         RES04:    MOV     A,@R0  -        ;
021E C62F                 JZ      SD1             ;   error message
                ;
                ;         ADD     A,#-7           ;
                ;         JC      S04END          ;
                ;
0220 F0                   MOV     A,@R0           ;
0221 0303                 ADD     A,#03H          ;  + Device ID ,command ,BYTE COUNT
                ;
0223 AB         SD2:      MOV     R3,A            ;
0224 BA04                 MOV     R2,#04H         ;
0226 B825                 MOV     R0,#SNDMES      ;
0228 34FC                 CALL    RESOUT          ;  response
                ;
022A B826       S04END:   MOV     R0,#SNDMES+1    ;
022C B040                 MOV     @R0,#40H        ;  clear 04 response for next datas.
022E 83                   RET
                ;
                ;
022F 2304       SD1.      MOV     A.#004H         ;   Error  message
0231 4423                 JMP     SD2             ;    ( same as 84 Command )
                ;
                ;-------------------------------------------------------------
                ;         Response   84 Command
                ;
0233            RES_84:
0233 B857                 MOV     R0,#FOR84+1     ;
0235 F0                   MOV     A,@R0           ;
0236 F247                 JB7     END_84          ;
                ;
0238 C648       RESP84:   JZ      F84FAL          ;  Called at main loop runing.
                ;
023A F0                   MOV     A,@R0           ;
023B 0303                 ADD     A,#03H          ;
023D AB                   MOV     R3,A            ;  store BYTE COUNT for send
                ;
023E C8         F84ERR:   DEC     R0              ;
                ;
023F BA84                 MOV     R2,#84H         ;
0241 34FC                 CALL    RESOUT          ;  Response out
                ;                                 ;
0243 B857       S84END:   MOV     R0,#FOR84+1     ;
0245 B080                 MOV     @R0,#080H       ;  reset 84 command
0247 83         END_84:   RET                     ;
                ;
                ;
0248 BB04       F84FAL:   MOV     R3,#04          ;  if VLF communication is failed.
```

```
024A 443E          JMP     F84ERR          ; send that condition to data process
               ;________________________________________________________________
024C           WAIT_84:
024C FD            MOV     A,R5            ;
024D 9653          JNZ     WAIT_END        ; If R5 = 0 then look 84 buffer
024F 5433          CALL    RES_84          ;   send 84 command
0251 BD03          MOV     R5,#COUNT_R5    ;  initialize R5 ( counter )
0253           WAIT_END:                   ;
0253 83            RET                     ;
               ;----------------------------------------------------------------
0254 B820      INIT_P:  MOV  R0,#PWRDET    ;  Power Detect line initialization
0256 B0C0          MOV     @R0,#0C0H       ;
0258 14AB          CALL    PS              ; Call subscrivers power detect
025A 83            RET
               ;
               ;==========  Change  Converter Number  to bit pattern  ==========
               ;
               ;
025B BAFE      BITSEL:  MOV  R2,#0FEH      ; R3: Drop or Converter Num.
025D FB            MOV     A,R3            ; R2: Bit pattern (Active Low)
025E C665          JZ      CON0            ;  exam: Converter 3
0260 FA            MOV     A,R2            ;   1111 0111 B
0261 E7        TUNLP1:  RL   A             ;
0262 EB61          DJNZ    R3,TUNLP1       ;
0264 AA            MOV     R2,A            ;
0265 83        CON0:    RET                ;
               ;
               ;------------------------------
               ;::::::::::::::::::::::::::::::::::::::::::::::::::::::::::::::::
               ;:                    Change Tuner freq.                        :
               ;::::::::::::::::::::::::::::::::::::::::::::::::::::::::::::::::
               ;   Used Resister
               ;     R0 ---   Indicate Channel Command ( 03 command  )
               ;     R2 ---   Converter Select
               ;     R3 ---   Working
               ;
               ;

0266 B821      TUNER:   MOV  R0,#CHANEL    ;
0268 F0            MOV     A,@R0           ;  @R0 --  Converter number
0269 AB            MOV     R3,A            ;
               ;
026A 545B          CALL    BITSEL          ;
               ;
026C B823          MOV     R0,#CHANEL+2    ;
026E BB02          MOV     R3,#02          ;  @R0 --  Main Counter 2 bits
0270 548F      TUNLP3:  CALL  DATOUT       ;
0272 EB70          DJNZ    R3,TUNLP3       ;
               ;
0274 F0            MOV     A,@R0           ;  Abort one  bit in @R0
0275 E7            RL      A               ;
0276 A0            MOV     @R0,A           ;
               ;
0277 C8            DEC     R0              ;  @R0 --  Main Counter N
0278 BB08          MOV     R3,#08          ;
027A 548F      TUNLP2:  CALL  DATOUT       ;
027C EB7A          DJNZ    R3,TUNLP2       ;
               ;
027E 18            INC     R0              ;
027F BB05          MOV     R3,#05          ;
0281 548F      TUNLP4:  CALL  DATOUT       ;   Swallow counter
0283 EB81          DJNZ    R3,TUNLP4       ;
               ;
0285 230A          MOV     A,#LODDAT       ;  Load pulse
0287 54A5          CALL    PULSE           ;
               ;
0289 2301          MOV     A,#DAT_0        ;  Clear Data
028B 3C            MOVD    P4,A            ;
028C 54AE          CALL    SELECT          ;
028E 83            RET                     ;
               ;-----------------------------------------------------
028F 97        DATOUT:  CLR  C             ;
0290 F0            MOV     A,@R0           ;
0291 F7        CICLE0:  RLC  A             ;
0292 A0            MOV     @R0,A           ;
0293 2309          MOV     A,#DAT_1        ;
0295 3C            MOVD    P4,A            ;  Data & Function set  Data  1
0296 F69B          JC      DATA1           ;
0298 2307          MOV     A,#07H          ;   if output data is  0
```

```
029A 9C          ANLD    P4,A         :      then invert a data
               ;                               that recentry  outputed
029B FA    DATA1:  MOV     A,R2         ·  Select  high
029C 39          OUTL    P1,A         :
029D 23FF        MOV     A,#0FFH      :
029F 39          OUTL    P1,A         :  Select  Low
               ;
02A0 54A3        CALL    CLOCK        :
               ;
02A2 83          RET                  :
               ;------------------------------------------------------------------
02A3 2308  CLOCK:  MOV     A,#CLKDAT    :
02A5 3C    PULSE:  MOVD    P4,A         :  Clock High
02A6 FA          MOV     A,R2         :
02A7 39          OUTL    P1,A         :      Select high
02A8 23FF        MOV     A,#0FFH      :
02AA 39          OUTL    P1,A         :      Select low
               ;
02AB 2307        MOV     A,#07H       :  Clock Low
02AD 9C          ANLD    P4,A         :
02AE FA    SELECT: MOV     A,R2         :      Select high
02AF 39          OUTL    P1,A         :
02B0 23FF        MOV     A,#0FFH      :
02B2 39          OUTL    P1,A         :      Select low
02B3 83          RET
               ;------------ Power, Cable , Power check          ----------------
02B4 230C  PWRON:  MOV     A,#PWRDT1    :
02B6 3C    CONCOM: MOVD    P4,A         :
               ;
02B7 545B        CALL    BITSEL       :  SET R3 --- Conveter Number
02B9 54AE        CALL    SELECT       :
02BB 83          RET                  :
02BC 2304  PWROFF: MOV     A,#PWRDT0    :
02BE 44B6        JMP     CONCOM       :
               ;
02C0 2303  CABLEA: MOV     A,#CABL_A    :  Select RF cable A
02C2 44B6        JMP     CONCOM       :
               ;
02C4 230B  CABLEB: MOV     A,#CABL_B    :  Select RF cable B
02C6 44B6        JMP     CONCOM       :
               ;
02C8 230D  PWRCHK: MOV     A,#DETDAT    :  Power  Check
02CA 3C          MOVD    P4,A         :
02CB 54AE        CALL    SELECT       :
02CD 83          RET                  :
               ;---------------  END  ----------------------------------------

Errors=     0

LOCATION OBJECT CODE LINE     SOURCE LINE

 "8048"
 ;Last Ver.(AKI)
 ;
 ;%%%8204381 0%%%%%%%%%%%%%%%%%%%%%%%%%%%%%%%%%%%%%%%%%%%%%%%%%%%%%%%%%%%%%
 ;
 ;
 ;                      Drop   Processor   ( 8042 )
 ;
 ;                timer  interrupt  routine.  ver 2.2.1
 ;
 ;                   [ Hot ver. ] + 04_An      by  Hideo Shigihara.
 ;
 ;%%%%%%%%%%%%%%%%%%%%%%%%%%%%%%%%%%%%%%%%%%%%%%%%%%%%%%%%%%%%%%%%8204381 0%%%
 ;
 ;
 ;\\\\\\\\\\\\\\\\\\\\\\\\\\\\\\\\\\\\\\\\\\\\\\\\\\\\\\\\\\\\\\\\\\\\\\\\\\\\\\\\\
 ;\\                                                                          \\
 ;\\                    --- Register bank 1 ---                               \\
 ;\\                                                                          \\
 ;\\\\\\\\\\\\\\\\\\\\\\\\\\\\\\\\\\\\\\\\\\\\\\\\\\\\\\\\\\\\\\\\\\\\\\\\\\\\\\\\\
 ;\\                                                                          \\
 ;\\    *****  R0   :   Working resister.                         *****       \\
 ;\\                                                                          \\
 ;\\    *****  R1   :   Working resister.                         *****       \\
 ;\\                                                                          \\
 ;\\    *****  R2   :   Data (bit) counter.                       *****       \\
 ;\\                                                                          \\
 ;\\    *****  R3   :   Transmit or receive data buffer.          *****       \\
 ;\\                                                                          \\
```

```
               ;\\    *****  R4   :   Current access drop map address.      *****  \\
               ;\\                                                                  \\
               ;\\    *****  R5   :   Current access device map address.    *****  \\
               ;\\                                                                  \\
               ;\\    *****  R6   :   VLF flags.                            *****  \\
               ;\\                                                                  \\
               ;\\                 (bit0)  =   Error counter 0.                     \\
               ;\\                                                                  \\
               ;\\                 (bit1)  =   Error counter 1.                     \\
               ;\\                                                                  \\
               ;\\                 (bit2)  =   Error counter 2.                     \\
               ;\\                                                                  \\
               ;\\                 (bit3)  =   --- No used. ---                     \\
               ;\\                                                                  \\
               ;\\                 (bit4)  =   --- No used. ---                     \\
               ;\\                                                                  \\
               ;\\                 (bit5)  =   --- No used. ---                     \\
               ;\\                                                                  \\
               ;\\                 (bit6)  =   RCK flag.                            \\
               ;\\                                                                  \\
               ;\\                 (bit7)  =   --- No used. ---                     \\
               ;\\                                                                  \\
               ;\\    *****  R7   :   Polling flag                          *****  \\
               ;\\                                                                  \\
               ;\\                 (bit0)  =   Return wait flag.                    \\
               ;\\                                                                  \\
               ;\\                 (bit1)  =   No request flag.                     \\
               ;\\                                                                  \\
               ;\\                 (bit2)  =   Only 04 flag.                        \\
               ;\\                                                                  \\
               ;\\                 (bit3)  =   --- No used. ---                     \\
               ;\\                                                                  \\
               ;\\                 (bit4)  =   R.R  or  priority flag(device).      \\
               ;\\                                                                  \\
               ;\\                 (bit5)  =   R.R  or  priority flag(drop).        \\
               ;\\                                                                  \\
               ;\\                 (bit6)  =   First drop select flag.              \\
               ;\\                                                                  \\
               ;\\                 (bit7)  =   Response flag.                       \\
               ;\\                                                                  \\
               ;\\\\\\\\\\\\\\\\\\\\\\\\\\\\\\\\\\\\\\\\\\\\\\\\\\\\\\\\\\\\\\\\\\\\\\\\\\\\\\\\
               ;
               ;
                       ORG      07H
               ;
               ;]]]]]]]]]]]]]]]]]]]]]]]]]]]]]]]][[[[[[[[[[[[[[[[[[[[[[[[[[[[[[[[[[[[[[[
               ;|||||||||||||||||||||||||||||||||||||||||||||||||||||||||||||||||||||
               ;
               ;                    TIMER INTERRUPT ROUTINE.
               ;
               ;|||||||||||||||||||||||||||||||||||||||||||||||||||||||||||||||||||||
               ;
0007 6400                                JMP      HETIT
               ;
               ;]]]]]]]]]]]]]]]]]]]]]]]]]]]]]]]]]][[[[[[[[[[[[[[[[[[[[[[[[[[[[[[[[[[[[
               ;
               ;---------------------------------------------------------------------
               ;
               ;
      <0024>    SDMSGK    EQU     24H             ;Submessage for device response.
                                                   (Command only ,WR or RD data.)
               ;
               ;
      <0025>    SDMSGH    EQU     25H             ;04 command buffer ( ID.)
               ;
               ;
      <0026>    SDMSG1    EQU     26H             ;04 command buffer ( byte count.)
               ;
               ;
      <0027>    SDMSGC    EQU     27H             ;04 command buffer ( command.)
               ;
               ;
      <0031>    DRMAP0    EQU     31H             ;Drop polling map ( 2.0 )
               ;
               ;
      <0036>    DRMAP5    EQU     36H             ;Drop polling map ( 2.5 )
               ;
               ;
      <0037>    DRMAPH    EQU     37H             ;Drop polling map ( 2.H )
               ;
```

```
         ;
<0038>   DVM10     EQU     38H          ;Device polling map ( 1.0.0 )
         ;
         ;
<003D>   DVM11     EQU     3DH          ;Device polling map ( 1.1.0 )
         ;
         ;
<0042>   DVM12     EQU     42H          ;Device polling map ( 1.2.0 )
         ;
         ;
<0047>   DVM13     EQU     47H          ;Device polling map ( 1.3.0 )
         ;
         ;
<004C>   DVM14     EQU     4CH          ;Device polling map ( 1.4.0 )
         ;
         ;
<0051>   DVM15     EQU     51H          ;Device polling map ( 1.5.0 )
         ;
         ;
<0056>   RE84H     EQU     56H          ;84 command buffer ( ID.)
         ;
         ;
<0057>   RE841     EQU     57H          ;84 command buffer ( byte count.)
         ;
         ;
<0058>   RE84C     EQU     58H          ;84 command buffer ( data 0.)
         ;
         ;
<005D>   TXBUF     EQU     5DH          ;Transmissive data buffer.
         ;
         ;
<005E>   DEMAP0    EQU     5EH          ;Device polling map ( 2.N.0 ).
         ;
         ;
<0065>   DEMAP7    EQU     65H          ;Device polling map ( 2.N.7 ).
         ;
         ;
<0067>   DEMAPH    EQU     67H          ;Device polling map ( 2.N.H ).
         ;
         ;
<0068>   LAV1      EQU     68H          ;Indirect addressing data buffer.
         ;
         ;
<0069>   ANSPAR    EQU     69H          ;Parity flag .
         ;
         ;
<006A>   POLING    EQU     6AH          ;Current access device & drop
         ;                                number set buffer.
         ;
<006B>   CNTBY     EQU     6BH          ;Byte counter for Rx or Tx.
         ;
         ;
<006C>   SAVDRP    EQU     6CH          ;Drop number save buffer.
         ;
         ;
         ;
         ;--------------------------------------------------------------
         ;
                             ORG             300H
         ;
         ;**************************************************************
         ;--------------------------------------------------------------
         ;
         ;*************   INDIRECT ADDRESSING ROUTINE.   ***************
         ;
0300 2F        HETIT:   XCH     A,R7          ;Jumping address set.
         ;
0301 D5                 SEL     RB1           ;Register bank change.
         ;
0302 0305               ADD     A,#NEGIH      ;Indirect addressing jump.
0304 B3                 JMPP    @A            ;
         ;
         ;
         ;**************************************************************
         ;
         ;--------------------------------------------------------------
         ;
         ;***************   INDIRECT ADDRESSING TABLE.   ****************
         ;
         ;
```

```
0305 2527292B2D   NEGIH:    DB        A0, A1, A2, A3, A4, A5, A6, A7
                  ;
                  ;
030D 3537393B3D             DB        A8, B9,B10,C11,C12,C13,C14,C15
                  ;
                  ;
0315 4547494B4D             DB        C16,C17,C18,C19,D20,D21,D22,D23
                  ;
                  ;
031D 5557595B5D             DB        D24,D25,D26,D27,D28,E29,E30,F31
                  ;
                  ;
                  ;##################################################################
                  ;
                  ;------------------------------------------------------------------
                  ;||||||||||||||||||||||||||||||||||||||||||||||||||||||||||||||||||
                  ;|                                                                |
                  ;|$$$$$$$$$$$$   JUMP  TABLE  FOR  TIMER  INTERRUPT.   $$$$$$$$$$$$|
                  ;|                                                                |
                  ;|                    (  I  N  D  E  X  )                         |
                  ;|                                                                |
0325 649A         A0:       JMP     CPCMO        ;[#0]  : Conditional poll command |
                  ;|                                     set & start bit Tx routine|
                  ;|          [ L.No  423 ]                                        |
                  ;|                                                                |
0327 64E3         A1:       JMP     DWBO         ;[#1]  : Transmissive data Tx     |
                  ;|                                     routine.                   |
                  ;|          [ L.No  519 ]                                        |
                  ;|                                                                |
0329 64B5         A2:       JMP     MIOO         ;[#2]  : Message indicator bit Tx |
                  ;|                                     routine.                   |
                  ;|          [ L.No  456 ]                                        |
                  ;|                                                                |
032B 64FE         A3:       JMP     PALBO        ;[#3]  : Last bit of transmissive |
                  ;|                                     data Tx routine.           |
                  ;|          [ L.No  556 ]                                        |
                  ;|                                                                |
032D 6465         A4:       JMP     MTMINT       ;[#4]  : Drop select & start bit Tx|
                  ;|                                     routine.                   |
                  ;|          [ L.No  355 ]                                        |
                  ;|                                                                |
032F 841A         A5:       JMP     PARBT        ;[#5]  : Parity bit Tx routine.   |
                  ;|                                                                |
                  ;|          [ L.No  604 ]                                        |
                  ;|                                                                |
0331 8411         A6:       JMP     STOPO        ;[#6]  : Stop bit Tx routine.(1)  |
                  ;|                                                                |
                  ;|          [ L.No  585 ]                                        |
                  ;|                                                                |
0333 8439         A7:       JMP     ACK1         ;[#7]  : ACK receive & ckeck      |
                  ;|                                     routine.(1)                |
                  ;|          [ L.No  655 ]                                        |
                  ;|                                                                |
0335 8422         A8:       JMP     RCK          ;[#8]  : RCK receive & check      |
                  ;|                                     routine.                   |
                  ;|          [ L.No  624 ]                                        |
                  ;|                                                                |
0337 C47F         B9:       JMP     ACK4         ;[#9]  : ACK check 4.             |
                  ;|                                 (disposal of 04 command.)     |
                  ;|          [ L.No 1456 ]                                        |
                  ;|                                                                |
0339 A4E8         B10:      JMP     COM04D       ;[#10] : 04 command data Tx.      |
                  ;|                                 (disposal of 04 command.)     |
                  ;|          [ L.No 1241 ]                                        |
                  ;|                                                                |
033B 848E         C11:      JMP     KEYDAY       ;[#11] : Start bit Tx.            |
                  ;|                                     (Rx routine.)              |
                  ;|          [ L.No  740 ]                                        |
                  ;|                                                                |
033D 84BB         C12:      JMP     PALK         ;[#12] : Parity bit Rx.           |
                  ;|                                     (Rx routine.)              |
                  ;|          [ L.No  814 ]                                        |
                  ;|                                                                |
033F 8498         C13:      JMP     RSTAT        ;[#13] : Start bit erase.         |
                  ;|                                     (Rx routine.)              |
                  ;|          [ L.No  760 ]                                        |
                  ;|                                                                |
0341 84A2         C14:      JMP     RBSET        ;[#14] : Receivable data Rx.      |
                  ;|                                     (Rx routine.)              |
                  ;|          [ L.No  780 ]                                        |
```

```
          ;|
0343 84DE C15:    JMP    ACKOT      ;[#15] : ACK bit Tx. (1)      |
          ;|                                 (Rx routine.)        |
          ;|        [ L.No  855 ]                                 |
          ;|                                                      |
0345 A4AE C16:    JMP    STGN84     ;[#16] : Stop bit Tx 6.       |
          ;|                           continue 84 command data Rx|
          ;|        [ L.No 1137 ]                                 |
          ;|                                                      |
0347 A43A C17:    JMP    NCKOT      ;[#17] : NCK Tx .             |
          ;|                                 (Rx routine.)        |
          ;|        [ L.No  999 ]                                 |
          ;|                                                      |
0349 A4BE C18:    JMP    STGN04     ;[#18] : Stop bit Tx 7.       |
          ;|                           continue 04 command data Rx|
          ;|        [ L.No 1137 ]                                 |
          ;|                                                      |
034B C43E C19:    JMP    ACK3       ;[#19] : ACK check 3.         |
          ;|                                 (Rx routine.)        |
          ;|        [ L.No 1393 ]                                 |
          ;|                                                      |
034D A4D4 D20:    JMP    COM04      ;[#20] : Start bit Tx.        |
          ;|                                 (04 command.)        |
          ;|        [ L.No 1215 ]                                 |
          ;|                                                      |
034F A406 D21:    JMP    STER84     ;[#21] : Stop bit Tx 3.       |
          ;|                           disposal of 84 com error.  |
          ;|        [ L.No  922 ]                                 |
          ;|                                                      |
0351 84F8 D22:    JMP    STER04     ;[#22] : Stop bit Tx 2.       |
          ;|                           disposal of 04 com error.  |
          ;|        [ L.No  900 ]                                 |
          ;|                                                      |
0353 A49A D23:    JMP    STGR84     ;[#23] : Stop bit Tx 5.       |
          ;|                           84 com all ok & end.       |
          ;|        [ L.No 1110 ]                                 |
          ;|                                                      |
0355 A424 D24:    JMP    STGR04     ;[#24] : Stop bit Tx 4.       |
          ;|                           04 com all ok & end.       |
          ;|        [ L.No  965 ]                                 |
          ;|                                                      |
0357 84EC D25:    JMP    REPRX      ;[#25] : Stop bit Tx 1.       |
          ;|                           challenge once more.       |
          ;|        [ L.No  878 ]                                 |
          ;|                                                      |
0359 A459 D26:    JMP    LCIN       ;[#26] : Last character indicator |
          ;|                                 check.               |
          ;|        [ L.No 1038 ]                                 |
          ;|                                                      |
035B E434 D27:    JMP    IDLINT     ;[#27] : Wait routine for 84 com.  test.test
          ;|                                    ( No 1 )          |
          ;|        [ L.No 1684 ]                                 |
          ;|                                                      |
035D E416 D28:    JMP    DSCF84     ;[#28] : Drop scan for 84 command. |
          ;|                                                      |
          ;|        [ L.No 1629 ]                                 |
          ;|                                                      |
035F E477 E29:    JMP    DSF04C     ;[#29] : Drop scan for 04 command. |
          ;|                                                      |
          ;|        [ L.No 1765 ]                                 |
          ;|                                                      |
0361 E44B E30:    JMP    NDPS04     ;[#30] : Changing opreation to 84. |
          ;|                                                      |
          ;|        [ L.No 1713 ]                                 |
          ;|                                                      |
0363 64CE F31:    JMP    SMLING     ;[#31] : Life sample.         |
          ;|                                                      |
          ;|        [ L.No  492 ]                                 |
          ;|                                                      |
          ;|                                                      |
          ;|$$$$$$$$$$$$$$$$$$$$$$$$$$$$$$$$$$$$$$$$$$$$$$$$$$$$$$$$$$$$$$$$$$$|
          ;|                                                      |
          ;||||||||||||||||||||||||||||||||||||||||||||||||||||||||||||||||||||
          ;
          ;%%%%%%%%%%%%%%%%%%%%%%%%%%%%%%%%%%%%%%%%%%%%%%%%%%%%%%%%%%%%%%%%%%%%
          ;%                                                                  %
          ;%****  CONDITIONAL-POLL.CONDITIONAL-POLL.CONDITIONAL-POLL.    ****%
          ;%                                                                  %
          ;%%%%%%%%%%%%%%%%%%%%%%%%%%%%%%%%%%%%%%%%%%%%%%%%%%%%%%%%%%%%%%%%%%%%
          ;
```

```
                ;******************************************************************
                ;
                ;           <   DROP SELECT & START BIT SET.   >
                ;                                                              #A4
                ;******************************************************************
                ;
                ;                ...............................................
0365 00         MTMINT:  NOP
0366 266C                JNT0     ETDSR        ;Detect service request
                ;                                from SPU.
                ;                ...............................................
                ;
0368 D40B                CALL     TSET1        ;1 bit time counter set & start.
036A 6489       NOTMAP:  JMP      DVMNS        ;<  no request !  >
                ;                              ;
                ;                               <  request !  >
036C D40B       ETDSR:   CALL     TSET1        ;1 bit time counter set & start.
                ;
036E B831                MOV      R0,#DRMAP0   ;Drop map set or not.
0370 F0                  MOV      A,@R0        ;
0371 726A                JB3      NOTMAP       ;
                ;
0373 F4B6                CALL     DEVCH        ;Changing the device map.
                ;
0375 BD5E                MOV      R5,#DEMAP0   ;First device select.
                ;
                ;
0377 FD         DMSRE:   MOV      A,R5         ;Next device select.
0378 A8                  MOV      R0,A         ;
0379 F0                  MOV      A,@R0        ;
037A B867                MOV      R0,#DEMAPH   ;Device map 1 set or not ?
037C A0                  MOV      @R0,A        ;
037D D3FF                XRL      A,#0FFH      ;
037F C689                JZ       DVMNS        ;
                ;
                ;                               <  set  !  >
0381 D422                CALL     PARCLL       ;Parity flag clear
                ;                                 & VLF flags clear.
0383 D414                CALL     VLF00        ;Start bit "0" set.
                ;
0385 2300                MOV      A,#0         ;***NEXT [CPCMO]***
0387 C4EF                JMP      JMPR         ;RETR.
                ;
                ;                               <  No request or not set  !  >
0389 FF         DVMNS:   MOV      A,R7         ;
038A 4302                ORL      A,#02H       ;Drop scan flag set.
038C AF                  MOV      R7,A         ;
                ;
038D B4FF                CALL     BCNTBC       ;04 command set or not ?
038F F293                JB7      SF04D        ;
0391 C4F2                JMP      NTDRP        ;<  Not set !  >
                ;
                ;
0393 FF         SF04D:   MOV      A,R7
0394 4304                ORL      A,#04H       ;
0396 AF                  MOV      R7,A         ;
0397 E459                JMP      INT04S       ;Disposal of 04 command.
                ;                               ***NEXT [COM04]***
                ;
                ;
                ;
                ;******************************************************************
                ;
                ;    <  CONDITIONAL POLL COMMAND SET & START BIT SET.  >
                ;                                                              #A0
                ;******************************************************************
                ;
                ;|||||||||||||||||||||||||||||||||||||||||||||||||||||||||||||||||
                ;|                                                               |
0399 58         CPCOM:   DB       58H          ;                                 |
                ;|                                                               |
                ;|||||||||||||||||||||||||||||||||||||||||||||||||||||||||||||||||
                ;
                ;
                ;                ...............................................
039A F8         CPCMO:   MOV      A,R0         ;Start bit trans.
039B 3D                  MOVD     P5,A         ;
                ;                ...............................................
                ;
039C D40B                CALL     TSET1        ;1 bit time counter set & start.
```

```
                ;
039E 2399                   MOV     A,#CPCOM        ;Conditional poll command set.
03A0 A3                     MOVP    A,@A            ;( Transmissive data set. )
03A1 A9                     MOV     R1,A            ;
03A2 B867                   MOV     R0,#DEMAPH      ;[#TXBUF] <--- conditional poll
03A4 F0                     MOV     A,@R0           ; command + device address.
03A5 530F                   ANL     A,#0FH          ;
03A7 49                     ORL     A,R1            ;
03A8 B85D                   MOV     R0,#TXBUF       ;
03AA A0                     MOV     @R0,A           ;
                ;
03AB B868                   MOV     R0,#LAV1        ;Indirect addressing buffer set.
03AD B007                   MOV     @R0,#7          ;
                ;
03AF D414                   CALL    VLF00           ;MI bit "0" set.
                ;
03B1 2302                   MOV     A,#2            ;***NEXT [MI00]***
03B3 C4EF                   JMP     JMPR            ;RETR.
                ;
                ;
                ;
                ;""""""""""""""""""""""""""""""""""""""""""""""""""""""""""""""""""""""
                ;
                ;               (   MESSAGE INDICATOR BIT Tx .   )
                ;                                                                  #A2
                ;""""""""""""""""""""""""""""""""""""""""""""""""""""""""""""""""""""""
                ;
                ;            ................................................
03B5 F8         MI00:       MOV     A,R0            ;MI bit trans.
03B6 3D                     MOVD    P5,A            ;
                ;            ................................................
                ;
03B7 D40F                   CALL    TSET05          ;1 bit time counter set & start.
                ;
03B9 B85D                   MOV     R0,#TXBUF       ;A<--[TXBUF]
03BB F0                     MOV     A,@R0           ;
03BC 67                     RRC     A               ;Rotate right.
03BD AB                     MOV     R3,A            ;
03BE F6C4                   JC      VLFD1           ;Cy=1 ?
                ;
03C0 D414                   CALL    VLF00           ;(Carry = 0)
                ;                                    Transmissive data = '0' set.
                ;
03C2 64C8                   JMP     MI00E           ;
                ;
03C4 D429       VLFD1:      CALL    PALAN           ;(Carry = 1)
                ;                                    Parity analyse.
                ;
03C6 D418                   CALL    VLF01           ;Transmissive data = '1' set.
                ;
03C8 BA07       MI00E:      MOV     R2,#07H         ;Bit counter set.
                ;
03CA 231F                   MOV     A,#31           ;***NEXT [SMLING]***     ←変更部分
03CC C4EF                   JMP     JMPR            ;RETR.
                ;
                ;
                ;
                ;""""""""""""""""""""""""""""""""""""""""""""""""""""""""""""""""""""""
                ;
                ;                    (   LIFE   SAMPLE.   )
                ;                                                                 #F31
                ;""""""""""""""""""""""""""""""""""""""""""""""""""""""""""""""""""""""
                ;
                ;            ................................................
03CE 00         SMLING:     NOP                     ;exist the bad Device on
03CF 3609                   JT0     SMLOK           ;       this cable ?
                ;            ................................................
03D1 D40F                   CALL    TSET05          ;(Error !)
                ;                                    Half bit time counter set &
03D3 FE                     MOV     A,R6            ;       start.
03D4 4310                   ORL     A,#10H          ;
03D6 AE                     MOV     R6,A            ;
03D7 64DF                   JMP     DWBOJP          ;
                ;
03D9 D40F       SMLOK:      CALL    TSET05          ;(Ok !)
                ;                                    Half bit time counter set &
03DB FE                     MOV     A,R6            ;       start.
03DC 53EF                   ANL     A,#0EFH         ;
03DE AE                     MOV     R6,A            ;
                ;
```

```
03DF 2301     DWBOJP:  MOV     A,#1            ;***NEXT [DWBO]***
03E1 C4EF              JMP     JMPR            ;RETR.
              ;
              ;
              ;*********************************************************************
              ;
              ;                       (  8 BIT DATA Tx.  )
              ;                                                                #A1
              ;*********************************************************************
              ;
              ;        .......................................................
03E3 F8       DWBO:    MOV     A,R0            ;Transmissive data trans.
03E4 3D                MOVD    P5,A            ;
              ;        .......................................................
              ;
03E5 D40B              CALL    TSET1           ;1 bit time counter set & start.
              ;
03E7 FB                MOV     A,R3            ;Rotate right.
03E8 67                RRC     A               ;
03E9 AB                MOV     R3,A            ;
03EA F6F0              JC      VLFD2           ;Cy = 1 ?
              ;
03EC D414              CALL    VLFO0           ;Next transmissive data = '0' set.
              ;
03EE 64F4              JMP     DWBOC           ;
              ;
03F0 D429     VLFD2:   CALL    PALAN           ;Next transmissive data = '1' set.
              ;
03F2 D41B              CALL    VLFO1           ;Parity flag set.
              ;
03F4 EAFA     DWBOC:   DJNZ    R2,DWBOE        ;Transmissive data end ?
              ;                                 ( end ! )
03F6 2303              MOV     A,#3            ;***NEXT [PALAN]***
03F8 C4EF              JMP     JMPR            ;RETR.
              ;
              ;                                 ( not end ! )
03FA 2301     DWBOE:   MOV     A,#1            ;***NEXT [DWBO]***
03FC C4EF              JMP     JMPR            ;RETR.
              ;
              ;
              ;
              ;*********************************************************************
              ;
              ;                       (  LAST DATA Tx.  )
              ;                                                                #A3
              ;*********************************************************************
              ;
              ;        .......................................................
03FE F8       PALBO:   MOV     A,R0            ;Last data trans.
03FF 3D                MOVD    P5,A            ;
              ;        .......................................................
              ;
0400 D40B              CALL    TSET1           ;1 bit time counter set & start.
              ;
0402 B869              MOV     R0,#ANSPAR      ;
0404 F0                MOV     A,@R0           ;Parity flag check.
0405 120B              JB0     EVNST           ;
              ;
0407 D414              CALL    VLFO0           ;(  Even  !  )
              ;                                 Parity bit "0" set.
0409 840D              JMP     PBSED           ;
              ;
040B D41B     EVNST:   CALL    VLFO1           ;(  Odd  !  )
              ;                                 Parity bit "1" set.
              ;
040D 2305     PBSED:   MOV     A,#5            ;***NEXT [MTMINT]***
040F C4EF              JMP     JMPR            ;RETR.
              ;
              ;
              ;
              ;*********************************************************************
              ;
              ;                       (  STOP BIT Tx.  )
              ;                                                                #A6
              ;*********************************************************************
              ;
              ;        .......................................................
0411 F8       STOPO:   MOV     A,R0            ;
0412 3D                MOVD    P5,A            ;Stop bit trans.
              ;        .......................................................
```

```
                      ;
0413 D40F                     CALL    TSET05          ;Half bit time counter set & start.
                      ;
0415 B868                     MOV     R0,#LAV1        ;Indirect addressing.
0417 F0                       MOV     A,@R0           ;***NEXT <-- [LAV1]***
0418 C4EF                     JMP     JMPR            ;RETR.
                      ;
                      ;
                      ;
                      ;"""""""""""""""""""""""""""""""""""""""""""""""""""""""""""""""""""""""
                      ;
                      ;                  <  PARITY BIT Tx.  >
                      ;                                                                    #A5
                      ;"""""""""""""""""""""""""""""""""""""""""""""""""""""""""""""""""""""""
                      ;
                      ;      ....................................................
041A F8               PARBT:  MOV     A,R0
041B 3D                       MOVD    P5,A            ;Parity bit trans.
                      ;      ....................................................
                      ;
041C D40F                     CALL    TSET05          ;Half bit time counter set & start.
                      ;
041E 2308                     MOV     A,#8            ;Indirect addressing.
                      ;                                ***NEXT [RCK]***
0420 C4EF                     JMP     JMPR            ;RETR.
                      ;
                      ;
                      ;
                      ;
                      ;"""""""""""""""""""""""""""""""""""""""""""""""""""""""""""""""""""""""
                      ;
                      ;                  <  RCK CHECK.  >
                      ;                                                                    #A3
                      ;"""""""""""""""""""""""""""""""""""""""""""""""""""""""""""""""""""""""
                      ;
                      ;      ....................................................
0422 00               RCK:    NOP                     ;
0423 362D                     JT0     SPCEI           ;RCK bit detect.
                      ;      ....................................................
                      ;
0425 D40F                     CALL    TSET05          ;Half bit time counter set & start.
                      ;
0427 FE                       MOV     A,R6            ;RCK flag set.
0428 4340                     ORL     A,#40H          ;< OK  !.>
042A AE                       MOV     R6,A            ;
042B 8433                     JMP     RCKE            ;
                      ;                                < Error  ! >
042D D40F             SPCEI:  CALL    TSET05          ;Half bit time counter set & start.
                      ;
042F FE                       MOV     A,R6            ;RCK flag set.
0430 53BF                     ANL     A,#0BFH         ;
0432 AE                       MOV     R6,A            ;
                      ;
0433 D41B             RCKE:   CALL    VLF01           ;Stop bit "1" set.
                      ;
0435 2306                     MOV     A,#6            ;***NEXT [STOP0]***
0437 C4EF                     JMP     JMPR            ;RETR.
                      ;
                      ;
                      ;
                      ;"""""""""""""""""""""""""""""""""""""""""""""""""""""""""""""""""""""""
                      ;
                      ;                  <  ACK CHECK.  >
                      ;                                                                    #A7
                      ;"""""""""""""""""""""""""""""""""""""""""""""""""""""""""""""""""""""""
                      ;
                      ;      ....................................................
0439 00               ACK1:   NOP                     ;
043A 2647                     JNT0    CMCHK4          ;ACK bit detect.
                      ;      ....................................................
                      ;
043C D40F                     CALL    TSET05          ;Half bit time counter set & start.
                      ;
043E FE                       MOV     A,R6            ;RCK flag check !
043F D26A                     JB6     RCKEND          ;
                      ;
0441 B4FF             ERRCKT: CALL    BCNTBC          ;<  RCK error  !  >
0443 F28C                     JB7     DP04ST          ;
0445 C4AF                     JMP     DISEND          ;<ER>
                      ;
```

```
0447 D40F   CMCHK4:  CALL    TSET05        ;Half bit time counter set & start.
0449 FE              MOV     A,R6          ;
044A 924E            JB4     ABERSP        ;
044C 8441            JMP     ERRCKT        ;
            ;
044E B867   ABERSP:  MOV     R0,#DEMAPH    ;make error message (04).
0450 F0              MOV     A,@R0         ;
0451 5307            ANL     A,#07H        ;
0453 E7              RL      A             ;
0454 E7              RL      A             ;
0455 E7              RL      A             ;
0456 A9              MOV     R1,A          ;
0457 B837            MOV     R0,#DRMAPH    ;
0459 F0              MOV     A,@R0         ;
045A 5307            ANL     A,#07H        ;
045C 49              ORL     A,R1          ;
045D B856            MOV     R0,#RE84H     ;
045F A0              MOV     @R0,A         ;
0460 B858            MOV     R0,#RE84C     ;
0462 B004            MOV     @R0,#04H      ;
0464 B857            MOV     R0,#RE841     ;
0466 B000            MOV     @R0,#0H       ;
0468 8441            JMP     ERRCKT        ;
            ;
            ;                              (  ACK & RCK ok  !  )
046A D422   RCKEND:  CALL    PARCLL        ;Parity flag clear
            ;                                   & VLF flags clear.
            ;
046C B867            MOV     R0,#DEMAPH    ;Make address byte of 84 command.
046E F0              MOV     A,@R0         ;
046F 5307            ANL     A,#07H        ;[#POLING] <--- drop number ( upper
0471 E7              RL      A             ; 5 bit ) + device address ( lower
0472 E7              RL      A             ; 3 bit ).
0473 E7              RL      A             ;
0474 A9              MOV     R1,A          ;
0475 B837            MOV     R0,#DRMAPH    ;
0477 F0              MOV     A,@R0         ;
0478 5307            ANL     A,#07H        ;
047A 49              ORL     A,R1          ;
047B B86A            MOV     R0,#POLING    ;
047D A0              MOV     @R0,A         ;
            ;
047E B868            MOV     R0,#LAV1      ;
0480 B000            MOV     @R0,#0H       ;84 command flag set.
0482 B86B            MOV     R0,#CNTBY     ;Byte counter clear.
0484 B000            MOV     @R0,#0H       ;
            ;
0486 D414            CALL    VLF00         ;Start bit "0"  set.              test
            ;
0488 230B            MOV     A,#11         ;(Advance !)
            ;                               ***NEXT [KEYDAY]***
048A C4EF            JMP     JMPR          ;RETR.
            ;
048C E459   DP04ST:  JMP     INT04S        ;Disposal of 04 command.
            ;
            ;
            ;
            ;"""""""""""""""""""""""""""""""""""""""""""""""""""""""""""""""""""""
            ;
            ;****  84COM-84COM-84COM-84COM-84COM-84COM-84COM-84COM-84COM   ****
            ;*                                                                  *
            ;*                     DISPOSAL OF 84 COMMAND.                      *
            ;*                                                                  *
            ;****  84COM-84COM-84COM-84COM-84COM-84COM-84COM-84COM-84COM   ****
            ;
            ;"""""""""""""""""""""""""""""""""""""""""""""""""""""""""""""""""""""
            ;
            ;            (  START BIT Tx  <--- Rx ROUTINE.   )
            ;                                                               #C11
            ;"""""""""""""""""""""""""""""""""""""""""""""""""""""""""""""""""""""
            ;
            ;   ..............................................................
048E F8     KEYDAY:  MOV     A,R0          ;
048F 3D              MOVD    P5,A          ;Start bit trans.
            ;   ..............................................................

0490 D40B            CALL    TSET1         ;1 bit time counter set & start.
            ;
0492 D41B            CALL    VLF01         ;Start bit reset stb "1"  set.
```

```
                 ;
0494 230D                   MOV     A,#13          ;***NEXT [RSTAT]***
0496 C4EF                   JMP     JMPR           ;RETR.
                 ;
                 ;
                 ;
                 ;""""""""""""""""""""""""""""""""""""""""""""""""""""""""""""""""
                 ;
                 ;          <  START BIT ERASE.<--- Rx ROUTINE.  >
                 ;                                                            #C13
                 ;""""""""""""""""""""""""""""""""""""""""""""""""""""""""""""""""
                 ;
                 ;          ..................................................
0498 F8          RSTAT:     MOV     A,R0           ;Start bit clear.
0499 3D                     MOVD    P5,A           ;
                 ;          ..................................................
                 ;
049A D40F                   CALL    TSET05         ;Half bit time counter set & start.
                 ;
049C BA08                   MOV     R2,#08H        ;Bit counter set.
                 ;
049E 230E                   MOV     A,#14          ;***NEXT [RBSET]***
04A0 C4EF                   JMP     JMPR           ;RETR.
                 ;
                 ;
                 ;
                 ;""""""""""""""""""""""""""""""""""""""""""""""""""""""""""""""""
                 ;
                 ;          <  DATA Rx <--- Rx ROUTINE.  >
                 ;                                                            #C14
                 ;""""""""""""""""""""""""""""""""""""""""""""""""""""""""""""""""
                 ;
                 ;          ..................................................
04A2 00          RBSET:     NOP
04A3 26AB                   JNT0    VDATI1         ;Received data is
                 ;                                    " 0 " or " 1 "  ?
                 ;          ..................................................
                 ;
04A5 D40B                   CALL    TSET1          ;1 bit time counter set & start.
                 ;
04A7 F431                   CALL    VLFI0          ;<  Data = "0".  >
04A9 84B1                   JMP     CNTDN          ;
                 ;                                  <  Data = "1".  >
04AB D40B        VDATI1:    CALL    TSET1          ;1 bit time counter set & start.
                 ;
04AD D429                   CALL    PALAN          ;Parity flag set.
04AF F42B                   CALL    VLFI1          ;
                 ;
04B1 EAB7        CNTDN:     DJNZ    R2,SETRB       ;Receive end or not ?
                 ;
                 ;                                  < Receive end ! >
04B3 230C        PALKS:     MOV     A,#12          ;***NEXT [PALK]***
04B5 C4EF                   JMP     JMPR           ;RETR.
                 ;
                 ;                                  < Receive continue ! >
04B7 230E        SETRB:     MOV     A,#14          ;***NEXT [RBSET]***
04B9 C4EF                   JMP     JMPR           ;RETR.
                 ;
                 ;
                 ;
                 ;""""""""""""""""""""""""""""""""""""""""""""""""""""""""""""""""
                 ;
                 ;          <  PARITY BIT Rx.<--- Rx ROUTINE.  >
                 ;                                                            #C12
                 ;""""""""""""""""""""""""""""""""""""""""""""""""""""""""""""""""
                 ;
                 ;          ..................................................
04BB 00          PALK:      NOP
04BC 26D5                   JNT0    PTYBI          ;Parity bit Rx.
                 ;          ..................................................
                 ;
04BE D40F                   CALL    TSET05         ;Half bit time counter set & start.
                 ;
04C0 B869                   MOV     R0,#ANSPAR     ;(Parity bit = "0")
04C2 F0                     MOV     A,@R0          ;
04C3 12C7                   JB0     NCKAC          ;
04C5 84CD                   JMP     ACKAC          ;
                 ;
04C7 D41B        NCKAC:     CALL    VLF01          ;( Parity error ! )
                 ;                                  NACK "1" set.
```

```
                ;
04C9 2311                MOV     A,#17           ;***NEXT [NCKOT]***
04CB C4EF                JMP     JMPR            ;RETR.
                ;
                ;                                 ( Parity ok ! )
04CD D424       ACKAC:   CALL    PARCLR          ;Parity flag clear.
04CF D414                CALL    VLF00           ;
                ;                                 ACK "0" set.
                ;
04D1 230F                MOV     A,#15           ;***NEXT [ACKOT]***
04D3 C4EF                JMP     JMPR            ;RETR.
                ;
04D5 D40F       PTYBI:   CALL    TSET05          ;Half bit time counter set & start.
                ;
04D7 B869                MOV     R0,#ANSPAR      ;Parity bit = "1" ?
04D9 F0                  MOV     A,@R0           ;
04DA 12CD                JB0     ACKAC           ;(Parity Ok !)
04DC 84C7                JMP     NCKAC           ;(Parity error !)
                ;
                ;
                ;
                ;""""""""""""""""""""""""""""""""""""""""""""""""""""""""""""""""
                ;
                ;              ( ACK Tx.<--- Rx ROUTINE.  )
                ;                                                        #C15
                ;""""""""""""""""""""""""""""""""""""""""""""""""""""""""""""""""
                ;
                ;        ...............................................
04DE F8         ACKOT:   MOV     A,R0            ;ACK trans.
04DF 3D                  MOVD    P5,A            ;
                ;        ...............................................
                ;
04E0 D40F                CALL    TSET05          ;Half bit time counter set & start.
                ;
04E2 FF                  MOV     A,R7            ;
04E3 4380                ORL     A,#80H          ;Response flag set.
04E5 AF                  MOV     R7,A            ;
                ;
04E6 D41B                CALL    VLF01           ;Stop bit "1" set.
                ;
04E8 231A                MOV     A,#26           ;***NEXT [LCIN]***
04EA C4EF                JMP     JMPR            ;RETR.
                ;
                ;
                ;""""""""""""""""""""""""""""""""""""""""""""""""""""""""""""""""
                ;
                ;          ( STOP BIT Tx 1. CHALLENGE Rx ONCE MORE. )
                ;                                                        #D25
                ;""""""""""""""""""""""""""""""""""""""""""""""""""""""""""""""""
                ;
                ;        ...............................................
04EC F8         REPRX:   MOV     A,R0            ;Stop bit Tx.
04ED 3D                  MOVD    P5,A            ;
                ;        ...............................................
                ;
04EE D40B                CALL    TSET1           ;1 bit time counter set & start.
                ;
04F0 D424                CALL    PARCLR          ;Parity flag clear.
                ;
04F2 D414                CALL    VLF00           ;Start bit "0" set.
                ;
04F4 230B                MOV     A,#11           ;***NEXT [KEYDAY]***
04F6 C4EF                JMP     JMPR            ;RETR.
                ;
                ;
                ;
                ;""""""""""""""""""""""""""""""""""""""""""""""""""""""""""""""""
                ;
                ;          ( STOP BIT Tx 2.<--- FOR 04 COMMAND.  )
                ;                                                        #D22
                ;""""""""""""""""""""""""""""""""""""""""""""""""""""""""""""""""
                ;
                ;        ...............................................
04F8 F8         STER04:  MOV     A,R0            ;Stop bit trans.
04F9 3D                  MOVD    P5,A            ;
                ;        ...............................................
                ;
04FA D40B                CALL    TSET1           ;1 bit time counter set & start.
                ;
```

```
04FC B827            MOV     R0,#SDMSGC      ;
04FE B002            MOV     @R0,#02H        ;Error indicator set.
0500 B826            MOV     R0,#SDMSG1      ;
0502 B000            MOV     @R0,#0H         ;
                ;
0504 E48A            JMP     R04ERS          ;
                ;
                ;
                ;
                ;**************************************************************
                ;
                ;          ( STOP BIT Tx 3. FOR 84 COMMAND.  )
                ;                                                          #D21
                ;**************************************************************
                ;
                ;     ....................................................
0506 F8         STER84:  MOV     A,R0            ;Stop bit trans.
0507 3D              MOVD    P5,A            ;
                ;     ....................................................
                ;
0508 D40B            CALL    TSET1           ;1 bit time counter set & start.
                ;
050A B86A            MOV     R0,#POLING      ;Drop & device address set
                ;                                 to response buffer.
050C F0              MOV     A,@R0           ;
050D B856            MOV     R0,#RE84H       ;
050F A0              MOV     @R0,A           ;
                ;
0510 B858            MOV     R0,#RE84C       ;
0512 B002            MOV     @R0,#02H        ;( DEVICE to ECU link error ! )
0514 B857            MOV     R0,#RE841       ;Error indicator set.
0516 B000            MOV     @R0,#0H         ;
0518 C4AF            JMP     DISEND
                ;
                ;
                ;
                ;-----------------------------------------------SUB ROUTINE---
                ;
                ;    [ INPUT DATA SET TO 04 BUF. & BYTE COUNTER INC.ROUTINE. ]
                ;
                ;--------------------------------------------------------------
                ;
051A D403       INDABY:  CALL    CNTBCK          ;
051C 0328            ADD     A,#SDMSGC+1     ;
051E A8              MOV     R0,A            ;
051F FB              MOV     A,R3            ;
0520 A0              MOV     @R0,A           ;Input data set to 04 buf.
                ;
0521 D407            CALL    BCNINC          ;Byte counter Inc.
0523 83              RET
                ;
                ;
                ;**************************************************************
                ;
                ;         ( STOP BIT Tx 4. 04 COMMAND ALL OK ! END !  )
                ;                                                          #D24
                ;**************************************************************
                ;
                ;     ....................................................
0524 F8         STGR04:  MOV     A,R0            ;Stop bit trans.
0525 3D              MOVD    P5,A            ;
                ;     ....................................................
                ;
0526 D40B            CALL    TSET1           ;1 bit time counter set & start.
                ;
0528 B827            MOV     R0,#SDMSGC      ;Device address clear.
052A F0              MOV     A,@R0           ;
052B 53F8            ANL     A,#0F8H         ;
052D 77              RR      A               ;
052E 77              RR      A               ;
052F 77              RR      A               ;
0530 A0              MOV     @R0,A           ;
                ;
0531 B41A            CALL    INDABY          ;Input data set to 04 buf.
                ;                                & byte counter inc.routine.
                ;
0533 10              INC     @R0             ;
                ;
0534 F0              MOV     A,@R0           ;
```

```
0535 B826                 MOV     R0,#SDMSG1     ;Byte counter buffer set.
0537 A0                   MOV     @R0,A          ;
                ;
0538 E48A                 JMP     R04ERS
                ;
                ;
                ;
                ;****************************************************
                ;
                ;              ( NCK Tx.<--- Rx ROUTINE.  )
                ;                                                  #C17
                ;****************************************************
                ;
                ;         ..............................................
053A F8         NCKOT:    MOV     A,R0           ;NCK trans.
053B 3D                   MOVD    P5,A           ;
                ;         ..............................................
                ;
053C D40B                 CALL    TSET1          ;1 bit time counter set & start.
                ;
053E FE                   MOV     A,R6           ;
053F 5248                 JB2     REPER          ;Error = 5 times ?
0541 1E                   INC     R6             ;Error counter inc.
0542 D41B                 CALL    VLF01          ;
                ;                                 Stop  bit "1" set.
                ;
0544 2319                 MOV     A,#25          ;***NEXT [REPRX]***
0546 C4EF                 JMP     JMPR           ;RETR.
                ;
0548 B868       REPER:    MOV     R0,#LAV1       ;( 5 times error ! )
054A F0                   MOV     A,@R0          ;Disposal of 04 command or
                ;                                      84 command ?
054B C653                 JZ      JER84          ;
054D D41B                 CALL    VLF01          ;04 command error response.
                ;                                 stop bit "1" set.
                ;
054F 2316                 MOV     A,#22          ;***NEXT [STER04]***
0551 C4EF                 JMP     JMPR           ;RETR.
                ;
0553 D41B       JER84:    CALL    VLF01          ;84 ( dr polling ) error response.
                ;                                 stop bit "1" set.
                ;
0555 2315                 MOV     A,#21          ;***NEXT [STER84]***
0557 C4EF                 JMP     JMPR           ;RETR.
                ;
                ;
                ;****************************************************
                ;
                ;         ( LAST CHARACTER INDICATOR CHECK.  )
                ;                                                  #D26
                ;****************************************************
                ;
                ;         ..............................................
0559 00         LCIN:     NOP
055A 267B                 JNT0    LCIEN          ;Last character indicator
                ;                                   detect.
                ;         ..............................................
                ;
055C D40F                 CALL    TSET05         ;Half bit time counter set & start.
                ;
055E B868                 MOV     R0,#LAV1       ;
0560 F0                   MOV     A,@R0          ;
0561 C66F                 JZ      BAI84          ;Disposal of 84 command or
                ;
0563 D403                 CALL    CNTBCK         ;Byte counter check.
0565 D304                 XRL     A,#4H          ;Data <= 5 byte ?
0567 C63E                 JZ      LCIER          ;(    04    )error.
                ;                                 good !
0569 D41B                 CALL    VLF01          ;(  Disposal of 04 command !  )
                ;                                 Stop bit "1" set.
                ;
056B 2312                 MOV     A,#18          ;***NEXT [STGN04]***
056D C4EF                 JMP     JMPR           ;RETR.
                ;
056F D403       BAI84:    CALL    CNTBCK         ;
0571 D304                 XRL     A,#4H          ;Data <= 5 byte ?
0573 C694                 JZ      DY84           ;(    84    )error.
                ;
                ;                                 good !
```

```
0575 D41B                   CALL    VLF01         ;( Disposal of 84 command ! )
           ;                                       Stop bit "1" set.
           ;
0577 2310                   MOV     A,#16         ;***NEXT [STGN84]***
0579 C4EF                   JMP     JMPR          ;RETR.
           ;
057B D40F        LCIEN:     CALL    TSET05        ;Half bit time counter set & start.
           ;
057D B868                   MOV     R0,#LAV1      ;
057F F0                     MOV     A,@R0         ;
0580 C688                   JZ      ENST84        ;
0582 D41B                   CALL    VLF01         ;( Disposal of 04 command ! )
           ;                                       Stop bit "1" set.
           ;
0584 2318                   MOV     A,#24         ;***NEXT [STGR04]***
0586 C4EF                   JMP     JMPR          ;RETR.
           ;
           ;                                       ( Disposal of 84 command ! )
0588 D41B        ENST84:    CALL    VLF01         ;
           ;                                       Stop bit "1" set.
           ;
058A 2317                   MOV     A,#23         ;***NEXT [STGR84]***
058C C4EF                   JMP     JMPR          ;RETR.
           ;
           ;                                       ( grater than 5 byte! )
058E D41B        LCIER:     CALL    VLF01         ;( Disposal of 04 command ! )
           ;                                       Stop bit "1" set.
           ;
0590 2316                   MOV     A,#22         ;***NEXT [STER04]***
0592 C4EF                   JMP     JMPR          ;RETR.
           ;
0594 D41B        DY84:      CALL    VLF01         ;( Disposal of 84 command ! )
           ;                                       Stop bit "1" set.
           ;
0596 2315                   MOV     A,#21         ;***NEXT [STER84]***
0598 C4EF                   JMP     JMPR          ;RETR.
           ;
           ;
           ;
           ;""""""""""""""""""""""""""""""""""""""""""""""""""""""""""""""""""""""
           ;
           ;            (   STOP BIT Tx 5.  84 COMMANMD ALL OK ! END !   )
           ;                                                                  #D23
           ;""""""""""""""""""""""""""""""""""""""""""""""""""""""""""""""""""""""
           ;
           ;           ................................................
059A F8          STGR84:    MOV     A,R0          ;Stop bit trans.
059B 3D                     MOVD    P5,A          ;
           ;           ................................................
           ;
059C D40B                   CALL    TSET1         ;1 bit time counter set & start.
           ;
059E B4CC                   CALL    REDSTB        ;Response data set to 84 buffer.
           ;
05A0 B86A                   MOV     R0,#POLING    ;Disposal address buffer set.
05A2 F0                     MOV     A,@R0         ;
05A3 B856                   MOV     R0,#RE84H     ;
05A5 A0                     MOV     @R0,A         ;
05A6 D407                   CALL    BCNINC        ;Byte counter buffer set.
05A8 F0                     MOV     A,@R0         ;
05A9 B857                   MOV     R0,#RE841     ;
05AB A0                     MOV     @R0,A         ;
05AC C4AF                   JMP     DISEND
           ;
           ;
           ;
           ;""""""""""""""""""""""""""""""""""""""""""""""""""""""""""""""""""""""
           ;
           ;            (   STOP BIT Tx 6. 84 COMMAND Rx DATA CONTINUE.   )
           ;                                                                  #C16
           ;""""""""""""""""""""""""""""""""""""""""""""""""""""""""""""""""""""""
           ;
           ;           ................................................
05AE F8          STGN84:    MOV     A,R0          ;Stop bit trans.
05AF 3D                     MOVD    P5,A          ;
           ;           ................................................
           ;
05B0 D40B                   CALL    TSET1         ;1 bit time counter set & start.
           ;
```

```
05B2 B4CC                CALL    REDSTB          ;Input data set to 84 command
                 ;                                           buffer.
05B4 D407                CALL    BCHINC          ;Byte counter Inc.
                 ;
05B6 D422                CALL    PARCLL          ;Parity flag clear
                 ;                                     & VLF flags clear.
                 ;
05B8 D414                CALL    VLF00           ;
                 ;                                Start bit "0" set.
                 ;
05BA 2308                MOV     A,#11           ;***NEXT [KEYDAY]***
05BC C4EF                JMP     JMPR            ;RETR.
                 ;
                 ;
                 ;
                 ;"""""""""""""""""""""""""""""""""""""""""""""""""""""""""""""""""""
                 ;
                 ;        < STOP BIT Tx 7. 04 COMMAND DATA Rx CONTINUE.   >
                 ;                                                                #C18
                 ;"""""""""""""""""""""""""""""""""""""""""""""""""""""""""""""""""""
                 ;
                 ;       ...................................................
058E F8          STGN04: MOV     A,R0            ;Stop bit trans.
058F 3D                  MOVD    P5,A            ;
                 ;       ...................................................
                 ;
05C0 D40B                CALL    TSET1           ;1 bit time counter set & start.
                 ;
05C2 B41A                CALL    INDABY          ;Input data set to 04 buf.
                 ;                                  byte counter inc. routine.
                 ;
05C4 D422                CALL    PARCLL          ;Parity flag clear
                 ;                                     & VLF flags clear.
                 ;
05C6 D414                CALL    VLF00           ;
                 ;                                Start bit "0" set.
                 ;
05C8 2308                MOV     A,#11           ;***NEXT [KEYDAY]***
05CA C4EF                JMP     JMPR            ;RETR.
                 ;
                 ;
                 ;
                 ;"""""""""""""""""""""""""""""""""""""""""""""""""""""""""""""""""""
                 ;-------------------------------------------------SUB ROUTINE---
                 ;
                 ;            [ RESPONSE DATA SET TO 84 BUFFER. ]
                 ;
                 ;---------------------------------------------------------------
                 ;
05CC D403        REDSTB: CALL    CNTBCK          ;
05CE 0358                ADD     A,#RE84C        ;
05D0 A8                  MOV     R0,A            ;
05D1 FB                  MOV     A,R3            ;
05D2 A0                  MOV     @R0,A           ;Input data set to 84 buf.
05D3 83                  RET                     ;
                 ;
                 ;
                 ;---------------------------------------------------------------
                 ;
                 ;****  04COM-04COM-04COM-04COM-04COM-04COM-04COM-04COM-04COM  ****
                 ;*                                                               *
                 ;*                   DISPOSAL OF 04 COMMAND.                     *
                 ;*                                                               *
                 ;****  04COM-04COM-04COM-04COM-04COM-04COM-04COM-04COM-04COM  ****
                 ;
                 ;"""""""""""""""""""""""""""""""""""""""""""""""""""""""""""""""""""
                 ;
                 ;          <  START BIT Tx. <--- 04 COMMAND.  >
                 ;                                                                #D20
                 ;"""""""""""""""""""""""""""""""""""""""""""""""""""""""""""""""""""
                 ;
                 ;       ...................................................
05D4 F8          COM04:  MOV     A,R0            ;Start bit trans.
05D5 3D                  MOVD    P5,A            ;
                 ;       ...................................................
                 ;
05D6 D40B                CALL    TSET1           ;1 bit time counter set & start.
                 ;
05D8 B827                MOV     R0,#SDMSGC      ;
```

```
05DA F0               MOV    A,@R0           ;
05DB B85D             MOV    R0,#TXBUF       ;Tx buffer <--- command (04)
05DD A0               MOV    @R0,A           ;
05DE B868             MOV    R0,#LAV1        ;
05E0 B013             MOV    @R0,#19         ;[LAV1] <-- ACK3.
05E2 D414             CALL   VLF00           ;MI bit "0" set.
                 ;
05E4 2302             MOV    A,#2            ;***NEXT (MI00)***
05E6 C4EF             JMP    JMPR            ;RETR.
                 ;
                 ;
                 ;
                 ;""""""""""""""""""""""""""""""""""""""""""""""""""""""""""""
                 ;
                 ;                  (   04 COMMAND  DATA Tx.    )
                 ;                                                          #B10
                 ;""""""""""""""""""""""""""""""""""""""""""""""""""""""""""""
                 ;
                 ;          ..................................................
05E8 F8          COM04D:  MOV    A,R0            ;Start bit Tx.
05E9 3D                   MOVD   P5,A            ;
                 ;          ..................................................
                 ;
05EA D40B                 CALL   TSET1           ;1 bit time counter set & start.
                 ;
05EC D403                 CALL   CNTBCK          ;
05EE 0327                 ADD    A,#SDMSGC       ;
05F0 A8                   MOV    R0,A            ;
05F1 F0                   MOV    A,@R0           ;
05F2 B85D                 MOV    R0,#TXBUF       ;Tx buffer <--- Data set.
05F4 A0                   MOV    @R0,A           ;
05F5 B868                 MOV    R0,#LAV1        ;
05F7 B009                 MOV    @R0,#9          ;[LAV1] <--- ACK4.
05F9 D41B                 CALL   VLF01           ;MI bit "1" set.
                 ;
05FB 2302                 MOV    A,#2            ;***NEXT (MI00)***
05FD C4EF                 JMP    JMPR            ;RETR.
                 ;
                 ;
                 ;
                 ;""""""""""""""""""""""""""""""""""""""""""""""""""""""""""""
                 ;-----------------------------------------------SUB ROUTINE----
                 ;
                 ;                  [  BYTE COUNT BYTE CHECK.  ]
                 ;
                 ;--------------------------------------------------------------
                 ;
05FF B826        BCNTBC:  MOV    R0,#SDMSG1      ;
0601 F0                   MOV    A,@R0           ;
0602 83                   RET
                 ;
                 ;
                 ;-----------------------------------------------SUB ROUTINE---
                 ;
                 ;                  [  BYTE COUNTER CHECK.  ]
                 ;
                 ;--------------------------------------------------------------
                 ;
0603 B86B        CNTBCK:  MOV    R0,#CNTBY       ;
0605 F0                   MOV    A,@R0           ;
0606 83                   RET
                 ;
                 ;
                 ;-----------------------------------------------SUB ROUTINE---
                 ;
                 ;                  [  BYTE COUNTER INC.  ]
                 ;
                 ;--------------------------------------------------------------
                 ;
0607 B86B        BCNINC:  MOV    R0,#CNTBY       ;
0609 10                   INC    @R0             ;
060A 83                   RET
                 ;
                 ;
                 ;-----------------------------------------------SUB ROUTINE---
                 ;
                 ;                  [  1 BIT TIME COUNTER SET.  ]
                 ;
                 ;--------------------------------------------------------------
```

```
                ;
060B 23EF       TSET1:   MOV     A,#239          ;
060D C411                JMP     TIST            ;
                ;
                ;
                ;-----------------------------------------------------SUB ROUTINE--
                ;
                ;                 [  HALF BIT TIME COUNTER SET. ]
                ;
                ;-------------------------------------------------------------------
                ;
060F 23F8       TSET05:  MOV     A,#248          ;
                ;
0611 62         TIST:    MOV     T,A             ;
0612 45                  STRT    CNT             ;
0613 83                  RET
                ;
                ;
                ;-----------------------------------------------------SUB ROUTINE---
                ;
                ;                 [  VLF OUTPUT DATA "0" SET.   ]
                ;
                ;-------------------------------------------------------------------
                ;
0614 B837       VLF00:   MOV     R0,#DRMAPH      ;
0616 F0                  MOV     A,@R0           ;
0617 5307                ANL     A,#07H          ;
0619 C420                JMP     VLFOST          ;
                ;
                ;
                ;-----------------------------------------------------SUB ROUTINE---
                ;
                ;                 [  VLF OUTPUT DATA "1" SET.   ]
                ;
                ;-------------------------------------------------------------------
                ;
061B B837       VLF01:   MOV     R0,#DRMAPH      ;
061D F0                  MOV     A,@R0           ;
061E 4308                ORL     A,#08H          ;
0620 A8         VLFOST:  MOV     R0,A            ;
0621 83                  RET
                ;
                ;
                ;-----------------------------------------------------SUB ROUTINE---
                ;
                ;                    [  PARITY FLAG CLEAR.   ]
                ;
                ;-------------------------------------------------------------------
                ;
0622 BE00       PARCLL:  MOV     R6,#0           ;VLF flags clear.
                ;
0624 B869       PARCLR:  MOV     R0,#ANSPAR      ;Parity flag clear.
0626 B000                MOV     @R0,#0H         ;
0628 83                  RET
                ;
                ;
                ;-----------------------------------------------------SUB ROUTINE---
                ;
                ;                      [  PARITY CHECK.   ]
                ;
                ;-------------------------------------------------------------------
                ;
0629 B869       PALAN:   MOV     R0,#ANSPAR      ;
062B 10                  INC     @R0             ;
062C 83                  RET
                ;
                ;
                ;-----------------------------------------------------SUB ROUTINE---
                ;
                ;              [ Error response set to 04 buffer. ]
                ;
                ;-------------------------------------------------------------------
                ;
062D B827       ERRSES:  MOV     R0,#SDMSGC      ;Error indicate .
062F FE                  MOV     A,R6            ;
0630 D236                JB6     ERRSEA          ;
0632 B003                MOV     @R0,#03H        ;( abnormal error  ! )
0634 C438                JMP     ERRSEE          ;
                ;
0636 B001       ERRSEA:  MOV     @R0,#01H        ;( normal error  ! )
```

```
0638 B826   ERRSEE:  MOV     R0,#SDMSG1      ;
063A B000            MOV     @R0,#0H         ;
063C E48A            JMP     R04ERS          ;
            ;
            ;
            ;""""""""""""""""""""""""""""""""""""""""""""""""""""""""""""""""""""""""
            ;
            ;               (  ACK CHECK 3 <--- 04 COMMAND.  )
            ;                                                                  #D29
            ;""""""""""""""""""""""""""""""""""""""""""""""""""""""""""""""""""""""""
            ;
            ;        ..........................................................
063E 00     ACK3:    NOP                     ;
063F 2648            JNT0    ACKER           ;ACK bit Rx.
            ;        ..........................................................
            ;
0641 D40F            CALL    TSET05          ;Half bit time counter set & start.
            ;
0643 FE              MOV     A,R6            ;RCK ?
0644 D254            JB6     ACKSSC          ;
0646 C44A            JMP     ACKER2          ;
            ;                                 RCK error.
0648 D40F   ACKER:   CALL    TSET05          ;Half bit time counter set & start.
            ;
064A FE     ACKER2:  MOV     A,R6            ;
064B 527D            JB2     ACEND           ;5 times error ?
064D 1E              INC     R6              ;
064E D414            CALL    VLF00           ;Re-challenge.
            ;                                 Start bit "0" set.
            ;
0650 2314            MOV     A,#20           ;***NEXT (COM04)***
0652 C4EF            JMP     JMPR            ;RETR.
            ;
0654 B824   ACKSSC:  MOV     R0,#SDMSGK      ;(command only!)
0656 F0              MOV     A,@R0           ;
0657 325F            JB1     RWMOD           ;
0659 B826            MOV     R0,#SDMSG1      ;
065B B040            MOV     @R0,#01000000B;
065D E48A            JMP     R04ERS          ;
            ;
065F 126D   RWMOD:   JB0     RDMOD           ;Command + RD or WR ?
0661 B86B            MOV     R0,#CNTBY       ;
0663 B001            MOV     @R0,#1H         ;
0665 D422            CALL    PARCLL          ;Parity flag clear
            ;                                        & VLF flags clear.
0667 D414            CALL    VLF00           ;
            ;                                 Start bit "0" set.
            ;
            ;                                 (command + message!)
0669 230A            MOV     A,#10           ;***NEXT (COM04D)***
066B C4EF            JMP     JMPR            ;RETR.
            ;
066D D422   RDMOD:   CALL    PARCLL          ;Parity flag clear
            ;                                        & VLF flags clear.
066F B868            MOV     R0,#LAV1        ;
0671 B001            MOV     @R0,#1H         ;
0673 B86B            MOV     R0,#CNTBY       ;
0675 B000            MOV     @R0,#0H         ;
0677 D414            CALL    VLF00           ;Start bit "0" set.
            ;
            ;                                 (command + response!)
0679 230B            MOV     A,#11           ;***NEXT [KEYDAY]***
067B C4EF            JMP     JMPR            ;RETR.
            ;
067D C42D   ACEND:   JMP     ERRSES          ;
            ;
            ;
            ;
            ;""""""""""""""""""""""""""""""""""""""""""""""""""""""""""""""""""""""""
            ;
            ;               (  ACK CHECK 4.  <--- 04 COMMAND.  )
            ;                                                                  #B9
            ;""""""""""""""""""""""""""""""""""""""""""""""""""""""""""""""""""""""""
            ;
            ;        ..........................................................
067F 00     ACK4:    NOP                     ;
0680 2689            JNT0    AERCK           ;ACK bit check.
            ;        ..........................................................
            ;
```

```
0682 D40F                  CALL    TSET05          ;Half bit time counter set & start.
                 ;
0684 FE                    MOV     A,R6            ;(ACK !)
0685 D293                  JB6     AOKCK           ;
0687 C48B                  JMP     AERCK2          ;
                 ;
                 ;                                  (  NCK  !  )
0689 D40F        AERCK:    CALL    TSET05          ;Half bit time counter set & start.
                 ;
068B FE          AERCK2:   MOV     A,R6            ;5 times error ?
068C 52A7                  JB2     AENCK           ;
068E 1E                    INC     R6              ;Error counter Inc.
                 ;                                  Challenge once more.
068F D424                  CALL    PARCLR          ;Parity flag clear.
0691 C4A1                  JMP     A04CON          ;
                 ;
0693 B4FF        AOKCK:    CALL    BCNTBC          ;(  ACK & RCK ok !  )
0695 5307                  ANL     A,#07H          ;
0697 A9                    MOV     R1,A            ;
0698 C9                    DEC     R1              ;
0699 D403                  CALL    CNTBCK          ;
069B D9                    XRL     A,R1            ;
069C C6A9                  JZ      END04W          ;Tx operation end or not ?
069E 10                    INC     @R0             ;
069F D424                  CALL    PARCLR          ;Parity flag clear.
                 ;
                 ;                                  (  Tx operation continue
                 ;                                        for 04 com ! )
06A1 D414        A04CON:   CALL    VLF00           ;Start bit "0" set.
                 ;
06A3 230A                  MOV     A,#10           ;***NEXT (COM04D)***
06A5 C4EF                  JMP     JMPR            ;RETR.
                 ;
06A7 C42D        AENCK:    JMP     ERRSES          ;04 command response error.
                 ;                                   Error indicator set.
                 ;
                 ;                                  ( Tx operation end for 04 com !  )
06A9 B826        END04W:   MOV     R0,#SDMSG1      ;
06AB B040                  MOV     @R0,#01000000B;
06AD E48A                  JMP     R04ERS          ;
                 ;
                 ;
                 ;
                 ;*************************************************************
                 ;--------------------------------------------------SUB ROUTINE---
                 ;
                 ;                   [  JMP TO HEAD ROUTINE.  ]
                 ;
                 ;---------------------------------------------------------------
                 ;
06AF D422        DISEND:   CALL    PARCLL          ;Parity flag clear
                 ;                                        & VLF flags clear.
06B1 B857                  MOV     R0,#RE841
06B3 F0                    MOV     A,@R0
06B4 F2BA                  JB7     JPIDL
06B6 231B                  MOV     A,#27
06B8 C4EF                  JMP     JMPR
                 ;
06BA FF          JPIDL:    MOV     A,R7            ;Response flags check !
06BB F2CA                  JB7     PCHKS           ;
                 ;
                 ;                                  ( no  response  ! )
06BD B867        CONTDE:   MOV     R0,#DEMAPH      ;Device end ?
06BF F0                    MOV     A,@R0           ;
06C0 F2C5                  JB7     ALEND           ;
06C2 1D                    INC     R5
06C3 6477                  JMP     DMSRE           ;Device continue.
                 ;
                 ;
06C5 FF          ALEND:    MOV     A,R7            ;
06C6 D2E8                  JB6     PRDR2           ;
06C8 C4F2                  JMP     NTDRP           ;
                 ;
                 ;                                  ( response  ! )
06CA 537F        PCHKS:    ANL     A,#7FH          ;
06CC AF                    MOV     R7,A            ;Response flag clear.
                 ;
06CD 92E4                  JB4     PRDEV           ;
                 ;
```

```
06CF B867               MOV     R0,#DEMAPH      ;
06D1 F0                 MOV     A,@R0           ;
06D2 F2DF               JB7     QUESE           ;
06D4 FF                 MOV     A,R7            ;
06D5 B2D9               JB5     PRLSFS          ;
             ;
06D7 C4BD               JMP     CONTDE          ;
             ;
06D9 FF      PRLSFS:    MOV     A,R7            ;
06DA 4340               ORL     A,#040H         ;
06DC AF                 MOV     R7,A            ;
06DD C4BD               JMP     CONTDE          ;
             ;
06DF FF      QUESE:     MOV     A,R7            ;
06E0 B2EB               JB5     PRDRP           ;
06E2 C4BD               JMP     CONTDE          ;(  R.R.device poll &
             ;                                     R.R.drop poll.  )
06E4 B2E8    PRDEV:     JB5     PRDR2           ;(  Priority device poll
             ;                                    & R.R.drop poll.  )
06E6 C4F2               JMP     NTDRP           ;Next drop select.
             ;
06E8 53BF    PRDR2:     ANL     A,#0BFH         ;
06EA AF                 MOV     R7,A            ;
             ;
06EB BD5E    PRDRP:     MOV     R5,#DEMAP0
06ED C4FC               JMP     STDPS           ;(  Priority or R.R.device poll
             ;                                    & priority drop poll.  )
             ;                                   1st drop select.
             ;
             ;-----------------------------------------------SUB ROUTINE---
             ;
             ;                     [  RETURN ROUTINE.  ]
             ;
             ;-------------------------------------------------------------
             ;
06EF C5      JMPR:      SEL     RB0             ;
06F0 2F                 XCH     A,R7            ;
06F1 93                 RETR
             ;
             ;
             ;-----------------------------------------------SUB ROUTINE---
             ;
             ;                [  NEXT ACCESS DROP SELECT.  ]
             ;
             ;-------------------------------------------------------------
             ;
             ;
06F2 BD5E    NTDRP:     MOV     R5,#DEMAP0      ;
06F4 FC                 MOV     A,R4            ;
06F5 A8                 MOV     R0,A            ;
06F6 F0                 MOV     A,@R0           ;
06F7 F2FC               JB7     STDPS           ;Drop end or not ?
06F9 1C                 INC     R4              ;( not end ! )
             ;                                   Next drop set.
06FA E409               JMP     SETSD           ;
             ;
             ;
06FC BC31    STDPS:     MOV     R4,#DRMAP0      ;( Drop end ! )
06FE B831               MOV     R0,#DRMAP0      ;
0700 F0                 MOV     A,@R0           ;
0701 7205               JB3.    SELSET          ;Drop map set or not ?
             ;
0703 E409               JMP     SETSD
             ;
             ;                                   ( Not set ! )
0705 2304    SELSET:    MOV     A,#4            ;***NEXT [MTMINT]***
0707 C4EF               JMP     JMPR            ;RETR.
             ;
0709 FC      SETSD:     MOV     A,R4            ;(  Set !  )
070A A8                 MOV     R0,A            ;
070B F0                 MOV     A,@R0           ;
             ;
070C 4308    ANSWO:     ORL     A,#08H          ;
070E A8                 MOV     R0,A            ;
             ;
070F FF                 MOV     A,R7            ;
0710 3216               JB1     DSCF84          ;
             ;
0712 231C               MOV     A,#28           ;***NEXT [DSCF84]***
0714 C4EF               JMP     JMPR            ;RETR.
```

```
                 ;
                 ;
                 ;-------------------------------------------------------------
                 ;"""""""""""""""""""""""""""""""""""""""""""""""""""""""""""""
                 ;
                 ;                  [ DROP SCAN FOR 84 COMMAND. ]
                 ;                                                          #D28
                 ;"""""""""""""""""""""""""""""""""""""""""""""""""""""""""""""
                 ;
                 ;          ..............................................
0716 F8          DSCF84:  MOV     A,R0            ;Drop scan.
0717 3D                   MOVD    P5,A            ;
                 ;          ..............................................
                 ;
0718 FF                   MOV     A,R7            ;
0719 321D                 JB1     DSCFJJ          ;
                 ;
071B D40B                 CALL    TSET1           ;1 bit time counter set.
                 ;
071D FF          DSCFJJ:  MOV     A,R7            ;Response flag 2 clear.
071E 53FD                 ANL     A,#0FDH         ;
0720 AF                   MOV     R7,A            ;
                 ;
0721 F8                   MOV     A,R0            ;
0722 5387                 ANL     A,#087H         ;
0724 B837                 MOV     R0,#DRMAPH      ;
0726 A0                   MOV     @R0,A           ;
                 ;
0727 2304                 MOV     A,#4            ;***NEXT [MTMINT]***
0729 C4EF                 JMP     JMPR            ;RETR.
                 ;
                 ;
                 ;"""""""""""""""""""""""""""""""""""""""""""""""""""""""""""""
                 ;-------------------------------------------------SUB ROUTINE---
                 ;
                 ;                  [  VLF INPUT DATA " 1 " SET.  ]
                 ;
                 ;-------------------------------------------------------------
                 ;
072B 97          VLFI1:   CLR     C               ;
072C A7                   CPL     C               ;
                 ;
072D FB          VLFRST:  MOV     A,R3            ;
072E 67                   RRC     A               ;
072F AB                   MOV     R3,A            ;
0730 83                   RET
                 ;
                 ;
                 ;-------------------------------------------------------------
                 ;-------------------------------------------------SUB ROUTINE---
                 ;
                 ;                  [  VLF INPUT DATA " 0 " SET.  ]
                 ;
                 ;-------------------------------------------------------------
                 ;
0731 97          VLFI0:   CLR     C               ;
0732 E42D                 JMP     VLFRST          ;
                 ;
                 ;
                 ;"""""""""""""""""""""""""""""""""""""""""""""""""""""""""""""
                 ;
                 ;                  ( WAIT for 84 COMMAND DISPOSAL. )
                 ;
                 ;"""""""""""""""""""""""""""""""""""""""""""""""""""""""""""""
                 ;
0734 D40F        IDLINT:  CALL    TSET05          ;Half bit time counter set & start.
0736 B857                 MOV     R0,#RE841       ;84 buffer empty.
0738 F0                   MOV     A,@R0           ;
0739 F243                 JB7     DNTSET          ;
                 ;
                 ;
073B B4FF                 CALL    BCNTBC          ;Exit 04 operation.
073D F245                 JB7     ST04DP          ;
                 ;
073F 2318                 MOV     A,#27           ;***NEXT [IDLINT]***
0741 C4EF                 JMP     JMPR            ;
                 ;
0743 C48A        DNTSET:  JMP     JPIDL           ;(84 buffer empty.)
                 ;
                 ;
```

```
0745 FF          ST04DP:  MOV     A,R7              ;
0746 4301                 ORL     A,#01H            ;
0748 AF                   MOV     R7,A              ;
0749 E459                 JMP     INT04S            ;
                 ;
                 ;------------------------------------------------------------------
                 ;******************************************************************
                 ;
                 ;                  [ CHANGING OPERATION TO 84 .]
                 ;
                 ;******************************************************************
                 ;
                 ;
                 ;        ..................................................
074B F8          NDPS04:  MOV     A,R0              ;
074C 3D                   MOVD    P5,A              ;
                 ;        ..................................................
                 ;
074D D40B                 CALL    TSET1             ;1 bit timer counter set & start.
                 ;
074F FF          MADAD2:  MOV     A,R7              ;
0750 1254                 JB0     ARIWT             ;
0752 C4AF                 JMP     DISEND            ;
0754 53FE        ARIWT:   ANL     A,#0FEH           ;
0756 AF                   MOV     R7,A              ;
0757 E434                 JMP     IDLINT            ;
                 ;
                 ;---------------------------------------------------SUB ROUTINE---
                 ;
                 ;                     [  04 DROP SELECT.  ]
                 ;
                 ;------------------------------------------------------------------
                 ;
0759 B825        INT04S:  MOV     R0,#SDMSGH        ;
075B F0                   MOV     A,@R0             ;
075C 5307                 ANL     A,#07H            ;
075E A9                   MOV     R1,A              ;
075F B837                 MOV     R0,#DRMAPH        ;
0761 F0                   MOV     A,@R0             ;
0762 5307                 ANL     A,#07H            ;
0764 D9                   XRL     A,R1              ;
0765 C67B                 JZ      NOCHGE            ;
                 ;
0767 F9                   MOV     A,R1              ;
0768 4308                 ORL     A,#08H            ;
076A A8                   MOV     R0,A              ;
                 ;
076B FF                   MOV     A,R7              ;
076C 3272                 JB1     DSF04B            ;
                 ;
076E 231D                 MOV     A,#29             ;***NEXT [DSF04C]***
0770 C4EF                 JMP     JMPR              ;RETR.
                 ;
0772 53FD        DSF04B:  ANL     A,#0FDH           ;
0774 AF                   MOV     R7,A              ;
0775 E477                 JMP     DSF04C            ;
                 ;
                 ;
                 ;------------------------------------------------------------------
                 ;******************************************************************
                 ;
                 ;                  [ DROP SCAN FOR 04 COMMAND. ]
                 ;                                                            #E29
                 ;******************************************************************
                 ;
                 ;        ..................................................
0777 F8          DSF04C:  MOV     A,R0              ;
0778 3D                   MOVD    P5,A              ;
                 ;        ..................................................
                 ;
0779 D40B                 CALL    TSET1             ;1 bit time counter set.
                 ;
077B F9          NOCHGE:  MOV     A,R1              ;
077C B837                 MOV     R0,#DRMAPH        ;
077E 20                   XCH     A,@R0             ;
077F B86C                 MOV     R0,#SAVDRP        ;
0781 A0                   MOV     @R0,A             ;
                 ;
                 ;
```

```
0782 D422                 CALL    PARCLL          ;Parity flag clear
                      ;                             & VLF flags clear.
0784 D414                 CALL    VLF00           ;Start "0" bit set.
                      ;
0786 2314                 MOV     A,#20           ;***NEXT [COM04]***
0788 C4EF                 JMP     JMPR            ;RETR.
                      ;
                      ;
                      ;--------------------------------------------------SUB ROUTINE---
                      ;
                      ;                 [  04 COMMAND DISP END.  ]
                      ;
                      ;----------------------------------------------------------------
                      ;
078A B86C             R04ERS:  MOV     R0,#SAVDRP      ;
078C F0                        MOV     A,@R0           ;
078D B937                      MOV     R1,#DRMAPH      ;
078F 21                        XCH     A,@R1           ;
0790 A8                        MOV     R0,A            ;
                      ;
0791 FF                        MOV     A,R7            ;
0792 52A7                      JB2     TSUGIN          ;
                      ;
0794 F1                        MOV     A,@R1           ;
0795 D8                        XRL     A,R0            ;
0796 C6AE                      JZ      MADADE          ;
                      ;
0798 B867                      MOV     R0,#DEMAPH      ;
079A F0                        MOV     A,@R0           ;
079B F2AC                      JB7     TSUGI2          ;
                      ;
079D F1                        MOV     A,@R1           ;
079E 5307                      ANL     A,#07H          ;
07A0 4308                      ORL     A,#08H          ;
07A2 A8                        MOV     R0,A            ;
07A3 231E                      MOV     A,#30           ;
07A5 C4EF                      JMP     JMPR            ;
                      ;
07A7 53FB             TSUGIN:  ANL     A,#0FBH         ;
07A9 AF                        MOV     R7,A            ;
                      ;
07AA C4F2                      JMP     NTDRP           ;
07AC C4AF             TSUGI2:  JMP     DISEND          ;
                      ;
07AE E44F             MADADE:  JMP     MADAD2          ;
                      ;
                      ;
                      ;--------------------------------------------------SUB ROUTINE---
                      ;
                      ;                 [  CHANGING THE DEVICE MAP.  ]
                      ;
                      ;----------------------------------------------------------------
                      ;
                      ;|||||||||||||||||||||||||||||||||||||||||||||||||||||||||||||||||
                      ;|..............................................................|
                      ;|           HEAD ADDRESS TABLE OF THE DEVICE MAP 1.            |
                      ;|..............................................................|
                      ;|                                                              |
07B0 38               ROMTI:   DB      DVM10           ;Drop #0 ( device map 1 ).     |
                      ;|                                                              |
07B1 3D                        DB      DVM11           ;Drop #1 (      "        ).    |
                      ;|                                                              |
07B2 42                        DB      DVM12           ;Drop #2 (      "        ).    |
                      ;|                                                              |
07B3 47                        DB      DVM13           ;Drop #3 (      "        ).    |
                      ;|                                                              |
07B4 4C                        DB      DVM14           ;Drop #4 (      "        ).    |
                      ;|                                                              |
07B5 51                        DB      DVM15           ;Drop #5 (      "        ).    |
                      ;|                                                              |
                      ;|||||||||||||||||||||||||||||||||||||||||||||||||||||||||||||||||
                      ;
07B6 B837             DEVCH:   MOV     R0,#DRMAPH      ;Device table head address set.
07B8 F0                        MOV     A,@R0           ;     ( for current drop #. )
07B9 5307                      ANL     A,#07H          ;
07BB 03B0                      ADD     A,#ROMTI        ;
07BD A3                        MOVP    A,@A            ;
                      ;
07BE A9                        MOV     R1,A            ;
07BF F1                        MOV     A,@R1           ;
```

```
07C0 72F8                 JB3     PUEND          ;Device polling map set or not ?
07C2 F9                   MOV     A,R1           ;Priority or round robin ?
07C3 0304                 ADD     A,#4H          ;
07C5 A8                   MOV     R0,A           ;
07C6 F0                   MOV     A,@R0          ;
07C7 72CE                 JB3     PRSET          ;
07C9 FF                   MOV     A,R7           ;Polling flag set.(round robin.)
07CA 53EF                 ANL     A,#0EFH        ;
07CC E4D1                 JMP     RPSETE         ;
                ;
07CE FF         PRSET:    MOV     A,R7           ;Polling flag set.(priority poll.)
07CF 4310                 ORL     A,#10H         ;
07D1 AF         RPSETE:   MOV     R7,A           ;
                ;
07D2 B85E                 MOV     R0,#DEMAP0     ;R0 = device map 2 pointer.
07D4 BA00                 MOV     R2,#0H         ;R2 = F.F flag.
                ;
07D6 FA         DEVPS:    MOV     A,R2           ;
07D7 96DE                 JNZ     SWPAC          ;
07D9 BAFF                 MOV     R2,#0FFH       ;
07DB F1                   MOV     A,@R1          ;(  bit 0 - 3  )
07DC E4E3                 JMP     CONCT          ;
                ;
07DE BA00       SWPAC:    MOV     R2,#0H         ;(  bit 4 - 7  )
07E0 F1                   MOV     A,@R1          ;
07E1 47                   SWAP    A              ;
07E2 19                   INC     R1
                ;
07E3 530F       CONCT:    ANL     A,#0FH         ;map 2 <--- map 1.
07E5 A0                   MOV     @R0,A          ;
07E6 D30F                 XRL     A,#0FH         ;
07E8 C6F2                 JZ      DEVCE          ;Device end ?
07EA F8                   MOV     A,R0           ;
07EB D365                 XRL     A,#DEMAP7      ;Device map end ?
07ED C6F3                 JZ      DEVCE2         ;
07EF 18                   INC     R0             ;
07F0 E4D6                 JMP     DEVPS
                ;
07F2 C8         DEVCE:    DEC     R0             ;
07F3 F0         DEVCE2:   MOV     A,@R0          ;
07F4 4380                 ORL     A,#80H         ;
07F6 A0                   MOV     @R0,A          ;
07F7 83                   RET                    ;
                ;
07F8 B85E       PUEND:    MOV     R0,#DEMAP0     ;Device map 1 not set.
07FA B0FF                 MOV     @R0,#0FFH      ;
07FC 83                   RET                    ;
                ;
                ;
                ;#################################### END #######################

Errors=     0
```

SOURCE LINE

```
'8036
;
;**********************************************************************
;
SEISAKU_DD:        EQU 01H            ;
SEISAKU_MM:        EQU 12H            ;
SEISAKU_YY:        EQU 58H            ;
SEISAKU_VV:        EQU 2              ; Version No.
;*****
;*****          <<<   TOSHINO_OS   >>>
;*****          <<< TOSHIBA  NO OS >>>
;*****          <<< TOSHI & INO OS >>>
;*****          <<< TOSHI    NO OS >>>
;*****              ==============
;*****                 <<< Data Format >
;*****                 Adrs H  --- ( ECU Address H )
;*****                 Adrs L  --- ( ECU Address L )
;*****                 Data Length N
;*****                 Data 1
;*****                    .
;*****                    .    (.Data P to Drop P  Command / Data )
;*****                    .
;*****                 Data N
;*****                   ------ By  M.TANAKA & T.INOUE  ------
;*****
;*****
;*****   Function
```

```
;*****
;*****     (1) --- CCC & ECU Commmunication
;*****             Echo Back
;*****             Forced Tuning / Off / Key
;*****             Send Function ( ALOHA )  Test
;*****
;*****     (2) --- Ram Back up
;*****
;*****     (3) --- Verification
;*****
;*****
;*****
;*****
;****************************************************************************
;$$$$$
;$$$$$          <<<  Bug List  >>>
;$$$$$
;$$$$$
;$$$$$
;$$$$$
;$$$$$
;$$$$$$$$$$$$$$$$$$$$$$$$$$$$$$$$$$$$$$$$$$$$$$$$$$$$$$$$$$$$$$$$$$$$$$$$$$$$$
;
BIAS:              EQU 0000H
;
PROGRAMVERSION:  EQU BIAS                  ; DS 4
RX_CRC_ERROR:    EQU BIAS+4                ; DS 4
RX_CRC_OK_YO:    EQU BIAS+8                ; DS 4
IBF_OVER_FLOW:   EQU BIAS+12               ; DS 2
SCAN_MODE_FLAG:  EQU BIAS+14               ; DS 1
VIEW_CHANNEL:    EQU BIAS+16               ; DS 8*2
PC_CODE:         EQU BIAS+32               ; DS 8*2
EVENT_CHANNEL    EQU BIAS+48               ; DS 8
;                EQU BIAS+56
VLF_ERROR_MAP:   EQU BIAS+128              ; DS 128
PC_FC_LIST:      EQU BIAS+256              ; DS 128
BASIC_AUTHO:     EQU BIAS+256+128          ; DS 128
                 ;   BIAS+512
;
A200H:           EQU 200H
CH_NO_FREQ       EQU A200H                 ; DS 256   FREQUENCY TABLE START FROM HERE
TIME_TABLE:      EQU A200H+100H            ; 8*8*2
JUMP_ADDRESS:    EQU A200H+180H            ; 8*8*2
NEXT_GO_ADRS:    EQU A200H+200H            ; 64*2
;                    --- 480H
TO_DROP:         EQU 0500H
TO_CCC:          EQU 0600H
;
DS2:             EQU 0700H
INDEX_RX_1:      EQU DS2+2*1
INDEX_TX_1:      EQU DS2+2*2
CTRL_1:          EQU DS2+2*3
CTRL_1_COUNT:    EQU DS2+2*4
INDEX_RX_2:      EQU DS2+2*5
INDEX_TX_2:      EQU DS2+2*6
CTRL_2:          EQU DS2+2*7
CTRL_2_COUNT:    EQU DS2+2*8
PAGE_SW:         EQU DS2+2*9
ECHO_BACK_FLAG:  EQU DS2+2*10
REVERS_CHANEL:   EQU DS2+2*11
TX_BUSY_FLAG:    EQU DS2+2*12
BASE_POINT:      EQU DS2+2*13
INIT_POINT:      EQU DS2+2*14
BINARY_LED:      EQU DS2+2*15
ECHO_BACK_ADRS:  EQU DS2+2*16

CONV_NO:         EQU DS2+2*18
DROP_NO:         EQU DS2+2*19
IC_BYTE:         EQU DS2+2*20
DEVICE_NO:       EQU DS2+2*21
ID_BYTE:         EQU DS2+2*22
CONV_NO_BIT:     EQU DS2+2*23
DROP_NO_BIT:     EQU DS2+2*24
DEVICE_NO_BIT:   EQU DS2+2*25
```

```
MUL_ADR           EQU DS2+2*29              ; DS 2     STORE #3
EXTRN_STAT        EQU DS2+2*30              ; DS 2
TEMP_R_CH         EQU DS2+2*31              ; DS 2
;                     740H
OBF_BF_N:         EQU DS2+2*32     ;    0000  0000
OBF_BF_CMD:       EQU OBF_BF_N+1
OBF_BF_ID:        EQU OBF_BF_N+2
OBF_BF_BYTE:      EQU OBF_BF_N+3
CONV_SELECT:      EQU OBF_BF_N+16  ; DS 8
;
DS1:              EQU 0780H
NOW_EVENT:        EQU DS1
BEFOR_EVENT:      EQU DS1+1
EVENT_ENABLE:     EQU DS1+2
LSB_LED:          EQU DS1+4
MSB_LED:          EQU DS1+5
HSB_LED:          EQU DS1+6
PPV_LED:          EQU DS1+7
KEY_DATA:         EQU DS1+9
ONE_SEC_TIMER:    EQU DS1+10
TUNER_D1:         EQU DS1+11
TUNER_D2:         EQU DS1+12
TUNER_CBL:        EQU DS1+13
UP_FLAG:          EQU DS1+14
DOWN_FLAG:        EQU DS1+15
PC_FC_EXIST:      EQU DS1+16
POWER_FEED:       EQU DS1+17
;
DS16:             EQU 800H
DROP_CMD_BF:      EQU DS16                       ; DS 16
SPU_CMD_BF:       EQU DS16+16*1                  ; DS 16
FROM_OBF_BF:      EQU DS16+16*2                  ; DS 16
SEND_ENABLE:      EQU DS16+16*3                  ; DS 1
SEND_ADDRESS:     EQU SEND_ENABLE+1              ; DS 2
SEND_INDEX:       EQU SEND_ADDRESS+2             ; DS 1
SEND_CMD_RESP:    EQU SEND_ADDRESS+3             ; DS 1
SEND_DATA_BUFF:   EQU SEND_ADDRESS+4             ; DS 123
EVENT_NO_FREQ:    EQU 900H                       ; DS 256
;
;--------------------------------------
;
KEY_DATA_STACK:   EQU 1000H                      ; DS 16*64=1024
ECU_ADDPESS:      EQU KEY_DATA_STACK+16*64       ; DS 2
TX_LENGTH:        EQU ECU_ADDRESS+2              ; DS 1
TX_COMMAND:       EQU ECU_ADDRESS+3              ; DS 1
TX_BUFFER:        EQU ECU_ADDRESS+4              ; DS 256
;
TIMER_COUNTER:    EQU 2000H-4
INDEX_HISTORY:    EQU 2000H-2
HISTORY_BUFFER:   EQU 2000H
;
PAGE_MEM:         EQU 3000H
STACK_END:        EQU 39FFH
STACK_TOP:        EQU 4000H
;
; ************  BACK_UP RAM Area  ********************************
;
ES_BACK_UP:       EQU 0          ; DS 512
ES_BACK_UP_1:     EQU 200H       ; DS 512
ES_BACK_UP_2:     EQU 400H       ; DS 512
;
ES_EVENT_TIMER:   EQU 600H       ; DS 128*6
;
```

```
                  ; ************  Imediate Data  ************************************
                  ;
                  MUL_NO            EQU              3
                  TIMER_OUT_CODE:   EQU 0
                  PLUS_KEY_CODE:    EQU 10H
                  EVENT_KEY_CODE:   EQU 11H
                  AUTHO_KEY_CODE:   EQU 12H
                  ONOFF_KEY_CODE:   EQU 13H
                  MINUS_KEY_CODE:   EQU 14H
                  SCAN_KEY_CODE:    EQU 15H
                  CLEAR_KEY_CODE:   EQU 16H
                  SEND_KEY_CODE:    EQU 17H
                  POWER_ON_CODE:    EQU 18H
                  POWER_OFF_CODE:   EQU 19H
                  RECENT_ON_CODE:   EQU 1AH
                  RELEASE_CODE:     EQU 1BH
                  KEY_PUSH_CODE:    EQU 1CH
                  ;
                  ASCII_ER:         EQU 4572H
                  ASCII_AU:         EQU 4155H
                  ASCII_SC:         EQU 5343H
                  ASCII_FC:         EQU 4643H
                  ASCII_PC:         EQU 5043H
                  ASCII_CL:         EQU 434CH
                  ASCII_SE:         EQU 5345H
                  ASCII_AD:         EQU 4164H
                  ASCII_DE:         EQU 6445H
                  ASCII_NU:         EQU 0D49CH
                  ASCII_NO:         EQU 0D4DCH
                  ASCII_CO:         EQU 43DCH
                  ASCII_PR:         EQU 5072H
                  ;
                  PUSH_ALL:         EQU 60H
                  POP_ALL:          EQU 61H
                  ;
                  SEND_MAX:         EQU 64*2
                  ;
                  ; ---------------------------------------------------------------
                  ; ************  I / O  Port  ***********************************
                  ; ---------------------------------------------------------------
                  ;
                  DROP_CMD_PORT:    EQU 082H
                  DROP_DATA_PORT:   EQU 080H
                  ECU_H_ADDRESS:    EQU 0102H
                  ECU_L_ADDRESS:    EQU 0100H
                  INT_OFST          EQU              0A0H+(5*4)
                  INT1OFST          EQU              52
                  INT3OFST          EQU              60
                  TIMER1_OFST       EQU              72
                  ACHD              EQU              00
                  ACHC              EQU              04
                  BCHD              EQU              02
                  BCHC              EQU              06




                  ;---------------CS      SET-----------------------------
                  ;
                  ;                 INITIAL SET UP IAPX186
                  ;
                  ;------------------------------------------------------
                                    ORG              0000H
0000 FA           RUN:              CLI
                                    ;LCS SET UP      16KB
0001 B8A2FF                         MOV              AX,0FFA2H
0004 92                             XCHG             DX,AX
0005 B8F800                         MOV              AX,00F8H
0008 EF                             OUT              DX,AX
                                    ;PCS SET UP FROM 0000H AT I/O MAPPED
0009 B8A4FF                         MOV              AX,0FFA4H
000C 92                             XCHG             DX,AX
000D B83F00                         MOV              AX,003FH          ;3-WAITES INSERTED
0010 EF                             OUT              DX,AX
0011 B8A8FF                         MOV              AX,0FFA8H
0014 92                             XCHG             DX,AX
0015 B83C88                         MOV              AX,883CH
0018 EF                             OUT              DX,AX
                                    ;MCS SET UP 04000H
0019 BAA6FF                         MOV              DX,0FFA6H
001C B8FC21                         MOV              AX,21FCH
```

```
001F EF                                  OUT     DX,AX
                     ;
0020 B80020                              MOV     AX,2000H
0023 8ED8                                MOV     DS,AX
                     ;
                     ;
0025 BB0000          RAM_CLEAR:          MOV BX,BIAS
0028 B80000                              MOV AX,0
002B 8907            RAM_CLEAR_LP:       MOV [BX],AX
002D 83C302                              ADD BX,2
0030 81FB0040                            CMP BX,4000H
0034 72F5                                JC RAM_CLEAR_LP
                     ;
                     ;
                     ;-------------JUMP TABLE WRITE-------------------
0036 B80000                              MOV     AX,0
0039 8ED8                                MOV     DS,AX
                     ;--------------INT1 ADDR.-------------------------------
003B BB3400                              MOV     BX,INT1OFST
003E C7070002                            MOV     WORD PTR [BX],200H
0042 C7470200FE                          MOV     WORD PTR [BX+2],0FE00H
                     ;--------------INT3 ADDR. ------------------------------
0047 BB3C00                              MOV     BX,INT3OFST
004A C7070003                            MOV     WORD PTR [BX],300H
004E C7470200FE                          MOV     WORD PTR [BX+2],0FE00H
                     ;--------------INT0 ADDR. /CASCADED WITH INT2/INTA0/----
0053 BB8400                              MOV     BX,INT_OFST
0056 C7070004                            MOV     WORD PTR [BX],400H
005A C7470200FE                          MOV     WORD PTR [BX+2],0FE00H
005F C747040005                          MOV     WORD PTR [BX+4],500H
0064 C7470600FE                          MOV     WORD PTR [BX+6],0FE00H
0069 C747080006                          MOV     WORD PTR [BX+8],600H
006E C7470A00FE                          MOV     WORD PTR [BX+10],0FE00H
                     ;--------------TIMER 1 INTR. ADDR.------------------------
0073 BB4800                              MOV     BX,TIMER1_OFST
0076 C7070007                            MOV     WORD PTR [BX],700H
007A C7470200FE                          MOV     WORD PTR [BX+2],0FE00H
                     ;-------------SET UP TIMER----------------------
                     ;
                     ;
007F B80020                              MOV     AX,2000H
0082 8ED8                                MOV     DS,AX
0084 8ED0                                MOV     SS,AX
                     ;----------------50KHz SQUARE WAVE--------------------
0086 BA52FF                              MOV     DX,0FF52H
0089 B80F00                              MOV     AX,15
008C EF                                  OUT     DX,AX
008D BA54FF                              MOV     DX,0FF54H
0090 B80F00                              MOV     AX,15
0093 EF                                  OUT     DX,AX
0094 BA56FF                              MOV     DX,0FF56H
0097 B803C0                              MOV     AX,0C003H
009A EF                                  OUT     DX,AX
                     ;--------------INITIAL SET UP OF DMA CH.0;RX TRANS---
                     ;-------------SOURCE POINTER-----------------
009B B80000                              MOV     AX,ACHD
009E BAC0FF                              MOV     DX,0FFC0H
00A1 EF                                  OUT     DX,AX
00A2 B000                                MOV     AL,0
00A4 BAC2FF                              MOV     DX,0FFC2H
00A7 EF                                  OUT     DX,AX
                     ;---------------INITIAL SET UP OF DMA CH.1;TX TRANS--
                     ;--------------DESTINATION POINTER-----------
00A8 B80000                              MOV     AX,ACHD
00AB BAD4FF                              MOV     DX,0FFD4H
00AE EF                                  OUT     DX,AX
00AF B000                                MOV     AL,0
00B1 BAD6FF                              MOV     DX,0FFD6H
00B4 EE                                  OUT     DX,AL
                     ;-------------STACK SET UP----------------------
00B5 BCF03F                              MOV     SP,3FF0H
                     ;---------------INITIAL SET UP OF 8274-----------
00B8 B018                                MOV     AL,00011000B    ;CH.RESET
00BA E604                                OUT     ACHC,AL
                     ;--PTR 2A--
00BC BB0231                              MOV     BX,0011000100000010B
00BF BA0400                              MOV     DX,ACHC
00C2 E87E01                              CALL    SETCOM
                     ;--PTR 2B--
00C5 BB0228                              MOV     BX,0010100000000010B
00C8 BA0600                              MOV     DX,BCHC
```

```
00CB E87501                     CALL            SETCOM
             ;--PTR 4A--
00CE BB0420                     MOV             BX,0010000000000100B
00D1 BA0400                     MOV             DX,ACHC
00D4 E86C01                     CALL            SETCOM
             ;--PTR 4B--
00D7 BB0420                     MOV             BX,0010000000000100B
00DA BA0600                     MOV             DX,BCHC
00DD E86301                     CALL            SETCOM
             ;--PTR 7A--
00E0 BB077E                     MOV             BX,0111111000000111B
00E3 BA0400                     MOV             DX,ACHC
00E6 E85A01                     CALL            SETCOM
             ;--PTR 1B--
00E9 BB010C                     MOV             BX,0000110000000001B
00EC BA0600                     MOV             DX,BCHC
00EF E85101                     CALL            SETCOM
             ;=================RX INIT======================
00F2 B010                       MOV             AL,00010000B
00F4 E604                       OUT             ACHC,AL
             ;--PTR 1A--
00F6 BB012C                     MOV             BX,0010110000000001B
00F9 BA0400                     MOV             DX,ACHC
00FC E84401                     CALL            SETCOM
             ;--PTR 5A--
00FF BB05E2                     MOV             BX,1110001000000101B
0102 BA0400                     MOV             DX,ACHC
0105 E83B01                     CALL            SETCOM
             ;--RTS OFF--
0108 BB05E2                     MOV             BX,1110001000000101B
010B BA0400                     MOV             DX,ACHC
010E E83201                     CALL            SETCOM
             ;------------------------------------------------------------------
             ;-----------INITIAL SET UP OF INT0,INT1,INT3,UNMASK----------------
             ;--INT0---
0111 B82800                     MOV             AX,28H          ;LEVEL=0,EDGE TRIGGER,MASK,CASCAD
0114 BA38FF                     MOV             DX,0FF38H
0117 EF                         OUT             DX,AX
             ;--INT1---
0118 B81A00                     MOV             AX,1AH          ;LEVEL=1,LEVEL TRIGGER,MASK
011B BA3AFF                     MOV             DX,0FF3AH
011E EF                         OUT             DX,AX
             ;--INT3---
011F B81900                     MOV             AX,19H          ;LEVEL=2,LEVEL TRIGGER,MASK
0122 BA3EFF                     MOV             DX,0FF3EH
0125 EF                         OUT             DX,AX
             ;--TIMER1 INTR.--
0126 B80B00                     MOV             AX,1011B        ;LEVEL=3,MASK
0129 BA32FF                     MOV             DX,0FF32H
012C EF                         OUT             DX,AX

             ;
             ;----------------------------------------------------------
             ;
             ;                  Initialize
             ;
             ;----------------------------------------------------------
             ;
012D B80000  MAIN_START:        MOV AX,0
             ;
0130 BB0005                     MOV BX,TO_DROP
0133 891E0207                   MOV [INDEX_RX_1],BX
0137 891E0407                   MOV [INDEX_TX_1],BX
013B A23E07                     MOV BYTE PTR [TEMP_R_CH],AL
013E A21807                     MOV [TX_BUSY_FLAG],AL
0141 A22407                     MOV [CONV_NO],AL
0144 A29107                     MOV [POWER_FEED],AL
             ;
0147 A35007                     MOV [CONV_SELECT],AX
014A A35207                     MOV [CONV_SELECT+2],AX
```

```
0140 A35407                       MOV [CONV_SELECT+4],AX
0150 A35607                       MOV [CONV_SELECT+6],AX
                 ;
0153 BB0006                       MOV BX,TO_CCC
0156 891E0C07                     MOV [INDEX_TX_2],BX
015A 891E0A07                     MOV [INDEX_RX_2],BX
                 ;
015E A20607                       MOV [CTRL_1],AL
0161 A20807                       MOV [CTRL_1_COUNT],AL
0164 A20E07                       MOV [CTRL_2],AL
0167 A24007                       MOV [OBF_BF_N],AL
016A A31407                       MOV [ECHO_BACK_FLAG],AX
016D A31607                       MOV [REVERS_CHANEL],AX
                 ;
0170 B80030                       MOV AX,PAGE_MEM
0173 A31207                       MOV [PAGE_SW],AX
                 ;
0176 BB4107                       MOV BX,OBF_BF_CMD
0179 891E1007                     MOV [CTRL_2_COUNT],BX
                 ;
017D B00A                         MOV AL,10
017F A28A07                       MOV [ONE_SEC_TIMER],AL
                 ;
0182 B80020                       MOV AX,HISTORY_BUFFER
0185 A3FE1F                       MOV [INDEX_HISTORY],AX
0188 E88205                       CALL ECU_ADRS_READ
                 ;
018B E8D605                       CALL INIT_AUTHO_TBL         ;=
018E E8F305                       CALL INIT_VIEW_TBL          ;=
0191 E84B06                       CALL INIT_CODE              ;=
0194 B03F                         MOV AL,3FH                  ;=
0196 A20E00                       MOV [SCAN_MODE_FLAG],AL     ;=

0199 E85606                       CALL            FREQ_CALC
019C E8D306                       CALL CHANNEL_HOSEI
019F E8FC05                       CALL EVENT_DATA_CL
01A2 E88705                       CALL INIT_EV_TIMER
                 ;
                 ;=============================================
                 ;
01A5 BB0004                       MOV BX,ES_BACK_UP_2
01A8 26813FA5A5                   CMP WORD PTR ES:[BX],0A5A5H
01AD 740A                         JZ BACK_UP_KAI
01AF BB0002                       MOV BX,ES_BACK_UP_1
01B2 26813FA5A5                   CMP WORD PTR ES:[BX],0A5A5H
01B7 7542                         JNZ BACK_UP_EXIT
01B9 8BF3        BACK_UP_KAI:     MOV SI,BX
01BB B8FC01                       MOV AX,508
01BE B90000                       MOV CX,0
01C1 26326F04    BACK_UP_CK1:     XOR CH,ES:[BX+4]
01C5 26024F04                     ADD CL,ES:[BX+4]
01C9 43                           INC BX
01CA 48                           DEC AX
01CB 75F4                         JNZ BACK_UP_CK1
                 ;
01CD 263A6C02                     CMP CH,ES:[SI+2]
01D1 7528                         JNZ BACK_UP_EXIT
01D3 263A4C03                     CMP CL,ES:[SI+3]
01D7 7521                         JNZ BACK_UP_NONE
                 ;
01D9 8BDE        BACK_UP_YES:     MOV BX,SI
01DB 81F30002                     XOR BX,ES_BACK_UP_1
01DF 81F30004                     XOR BX,ES_BACK_UP_2
01E3 891EFC1F                     MOV [TIMER_COUNTER],BX
                 ;
01E7 B80002                       MOV AX,512
01EA BB0000                       MOV BX,PROGRAMVERSION
01ED 268A0C      BACK_UP_CK2:     MOV CL,ES:[SI]
01F0 880F                         MOV [BX],CL
01F2 43                           INC BX
01F3 46                           INC SI
01F4 48                           DEC AX
01F5 75F6                         JNZ BACK_UP_CK2
01F7 E90100                       JMP BACK_UP_EXIT
                 ;
01FA 90          BACK_UP_NONE:    NOP
                 ;
01FB E81D05      BACK_UP_EXIT:    CALL INIT_TIM_TBL           ;;
01FE E83D05                       CALL INIT_JUMP_TBL          ;;
```

```
                ;
0201 BE0000                 MOV SI,PROGRAMVERSION
0204 C60458                 MOV BYTE PTR [SI],SEISAKU_YY
0207 C6440112               MOV BYTE PTR [SI+1],SEISAKU_MM
020B C6440201               MOV BYTE PTR [SI+2],SEISAKU_DD
020F C6440302               MOV BYTE PTR [SI+3],SEISAKU_VV
                ;
                ;==============================================
0213 B840A0                 MOV          AX,0A040H
0216 BACAFF                 MOV          DX,0FFCAH
0219 EF                     OUT          DX,AX
                ;           IN           AL,ACHC
                ;           AND          AL,01011111B
021A B07F                   MOV          AL,01111111B
021C 8B3C07                 MOV          BX,EXTRN_STAT
021F 8807                   MOV          BYTE PTR [BX],AL
                ;--UNMASK--INTR's------------------------
0221 B84C00                 MOV          AX,01001100B    ;NOW UNMASK INT0,INT1,INT3,TIMER1_INTP
0224 BA28FF                 MOV          DX,0FF28H
0227 EF                     OUT          DX,AX
                ;````````````````````````````````````````
                ;--------------RX. ENABLE-----------------------------
0228 BB03D9                 MOV          BX,1101100100000011B
022B BA0400                 MOV          DX,ACHC
022E E81200                 CALL         SETCOM
                ;*******************MAIN INITITIALIZE TIMER2********
0231 B80008                 MOV          AX,00800H
0234 BA62FF                 MOV          DX,0FF62H
0237 EF                     OUT          DX,AX
0238 B801C0                 MOV          AX,1100000000000001B
023B BA66FF                 MOV          DX,0FF66H
023E EF                     OUT          DX,AX
                ;---------------------------------------------------
023F FB                     STI
                ;
0240 E98D00                 JMP HAJIMERUYO
                ;
                ;===========================================================================:
                ;---------------SETCOM for 8274-----------
0243 8AC3       SETCOM:     MOV          AL,BL
0245 EE                     OUT          DX,AL
0246 8AC7                   MOV          AL,BH
0248 EE                     OUT          DX,AL
0249 C3                     RET
                ;---------------------------------------------------------------
                ;-------------PTR 1A-------------
024A B001       HDLC_TX_START:  MOV      AL,00000001B
024C E604                   OUT          ACHC,AL
024E B00F                   MOV          AL,00001111B
0250 E604                   OUT          ACHC,AL
                ;---------------REVERSE CH.SELECT----
0252 B005                   MOV          AL,00000101B
0254 E604                   OUT          ACHC,AL
0256 A01607                 MOV          AL,BYTE PTR [REVERS_CHANEL]
0259 A23E07                 MOV          BYTE PTR [TEMP_R_CH],AL
025C 8AE0                   MOV          AH,AL
025E 2401                   AND          AL,00000001B
0260 F8                     CLC
0261 D0C0                   ROL          AL
0263 0C60                   OR           AL,01100000B
0265 E604                   OUT          ACHC,AL
0267 B005                   MOV          AL,00000101B
0269 E606                   OUT          BCHC,AL
026B 8AC4                   MOV          AL,AH
026D 2402                   AND          AL,00000010B
026F 0CE0                   OR           AL,11100000B
0271 E606                   OUT          BCHC,AL
                ;-------------PTR 5A-----------------
                ;           MOV          AL,00000101B
                ;           OUT          ACHC,AL
                ;           MOV          AL,01100000B
                ;           OUT          ACHC,AL
0273 E85300                 CALL         WAIT       ;RTS HOLD 12ms UNTIL Tx.ENABLE
0276 E85000                 CALL         WAIT
0279 E84D00                 CALL         WAIT
027C E84A00                 CALL         WAIT
027F E84700                 CALL         WAIT
0282 E84400                 CALL         WAIT
0285 E84100                 CALL         WAIT
0288 E83E00                 CALL         WAIT
```

```
                 ;--------------PTR 5A-------------
0288 B005                       MOV          AL,00000101B
028D E604                       OUT          ACHC,AL
028F A03E07                     MOV          AL,BYTE PTR [TEMP_R_CH]
0292 2401                       AND          AL,00000001B
0294 F8                         CLC
0295 D0C0                       ROL          AL
0297 0C69                       OR           AL,01101001B
0299 E604                       OUT          ACHC,AL
                 ;--------------------RTS ON---------------

029B B080                       MOV          AL,10000000B
029D E604                       OUT          ACHC,AL
                 ;-----------INITIAL SET UP OF DMA,CH.1:TX TRANS
                 ;-----------SOURCE POINTER SET--------------------------------
                 ;-------------DESTINATION POINTER SET-------------------------
029F 8BC6                       MOV          AX,SI            ;SOURCE ADR.
02A1 40                         INC          AX
02A2 BAD0FF                     MOV          DX,0FFD0H
02A5 EF                         OUT          DX,AX
02A6 B002                       MOV          AL,02H
02A8 BAD2FF                     MOV          DX,0FFD2H
02AB EE                         OUT          DX,AL
02AC 8AC1                       MOV          AL,CL            ;TRANSFER COUNT
02AE B400                       MOV          AH,0
02B0 BAD8FF                     MOV          DX,0FFD8H
02B3 EF                         OUT          DX,AX
                 ;---------------TRANSFER COUNT----------------------------------
                 ;-----------------CONTROL WORD SET---------------------
02B4 BADAFF                     MOV          DX,0FFDAH
02B7 B88616                     MOV          AX,01686H
02BA EF                         OUT          DX,AX            ;DMA GO !
                 ;-------------WAIT ROUTINE----------------------------
02BB E80B00                     CALL         WAIT
                 ;-------------FIRST BYTE OUTPUT-------
02BE 8BDE                       MOV          BX,SI            ;SOURCE ADR.
02C0 8A07                       MOV          AL,[BX]
02C2 E600                       OUT          ACHD,AL
                 ;
02C4 B0C0                       MOV          AL,11000000B
02C6 E604                       OUT          ACHC,AL
02C8 C3                         RET
                 ;==============WAIT============
02C9 BB0000      WAIT:          MOV          BX,0
02CC 43          WAIT1:         INC          BX
02CD 81FBFF00                   CMP          BX,0FFH
02D1 75F9                       JNE          WAIT1
02D3 C3                         RET
















                 ;---------------INTR 3------------------------------------
                                ORG          06300H
                 ;00000         CLI
                 ;
                 ; ------------------------------------------------------------
                 ; ************  OBF Interrupt Operation  **********************
                 ; ------------------------------------------------------------
                 ;
6300 9C          OBF_INTERRUPT: PUSHF                          ;PUSH ALL
6301 60                         DB 60H
6302 E480                       IN AL,DROP_DATA_PORT
```

```
                                   ;
6304 8B361007                  MOV SI,[CTRL_2_COUNT]
6308 8804                      MOV [SI],AL                     ; Data Store
630A 46                        INC SI
630B 89361007                  MOV [CTRL_2_COUNT],SI           ;    Pointer Increment
                               ;
630F BE4007                    MOV SI,OBF_BF_N
6312 FE064007                  INC BYTE PTR [OBF_BF_N]         ;    Data Length Increment
6316 8A0E4007                  MOV CL,[OBF_BF_N]
631A 8A6401                    MOV AH,[SI+1]                   ; AH = Command Byte
                               ;
631D 80F901                    CMP CL,1
6320 750F                      JNZ RESPONSE_2
6322 B001                      MOV AL,1                        ; 1 Byte Response
6324 80FC00                    CMP AH,0                        ;   [ 00 ] [ 07 ]
6327 7429                      JZ RESPONSE_CHK
6329 80FC07                    CMP AH,7
632C 7424                      JZ RESPONSE_CHK
632E E98200     OBF_RET_1      JMP OBF_RET
                               ;
6331 80F902     RESPONSE_2:    CMP CL,2
6334 72F8                      JC OBF_RET_1
                               ;
6336 B002                      MOV AL,2                        ; 2 Byte Tesponse
6338 80FC84                    CMP AH,84H                      ;   [ 01 ] [ 02 ] [ 03 ] [ 05 ] [ 06 ] [ 08 ]
633B 7405                      JZ RESPONSE_VAL                 ; Valiable Length
633D 80FC04                    CMP AH,4                        ;   [ 04 ] [ 84 ]
6340 7510                      JNZ RESPONSE_CHK
                               ;
6342 80F904     RESPONSE_VAL:  CMP CL,4                        ; [ 04 ][ 08 ] > 4
6345 726C                      JC OBF_RET
6347 8A4403                    MOV AL,[SI+3]                   ;    Byte Length Load
634A 0403                      ADD AL,3
634C 3C03                      CMP AL,3
634E 7502                      JNZ RESPONSE_CHK
6350 FEC0                      INC AL                          ; [04][84] Error Response
                               ;
6352 3AC8       RESPONSE_CHK:  CMP CL,AL
6354 725D                      JC OBF_RET
                               ;
6356 8B5401     OBF_PACKET:    MOV DX,[SI+1]
6359 80CA40                    OR DL,40H                       ; 8742 ---> 80186 Then OR 40H
635C 8B1EFE1F                  MOV BX,[INDEX_HISTORY]
6360 8917                      MOV [BX],DX
6362 8B5403                    MOV DX,[SI+3]
6365 895702                    MOV [BX+2],DX
6368 8B5405                    MOV DX,[SI+5]
636B 895704                    MOV [BX+4],DX
636E 8B16FC1F                  MOV DX,[TIMER_COUNTER]
6372 895706                    MOV [BX+6],DX
6375 83C308                    ADD BX,8
6378 81FB0030                  CMP BX,PAGE_MEM
637C 7203                      JC OBF_MEMO
637E BB0020                    MOV BX,HISTORY_BUFFER
6381 891EFE1F   OBF_MEMO:      MOV [INDEX_HISTORY],BX
                               ;
6385 8A260E07                  MOV AH,[CTRL_2]
6389 80FC28                    CMP AH,40
638C 731C                      JNC OBF_NEW
                               ;
638E 8B1E0A07                  MOV BX,[INDEX_RX_2]
6392 8807                      MOV [BX],AL
6394 FEC3                      INC BL
6396 8A6401     RESPONSE_TRNS: MOV AH,[SI+1]
6399 8827                      MOV [BX],AH
639B 46                        INC SI
639C FEC3                      INC BL
639E FEC8                      DEC AL
63A0 75F4                      JNZ RESPONSE_TRNS
                               ;
63A2 FE060E07                  INC BYTE PTR [CTRL_2]
63A6 891E0A07                  MOV [INDEX_RX_2],BX
                               ;
63AA A24007     OBF_NEW:       MOV [OBF_BF_N],AL               ; [OBF_BF_N] = 0
63AD B84107                    MOV AX,OBF_BF_CMD
63B0 A31007                    MOV [CTRL_2_COUNT],AX           ; [CTRL_2_COUNT] = OBF_BF_CM
                               ;
63B3 B80F00     OBF_RET:       MOV          AX,15
63B6 BA22FF                    MOV          DX,0FF22H
63B9 EF                        OUT          DX,AX
63BA 61                        DB           61H                ;POP ALL
63BB 9D                        POPF
63BC FB                        STI
63BD CF                        IRET
                ;---------------INTR 1-------------------------------
                               ORG          06200H
                ;@@@@@@@@      CLI
                ;
                ; -----------------------------------------------------------------
                ; ************ Drop Processor  IBF  Operation  *****************
```

```
                ; -----------------------------------------------------------------
                ;
6200 9C         IBF_INTERRUPT:   PUSHF
6201 60                          DB 60H
6202 8B1E0407                    MOV BX,[INDEX_TX_1]
6206 8A0E0607                    MOV CL,[CTRL_1]
620A 8A260807                    MOV AH,[CTRL_1_COUNT]
620E 80FC00                      CMP AH,0
6211 756C                        JNZ IBF_2ND
                ;
6213 80F900     IBF_1ST:         CMP CL,0
6216 750A                        JNZ IBF_EXIST
                ;------------MASK IBF/ INTR.
6218 B81A00     IBF_EMPTY:       MOV              AX,1AH
621B BA3AFF                      MOV              DX,0FF3AH
621E EF                          OUT              DX,AX
621F E97500                      JMP              IBF_RET
                ;
6222 8A27       IBF_EXIST:       MOV AH,[BX]
6224 FEC3                        INC BL
6226 8A07                        MOV AL,[BX]
6228 E682                        OUT DROP_CMD_PORT,AL
                ;
622A FEC3                        INC BL
622C 891E0407                    MOV [INDEX_TX_1],BX
6230 FECC                        DEC AH
6232 88260807                    MOV [CTRL_1_COUNT],AH
6236 7506                        JNZ IBF_PACKET
6238 FEC9                        DEC CL
623A 880E0607                    MOV [CTRL_1],CL
                ;
623E 8B36FE1F   IBF_PACKET:      MOV SI,[INDEX_HISTORY]
6242 8804                        MOV [SI],AL      ;
6244 8A07                        MOV AL,[BX]
6246 884401                      MOV [SI+1],AL    ;
6249 FEC3                        INC BL
624B 8A07                        MOV AL,[BX]
624D 884402                      MOV [SI+2],AL    ;
6250 FEC3                        INC BL
6252 8A07                        MOV AL,[BX]
6254 884403                      MOV [SI+3],AL    ;
6257 FEC3                        INC BL
6259 8A07                        MOV AL,[BX]
625B 884404                      MOV [SI+4],AL    ;
625E FEC3                        INC BL
6260 8A07                        MOV AL,[BX]
6262 884405                      MOV [SI+5],AL    ;
6265 8B16FC1F                    MOV DX,[TIMER_COUNTER]
6269 895406                      MOV [SI+6],DX
626C 83C608                      ADD SI,8
626F 81FE0030                    CMP SI,PAGE_MEM
6273 7203                        JC IBF_MEMO
6275 BE0020                      MOV SI,HISTORY_BUFFER
6278 8936FE1F   IBF_MEMO:        MOV [INDEX_HISTORY],SI
627C E91800                      JMP IBF_RET
                ;
627F 8A07       IBF_2ND:         MOV AL,[BX]
6281 E680                        OUT DROP_DATA_PORT,AL
6283 FEC3       IBF_SET:         INC BL
6285 891E0407                    MOV [INDEX_TX_1],BX
6289 FECC                        DEC AH
628B 88260807                    MOV [CTRL_1_COUNT],AH
628F 7506                        JNZ IBF_RET
6291 FEC9                        DEC CL
6293 880E0607                    MOV [CTRL_1],CL
                ;
                ;
                ;--------IN_SERVICE LATCH RESET
6297 B80D00     IBF_RET:         MOV              AX,13
629A BA22FF                      MOV              DX,0FF22H
629D EF                          OUT              DX,AX
629E 61                          DB               61H
629F 9D                          POPF
62A0 FB                          STI
62A1 CF                          IRET
                ;

                ;---------------INTR 0-----------------------------------
                ;--------------External status Intr.--------------------
                                 ORG              06400H
                ;@@@@@@           CLI
```

```
6400 9C                          PUSHF
6401 60                          DB          60H
6402 E404                        IN          AL,ACHC
          ;*************NEW VERSION***********
6404 8AC8                        MOV         CL,AL
6406 B010                        MOV         AL,00010000B
6408 E604                        OUT         ACHC,AL
640A E404                        IN          AL,ACHC
640C 8AE8                        MOV         CH,AL
640E A03C07                      MOV         AL,BYTE PTR [EXTRN_STAT]
6411 8AD0                        MOV         DL,AL
6413 8AC5                        MOV         AL,CH
6415 D0C0                        ROL         AL
6417 D0C0                        ROL         AL
6419 D0C0                        ROL         AL
641B 7207                        JC          LOY
641D 8AC1                        MOV         AL,CL
641F 24DF                        AND         AL,11011111B
6421 E90700                      JMP LOZ
          ;*****************
6424 8AC1       LOY:             MOV         AL,CL
6426 0C20                        OR          AL,00100000B
6428 E90000                      JMP         LOZ
642B A23C07     LOZ:             MOV         BYTE PTR [EXTRN_STAT],AL
642E 8AC2                        MOV         AL,DL
6430 2410                        AND         AL,00010000B
6432 8AE0                        MOV         AH,AL
6434 8AC1                        MOV         AL,CL
6436 2410                        AND         AL,00010000B
6438 3AE0                        CMP         AH,AL
643A 753A                        JNZ         EXIT
643C 8AC2                        MOV         AL,DL
643E 2420                        AND         AL,00100000B
6440 8AE0                        MOV         AH,AL
6442 8AC5                        MOV         AL,CH
6444 2420                        AND         AL,00100000B
6446 3AE0                        CMP         AH,AL
6448 8AC2                        MOV         AL,DL
644A 2480                        AND         AL,10000000B
644C 8AE1                        MOV         AH,CL
644E 80E480                      AND         AH,10000000B
6451 32E0                        XOR         AH,AL
6453 7521                        JNZ         EXIT
6455 8AC1       TX_UNDRN:        MOV         AL,CL
6457 2444                        AND         AL,01000100B
6459 3C40                        CMP         AL,01000000B
645B 7519                        JNE         EXIT             ;NOT TX.UNDERRUN
645D B028                        MOV         AL,00101000B
645F E604                        OUT         ACHC,AL
6461 B8100E                      MOV         AX,3600
6464 BA5AFF                      MOV         DX,0FF5AH
6467 EF                          OUT         DX,AX
6468 B801E0                      MOV         AX,1110000000000001B
646B BA5EFF                      MOV         DX,0FF5EH
646E EF                          OUT         DX,AX
646F B80300                      MOV         AX,0011B
6472 BA32FF                      MOV         DX,0FF32H
6475 EF                          OUT         DX,AX
                ;
                ;XIT:             MOV         AL,00010000B
                ;                 OUT         ACHC,AL
6476 B038       EXIT:            MOV         AL,00111000B
6478 E604                        OUT         ACHC,AL
647A B80C00                      MOV         AX,12
647D BA22FF                      MOV         DX,0FF22H
6480 EF                          OUT         DX,AX
                ;
6481 B80000                      MOV AX,0
6484 A21807                      MOV [TX_BUSY_FLAG],AL
6487 A31407                      MOV [ECHO_BACK_FLAG],AX
648A 61                          DB          61H
648B 9D                          POPF
648C FB                          STI
648D CF                          IRET
```

```
                    ;---------------INTR 0-----------------------------------
                                ORG             06500H
                    ;@@@@@@@    CLI
                    ;------------------------------------------------------------------
                    ;---------------FIRST RX. INT SHORI-------------------------------------
6500 9C                         PUSHF
6501 60                         DB              60H
6502 8B1E1207                   MOV             BX,WORD PTR [PAGE_SW]
                    ;
6506 E400           HON:        IN              AL,ACHD      ;1ST DATA INPUT
6508 8807                       MOV             [BX],AL
650A 43                         INC             BX
650B 8BC3                       MOV             AX,BX
650D BAC4FF                     MOV             DX,0FFC4H
6510 EF                         OUT             DX,AX
6511 B002                       MOV             AL,02H
6513 BAC6FF                     MOV             DX,0FFC6H
6516 EF                         OUT             DX,AX
6517 B8FF00                     MOV             AX,255
651A BAC8FF                     MOV             DX,0FFC8H
651D EF                         OUT             DX,AX
651E B846A2                     MOV             AX,0A246H    ;DMA START
6521 BACAFF                     MOV             DX,0FFCAH
6524 EF                         OUT             DX,AX
                    ;------------IN SERV. LATCH RESET--------
6525 B038                       MOV             AL,00111000B
6527 E604                       OUT             ACHC,AL
6529 B80C00                     MOV             AX,12
652C BA22FF                     MOV             DX,0FF22H
652F EF                         OUT             DX,AX
6530 61                         DB              61H
6531 9D                         POPF
6532 FB                         STI
6533 CF                         IRET




                    ;---------------INTR 0-----------------------------------
                    ;---------------Special Rx. intr.-------------------------------
                                ORG             06600H
                    ;@@@@@@     CLI
                    ;
                    ; ------------------------------------------------------------
                    ; ************  HDLC Rx Interrupt Operation  *******************
                    ; ------------------------------------------------------------
                    ;
6600 9C             RX_INTERRUPT:   PUSHF
6601 60                             DB 60H
6602 E86400         RX_RCV:         CALL RX_RECEIVE
6605 7256                           JC RX_CRC_ERR                  ; CRC Error
6607 83060A0001                     ADD WORD PTR [RX_CRC_OK_YO+2],1
660C 8316080000                     ADC WORD PTR [RX_CRC_OK_YO],0
6611 8B361207                       MOV SI,[PAGE_SW]
                    ;
6615 8B1C                           MOV BX,[SI]                    ; BX = Receive Address
6617 3B1E0014                       CMP BX,[ECU_ADDRESS]
661B 7419                           JZ MY_ADRS
661D 81FBFFFF                       CMP BX,0FFFFH
6621 7413                           JZ MY_ADRS                     ; Global Address
6623 83FB00                         CMP BX,0
6626 751E                           JNZ RX_RET
                                                                   ; SI --- ECU H Address
6628 A10014         ALOHA_CHECK:    MOV AX,[ECU_ADDRESS]           ; +1          L
662B 234403                         AND AX,[SI+3]                  ; +2     Tx Length
662E 3B4405                         CMP AX,[SI+5]                  ; +3     MASK H Address
6631 7513                           JNZ RX_RET                     ; +4          L
                                                                   ; +5     Ref. H Address
                                                                   ; +6          L
                                                                   ; +7     Real Tx Length
                                                                   ;
6633 83C605         MY_ALOHA:       ADD SI,5                       ; Aloha Address
```

```
                      ;
6636 89361407         MY_ADRS:      MOV [ECHO_BACK_FLAG],SI         ; ECHO Back Buffer Address S-
                      ;
663A 81C60001                       ADD           SI,100H
663E 81E60033                       AND           SI,3300H
6642 89361207                       MOV           WORD PTR [PAGE_SW],SI
                      ;
6646 B038             RX_RET:       MOV           AL,00111000B
6648 E604                           OUT           ACHC,AL
                      ;--------------------------
664A B80C00                         MOV           AX,12
664D BA22FF                         MOV           DX,0FF22H
6650 EF                             OUT           DX,AX
6651 B001                           MOV           AL,00000001B
6653 E604                           OUT           ACHC,AL
6655 B00F                           MOV           AL,00001111B
6657 E604                           OUT           ACHC,AL
6659 61                             DB            61H
665A 9D                             POPF
                      ;--------------------------
665B FB                             STI
665C CF                             IRET
                      ;
665D 8306060001       RX_CRC_ERR:   ADD WORD PTR [RX_CRC_ERROR+2],1
6662 8316040000                     ADC WORD PTR [RX_CRC_ERROR],0
6667 EBDD                           JMP RX_RET
                      ;
6669 90               RX_RECEIVE:   NOP
666A B844A0                         MOV           AX,0A044H          ;DMA STOP
666D BACAFF                         MOV           DX,0FFCAH
6670 EF                             OUT           DX,AX
6671 B001                           MOV           AL,00000001B
6673 E604                           OUT           ACHC,AL
6675 E404                           IN            AL,ACHC            ;STATUS INPUT
6677 D0C0                           ROL           AL
6679 D0C0                           ROL           AL
667B B030                           MOV           AL,00110000B       ;ERROR RESET COM
667D E604                           OUT           ACHC,AL
667F B040                           MOV           AL,01000000B       ;RESER CRC CECKER
6681 E604                           OUT           ACHC,AL
6683 B020                           MOV           AL,00100000B
6685 E604                           OUT           ACHC,AL
6687 C3                             RET
                      ;--------------------------
                      ;------------------NON SPECIFIC EOI--------------------
6688 B80080           EOI:          MOV           AX,8000H
668B BA22FF                         MOV           DX,0FF22H
668E EF                             OUT           DX,AX
668F C3                             RET
                      ;------------------------------------------
                      ;------------TX_DISABLE_ROUTINE
                      ;----TIMER_1 INTR----
                                    ORG           06700H
                      ;@@@@         CLI
6700 9C                             PUSHF
6701 60                             DB            60H
6702 B8100E                         MOV           AX,3600
6705 BA5AFF                         MOV           DX,0FF5AH
6708 EF                             OUT           DX,AX
6709 B80160                         MOV           AX,0110000000000001B
670C BA5EFF                         MOV           DX,0FF5EH
670F EF                             OUT           DX,AX
6710 B80B00                         MOV           AX,1011B
6713 BA32FF                         MOV           DX,0FF32H
6716 EF                             OUT           DX,AX
                      ;---------------PTR 0A------------------
6717 B028                           MOV           AL,00101000B
6719 E604                           OUT           ACHC,AL
                      ;---------------PTR 05A------------
671B B005                           MOV           AL,00000101B
671D E604                           OUT           ACHC,AL
671F A03E07                         MOV           AL,BYTE PTR [TEMP_R_CH]
6722 2401                           AND           AL,00000001B
6724 F8                             CLC
6725 D0C0                           ROL           AL
6727 0CE0                           OR            AL,11100000B
6729 E604                           OUT           ACHC,AL
                      ;----------------------RTS OFF-------------
                      ;---------------PTR 01A------------
672B B001                           MOV           AL,00000001B
672D E604                           OUT           ACHC,AL
```

```
672F B02D                        MOV            AL,00101101B
6731 E604                        OUT            ACHC,AL
              ;----------------PTR 0A---------------
6733 B080                        MOV            AL,10000000B
6735 E604                        OUT            ACHC,AL
              ;----------------PTR 0A----------------
              ;                  MOV            AL,00010000B   ???????
              ;                  OUT            ACHC,AL
              ;---------
6737 BA22FF                      MOV            DX,0FF22H
673A B80800                      MOV            AX,08
673D EF                          OUT            DX,AX
673E B80000                      MOV            AX,0.            ;Tx end flag
6741 A21807                      MOV [TX_BUSY_FLAG],AL
6744 A31407                      MOV [ECHO_BACK_FLAG],AX
6747 61                          DB             61H
6748 9D                          POPF
6749 FB                          STI
674A CF                          IRET
              ;------------------------------------------
              ;-----------------------SET UP UCS--------------------------------
                                 ORG            07C00H
7C00 B83FF8                      MOV            AX,0F83FH
7C03 BAA0FF                      MOV            DX,0FFA0H
7C06 EF                          OUT            DX,AX
7C07 EA000000F8                  DB             0EAH,0,0,0,0F8H            ;JUMP TO 0F8000
              ;=============================================================
                                 ORG            07FF0H
7FF0 EA0000C0FF                  DB             0EAH,000H,00H,0C0H,0FFH    ;JUMP TO 0FFC00





              ;
              ;-----------------------------------------------------------------------
              ;*************                 ***************************************
              ;*************       Hajime    ***************************************
              ;*************                 ***************************************
              ;-----------------------------------------------------------------------
              ;
                                 ORG 300H
              ;
0300 90            HAJIMERUYO:   NOP
0301 E80000                      CALL POWER_DET_CMD
0304 BE2008        HAJIME1:      MOV SI,FROM_OBF_BF
0307 E80000                      CALL LOAD_FROM_DROP
030A 72F8                        JC HAJIME1
030C BE2008                      MOV SI,FROM_OBF_BF
030F 8A4401                      MOV AL,[SI+1]
0312 3C01                        CMP AL,1
0314 75EE                        JNZ HAJIME1        ; IF Response <> Power Det. Then Wait
              ;
0316 E80000                      CALL POWER_DET_CMD
0319 BE2008        HONBAN1:      MOV SI,FROM_OBF_BF
031C E80000                      CALL LOAD_FROM_DROP
031F 72F8                        JC HONBAN1
0321 BE2008                      MOV SI,FROM_OBF_BF
0324 8A4401                      MOV AL,[SI+1]
0327 3C01                        CMP AL,1
0329 75EE                        JNZ HONBAN1 .      ; IF Response <> Power Det. Then Wait
              ;
032B 8A7402                      MOV DH,[SI+2]      ; DH = Power Detect Data
032E B210                        MOV DL,10H         ; DL = 1st ID_BYTE --- 10H
0330 D0CE          DROP_INIT_LP: ROR DH
0332 7363                        JNC DRP_NEXT       ; IF CY=0 Then Power Down
              ;
0334 52            DEV_INIT_LP:  PUSH DX
0335 88162C07                    MOV [ID_BYTE],DL
0339 E80000                      CALL ID_DROP_DEVICE
033C E80000                      CALL SPU_STATUS_REQ
033F BE2008        DEV_RESP_WT:  MOV SI,FROM_OBF_BF
0342 E80000                      CALL LOAD_FROM_DROP
0345 72F8                        JC DEV_RESP_WT
0347 BE2008                      MOV SI,FROM_OBF_BF   ; SI --- Length
                                                      ; +1      Command
                                                      ; +2      ID_BYTE
                                                      ; +3      Byte Count
                                                      ; +4      Data
034A B004                        MOV AL,4
034C 3A4401                      CMP AL,[SI+1]
```

```
034F 75EE                        JNZ DEV_RESP_WT     ; IF [SI+1]=4 Then 04 Command
          ;
0351 8A4402                      MOV AL,[SI+2]
0354 3A062C07                    CMP AL,[ID_BYTE]
0358 75E5                        JNZ DEV_RESP_WT     ; IF CMD NEQ Status Then Wait Loop
          ;
035A B000                        MOV AL,0
035C 3A4403                      CMP AL,[SI+3]
035F 742D                        JZ DEV_NEXT         ; VLF Error (Device Off)
          ;
0361 8A4404                      MOV AL,[SI+4]
0364 24F8                        AND AL,0F8H
0366 75D7                        JNZ DEV_RESP_WT     ; Status Response denai
          ;
0368 8A5405                      MOV DL,[SI+5]       ; <<< DL = Status >>
036B E80000                      CALL CONV_SW_BIT_AL  ;  SI --- CONVSEL ( Drop_NO. )
                                                     .;  AL --- ( Device )
036E 80E280                      AND DL,80H           ;
0371 740E                        JZ DEV_SW_0         ; IF (7)=0 Then Converter SW=0
0373 8A262607   DEV_SW_1:        MOV AH,[DROP_NO]
0377 80E401                      AND AH,1
037A 7509                        JNZ DEV_CLR          ; IF ODD Drop Then Converter SW=0  Else  Abnorma
037C 0804                        OR [SI],AL
037E E90400                      JMP DEV_CLR
0381 343F       DEV_SW_0:        XOR AL,3FH
0383 2004                        AND [SI],AL
          ;
0385 E80000     DEV_CLR:         CALL SPU_RELAY_OFF
0388 E80000                      CALL SPU_CLEAR_DISP
038B E80000                      CALL EVENT_LED_OFF
          ;
038E 5A         DEV_NEXT:        POP DX
038F 80C208                      ADD DL,8        ; 00**  *0DD
0392 80FA30                      CMP DL,30H      ; 0011  0DDD
0395 729D                        JC DEV_INIT_LP  ;   IF Device<6 Then Next Device
          ;
0397 80E207     DRP_NEXT:        AND DL,7
039A FEC2                        INC DL          ;   Next Drop
039C 80FA06                      CMP DL,6        ;   IF Drop>5 Then Next Operation
039F 7305                        JNC POLLING_SEQ
03A1 80CA10                      OR DL,10H       ;   Next Device Start from "2"
03A4 EB8A                        JMP DROP_INIT_LP




03A6 E80000     POLLING_SEQ:     CALL DROP_MAP_SET            ;=
                                                              ;=
03A9 E80000                      CALL DEVICE_MAP_SET          ;= DROP 0
03AC FE062407                    INC BYTE PTR [CONV_NO]       ;=
03B0 E80000                      CALL DEVICE_MAP_SET          ;= DROP 1
03B3 FE062407                    INC BYTE PTR [CONV_NO]       ;=
03B7 E80000                      CALL DEVICE_MAP_SET          ;= DROP 2
03BA FE062407                    INC BYTE PTR [CONV_NO]       ;=
03BE E80000                      CALL DEVICE_MAP_SET          ;= DROP 3
03C1 FE062407                    INC BYTE PTR [CONV_NO]       ;=
03C5 E80000                      CALL DEVICE_MAP_SET          ;= DROP 4
03C8 FE062407                    INC BYTE PTR [CONV_NO]       ;=
03CC E80000                      CALL DEVICE_MAP_SET          ;= DROP 5











          ;
          ;
          ;---------------------------------------------------------------------------
          ;*************                   ****************************************
          ;*************  Main  Routine    ****************************************
          ;*************                   ****************************************
          ;---------------------------------------------------------------------------
          ;
          ;
03CF E82C01     MAIN_LOOP:        CALL FORWARD_CMD_CK          ; Cy Flag = 1  Active
03D2 E81100                       CALL TIMER_OPERAT
03D5 7205                         JC KEY_APPLICAT
```

```
                       ;
03D7 E8CD04            DROP_ACCESS:    CALL DROP_RESPONSE         ; Response no kaishaku
03DA 7305                              JNC ECU_ADRS_NEW           ;      ---> Shori Nshi
                       ;
03DC E80000            KEY_APPLICAT:   CALL KEY_OPERATION         ;      ---> Key shori
03DF EBEE                              JMP MAIN_LOOP
                       ;
03E1 E82903            ECU_ADRS_NEW:   CALL ECU_ADRS_READ
03E4 EBE9                              JMP MAIN_LOOP
                       ;
                       ; ************  Subroutine  ********************************************
                       ;
03E6 E8FB00            TIMER_OPERAT:   CALL TIMER_CHK
03E9 7202                              JC TIMER_YO
03EB F8                                CLC
03EC C3                                RET
                       ;
03ED FF06FC1F          TIMER_YO:       INC WORD PTR [TIMER_COUNTER]
                       ;
03F1 8B16FC1F          TIMER_TOB2:     MOV DX,[TIMER_COUNTER]
03F5 80FA00                            CMP DL,0
03F8 7568                              JNZ TIMER_TYPE_2
03FA 80E607                            AND DH,7
03FD 80FE06                            CMP DH,6
0400 7360                              JNC TIMER_TYPE_2
                       ;
0402 B001                              MOV AL,1
0404 8ACE                              MOV CL,DH              ; DH = CONV_NO
0406 D2C0                              ROL AL,CL              ; AL = CONV_NO_BIT
0408 84068007                          TEST AL,[NOW_EVENT]
040C 7454                              JZ TIMER_TYPE_2
040E B700                              MOV BH,0
0410 8ADE                              MOV BL,DH
                       ;        ******  PAY Channel View  ******
0412 BE3000                            MOV SI,EVENT_CHANNEL
0415 03F3                              ADD SI,BX
0417 8A1C                              MOV BL,[SI]            ; BL = EVENT View Channel
0419 BE0006                            MOV SI,ES_EVENT_TIMER  ; Counter Up & Pay ?
041C 8AE6                              MOV AH,DH
041E B000                              MOV AL,0
0420 D1C8                              ROR AX
0422 03F0                              ADD SI,AX
0424 268A20                            MOV AH,ES:[SI][BX]
0427 80FCF8                            CMP AH,0F8H
042A 7336                              JNC TIMER_TYPE_2
042C 26800008                          ADD BYTE PTR ES:[SI][BX],8
0430 268038F8                          CMP BYTE PTR ES:[SI][BX],0F8H
0434 722C                              JC  TIMER_TYPE_2
                       ;
0436 800E8007C0                        OR BYTE PTR [NOW_EVENT],0C0H
043B 80CE10                            OR DH,10H
043E 88362807                          MOV [IC_BYTE],DH
0442 E80000                            CALL CONV_TO_DROP
0445 E80000                            CALL ID_DROP_DEVICE
                       ;
0448 A02E07                            MOV AL,[CONV_NO_BIT]
044B 343F                              XOR AL,3FH
044D 20068107                          AND BYTE PTR [BEFOR_EVENT],AL
                       ;
```

```
0451 BE3000                          MOV SI,EVENT_CHANNEL
0454 03362407                        ADD SI,[CONV_NO]
0458 8A1C                            MOV BL,[SI]
045A B700                            MOV BH,0
045C E80000                          CALL BINDEC_LED
045F E80000                          CALL RUN_CONVERTER
                  ;
0462 8B1EFC1F     TIMER_TYPE_2:      MOV BX,[TIMER_COUNTER]
0466 81E3FF0F                        AND BX,0FFFH
                  ;
046A 81FB0004                        CMP BX,ES_BACK_UP_2          ; 1024
046E 734C                            JNC TIMER_TOB
0470 81FB0002                        CMP BX,ES_BACK_UP_1          ; 512
0474 721B                            JC MOV_1_ST
                  ;
0476 268A07       MOV_2_ND:          MOV AL,ES:[BX+ES_BACK_UP]    ; BX = 512 - 1023
0479 2688870002                      MOV ES:[BX+ES_BACK_UP_1],AL
047E 753C                            JNZ TIMER_TOB
0480 26C7060002                      MOV WORD PTR ES:[ES_BACK_UP_1],0A5A5H
0487 26C7060004                      MOV WORD PTR ES:[ES_BACK_UP_2],0
048E E92B00                          JMP TIMER_TOB
                  ;
0491 83FB04       MOV_1_ST:          CMP BX,4
0494 7214                            JC MOV_1_INIT
0496 8A07                            MOV AL,[BX]
0498 2688870002                      MOV ES:[BX+ES_BACK_UP_1],AL
049D 2630060202                      XOR ES:[ES_BACK_UP_1+2],AL
04A2 2600060302                      ADD ES:[ES_BACK_UP_1+3],AL
04A7 E91200                          JMP TIMER_TOB
                  ;
04AA 26C6870002   MOV_1_INIT:        MOV BYTE PTR ES:[BX+ES_BACK_UP_1],0
04B0 83FB00                          CMP BX,0
04B3 7507                            JNZ TIMER_TOB
04B5 26C7060004                      MOV WORD PTR ES:[ES_BACK_UP_2],0A5A5H
                  ;
04BC 81E33F00     TIMER_TOB:         AND BX,3FH                   ; 00**  ****
04C0 881E2807                        MOV [IC_BYTE],BL
04C4 02DB                            ADD BL,BL
04C6 BE0003                          MOV SI,TIME_TABLE
04C9 8B00                            MOV AX,[SI][BX]
04CB 3DFFFF                          CMP AX,0FFFFH
04CE 7412                            JZ TIMER_SLEEP               ; Timer Wa Tukawanai
04D0 FF08                            DEC WORD PTR [SI][BX]
04D2 750E                            JNZ TIMER_SLEEP              ;    <---   Madada
                  ;
04D4 B100                            MOV CL,TIMER_OUT_CODE        ;    <---   Jikan desuyo
04D6 880E8907                        MOV [KEY_DATA],CL
04DA E80000                          CALL IC_DROP_DEVICE
04DD E80000                          CALL CONV_TO_DROP
                  ;
04E0 F9           TIMER_ACTIVE:      STC
04E1 C3                              RET
                  ;


04E2 F8           TIMER_SLEEP:       CLC
04E3 C3                              RET

                  ;
                  ; ************  Timer Counter Check  ****************************
                  ;
                  ;=================SUBROUTINE FOR COUNT SEC=============
04E4 BA66FF       TIMER_CHK:         MOV          DX,0FF66H
04E7 ED                              IN           AX,DX
04E8 A92000                          TEST         AX,0020H
04EB F8                              CLC
04EC 740F                            JZ           RETTIM2
04EE B80008                          MOV          AX,0800H
04F1 BA62FF                          MOV          DX,0FF62H
04F4 EF                              OUT          DX,AX
04F5 B801C0                          MOV          AX,1100000000000001B
04F8 BA66FF                          MOV          DX,0FF66H
04FB EF                              OUT          DX,AX
04FC F9                              STC
04FD C3           RETTIM2:           RET
```

```
                          ;
                          ;----------------------------------------------------------------------------
                          ;*************                                  ***********************************
                          ;*************  HDLC Forward Command            ***********************************
                          ;*************                                  ***********************************
                          ;----------------------------------------------------------------------------
                          ;
04FE 8B361407             FORWARD_CMD_CK: MOV SI,[ECHO_BACK_FLAG]
0502 83FE00                               CMP SI,0
0505 7503                                 JNZ FORWARD_COME
0507 E90102                               JMP TX_CCC_N_RET
                                                                          ; SI=Data Buffer Address
050A C706140700           FORWARD_COME:   MOV WORD PTR [ECHO_BACK_FLAG],0 ; +0 --- ECU H Address
0510 8A4403                               MOV AL,[SI+3]                   ; +1          L
0513 3C80                                 CMP AL,80H                      ; +2      Rx Data Length
0515 7333                                 JNC FORWARD_CMDTBL              ; +3      Command
0517 3C20                                 CMP AL,20H
0519 7303                                 JNC CCC_CMD_20_7F
051B E98501                               JMP CCC_DROP_CMD        ; 00 - 1F Command
                          ;
051E 740A                 CCC_CMD_20_7F:  JZ FORCED_KEY           ; 20 - 7F Command
0520 3C30                                 CMP AL,30H
0522 7403                                 JZ COLD_START
0524 E9E401                               JMP TX_CCC_N_RET
                          ;
0527 E9D6FA               COLD_START:     JMP RUN                 ; *******  Cold Start  ******
                          ;
052A 8A4404               FORCED_KEY:     MOV AL,[SI+4]
052D A22807                               MOV [IC_BYTE],AL
0530 8A6405                               MOV AH,[SI+5]
0533 88268907                             MOV [KEY_DATA],AH
0537 E80000                               CALL IC_DROP_DEVICE
053A E80000                               CALL CONV_TO_DROP
053D E80000                               CALL KEY_OPERATION
0540 F9                                   STC
0541 C3                                   RET
                          ;
0542 5B                   FORWARD_JUMP:   POP BX
0543 03D8                                 ADD BX,AX
0545 8A4403                               MOV AL,[SI+3]
0548 53                                   PUSH BX
0549 C3                                   RET
                          ;
054A 2C80                 FORWARD_CMDTBL: SUB AL,80H
054C 25FC00                               AND AX,0FCH
054F E8F0FF                               CALL FORWARD_JUMP
                          ;
0552 E97C00               CCC_CMD_JMPTBL: JMP SEND_FUNC_MOD   ; 80H ---
0555 90                                   NOP
0556 E99600                               JMP SEND_RESPONSE   ; 84H ---
0559 90                                   NOP
055A E90000                               JMP PAY_GROUP_1     ; 88H ---
055D 90                                   NOP
055E E90000                               JMP PAY_GROUP_2     ; 8CH ---
0561 90                                   NOP
0562 E9A601                               JMP TX_CCC_N_RET    ; 90H ---
0565 90                                   NOP
0566 E9A201                               JMP TX_CCC_N_RET    ; 94H ---
0569 90                                   NOP
056A E99E01                               JMP TX_CCC_N_RET    ; 98H ---
056D 90                                   NOP
056E E99A01                               JMP TX_CCC_N_RET    ; 9CH ---
0571 90                                   NOP
```

```
0572 E99601                        JMP TX_CCC_N_RET     ; A0H ---          [Ino]
0575 90                            NOP
0576 E99201                        JMP TX_CCC_N_RET     ; A4H ---          [Ino]
0579 90                            NOP
057A E98E01                        JMP TX_CCC_N_RET     ; A8H ---          [Ino]
057D 90                            NOP
057E E98A01                        JMP TX_CCC_N_RET     ; ACH ---          [Ino]
0581 90                            NOP
0582 E98601                        JMP TX_CCC_N_RET     ; B0H ---          [Ino]
0585 90                            NOP
0586 E98201                        JMP TX_CCC_N_RET     ; B4H ---          [Ino]
0589 90                            NOP
058A E97E01                        JMP TX_CCC_N_RET     ; B8H ---          [Ino]
058D 90                            NOP
058E E97A01                        JMP TX_CCC_N_RET     ; BCH ---          [Ino]
0591 90                            NOP
0592 E97601                        JMP TX_CCC_N_RET     ; C0H ---          [Ben]
0595 90                            NOP
0596 E97201                        JMP TX_CCC_N_RET     ; C4H ---          [Ben]
0599 90                            NOP
059A E96E01                        JMP TX_CCC_N_RET     ; C8H ---          [Ben]
059D 90                            NOP
059E E96A01                        JMP TX_CCC_N_RET     ; CCH ---          [Ben]
05A1 90                            NOP
05A2 E96601                        JMP TX_CCC_N_RET     ; D0H ---
05A5 90                            NOP
05A6 E96201                        JMP TX_CCC_N_RET     ; D4H ---
05A9 90                            NOP
05AA E95E01                        JMP TX_CCC_N_RET     ; D8H ---
05AD 90                            NOP
05AE E95A01                        JMP TX_CCC_N_RET     ; DCH ---
05B1 90                            NOP
05B2 E95601                        JMP TX_CCC_N_RET     ; E0H ---
05B5 90                            NOP
05B6 E95201                        JMP TX_CCC_N_RET     ; E4H ---
05B9 90                            NOP
05BA E94E01                        JMP TX_CCC_N_RET     ; E8H ---
05BD 90                            NOP
05BE E94A01                        JMP TX_CCC_N_RET     ; ECH ---
05C1 90                            NOP
05C2 E95500                        JMP ECHO_BACK_CMD    ; F0H ---
05C5 90                            NOP
05C6 E9E300                        JMP FORCED_TUNE      ; F4H ---
05C9 90                            NOP
05CA E95A00                        JMP DISPLAY_MEMORY   ; F8H ---
05CD 90                            NOP
05CE E99300                        JMP STORE_MEMORY     ; FCH ---
                ;
                ; ************  Send Function Response  ****************************
                ;
05D1 2403       SEND_FUNC_MOD:     AND AL,3                          ; 80 - 83 Command
05D3 7407                          JZ S_F_M_SET
05D5 3C01                          CMP AL,1
05D7 740D                          JZ S_F_M_CLR
05D9 E92F01                        JMP TX_CCC_N_RET                  ; 82 - 83 Command
                ;
05DC 8A6404     S_F_M_SET:         MOV AH,[SI+4]                     ; 80 Command
05DF 88263008                      MOV [SEND_ENABLE],AH
05E3 E92501                        JMP TX_CCC_N_RET
                ;
05E6 B400       S_F_M_CLR:         MOV AH,0                          ; 81 Command
05E8 88263308                      MOV [SEND_INDEX],AH
05EC E91C01                        JMP TX_CCC_N_RET
                ;
05EF 8A263308   SEND_RESPONSE:     MOV AH,[SEND_INDEX]               ; 84 - 87 Command
05F3 80FC00                        CMP AH,0
05F6 741F                          JZ NO_SEND
05F8 8A6403     YES_SEND:          MOV AH,[SI+3]
05FB 88263408                      MOV [SEND_CMD_RESP],AH
05FF 2403                          AND AL,3
0601 A21607                        MOV [REVERS_CHANEL],AL
0604 FE063308                      INC BYTE PTR [SEND_INDEX]
0608 FE063308                      INC BYTE PTR [SEND_INDEX]
060C BE3108                        MOV SI,SEND_ADDRESS
060F A10014                        MOV AX,[ECU_ADDRESS]
0612 8904                          MOV [SI],AX
0614 E9D600                        JMP TX_CCC_RUN
                ;
0617 E9F100     NO_SEND:           JMP TX_CCC_N_RET
                ;
                ; ************  Echo Back Command  ********************************
```

```
                  ;
061A 2403         ECHO_BACK_CMD:    AND AL,3                  ; Command >= 0F0H
061C A21607                         MOV [REVERS_CHANEL],AL    ; Reverse Channel Command
061F A10014       ECHO_BACK_SURU:   MOV AX,[ECU_ADDRESS]
0622 8904                           MOV [SI],AX
0624 E9C600                         JMP TX_CCC_RUN
                  ;
                  ; ************  Display Memory  ************************************
                  ;
0627 8B5C05       DISPLAY_MEMORY:   MOV BX,[SI+5]             ;     <<< Display Memory >>>
062A 8A4403                         MOV AL,[SI+3]
062D A20314                         MOV [TX_COMMAND],AL
0630 8A4404                         MOV AL,[SI+4]             ; SI --- ECU Address H
0633 BE0414                         MOV SI,TX_BUFFER          ; +1     ECU Address L
0636 A20214                         MOV [TX_LENGTH],AL        ; +2     Rx Length
0639 81FB0080                       CMP BX,8000H              ; +3     Command
063D 7310                           JNC DISP_MEM_5517
063F 8A27         TX_TRNS2:         MOV AH,[BX]               ; +4     Tx Length
0641 8824                           MOV [SI],AH               ; +5     Tx Address L
0643 46                             INC SI                    ; +6     Tx Address H
0644 43                             INC BX
0645 FEC8                           DEC AL
0647 75F6                           JNZ TX_TRNS2
0649 BE0014                         MOV SI,ECU_ADDRESS
064C E99E00                         JMP TX_CCC_RUN
                  ;
064F 81E3FF7F     DISP_MEM_5517:    AND BX,7FFFH              ; Back Up Memory Display
0653 268A27       TX_TRNS3:         MOV AH,ES:[BX]
0656 8824                           MOV [SI],AH
0658 46                             INC SI
0659 43                             INC BX
065A FEC8                           DEC AL
065C 75F5                           JNZ TX_TRNS3
065E BE0014                         MOV SI,ECU_ADDRESS
0661 E98900                         JMP TX_CCC_RUN
                  ;
0664 8B5C05       STORE_MEMORY:     MOV BX,[SI+5]             ;     <<< Store Memory >>>
0667 8A4403                         MOV AL,[SI+3]
066A A20314                         MOV [TX_COMMAND],AL
066D 8A4404                         MOV AL,[SI+4]             ; SI --- ECU Address H
                                                              ; +1     ECU Address L
0670 A20214                         MOV [TX_LENGTH],AL        ; +2     Rx Length
0673 81FB0080                       CMP BX,8000H              ; +3     Command
0677 730E                           JNC STOR_MEM_5517
0679 8A6407       ST_TRNS2:         MOV AH,[SI+7]             ; +4     St Length
067C 8827                           MOV [BX],AH               ; +5     St Address L
067E 46                             INC SI                    ; +6     St Address H
067F 43                             INC BX
0680 FEC8                           DEC AL
0682 75F5                           JNZ ST_TRNS2
0684 E98400                         JMP TX_CCC_N_RET
                  ;
0687 81E3FF7F     STOR_MEM_5517:    AND BX,7FFFH              ; Back Up Memory Display
068B 81FB0001                       CMP BX,100H
068F 7303                           JNC ST_TRNS3
0691 E97700                         JMP TX_CCC_N_RET          ; Sokowa Interrupt Table
0694 8A6407       ST_TRNS3:         MOV AH,[SI+7]
0697 268827                         MOV ES:[BX],AH
069A 46                             INC SI
069B 43                             INC BX
069C FEC8                           DEC AL
069E 75F4                           JNZ ST_TRNS3
06A0 E96800                         JMP TX_CCC_N_RET
                  ;
                  ; ************  CCC ---> Data Processor ---> Drop Processor  *****
                  ;
06A3 83C602       CCC_DROP_CMD:     ADD SI,2
06A6 E80000                         CALL LOAD_TO_DROP
06A9 E95F00                         JMP TX_CCC_N_RET
                  ;
                  ; ************  Forced Tuning  --- Nth Converter  ****************
                  ;
06AC 8A4404       FORCED_TUNE:      MOV AL,[SI+4]                  ; SI --- ECU H Address
06AF A22807                         MOV [IC_BYTE],AL               ; +1           L Address
06B2 E80000                         CALL IC_DROP_DEVICE            ; +2     Tx Data Lendth
06B5 E80000                         CALL CONV_TO_DROP              ; +3     Command E0H
06B8 8A5C05                         MOV BL,[SI+5]                  ; +4     Converter NO.
06BB 80FB64                         CMP BL,100                     ; +5     Tuning Channel
06BE 7312                           JNC FORCED_OFF
                  ;
06C0 E80000       FORCED_ON:        CALL BINDEC_LED
```

```
06C3 E80000                           CALL LED_VIEW_TBL
06C6 E80000                           CALL SPU_LED_DISP
06C9 E80000                           CALL RUN_CONVERTER
06CC E80000                           CALL WAKEARI_DE_ON
06CF E93900                           JMP TX_CCC_N_RET
                  ;
06D2 E80000       FORCED_OFF:         CALL OP_SPU_OFF
06D5 E93300                           JMP TX_CCC_N_RET
                  ;
                  ; *************     SPU to CCC   Send   **********************************
                  ;
06D8 BE0214       SPECIAL_SPU_1:      MOV SI,TX_LENGTH
06DB BB0207                           MOV BX,INDEX_RX_1
06DE C60441                           MOV BYTE PTR [SI],65
06E1 C6440100                         MOV BYTE PTR [SI+1],0
06E5 83C602                           ADD SI,2
06E8 B040                             MOV AL,64
06EA E952FF                           JMP TX_TRNS2
                  ;
                  ; ############      Send to CCC   ###################################
                  ;
06ED A01807       TX_CCC_RUN:         MOV AL,[TX_BUSY_FLAG]
06F0 3C00                             CMP AL,0
06F2 7517                             JNZ TX_CCC_N_RET
                  ;
06F4 8A4C02       TX_RUN_SUB:         MOV CL,[SI+2]
06F7 FEC1                             INC CL
06F9 FEC1                             INC CL
06FB 80F903                           CMP CL,3
06FE 7302                             JNC TX_YOSHI
0700 B103                             MOV CL,3
0702 880E1807     TX_YOSHI:           MOV [TX_BUSY_FLAG],CL     ; [[[  SI --- Start Address   ]]]
0706 E841FB                           CALL HDLC_TX_START        ; [[[  CL --- Data Length     ]]]
0709 F9                               STC
070A C3                               RET
                  ;
                  ;
                  ;
070B F8           TX_CCC_N_RET:       CLC
070C C3                               RET
                  ;
                  ;
                  ;
                  ;
                  ;------------------------------------------------------------------------
                  ;*************                    **************************************
                  ;*************       Subroutine   **************************************
                  ;*************                    **************************************
                  ;------------------------------------------------------------------------
                  ;
                  ; ************       ECU Address Read Routine   ************************
                  ;
070D BA0001       ECU_ADRS_READ:      MOV   DX,ECU_L_ADDRESS
0710 EC                               IN AL,DX
0711 8AE0                             MOV AH,AL
0713 BA0201                           MOV   DX,ECU_H_ADDRESS
0716 EC                               IN AL,DX                         ; AH = L , AL = H Addres
0717 A30014                           MOV [ECU_ADDRESS],AX
071A C3                               RET
                  ;
                  ; ************       Timer Table Initialize   *************************
                  ;
071B BE0003       INIT_TIM_TBL:       MOV SI,TIME_TABLE
071E BB0000                           MOV BX,0
0721 C600FF       INIT_TIM_LP:        MOV BYTE PTR [SI][BX],0FFH
0724 43                               INC BX
0725 81FB8000                         CMP BX,128
0729 75F6                             JNZ INIT_TIM_LP
072B C3                               RET
                  ;
                  ; ************       Event Timer Table Initialize   *******************
                  ;
```

```
072C BE0006           INIT_EV_TIMER:  MOV SI,ES_EVENT_TIMER
072F BB0000                           MOV BX,0
0732 26C60000         INIT_EV_1:      MOV BYTE PTR ES:[SI][BX],0
0736 43                               INC BX
0737 81FB0003                         CMP BX,128*6
073B 75F5                             JNZ INIT_EV_1
073D C3                               RET
                      ;
                      ; ************  JUMP_ADDRESS Table Initialize  ******************
                      ;
073E E80300           INIT_JUMP_TBL:  CALL INIT_WA_DOKO
0741 E90000                           JMP OP_INITIAL
0744 58               INIT_WA_DOKO:   POP AX
0745 A31C07                           MOV [INIT_POINT],AX
0748 BE8003                           MOV SI,JUMP_ADDRESS
074B BB0000                           MOV BX,0
074E 8900             INIT_JUMP_LP:   MOV [SI][BX],AX
0750 83C302                           ADD BX,2
0753 81FB8000                         CMP BX,128
0757 75F5                             JNZ INIT_JUMP_LP
0759 E80300                           CALL BASE_WA_DOKO
075C E90000                           JMP BASE_ROUTINE
075F 58               BASE_WA_DOKO:   POP AX
0760 A31A07                           MOV [BASE_POINT],AX
0763 C3                               RET
                      ;
                      ; ************  BASIC_AUTHO  Table Initialize  ******************
                      ;
0764 BE0001           INIT_AUTHO_TBL: MOV SI,PC_FC_LIST
0767 BB0000                           MOV BX,0
076A C60000           JUNKO:          MOV BYTE PTR [SI][BX],0
076D 43                               INC BX
076E 81FB0001                         CMP BX,256
0772 75F6                             JNZ JUNKO
                      ;
0774 BE8001                           MOV SI,BASIC_AUTHO
0777 BB0100                           MOV BX,1
077A C6003F           JUN:            MOV BYTE PTR [SI][BX],3FH
077D 43                               INC BX
077E 83FB5A                           CMP BX,90
0781 75F7                             JNZ JUN
0783 C3                               RET
                      ;
                      ; ************  View Channel Table Initialize  ******************
                      ;
0784 BE1000           INIT_VIEW_TBL:  MOV SI,VIEW_CHANNEL
0787 BB0000                           MOV BX,0                        ; S4,S3,S2,S1  S0,C2,C1,C0
078A 8AE3             INIT_VIEW_LP:   MOV AH,BL
078C FEC4                             INC AH
078E 80CC30                           OR AH,30H
0791 C60030                           MOV BYTE PTR [SI][BX],30H
0794 886008                           MOV BYTE PTR [SI][BX+8],AH
0797 43                               INC BX
0798 83FB08                           CMP BX,8
079B 75ED                             JNZ INIT_VIEW_LP
079D C3                               RET
                      ;
                      ; ************  EVENT Table  MODE  Initialize  ******************
                      ;
079E BB0006           EVENT_DATA_CL:  MOV BX,ES_EVENT_TIMER
07A1 26C707FF0F       CHIHARU:        MOV WORD PTR ES:[BX],0FFFH
07A6 83C302                           ADD BX,2
07A9 81FB0009                         CMP BX,ES_EVENT_TIMER+128*6
07AD 72F2                             JC CHIHARU
                      ;
07AF BE0009                           MOV SI,EVENT_NO_FREQ
07B2 B120                             MOV CL,32
07B4 C744400100       LP1:            MOV WORD PTR [SI+32*2],1
07B9 83C602                           ADD SI,2
07BC FEC1                             INC CL
07BE 80F93F                           CMP CL,63
07C1 75F1                             JNZ LP1
                      ;
07C3 BE0009                           MOV SI,EVENT_NO_FREQ
07C6 BB0002                           MOV BX,CH_NO_FREQ
07C9 B140                             MOV CL,64
07CB 8B07             LP2:            MOV AX,[BX]
07CD 89848000                         MOV [SI+64*2],AX
07D1 83C602                           ADD SI,2
07D4 83C302                           ADD BX,2
```

```
07D7 FEC1                                INC CL
07D9 80F980                              CMP CL,128
07DC 75ED                                JNZ LP2
                  ;
07DE C3                                  RET
                  ;
                  ; ************  PC_CODE & PR_CODE  Initialize  ******************
                  ;
07DF BE2000       INIT_CODE:             MOV SI,PC_CODE
07E2 BB0000                              MOV BX,0
07E5 C7000000     INIT_CODE_LP:          MOV WORD PTR [SI][BX],0
07E9 83C302                              ADD BX,2
07EC 83FB10                              CMP BX,16
07EF 75F4                                JNZ INIT_CODE_LP
07F1 C3                                  RET
                  ;
                  ; ************  Converter Frequency Calculation  ************
                  ;
07F2 C7063A0703   FREQ_CALC:             MOV        WORD PTR DS:[MUL_ADR],MUL_NO
07F8 B90000                              MOV        CX,0      ;A-CABLE
07FB B84000                              MOV        AX,64
07FE 48           CAL_STDA:              DEC        AX
07FF E81500                              CALL       FREQ_CAL
0802 3D0000                              CMP        AX,0
0805 75F7                                JNZ        CAL_STDA
0807 B9FF00                              MOV        CX,0FFH   ;B-CABLE
080A B84000                              MOV        AX,64
080D 48           CAL_STDB:              DEC        AX
080E E80600                              CALL       FREQ_CAL
0811 3D0000                              CMP        AX,0
0814 75F7                                JNZ        CAL_STDB
0816 C3                                  RET
                  ; ===============STD FREQ. CALICULATION SUBROUTINE=======
0817 80E120       FREQ_CAL:              AND        CL,00100000B
081A 50                                  PUSH       AX
081B 8BD0                                MOV        DX,AX
081D 754E                                JNZ        UP64          ;B-CABLE ====>UP64
081F 3D0000       UP64_D:                CMP        AX,0
0822 743A                                JE         ZERO
0824 3D3F00                              CMP        AX,63
0827 7435                                JE         ZERO
0829 3D0600                              CMP        AX,6
082C 7335                                JNC        CH6_62        ;CHANNELL ARE FROM 6 TO 62
082E 3D0400                              CMP        AX,4
0831 7335                                JNC        CH4_5         ;CHANNELL ARE FROM 4 TO 5
0833 BB4B01                              MOV        BX,331
0836 F6263A07     MULTI:                 MUL        BYTE PTR DS:[MUL_ADR]      ;CH_NO*3
083A 03C3                                ADD        AX,BX                      ;CH_NO*3+OFFSE
083C 80F900       ADDER:                 CMP        CL,0
083F 7400                                JZ         ADDER_1
                  ;;;;                   ADD        DX,64         ;64 OR 63 ??????
0841 80E403       ADDER_1:               AND        AH,00000011B
0844 F8                                  CLC
0845 D0C4                                ROL        AH
0847 D0C4                                ROL        AH
0849 D0C4                                ROL        AH
084B D0C4                                ROL        AH
084D D0C4                                ROL        AH
084F D0C4                                ROL        AH
0851 0AE1                                OR         AH,CL
0853 BB0002                              MOV        BX,CH_NO_FREQ
0856 8BF2                                MOV        SI,DX
0858 03F2                                ADD        SI,DX
085A 8900                                MOV        [BX][SI],AX   ;STORE #N & #S
085C 58                                  POP        AX
085D C3                                  RET
                  ;-----------------------------------------------
085E B80000       ZERO:                  MOV        AX,0
0861 EBD9                                JMP        ADDER
                  ;-----------------------------------------------
0863 BB5701       CH6_62:                MOV        BX,343
0866 EBCE                                JMP        MULTI
                  ;-----------------------------------------------
0868 BB4D01       CH4_5:                 MOV        BX,333
086B EBC9                                JMP        MULTI
                  ;-----------------------------------------------
086D 83C240       UP64:                  ADD        DX,64         ;64/63 Which???
0870 EBAD                                JMP        UP64_D
                  ;
                  ; ************  Japan Channel Hosei  ****************************
                  ;
0872 BE0002       CHANNEL_HOSEI:         MOV SI,CH_NO_FREQ
0875 B95140                              MOV CX,4051H          ; Japan  1
0878 898C8E00                            MOV [SI+71*2],CX
                  ;
087C B96640                              MOV CX,4066H          ; Japan  3
087F 898C9200                            MOV [SI+73*2],CX
                  ;
```

```
0883 B99840                          MOV CX,4098H           ; Japan  4
0886 898C9400                        MOV [SI+74*2],CX
                     ;
088A B98E40                          MOV CX,408EH           ; Japan  6
088D 898C9800                        MOV [SI+76*2],CX
                     ;
0891 B99340                          MOV CX,4093H           ; Japan  8
0894 898C9C00                        MOV [SI+78*2],CX
                     ;
0898 B99940                          MOV CX,4099H           ; Japan 10
089B 898CA000                        MOV [SI+80*2],CX
                     ;
089F B99F40                          MOV CX,409FH           ; Japan 12
08A2 898CA400                        MOV [SI+82*2],CX
08A6 C3                              RET
                     ;
                     ; ************  Drop Processor Response no shikibetu  ************
                     ;
08A7 BE2008          DROP_RESPONSE:  MOV SI,FROM_OBF_BF
08AA E80000                          CALL LOAD_FROM_DROP            ; Drop Processor kara no OBF Data wo FROM_OBF_BF ni utusi
08AD 7215                            JC DROP_RESP_NOP
08AF BE2008                          MOV SI,FROM_OBF_BF
08B2 8A4401                          MOV AL,[SI+1]                  :   ( AL ) = Command
08B5 3C01                            CMP AL,1
08B7 740D                            JZ DROP_RESP_01
08B9 3C04                            CMP AL,4
08BB 740B                            JZ DROP_RESP_04
08BD 3C84                            CMP AL,84H
08BF 7503                            JNZ DROP_RESP_NOP
08C1 E99F00                          JMP DROP_RESP_84
                     ;
08C4 F8              DROP_RESP_NOP:  CLC                    ; Key Data None ---> CY=0
08C5 C3                              RET
                     ;
                     ; ===================================[SI]==[+1]====[+2]==========
08C6 EBFC            DROP_RESP_01:   JMP DROP_RESP_NOP  ;        [01][POW.DETECT]
                     ; ===================================[SI]==[+1]==[+2]===[+3][+4]==[+5]==
08C8 8A4402          DROP_RESP_04:   MOV AL,[SI+2]
08CB A22C07                          MOV [ID_BYTE],AL
08CE E80000                          CALL ID_DROP_DEVICE
                     ;
08D1 BE2008                          MOV SI,FROM_OBF_BF
08D4 8A4C03                          MOV CL,[SI+3]          ;        [04][ID_BYTE][02][00][STATUS]
08D7 80F900                          CMP CL,0               ;                             00  **
08DA 7466                            JZ RESP_VLF_ERR
08DC BF8000                          MOV DI,VLF_ERROR_MAP
08DF B700                            MOV BH,0
08E1 8A1E2C07                        MOV BL,[ID_BYTE]
08E5 03DB                            ADD BX,BX
08E7 8121FEFF                        AND WORD PTR [DI][BX],0FFFEH
                     ;
08EB 8A6C04                          MOV CH,[SI+4]          ;                        02  00  **
08EE 80FD00                          CMP CH,0
08F1 7402                            JZ RESP_STATUS
08F3 EBCF                            JMP DROP_RESP_NOP
                     ;
08F5 8A5405          RESP_STATUS:    MOV DL,[SI+5]          ;      [ Status ]
08F8 80E204                          AND DL,4               ;   S * * *   * P * *
08FB 7431                            JZ KEY_DEPRESS         ;                 ^ ^
08FD 8A5405          RECENT_ON:      MOV DL,[SI+5]          ;   ^             ^ I
0900 E80000                          CALL CONV_SW_BIT_AL ;  ^   SPU Recent Power ON
0903 80E280                          AND DL,80H             ;   ^               I
0906 7411                            JZ CONV_SW_0           ;   Converter Select SW
0908 8A262607        CONV_SW_1:      MOV AH,[DROP_NO]
090C 80E401                          AND AH,1
090F 7518                            JNZ CONV_SW_SET
0911 0804                            OR [SI],AL
0913 E80000                          CALL JUMP_ADRS_INIZ
0916 E91000                          JMP CONV_SW_SET
0919 8A24            CONV_SW_0:      MOV AH,[SI]
091B 343F                            XOR AL,3FH
091D 2004                            AND [SI],AL
091F E80000                          CALL DROP_BIT_AL     ; 10/19 Henkou !!!
0922 22C4                            AND AL,AH
0924 7403                            JZ CONV_SW_SET
0926 E80000                          CALL JUMP_ADRS_INIZ
0929 E80000          CONV_SW_SET:    CALL JUMP_ADRS_INIT
092C F8                              CLC
092D C3                              RET
                     ;
092E 8A5405          KEY_DEPRESS:    MOV DL,[SI+5]          ;                 I
0931 80E202                          AND DL,2               ;     Key Currently Depressed
0934 740A                            JZ ELSE_STATUS
0936 B01C                            MOV AL,KEY_PUSH_CODE
0938 A28907                          MOV [KEY_DATA],AL
093B E80000                          CALL DROP_TO_CONV
093E F9                              STC
```

```
093F C3                                  RET
0940 F8              ELSE_STATUS:        CLC
0941 C3                                  RET
                     ;
0942 E80000          RESP_VLF_ERR:       CALL DROP_TO_CONV
0945 BE8000                              MOV SI,VLF_ERROR_MAP                ;
0948 B700                                MOV BH,0                            ;
094A 8A1E2C07                            MOV BL,[ID_BYTE]                    ;
094E 03DB                                ADD BX,BX                           ;
0950 8B00                                MOV AX,[SI][BX]                     ;
0952 050200                              ADD AX,2                            ;
0955 350100                              XOR AX,1                            ;
0958 8900                                MOV [SI][BX],AX                     ;
095A D0C8                                ROR AL                              ;
095C 7303                                JNC VLF_ERR_RET                     ;
095E E80000                              CALL JUMP_ADRS_INIT
0961 F8              VLF_ERR_RET:        CLC
0962 C3                                  RET
                     ; =================================================================
0963 8A4C03          DROP_RESP_84:       MOV CL,[SI+3]       ;       [84][ID/DROP]   [01][KEY]
0966 80F900                              CMP CL,0
0969 742D                                JZ RESP_84_NRET
                     ;
096B 8A6402                              MOV AH,[SI+2]         ; ( AH ) = ID_BYTE
096E 88262C07                            MOV [ID_BYTE],AH
                     ;
0972 E80000                              CALL ID_DROP_DEVICE ; ---> CONV_NO , DROP_NO , DEVICE_NO
0975 E80000                              CALL DROP_TO_CONV
                     ;
0978 8A6C04                              MOV CH,[SI+4]
097B 882E8907                            MOV [KEY_DATA],CH
                     ;
097F BE8000                              MOV SI,VLF_ERROR_MAP
0982 B700                                MOV BH,0
0984 8A1E2C07                            MOV BL,[ID_BYTE]
0988 03DB                                ADD BX,BX
098A 8120FEFF                            AND WORD PTR [SI][BX],0FFFEH
                     ;
098E 80FDFF                              CMP CH,0FFH
0991 7402                                JZ SENS_STATUS
0993 F9                                  STC                    ; Push Key Board ---> CY=1
0994 C3                                  RET
                     ;
0995 E80000          SENS_STATUS:        CALL SPU_STATUS_REQ ; 0FFH ---> No Key Stroke
0998 F8              RESP_84_NRET:       CLC
0999 C3                                  RET
                     ;
                     ;
                     ;
                                         GLOBAL          SPECIAL_SPU_1
                     ;
                     ;
                     ;
                                         EXTRN           POWER_DET_CMD
                                         EXTRN           LOAD_FROM_DROP
                                         EXTRN           LOAD_TO_DROP
                                         EXTRN           SPU_STATUS_REQ
                                         EXTRN           ID_DROP_DEVICE
                                         EXTRN           IC_DROP_DEVICE
                                         EXTRN           CONV_SW_BIT_AL
                                         EXTRN           DROP_BIT_AL
                                         EXTRN           SPU_RELAY_OFF
                                         EXTRN           SPU_CLEAR_DISP
                                         EXTRN           EVENT_LED_OFF
                                         EXTRN           DROP_MAP_SET
                                         EXTRN           KEY_OPERATION
                                         EXTRN           CONV_TO_DROP
                                         EXTRN           DROP_TO_CONV
                                         EXTRN           BINDEC_LED
                                         EXTRN           LED_VIEW_TBL
                                         EXTRN           SPU_LED_DISP
                                         EXTRN           RUN_CONVERTER
                                         EXTRN           WAKEARI_DE_ON
                                         EXTRN           OP_SPU_OFF
                                         EXTRN           OP_INITIAL
                                         EXTRN           BASE_ROUTINE
                                         EXTRN           JUMP_ADRS_INIT
                                         EXTRN           JUMP_ADRS_INIZ
                                         EXTRN           DEVICE_MAP_SET
                     ;
```

```
2080          EXTRN          PAY_GROUP_1
2081          EXTRN          PAY_GROUP_2

Errors=    0

  84  CTRL_1           A  443.777.801,836
  85  CTRL_1_COUNT     A  444.778.798.833
  88  CTRL_2           A  445,738.752
  89  CTRL_2_COUNT     A  454.683.686.757
      DEVICE_MAP_SET   E  1225,1227,1229.1231.1233,1235,2078
 102  DEVICE_NO        A
 106  DEVICE_NO_BIT    A
1204  DEV_CLR          A  1198,1200
1163  DEV_INIT_LP      A  1211
1208  DEV_NEXT         A  1185
1167  DEV_RESP_WT      A  1169.1177,1181.1189
1201  DEV_SW_0         A  1195
1196  DEV_SW_1         A
1592  DISPLAY_MEMORY   A  1546
1609  DISP_MEM_5517    A  1599
 136  DOWN_FLAG        A
1264  DROP_ACCESS      A
      DROP_BIT_AL      E  1985.2060
 143  DROP_CMD_BF      A
 230  DROP_CMD_PORT    A  793
 231  DROP_DATA_PORT   A  681.829
1160  DROP_INIT_LP     A  1218
      DROP_MAP_SET     E  1223,2064
 100  DROP_NO          A  1196,1976
 105  DROP_NO_BIT      A
1931  DROP_RESPONSE    A  1264
1948  DROP_RESP_01     A  1937
1950  DROP_RESP_04     A  1939
2019  DROP_RESP_94     A  1942
1944  DROP_RESP_NOP    A  1933.1941,1948,1967
      DROP_TO_CONV     E  1998.2004.2027.2067
1213  DRP_NEXT         A  1161
 120  DS1              A  121.122.123,125.126,127.128.130.131.132.133.134.135,136.137.138
 142  DS16             A  143.144,145.147
  81  DS2              A  82.83.84,85.86,87,88,89.90.91.92.93.94.95.96.97.99.100.101.102.103,104.105.106,108.109,110,113
  97  ECHO_BACK_ADRS   A
1584  ECHO_BACK_CMD    A  1542
  91  ECHO_BACK_FLAG   A  447,922.1016.1110,1446,1451
1586  ECHO_BACK_SURU   A
 161  ECU_ADDRESS      A  162,163.164,999,1006,1576.1596.1606.1616.1730
1278  ECU_ADRS_NEW     A  1265
1725  ECU_ADRS_READ    A  461,1278
 232  ECU_H_ADDRESS    A  1728
 233  ECU_L_ADDRESS    A  1725
2001  ELSE_STATUS      A  1995
1060  EOI              A
 182  ES_BACK_UP       A  1356
 183  ES_BACK_UP_1     A  480.498.1353,1357.1359.1366.1367,1368.1371
 184  ES_BACK_UP_2     A  477,499.1351,1360,1374
 186  ES_EVENT_TIMER   A  1319.1745.1804.1807
  62  EVENT_CHANNEL    A  1316,1341
1804  EVENT_DATA_CL    A  472
 123  EVENT_ENABLE     A
 194  EVENT_KEY_CODE   A
      EVENT_LED_OFF    E  1206.2063
 153  EVENT_NO_FREQ    A  1810.1818
 914  EXIT             A  883,895.899
  72  A200H            A  73.74.75,76
 239  ACHC             A  343.346.354,362,370.373.377,381,539,569.571,574.582.604.610.614.642.355.359.360.901,915,969.1023.102
                          1031.1047,1048,1052,1054,1056,1082,1085,1091.1095,1097,1100
 238  ACHD             A  325.333.639,952
1873  ADDER            A  1893
1876  ADDER_1          A  1874
1806  ALOHA_CHECK      A
 214  ASCII_AD         A
 208  ASCII_AU         A
 212  ASCII_CL         A
 218  ASCII_CO         A
 215  ASCII_DE         A
 207  ASCII_ER         A
 210  ASCII_FC         A
 217  ASCII_NO         A
 216  ASCII_NU         A
 211  ASCII_PC         A
 219  ASCII_PR         A
 209  ASCII_SC         A
 213  ASCII_SE         A
 195  AUTHO_KEY_CODE   A
 486  BACK_UP_CK1      A  490
 504  BACK_UP_CK2      A  509
 514  BACK_UP_EXIT     A  482,493,510
 483  BACK_UP_KAI      A  479
 512  BACK_UP_NONE     A  195
 497  BACK_UP_YES      A
  94  BASE_POINT       A  1769
      BASE_ROUTINE     E  1766.2075
1767  BASE_WA_DOKO     A  1765
  66  BASIC_AUTHO      A  1730
 241  BCHC.            A  350,358,366,534,588
 240  BCHD             A
 122  BEFOR_EVENT      A  1379
  52  BIAS             A  55.56,57,58.59.60,61,62.64.65.66.276
  96  BINARY_LED       A
      BINDEC_LED       E  1345.1663,2068
1846  CAL_STDA         A  1849
1852  CAL_STDB         A  1855
1459  CCC_CMD_20_7F    A  1456
1486  CCC_CMD_JMPTBL   A
1649  CCC_DROP_CMD     A  1457
1898  CH4_5            A  1869
```

```
1895  CH6_62             A  1867
1906  CHANNEL_HOSEI      A  471
1805  CHIHARU            A  1908
  73  CH_NO_FREQ         A  1819,1885,1906
 199  CLEAR_KEY_CODE     A
1464  COLD_START         A  1461
  99  CONV_NO            A  431,1226,1228,1230,1232,1234,1342
 104  CONV_NO_BIT        A  1337
 117  CONV_SELECT        A  434,435,436,437
1982  CONV_SW_0          A  1975
1976  CONV_SW_1          A
      CONV_SW_BIT_AL     E  1192,1973,2059
1989  CONV_SW_SET        A  1973,1981,1987
      CONV_TO_DROP       E  1334,1399,1471,1658,2066
 109  EXTRN_STAT         A  530,862,876
1466  FORCED_KEY         A  1459
1670  FORCED_OFF         A  1661
1663  FORCED_ON          A
1655  FORCED_TUNE        A  1544
1482  FORWARD_CMDTBL     A  1454
1446  FORWARD_CMD_CK     A  1256
1451  FORWARD_COME       A  1448
1476  FORWARD_JUMP       A  1484
1858  FREQ_CAL           A  1847,1853
1843  FREQ_CALC          A  470
 145  FROM_OBF_BF        A  1141,1144,1150,1153,1167,1170,1931,1934,1954
1141  HAJIME1            A  1143,1147
1139  HAJIMERUYO         A  551
 568  HDLC_TX_START      A  1696
 170  HISTORY_BUFFER     A  459,735,824
 952  HON                A
1150  HONBAN1            A  1152,1156
 127  HSB_LED            A
 782  IBF_1ST            A
 828  IBF_2ND            A  780
 785  IBF_EMPTY          A
 790  IBF_EXIST          A  783
 774  IBF_INTERRUPT      A
 825  IBF_MEMO           A  823
  58  IBF_OVER_FLOW      A
 803  IBF_PACKET         A  799
 840  IBF_RET            A  788,826,834
 830  IBF_SET            A
 101  IC_BYTE            A  1333,1377,1467,1656
      IC_DROP_DEVICE     E  1388,1470,1657,2058
 103  ID_BYTE            A  1164,1180,1951,1960,2007,2024,2034
      ID_DROP_DEVICE     E  1165,1335,1952,2026,2057
 169  INDEX_HISTORY      A  460,724,736,803,825
  82  INDEX_RX_1         A  427,1676
  86  INDEX_RX_2         A  441,742,753
  83  INDEX_TX_1         A  428,776,796,831
  87  INDEX_TX_2         A  440
1773  INIT_AUTHO_TBL     A  463
1833  INIT_CODE          A  465
1835  INIT_CODE_LP       A  1838
1747  INIT_EV_1          A  1750
1745  INIT_EV_TIMER      A  473
1761  INIT_JUMP_LP       A  1764
1755  INIT_JUMP_TBL      A  515
  95  INIT_POINT         A  1758
1737  INIT_TIM_LP        A  1740
1735  INIT_TIM_TBL       A  514
1792  INIT_VIEW_LP       A  1799
1790  INIT_VIEW_TBL      A  464
1757  INIT_WA_DOKO       A  1755
 235  INT1OFST           A  288
 236  INT3OFST           A  292
 234  INT_OFST           A  296
  75  JUMP_ADDRESS       A  1759
      JUMP_ADRS_INIT     E  1989,2015,2076
      JUMP_ADRS_INIZ     E  1980,1988,2077
1782  JUN                A  1785
1775  JUNKO              A  1778
1271  KEY_APPLICAT       A  1258
 130  KEY_DATA           A  1387,1469,1997,2030
 160  KEY_DATA_STACK     A  161
1993  KEY_DEPRESS        A  1971
      KEY_OPERATION      E  1271,1472,2065
 205  KEY_PUSH_CODE      A  1996
      LED_VIEW_TBL       E  1664,2069
      LOAD_FROM_DROP     E  1142,1151,1168,1932,2054
      LOAD_TO_DROP       E  1650,2055
 873  LOY                A  868
 876  LOZ                A  871,875
```

| | | | |
|---|---|---|---|
| 1812 | LP1 | A | 1816 |
| 1821 | LP2 | A | 1827 |
| 125 | LSB_LED | A | |
| 1256 | MAIN_LOOP | A | 1272,1279 |
| 424 | MAIN_START | A | |
| 197 | MINUS_KEY_CODE | A | |
| 1371 | MOV_1_INIT | A | 1364 |
| 1363 | MOV_1_ST | A | 1354 |
| 1356 | MOV_2_ND | A | |
| 126 | MSB_LED | A | |
| 1871 | MULTI | A | 1896,1899 |
| 108 | MUL_ADR | A | 1843,1871 |
| 191 | MUL_NO | A | 1843 |
| 1016 | MY_ADRS | A | 1000,1002 |
| 1014 | MY_ALOHA | A | |
| 76 | NEXT_GO_ADRS | A | |
| 121 | NOW_EVENT | A | 1311,1331 |
| 1580 | NO_SEND | A | 1568 |
| 116 | OBF_BF_BYTE | A | |
| 114 | OBF_BF_CMD | A | 453,756 |
| 115 | OBF_BF_ID | A | |
| 113 | OBF_BF_N | A | 114,115,116,117,446,688,689,690,755 |
| 679 | OBF_INTERRUPT | A | |
| 736 | OBF_MEMO | A | 734 |
| 755 | OBF_NEW | A | 740 |
| 722 | OBF_PACKET | A | |
| 759 | OBF_RET | A | 700,712,720 |
| 700 | OBF_RET_1 | A | 703 |
| 131 | ONE_SEC_TIMER | A | 457 |
| 196 | ONOFF_KEY_CODE | A | |
| | OP_INITIAL | E | 1756,2074 |
| | OP_SPU_OFF | E | 1670,2073 |
| 175 | PAGE_MEM | A | 450,733,822 |
| 90 | PAGE_SW | A | 451,950,996,1020 |
| | PAY_GROUP_1 | E | 1490,2080 |
| | PAY_GROUP_2 | E | 1492,2081 |
| 61 | PC_CODE | A | 1833 |
| 137 | PC_FC_EXIST | A | |
| 65 | PC_FC_LIST | A | 1773 |
| 193 | PLUS_KEY_CODE | A | |
| 1223 | POLLING_SEQ | A | 1216 |
| 222 | POP_ALL | A | |
| | POWER_DET_CMD | E | 1140,1149,2053 |
| 138 | POWER_FEED | A | 432 |
| 202 | POWER_OFF_CODE | A | |
| 201 | POWER_ON_CODE | A | |
| 128 | PPV_LED | A | |
| 55 | PROGRAMVERSION | A | 503,517 |
| 221 | PUSH_ALL | A | |
| 276 | RAM_CLEAR | A | |
| 278 | RAM_CLEAR_LP | A | 281 |
| 1972 | RECENT_ON | A | |
| 203 | RECENT_ON_CODE | A | |
| 204 | RELEASE_CODE | A | |
| 702 | RESPONSE_2 | A | 694 |
| 719 | RESPONSE_CHK | A | 697,699,709,716 |
| 745 | RESPONSE_TRNS | A | 750 |
| 711 | RESPONSE_VAL | A | 707 |
| 2044 | RESP_94_NRET | A | 2021 |
| 1969 | RESP_STATUS | A | 1966 |
| 2004 | RESP_VLF_ERR | A | 1957 |
| 1415 | RETTIM2 | A | 1407 |
| 92 | REVERS_CHANEL | A | 448,575,1572,1585 |
| 252 | RUN | A | 1464 |
| | RUN_CONVERTER | E | 1346,1666,2071 |
| 1038 | RX_CRC_ERR | A | 993 |
| 56 | RX_CRC_ERROR | A | 1038,1039 |
| 57 | RX_CRC_OK_YO | A | 994,995 |
| 990 | RX_INTERRUPT | A | |
| 992 | RX_RCV | A | |
| 1042 | RX_RECEIVE | A | 992 |
| 1022 | RX_RET | A | 1004,1009,1040 |
| 198 | SCAN_KEY_CODE | A | |
| 59 | SCAN_MODE_FLAG | A | 467 |
| 5 | SEISAKU_DD | A | 520 |
| 6 | SEISAKU_MM | A | 519 |
| 8 | SEISAKU_VV | A | 521 |
| 7 | SEISAKU_YY | A | 518 |
| 148 | SEND_ADDRESS | A | 149,150,151,1575 |
| 150 | SEND_CMD_RESP | A | 1570 |
| 151 | SEND_DATA_BUFF | A | |

```
47  SEND_ENABLE       A  148,1559
52  SEND_FUNC_MOD     A  1486
49  SEND_INDEX        A  1563,1566,1573,1574
00  SEND_KEY_CODE     A
24  SEND_MAX          A
66  SEND_RESPONSE     A  1488
43  SENS_STATUS       A  2039
61  SETCOM            A  347,351,355,359,363,367,374.378.382,540
75  SPECIAL_SPU_1     A  2049
    SPU_CLEAR_DISP    E  1205.2062
44  SPU_CMD_BF        A
    SPU_LED_DISP      E  1665,2070
    SPU_RELAY_OFF     E  1204,2061
    SPU_STATUS_REQ    E  1166,2043,2056
77  STACK_END         A
78  STACK_TOP         A
19  STORE_MEMORY      A  1548
35  STOR_MEM_5517     A  1626
27  ST_TRNS2          A  1632
39  ST_TRNS3          A  1637,1644
62  S_F_M_CLR         A  1555
58  S_F_M_SET         A  1553
10  TEMP_R_CH         A  429,576,605,1086
37  TIMER1_OFST       A  304
91  TIMER_ACTIVE      A
03  TIMER_CHK         A  1292
60  TIMER_COUNTER     A  500,730,819,1297,1301,1348
92  TIMER_OPERAT      A  1257
92  TIMER_OUT_CODE    A  1386
96  TIMER_SLEEP       A  1382,1384
76  TIMER_TOB         A  1352,1358,1361,1369,1373
01  TIMER_TOB2        A
40  TIMER_TYPE_2      A  1303,1306,1312,1326,1329
97  TIMER_YO          A  1293
74  TIME_TABLE        A  1379,1735
79  TO_CCC            A  439
78  TO_DROP           A  426
34  TUNER_CBL         A
32  TUNER_D1          A
33  TUNER_D2          A
64  TX_BUFFER         A  1596
93  TX_BUSY_FLAG      A  430,921,1109,1685,1695 1510,1512,1514,1516,1518,1520,1522,1524,1526,1528,1530
82  TX_CCC_N_RET      A  1449,1462,1494,1496,1498,1500,1502,1504,1506,1508,1633,1638,1645,1651,1668,1671,1687
                         1532,1534,1536,1538,1540,1556,1560,1564,1580,
85  TX_CCC_RUN        A  1578,1588,1607,1617
63  TX_COMMAND        A  1594,1621
62  TX_LENGTH         A  1597,1624,1675
89  TX_RUN_SUB        A
08  TX_TRNS2          A  1605,1681
18  TX_TRNS3          A  1615
90  TX_UNDRN          A
95  TX_YOSHI          A  1693
01  UP64              A  1861
62  UP64_D            A  1902
35  UP_FLAG           A
60  VIEW_CHANNEL      A  1790
64  VLF_ERROR_MAP     A  1958,2005,2032
16  VLF_ERR_RET       A  2014
45  WAIT              A  594,595,596,597,598,599,600,601,635
46  WAIT1             A  648
    WAKEARI_DE_ON     E  1667,2072
69  YES_SEND          A
92  ZERO              A  1863,1865
```

SOURCE LINE

```
'8086'
;
;**********************************************************************
;
SEISAKU_DD:      EQU 02H          ;
SEISAKU_MM:      EQU 12H          ;
SEISAKU_YY:      EQU 58H          ;
SEISAKU_VV:      EQU 2            ; Version No.
;*****
;*****        <<<  Application   >>>
;*****             =============
;*****
;*****                  ------ By  M.TANAKA ------
;*****
;*****     Function
;*****      (1) --- SPU Key Control
;*****                6 Drop / 4 SPU ( 2nd Subscriber )
;*****
;*****      (2) --- Ram Back up
;*****
;*****      (3) --- Hardware Check
;*****
;*****              Off Event      Conv , SW , Device No. (3 Degit)
;*****              Off Send       Revrese Data Send
```

```
;*****             Event          Event LED On
;*****
;*****
;*****
;*****
;*****
;*****
;*****
;***************************************************************
;$$$$$
;$$$$$          <<<  Bug List  >>>
;$$$$$
;$$$$$    (1)    2< 2nd Sub. de Converter On/Off ga okashii
;$$$$$
;$$$$$
;$$$$$
;$$$$$
;$$$$$$$$$$$$$$$$$$$$$$$$$$$$$$$$$$$$$$$$$$$$$$$$$$$$$$$$$$$$$$$$$$$$$$
;
BIAS:            EQU 0000H
;
PROGRAMVERSION:  EQU BIAS                   ; DS 4
RX_CRC_ERROR:    EQU BIAS+4                 ; DS 4
RX_CRC_OK_YO:    EQU BIAS+8                 ; DS 4
IBF_OVER_FLOW:   EQU BIAS+12                ; DS 2
SCAN_MODE_FLAG:  EQU BIAS+14                ; DS 1
VIEW_CHANNEL:    EQU BIAS+16                ; DS 8*2
PC_CODE:         EQU BIAS+32                ; DS 8*2
EVENT_CHANNEL    EQU BIAS+48                ; DS 8
;                EQU BIAS+56
VLF_ERROR_MAP:   EQU BIAS+128               ; DS 128
PC_FC_LIST:      EQU BIAS+256               ; DS 128
BASIC_AUTHO:     EQU BIAS+256+128           ; DS 128
                 ;   BIAS+512
;
A200H:           EQU 200H
CH_NO_FREQ       EQU A200H                  ; DS 256    FREQUENCY TABLE START FRO
TIME_TABLE:      EQU A200H+100H             ; 8*8*2
JUMP_ADDRESS:    EQU A200H+180H             ; 8*8*2
NEXT_GO_ADRS:    EQU A200H+200H             ; 64*2
;                     --- 480H
TO_DROP:         EQU 0500H
TO_CCC:          EQU 0600H
;
DS2:             EQU 0700H
INDEX_RX_1:      EQU DS2+2*1
INDEX_TX_1:      EQU DS2+2*2
CTRL_1:          EQU DS2+2*3
CTRL_1_COUNT:    EQU DS2+2*4
INDEX_RX_2:      EQU DS2+2*5
INDEX_TX_2:      EQU DS2+2*6
CTRL_2:          EQU DS2+2*7
CTRL_2_COUNT:    EQU DS2+2*8
PAGE_SW:         EQU DS2+2*9
ECHO_BACK_FLAG:  EQU DS2+2*10
REVERS_CHANEL:   EQU DS2+2*11
TX_BUSY_FLAG:    EQU DS2+2*12
BASE_POINT:      EQU DS2+2*13
INIT_POINT:      EQU DS2+2*14
BINARY_LED:      EQU DS2+2*15
ECHO_BACK_ADRS:  EQU DS2+2*16

CONV_NO:         EQU DS2+2*18
DROP_NO:         EQU DS2+2*19
IC_BYTE:         EQU DS2+2*20
DEVICE_NO:       EQU DS2+2*21
ID_BYTE:         EQU DS2+2*22
CONV_NO_BIT:     EQU DS2+2*23
DROP_NO_BIT:     EQU DS2+2*24
DEVICE_NO_BIT:   EQU DS2+2*25

MUL_ADR          EQU DS2+2*29               ; DS 2     STORE #3
EXTRN_STAT       EQU DS2+2*30               ; DS 2
TEMP_R_CH        EQU DS2+2*31               ; DS 2
```

```
;                    740H
OBF_BF_N:           EQU DS2+2*32    ;    0000  0000
OBF_BF_CMD:         EQU OBF_BF_N+1
OBF_BF_ID:          EQU OBF_BF_N+2
OBF_BF_BYTE:        EQU OBF_BF_N+3
CONV_SELECT:        EQU OBF_BF_N+16 ; DS 8

;
DS1:                EQU 0780H
NOW_EVENT:          EQU DS1
BEFOR_EVENT:        EQU DS1+1
EVENT_ENABLE:       EQU DS1+2

LSB_LED:            EQU DS1+4
MSB_LED:            EQU DS1+5
HSB_LED:            EQU DS1+6
PPV_LED:            EQU DS1+7

KEY_DATA:           EQU DS1+9
ONE_SEC_TIMER:      EQU DS1+10
TUNER_D1:           EQU DS1+11
TUNER_D2:           EQU DS1+12
TUNER_CBL:          EQU DS1+13
UP_FLAG:            EQU DS1+14
DOWN_FLAG:          EQU DS1+15
PC_FC_EXIST:        EQU DS1+16
POWER_FEED:         EQU DS1+17
;


DS16:               EQU 800H
DROP_CMD_BF:        EQU DS16                              ; DS 16
SPU_CMD_BF:         EQU DS16+16*1                         ; DS 16
FROM_OBF_BF:        EQU DS16+16*2                         ; DS 16

SEND_ENABLE:        EQU DS16+16*3                         ; DS 1
SEND_ADDRESS:       EQU SEND_ENABLE+1                     ; DS 2
SEND_INDEX:         EQU SEND_ADDRESS+2                    ; DS 1
SEND_CMD_RESP:      EQU SEND_ADDRESS+3                    ; DS 1
SEND_DATA_BUFF:     EQU SEND_ADDRESS+4                    ; DS 123

EVENT_NO_FREQ:      EQU 900H                              ; DS 256


HELP:               EQU 0A00H
;
;-------------------------------------
;
KEY_DATA_STACK:     EQU 1000H                             ; DS 16*64=1024
ECU_ADDRESS:        EQU KEY_DATA_STACK+16*64              ; DS 2
TX_LENGTH:          EQU ECU_ADDRESS+2                     ; DS 1
TX_COMMAND:         EQU ECU_ADDRESS+3                     ; DS 1
TX_BUFFER:          EQU ECU_ADDRESS+4                     ; DS 256


;
TIMER_COUNTER:      EQU 2000H-4
INDEX_HISTORY:      EQU 2000H-2
HISTORY_BUFFER:     EQU 2000H



;
PAGE_MEM:           EQU 3000H

STACK_END:          EQU 39FFH
STACK_TOP:          EQU 4000H
;
; ************  BACK_UP RAM Area  ********************************
;
ES_BACK_UP:         EQU 0           ; DS 512
ES_BACK_UP_1:       EQU 200H        ; DS 512
ES_BACK_UP_2:       EQU 400H        ; DS 512
;
ES_EVENT_TIMER:     EQU 600H        ; DS 128*6

;
; ************  Imediate Data  ***********************************
;
MUL_NO              EQU             3
TIMER_OUT_CODE:     EQU 0
```

```
PLUS_KEY_CODE:   EQU 10H
EVENT_KEY_CODE:  EQU 11H
AUTHO_KEY_CODE:  EQU 12H
ONOFF_KEY_CODE:  EQU 13H
MINUS_KEY_CODE:  EQU 14H
SCAN_KEY_CODE:   EQU 15H
CLEAR_KEY_CODE:  EQU 16H
SEND_KEY_CODE:   EQU 17H
POWER_ON_CODE:   EQU 18H
POWER_OFF_CODE:  EQU 19H
RECENT_ON_CODE:  EQU 1AH
RELEASE_CODE:    EQU 1BH
KEY_PUSH_CODE:   EQU 1CH
;
ASCII_ER:        EQU 4572H
ASCII_AU:        EQU 4155H
ASCII_SC:        EQU 5343H
ASCII_FC:        EQU 4643H
ASCII_PC:        EQU 5043H
ASCII_CL:        EQU 434CH
ASCII_SE:        EQU 5345H
ASCII_AD:        EQU 4164H
ASCII_DE:        EQU 6445H
ASCII_NU:        EQU 0D49CH
ASCII_NO:        EQU 0D4DCH
ASCII_CO:        EQU 43DCH
ASCII_PR:        EQU 5072H
;
PUSH_ALL:        EQU 60H
POP_ALL:         EQU 61H
;
SEND_MAX:        EQU 64*2
;
; ---------------------------------------------------------------
; ************  I / O  Port  ************************************
; ---------------------------------------------------------------
;
DROP_CMD_PORT:   EQU 082H
DROP_DATA_PORT:  EQU 080H
ECU_H_ADDRESS:   EQU 0102H
ECU_L_ADDRESS:   EQU 0100H
INT_OFST         EQU          0A0H+(5*4)
INT1OFST         EQU          52
INT3OFST         EQU          60
TIMER1_OFST      EQU          72
ACHD             EQU          00
ACHC             EQU          04
BCHD             EQU          02
BCHC             EQU          06


                 ORG 1000H


;
1000 BE8003      JUMP_ADRS_INIT: MOV SI,JUMP_ADDRESS
1003 B700                        MOV BH,0
1005 8A1E2C07                    MOV BL,[ID_BYTE]
1009 02DB                        ADD BL,BL
100B 8B0E1C07                    MOV CX,[INIT_POINT]
100F 8908                        MOV [SI][BX],CX
1011 C3                          RET
;
;
1012 BE8003      JUMP_ADRS_INIC: MOV SI,JUMP_ADDRESS
1015 B700                        MOV BH,0
1017 8A1E2807                    MOV BL,[IC_BYTE]
101B 02DB                        ADD BL,BL
101D 8B0E1C07                    MOV CX,[INIT_POINT]
1021 8908                        MOV [SI][BX],CX
1023 C3                          PET
;
;
1024 BE8003      JUMP_ADRS_INIZ: MOV SI,JUMP_ADDRESS
1027 B700                        MOV BH,0
1029 8A1E2C07                    MOV BL,[ID_BYTE]
102D 80F301                      XOR BL,1
1030 02DB                        ADD BL,BL
1032 8B0E1C07                    MOV CX,[INIT_POINT]
1036 8908                        MOV [SI][BX],CX
1038 C3                          RET
```

```
                 ; ************ Converter ---> Drop ni henkan *******
1039 56          CONV_TO_DROP:    PUSH SI
103A E84E00                       CALL CONV_SW_BIT_AL
103D 2204                         AND AL,[SI]
103F 7418                         JZ HIROKO
1041 8A262807                     MOV AH,[IC_BYTE]
1045 80E4FE                       AND AH,0FEH
1048 88262C07                     MOV [ID_BYTE],AH
104C 8A262407                     MOV AH,[CONV_NO]
1050 80E406                       AND AH,06H
1053 88262607                     MOV [DROP_NO],AH
1057 5E                           POP SI
1058 C3                           RET
1059 8A262807    HIROKO:          MOV AH,[IC_BYTE]
105D 88262C07                     MOV [ID_BYTE],AH
1061 8A262407                     MOV AH,[CONV_NO]
1065 88262607                     MOV [DROP_NO],AH
1069 5E                           POP SI
106A C3                           RET
                 ;
                 ;
106B 56          DROP_TO_CONV:    PUSH SI
106C E81C00                       CALL CONV_SW_BIT_AL
106F 2204                         AND AL,[SI]
1071 7402                         JZ HIROYO
1073 B001                         MOV AL,1
1075 8A262C07    HIROYO:          MOV AH,[ID_BYTE]
1079 0AE0                         OR AH,AL
107B 88262807                     MOV [IC_BYTE],AH
107F 8A262607                     MOV AH,[DROP_NO]
1083 0AE0                         OR AH,AL
1085 88262407                     MOV [CONV_NO],AH
1089 5E                           POP SI
108A C3                           RET
                 ;
                 ;
108B BE5007      CONV_SW_BIT_AL:  MOV SI,CONV_SELECT
108E B500                         MOV CH,0
1090 8A0E2607                     MOV CL,[DROP_NO]
1094 03F1                         ADD SI,CX
1096 E88505                       CALL DEVICE_BIT_AL
1099 C3                           RET
                 ;
109A 50          CONV_SW_FLAG:    PUSH AX
109B 51                           PUSH CX
109C 56                           PUSH SI
109D E8EBFF                       CALL CONV_SW_BIT_AL
10A0 2204                         AND AL,[SI]
10A2 5E                           POP SI
10A3 59                           POP CX
10A4 58                           POP AX
10A5 C3                           RET
                 ;
                 ; ************ ID_BYTE ---> DROP_NO , DEVICE_NO *************
                 ;
10A6 50          ID_DROP_DEVICE:  PUSH AX
10A7 51                           PUSH CX
10A8 8A262C07                     MOV AH,[ID_BYTE]
10AC 8AC4                         MOV AL,AH
10AE 80E407                       AND AH,7
10B1 88262607                     MOV [DROP_NO],AH
10B5 B103                         MOV CL,3                 ; A4 A3 A2 A1   A0 D2 D1 D0
10B7 D2C8                         ROR AL,CL                ; -  -  -  A4   A3 A2 A1 A0
10B9 2407                         AND AL,7                 ; 0  0  0  A4   A3 A2 A1 A0
10BB A22A07                       MOV [DEVICE_NO],AL
                 ;
10BE E91800                       JMP MAKE_DATA
                 ;
                 ; ************ IC_BYTE ---> CONV_NO , DEVICE_NO *************
                 ;
10C1 50          IC_DROP_DEVICE:  PUSH AX
10C2 51                           PUSH CX
10C3 8A262807                     MOV AH,[IC_BYTE]
10C7 8AC4                         MOV AL,AH
10C9 80E407                       AND AH,7
10CC 88262407                     MOV [CONV_NO],AH
10D0 B103                         MOV CL,3                 ; A4 A3 A2 A1   A0 D2 D1 D0
10D2 D2C8                         ROR AL,CL                ; -  -  -  A4   A3 A2 A1 A0
10D4 2407                         AND AL,7                 ; 0  0  0  A4   A3 A2 A1 A0
10D6 A22A07                       MOV [DEVICE_NO],AL
                 ;
```

```
10D9 B001                 MAKE_DATA:       MOV AL,1
10DB 8A0E2407                              MOV CL,[CONV_NO]
10DF D2C0                                  ROL AL,CL
10E1 A22E07                                MOV [CONV_NO_BIT],AL
                          ;
10E4 B001                                  MOV AL,1
10E6 8A0E2607                              MOV CL,[DROP_NO]
10EA D2C0                                  ROL AL,CL
10EC A23007                                MOV [DROP_NO_BIT],AL
                          ;
10EF B001                                  MOV AL,1
10F1 8A0E2A07                              MOV CL,[DEVICE_NO]
10F5 D2C0                                  ROL AL,CL
10F7 A23207                                MOV [DEVICE_NO_BIT],AL
                          ;
10FA 59                                    POP CX
10FB 58                                    POP AX
10FC C3                                    RET
                          ;
                          ; ************   TO_DROP Buffer Space ?  **************************
                          ;
10FD A00607               TO_DROP_SPACE:   MOV AL,[CTRL_1]
1100 3C28                                  CMP AL,40
1102 F5                                    CMC
1103 C3                                    RET
                          ;
                          ; ************   AL Wa Suuji Kai      ?  **************************
                          ;
1104 3C30                 KAZUKO:          CMP AL,30H
1106 7203                                  JC KAZUKO_RET
1108 3C3A                                  CMP AL,3AH
110A F5                                    CMC
110B C3                   KAZUKO_RET:      RET
                          ;
                          ; ************   TO_DROP  Buffer ni ireru  ***********************
                          ;
110C E8EEFF               LOAD_TO_DROP:    CALL TO_DROP_SPACE    ; Korenara Anzenne !!!!!!!!!!!!
110F 721F                                  JC IBF_OVR
                          ;
1111 8B1E0207                              MOV BX,[INDEX_RX_1]
1115 8A0C                                  MOV CL,[SI]
1117 FEC1                                  INC CL
1119 8A24                 LD1:             MOV AH,[SI]
111B 8827                                  MOV [BX],AH
111D FEC3                                  INC BL
111F 46                                    INC SI
1120 FEC9                                  DEC CL
1122 75F5                                  JNZ LD1
1124 FE060607                              INC BYTE PTR [CTRL_1]
1128 891E0207                              MOV [INDEX_RX_1],BX
112C E84705                                CALL IBF_UNMASK
112F C3                   RETRN:           RET
1130 FF060C00             IBF_OVR:         INC WORD PTR [IBF_OVER_FLOW]
1134 C3                                    RET
                          ;
                          ; ************   TO_CCC   Buffer kara toridasu  *******************
                          ;
1135 A00E07               LOAD_FROM_DROP:  MOV AL,[CTRL_2]
1138 3C01                                  CMP AL,1
113A 72F3                                  JC RETRN
113C 8B1E0C07                              MOV BX,[INDEX_TX_2]
1140 8A0F                                  MOV CL,[BX]
1142 FEC1                                  INC CL
1144 8A27                 LD2:             MOV AH,[BX]
1146 8824                                  MOV [SI],AH
1148 FEC3                                  INC BL
114A 46                                    INC SI
114B FEC9                                  DEC CL
114D 75F5                                  JNZ LD2
114F FE0E0E07                              DEC BYTE PTR [CTRL_2]
1153 891E0C07                              MOV [INDEX_TX_2],BX
1157 F8                                    CLC
1158 C3                                    RET
                          ;
                          ; ************   DROP MAP Set  ***********************************
                          ;
1159 BE0008               DROP_MAP_SET:    MOV SI,DROP_CMD_BF
115C C60405                                MOV BYTE PTR [SI],5
115F C6440107                              MOV BYTE PTR [SI+1],7
1163 C6440210                              MOV BYTE PTR [SI+2],10H
1167 C6440332                              MOV BYTE PTR [SI+3],32H
```

```
116B C6440454                        MOV BYTE PTR [SI+4],54H
116F C64405F0                        MOV BYTE PTR [SI+5],0F0H
1173 E896FF                          CALL LOAD_TO_DROP
1176 C3                              RET
                    ;
                    ; ************   Power Detect Command  ********************************
                    ;
1177 BE0008         POWER_DET_CMD:   MOV SI,DROP_CMD_BF
117A C60401                          MOV BYTE PTR [SI],1
117D C6440101                        MOV BYTE PTR [SI+1],1
1181 E889FF                          CALL LOAD_TO_DROP
1184 C3                              RET
                    ;
                    ; ************   Subscriber Power OFF Control  *******************
                    ;
1185 BE0008         CONV_P_OFF_CMD:  MOV SI,DROP_CMD_BF
1188 C60402                          MOV BYTE PTR [SI],2
118B C6440105                        MOV BYTE PTR [SI+1],5
118F A02407                          MOV AL,[CONV_NO]
1192 2407                            AND AL,7
1194 884402                          MOV BYTE PTR [SI+2],AL
1197 E872FF                          CALL LOAD_TO_DROP
                    ;
119A A02E07                          MOV AL,[CONV_NO_BIT]
119D 343F                            XOR AL,3FH
119F 20068007                        AND [NOW_EVENT],AL
11A3 C3                              RET
                    ;
                    ; ************   Subscriber Power ON Control  ********************
                    ;
11A4 BE0008         CONV_P_ON_CMD:   MOV SI,DROP_CMD_BF
11A7 C60402                          MOV BYTE PTR [SI],2
11AA C6440105                        MOV BYTE PTR [SI+1],5
11AE A08D07                          MOV AL,[TUNER_CBL]
11B1 884402                          MOV BYTE PTR [SI+2],AL
11B4 E855FF                          CALL LOAD_TO_DROP
11B7 C3                              RET
                    ;
                    ; ************   Select Subscriber Cable  *************************
                    ;
11B8 C3             CABLE_SEL_CMD:   RET
11B9 BE0008                          MOV SI,DROP_CMD_BF
11BC C60402                          MOV BYTE PTR [SI],2
11BF C6440106                        MOV BYTE PTR [SI+1],6
11C3 A08D07                          MOV AL,[TUNER_CBL]
11C6 247F                            AND AL,7FH
11C8 884402                          MOV BYTE PTR [SI+2],AL
11CB E83EFF                          CALL LOAD_TO_DROP
11CE C3                              RET
                    ;
                    ; ************   Tuner Frequency Change Request  *****************
                    ;
11CF BE0008         TUNER_FREQ_CMD:  MOV SI,DROP_CMD_BF
11D2 C60404                          MOV BYTE PTR [SI],4
11D5 C6440103                        MOV BYTE PTR [SI+1],3
11D9 A02407                          MOV AL,[CONV_NO]
11DC 884402                          MOV BYTE PTR [SI+2],AL
11DF A08B07                          MOV AL,[TUNER_D1]
11E2 884403                          MOV BYTE PTR [SI+3],AL
11E5 A08C07                          MOV AL,[TUNER_D2]
11E8 884404                          MOV BYTE PTR [SI+4],AL
11EB E81EFF                          CALL LOAD_TO_DROP
11EE C3                              RET
                    ;
                    ; ************   Converter Wo Ugokasu Program  *******************
                    ;
                    ;
11EF 50             RUN_CONVERTER:   PUSH AX
11F0 53                              PUSH BX
11F1 56                              PUSH SI
                    ;
11F2 A02C07                          MOV AL,[ID_BYTE]
11F5 50                              PUSH AX
                    ;
11F6 E8AF00                          CALL GO_CONVERTER
                    ;
11F9 BE8003                          MOV SI,JUMP_ADDRESS
11FC B700                            MOV BH,0
11FE 8A1E2607                        MOV BL,[DROP_NO]
1202 80C310                          ADD BL,10H
1205 8AF3                            MOV DH,BL              ; DH = First ID_BYTE
```

```
1207 02DB                        ADD BL,BL
1209 03DE                        ADD BX,SI          ; BX = First SPU JUMP_ADDRESS
120B B202                        MOV DL,2           ; DL = First SPU No.
120D E88AFE                      CALL CONV_SW_FLAG
1210 7520                        JNZ CONV1_VIEW_CK
                     ;
                     ;
1212 88362C07        CONV0_VIEW_CK:  MOV [ID_BYTE],DH
1216 88162A07                    MOV [DEVICE_NO],DL
121A E87DFE                      CALL CONV_SW_FLAG
121D 7503                        JNZ CONV0_NEXT
                     ;
121F E84000                      CALL CONV_SUB
                     ;
1222 83C310          CONV0_NEXT:     ADD BX,10H     ; JUMP_ADDRESS
1225 80C608                      ADD DH,8           ; ID_BYTE
1228 FEC2                        INC DL             ; CONV_NO
122A 80FA06                      CMP DL,6
122D 75E3                        JNZ CONV0_VIEW_CK
122F E91D00                      JMP CONV_OP_END
                     ;
1232 88362C07        CONV1_VIEW_CK:  MOV [ID_BYTE],DH
1236 88162A07                    MOV [DEVICE_NO],DL
123A E85DFE                      CALL CONV_SW_FLAG
123D 7403                        JZ CONV1_NEXT
                     ;
123F E82000                      CALL CONV_SUB
                     ;
1242 83C310          CONV1_NEXT:     ADD BX,10H     ; JUMP_ADDRESS
1245 80C608                      ADD DH,8           ; ID_BYTE
1248 FEC2                        INC DL             ; CONV_NO
124A 80FA06                      CMP DL,6
124D 75E3                        JNZ CONV1_VIEW_CK
                     ;
124F 58              CONV_OP_END:    POP AX
1250 A22C07                      MOV [ID_BYTE],AL
1253 E850FE                      CALL ID_DROP_DEVICE
1256 A08007                      MOV AL,[NOW_EVENT]
1259 243F                        AND AL,3FH
125B A28107                      MOV [BEFOR_EVENT],AL
                     ;
125E 5E                          POP SI
125F 5B                          POP BX
1260 58                          POP AX
1261 C3                          RET
                     ;
1262 8B0F            CONV_SUB:       MOV CX,[BX]
1264 3B0E1C07                    CMP CX,[INIT_POINT]
1268 743D                        JZ AKEMI
126A 53                          PUSH BX
126B 52                          PUSH DX
                     ;
126C 8A268007                    MOV AH,[NOW_EVENT]
1270 F6C4C0                      TEST AH,0C0H
1273 750E                        JNZ AYA0
1275 32268107                    XOR AH,[BEFOR_EVENT]
1279 84262E07                    TEST AH,[CONV_NO_BIT]
127D 741D                        JZ MODE_SAME
127F 8A268007                    MOV AH,[NOW_EVENT]
1283 F6C480          AYA0:           TEST AH,80H
1286 7411                        JZ AYA3
1288 F6C440                      TEST AH,40H
128B 7406                        JZ AYA2
128D E88801          AYA1:           CALL EVENT_LED_NRM
1290 E90900                      JMP MODE_SAME
                     ;
1293 E8D901          AYA2:           CALL EVENT_LED_FLH
1296 E90300                      JMP MODE_SAME
                     ;
1299 E88701          AYA3:           CALL EVENT_LED_OFF
                     ;
129C 3B0E1A07        MODE_SAME:      CMP CX,[BASE_POINT]
12A0 7503                        JNZ AKINA
12A2 E80602                      CALL SPU_LED_DISP
12A5 5A              AKINA:          POP DX
12A6 5B                          POP BX
                     ;
12A7 C3              AKEMI:          RET
                     ;
12A8 8A3E8507        GO_CONVERTER:   MOV BH,[MSB_LED]
12AC 8A1E8407                    MOV BL,[LSB_LED]
```

```
1200 E8EB03                            CALL DECBIN_BX
                   ;        ******     EVENT Program Taiou  ******
12B3 BE0009                            MOV SI,EVENT_NO_FREQ
12B6 A08007                            MOV AL,[NOW_EVENT]
12B9 84062E07                          TEST AL,[CONV_NO_BIT]
12BD 7503                              JNZ CONV_EVENT
12BF BE0002                            MOV SI,CH_NO_FREQ
12C2 03F3          CONV_EVENT:         ADD SI,BX
                   ;
12C4 8A00                              MOV AL,[SI][BX]
12C6 A28B07                            MOV [TUNER_D1],AL
12C9 8A6001                            MOV AH,[SI][BX+1]
12CC 88268C07                          MOV [TUNER_D2],AH
12D0 D0C4                              ROL AH
12D2 80E440                            AND AH,40H
12D5 80CC80                            OR AH,80H
12D8 0A262407                          OR AH,[CONV_NO]
12DC 88268D07                          MOV [TUNER_CBL],AH
12E0 E8C1FE                            CALL CONV_P_ON_CMD
12E3 E8D2FE                            CALL CABLE_SEL_CMD
12E6 E8E6FE                            CALL TUNER_FREQ_CMD
12E9 C3                                RET
                   ;
                   ;
                   ;
12EA BE8003        STP_CONVERTER:      MOV SI,JUMP_ADDRESS
12ED B700                              MOV BH,0
12EF 8A1E2607                          MOV BL,[DROP_NO]
12F3 80C310                            ADD BL,10H
12F6 8AF3                              MOV DH,BL              ; DH = First ID_BYTE
12F8 02DB                              ADD BL,BL
12FA 03DE                              ADD BX,SI              ; BX = First SPU JUMP_ADDRESS
12FC B202                              MOV DL,2               ; DL = First SPU No.
12FE E899FD                            CALL CONV_SW_FLAG
1301 7525                              JNZ CONV1_STP_CK
                   ;
                   ;
1303 88362C07      CONV0_STP_CK:       MOV [ID_BYTE],DH
1307 88162A07                          MOV [DEVICE_NO],DL
130B E88CFD                            CALL CONV_SW_FLAG
130E 7508                              JNZ STPC0_NEXT
1310 8B0E1C07                          MOV CX,[INIT_POINT]
1314 390F                              CMP [BX],CX
1316 7534                              JNZ CONV_VIEW_YET
1318 83C310        STPC0_NEXT:         ADD BX,10H        ; JUMP_ADDRESS
131B 80C608                            ADD DH,8          ; ID_BYTE
131E FEC2                              INC DL            ; CONV_NO
1320 80FA06                            CMP DL,6
1323 75DE                              JNZ CONV0_STP_CK
1325 E92200                            JMP CONV_VIEW_STP
                   ;
1328 88362C07      CONV1_STP_CK:       MOV [ID_BYTE],DH
132C 88162A07                          MOV [DEVICE_NO],DL
1330 E867FD                            CALL CONV_SW_FLAG
1333 7408                              JZ STPC1_NEXT
1335 8B0E1C07                          MOV CX,[INIT_POINT]
1339 390F                              CMP [BX],CX
133B 750F                              JNZ CONV_VIEW_YET
133D 83C310        STPC1_NEXT:         ADD BX,10H        ; JUMP_ADDRESS
1340 80C608                            ADD DH,8          ; ID_BYTE
1343 FEC2                              INC DL            ; CONV_NO
1345 80FA06                            CMP DL,6
1348 75DE                              JNZ CONV1_STP_CK
                   ;
134A F8            CONV_VIEW_STP:      CLC
134B C3                                RET
                   ;
134C F9            CONV_VIEW_YET:      STC
134D C3                                RET
                   ;
                   ; ************        Device MAP Set  *********************************
                   ;
134E A02407        DEVICE_MAP_SET:     MOV AL,[CONV_NO]
1351 BE0008                            MOV SI,DROP_CMD_BF
1354 C60407                            MOV BYTE PTR [SI],7
1357 C6440108                          MOV BYTE PTR [SI+1],8
135B 884402                            MOV BYTE PTR [SI+2],AL          ; Drop No. = ( AL )
135E C6440332                          MOV BYTE PTR [SI+3],32H
1362 C6440454                          MOV BYTE PTR [SI+4],54H
1366 C64405FF                          MOV BYTE PTR [SI+5],0FFH
136A C64406FF                          MOV BYTE PTR [SI+6],0FFH
136E C64407F0                          MOV BYTE PTR [SI+7],0F0H
```

```
1372 E897FD                          CALL LOAD_TO_DROP
1375 C3                              RET
                    ;
                    ; ************  SPU Status Request Command Create  **************
                    ;
1376 BE1008         SPU_STATUS_REQ:  MOV SI,SPU_CMD_BF
1379 C60404                          MOV BYTE PTR [SI],4            ; Length
137C C6440104                        MOV BYTE PTR [SI+1],4          ; Drop Command
1380 A02C07                          MOV AL,[ID_BYTE]
1383 884402                          MOV BYTE PTR [SI+2],AL         ; ID_BYTE
1386 C6440301                        MOV BYTE PTR [SI+3],1          ; Byte Count
138A A02A07                          MOV AL,[DEVICE_NO]
138D 884404                          MOV BYTE PTR [SI+4],AL         ; Status Req. Command
1390 E879FD                          CALL LOAD_TO_DROP
1393 C3                              RET
                    ;
                    ; ************  Clear Device Display  Command  ******************
                    ;
1394 BE1008         SPU_CLEAR_DISP:  MOV SI,SPU_CMD_BF
1397 C60404                          MOV BYTE PTR [SI],4            ; Length
139A C6440104                        MOV BYTE PTR [SI+1],4          ; Drop Command
139E A02C07                          MOV AL,[ID_BYTE]
13A1 884402                          MOV BYTE PTR [SI+2],AL         ; ID_BYTE
13A4 C6440301                        MOV BYTE PTR [SI+3],1          ; Byte Count
13A8 A02A07                          MOV AL,[DEVICE_NO]
13AB 0C30                            OR AL,30H
13AD 884404                          MOV BYTE PTR [SI+4],AL         ; Clear Disp. Command
13B0 E859FD                          CALL LOAD_TO_DROP
13B3 C3                              RET
                    ;
                    ; ************  Relay Control ON Command  **********************
                    ;
13B4 BE1008         SPU_RELAY_ON:    MOV SI,SPU_CMD_BF
13B7 C60405                          MOV BYTE PTR [SI],5            ; Length
13BA C6440104                        MOV BYTE PTR [SI+1],4          ; Drop Command
13BE A02C07                          MOV AL,[ID_BYTE]
13C1 884402                          MOV BYTE PTR [SI+2],AL         ; ID_BYTE
13C4 C6440302                        MOV BYTE PTR [SI+3],2          ; Byte Count
13C8 A02A07                          MOV AL,[DEVICE_NO]
13CB 0C28                            OR AL,28H
13CD 884404                          MOV BYTE PTR [SI+4],AL         ; Relay Cont. Command
13D0 B0FF                            MOV AL,0FFH
13D2 884405                          MOV BYTE PTR [SI+5],AL         ;       ON
13D5 E834FD                          CALL LOAD_TO_DROP
13D8 C3                              RET
                    ;
                    ; ************  Relay Control OFF Command  *********************
                    ;
13D9 BE1008         SPU_RELAY_OFF:   MOV SI,SPU_CMD_BF
13DC C60405                          MOV BYTE PTR [SI],5            ; Length
13DF C6440104                        MOV BYTE PTR [SI+1],4          ; Drop Command
13E3 A02C07                          MOV AL,[ID_BYTE]
13E6 884402                          MOV BYTE PTR [SI+2],AL         ; ID_BYTE
13E9 C6440302                        MOV BYTE PTR [SI+3],2          ; Byte Count
13ED A02A07                          MOV AL,[DEVICE_NO]
13F0 0C28                            OR AL,28H
13F2 884404                          MOV BYTE PTR [SI+4],AL         ; Relay Cont. Command
13F5 B000                            MOV AL,0
13F7 884405                          MOV BYTE PTR [SI+5],AL         ;       OFF
13FA E80FFD                          CALL LOAD_TO_DROP
13FD C3                              RET
                    ;
                    ; ************  Event LED ON Command  **************************
                    ;
13FE BE1008         EVENT_LED_ON:    MOV SI,SPU_CMD_BF
1401 C60405                          MOV BYTE PTR [SI],5            ; Length
1404 C6440104                        MOV BYTE PTR [SI+1],4          ; Drop Command
1408 A02C07                          MOV AL,[ID_BYTE]
140B 884402                          MOV BYTE PTR [SI+2],AL         ; ID_BYTE
140E C6440302                        MOV BYTE PTR [SI+3],2          ; Byte Count
1412 A02A07                          MOV AL,[DEVICE_NO]
1415 0C08                            OR AL,8
1417 884404                          MOV BYTE PTR [SI+4],AL         ; Event LED Cont. Command
141A B0FF                            MOV AL,0FFH
141C 884405                          MOV BYTE PTR [SI+5],AL         ;       ON
141F E8EAFC                          CALL LOAD_TO_DROP
1422 C3                              RET
                    ;
                    ; ************  Event LED OFF Command  *************************
                    ;
1423 BE1008         EVENT_LED_OFF:   MOV SI,SPU_CMD_BF
```

```
1426 C60405                            MOV BYTE PTR [SI],5             ; Length
1429 C6440104                          MOV BYTE PTR [SI+1],4           ; Drop Command
142D A02C07                            MOV AL,[ID_BYTE]
1430 884402                            MOV BYTE PTR [SI+2],AL          ; ID_BYTE
1433 C6440302                          MOV BYTE PTR [SI+3],2           ; Byte Count
1437 A02A07                            MOV AL,[DEVICE_NO]
143A 0C08                              OR AL,8
143C 884404                            MOV BYTE PTR [SI+4],AL          ; Event LED Cont. Command
143F B000                              MOV AL,0
1441 884405                            MOV BYTE PTR [SI+5],AL          ;       OFF
1444 E8C5FC                            CALL LOAD_TO_DROP
1447 C3                                RET
                   ;
                   ; ************  Event LED Normal Command  ***********************
                   ;
1448 E883FF        EVENT_LED_NRM:      CALL EVENT_LED_ON
144B BE1008                            MOV SI,SPU_CMD_BF
144E C60405                            MOV BYTE PTR [SI],5             ; Length
1451 C6440104                          MOV BYTE PTR [SI+1],4           ; Drop Command
1455 A02C07                            MOV AL,[ID_BYTE]
1458 884402                            MOV BYTE PTR [SI+2],AL          ; ID_BYTE
145B C6440302                          MOV BYTE PTR [SI+3],2           ; Byte Count
145F A02A07                            MOV AL,[DEVICE_NO]
1462 0C10                              OR AL,10H
1464 884404                            MOV BYTE PTR [SI+4],AL          ; Event LED Mode Command
1467 C6440500                          MOV BYTE PTR [SI+5],0           ;       Normal
146B E89EFC                            CALL LOAD_TO_DROP
146E C3                                RET
                   ;
                   ; ************  Event LED Flash Command  ***********************
                   ;
146F E88CFF        EVENT_LED_FLH:      CALL EVENT_LED_ON
1472 BE1008                            MOV SI,SPU_CMD_BF
1475 C60405                            MOV BYTE PTR [SI],5             ; Length
1478 C6440104                          MOV BYTE PTR [SI+1],4           ; Drop Command
147C A02C07                            MOV AL,[ID_BYTE]
147F 884402                            MOV BYTE PTR [SI+2],AL          ; ID_BYTE
1482 C6440302                          MOV BYTE PTR [SI+3],2           ; Byte Count
1486 A02A07                            MOV AL,[DEVICE_NO]
1489 0C10                              OR AL,10H
148B 884404                            MOV BYTE PTR [SI+4],AL          ; Event LED Mode Command
148E C64405FF                          MOV BYTE PTR [SI+5],0FFH        ;       Flash
1492 E877FC                            CALL LOAD_TO_DROP
1495 C3                                RET
```

```
                 ;
                 ; ************  SPU View Channel  Operation  ********************
                 ;
1496 BE1000      SPU_VIEW_DISP:  MOV SI,VIEW_CHANNEL
1499 B700                        MOV BH,0
149B 8A1E2407                    MOV BL,[CONV_NO]
149F 8A20                        MOV AH,[SI][BX]
14A1 8A4008                      MOV AL,[SI][BX+8]
14A4 88268507    SPU_LED_AX:     MOV [MSB_LED],AH
14A8 A28407                      MOV [LSB_LED],AL
                 ;
                 ; ************  SPU LED & EVENT_LED Operation  ******************
                 ;
14AB BE1008      SPU_LED_DISP:   MOV SI,SPU_CMD_BF
14AE C60406                      MOV BYTE PTR [SI],6            ; Length
14B1 C6440104                    MOV BYTE PTR [SI+1],4          ; Drop Command
14B5 A02C07                      MOV AL,[ID_BYTE]
14B8 884402                      MOV BYTE PTR [SI+2],AL         ; Device/Drop
14BB C6440303                    MOV BYTE PTR [SI+3],3          ; Byte Count
14BF A02A07                      MOV AL,[DEVICE_NO]
14C2 0C50                        OR AL,50H
14C4 884404                      MOV BYTE PTR [SI+4],AL         ; Display Character Comman
14C7 C6440500                    MOV BYTE PTR [SI+5],0          ;         LSB
14CB A08407                      MOV AL,[LSB_LED]
14CE 884406                      MOV BYTE PTR [SI+6],AL         ;         Data
14D1 E838FC                      CALL LOAD_TO_DROP
                 ;
14D4 BE1008                      MOV SI,SPU_CMD_BF
14D7 C6440501                    MOV BYTE PTR [SI+5],1          ;         MSB
14DB A08507                      MOV AL,[MSB_LED]
14DE 884406                      MOV BYTE PTR [SI+6],AL         ;         Data
14E1 E828FC                      CALL LOAD_TO_DROP
14E4 C3                          RET
                 ;
                 ; ************  SPU LED & EVENT_LED Operation  ******************
                 ;
14E5 BE1008      SPU_LED_DISFL:  MOV SI,SPU_CMD_BF
14E8 C60406                      MOV BYTE PTR [SI],6            ; Length
14EB C6440104                    MOV BYTE PTR [SI+1],4          ; Drop Command
14EF A02C07                      MOV AL,[ID_BYTE]
14F2 884402                      MOV BYTE PTR [SI+2],AL         ; Device/Drop
14F5 C6440303                    MOV BYTE PTR [SI+3],3          ; Byte Count
14F9 A02A07                      MOV AL,[DEVICE_NO]
14FC 0C50                        OR AL,50H
14FE 884404                      MOV BYTE PTR [SI+4],AL         ; Display Character Comman
1501 C6440580                    MOV BYTE PTR [SI+5],80H        ;         LSB Flash
1505 A08407                      MOV AL,[LSB_LED]
1508 884406                      MOV BYTE PTR [SI+6],AL         ;         Data
150B E8FEFB                      CALL LOAD_TO_DROP
                 ;
150E BE1008                      MOV SI,SPU_CMD_BF
1511 C6440501                    MOV BYTE PTR [SI+5],1          ;         MSB
1515 A08507                      MOV AL,[MSB_LED]
1518 884406                      MOV BYTE PTR [SI+6],AL         ;         Data
151B E8EEFB                      CALL LOAD_TO_DROP
151E C3                          RET
                 ;
                 ; ************  SPU LED & EVENT_LED Operation  ******************
                 ;
151F BE1008      SPU_LED_FLASH:  MOV SI,SPU_CMD_BF
1522 C60406                      MOV BYTE PTR [SI],6            ; Length
1525 C6440104                    MOV BYTE PTR [SI+1],4          ; Drop Command
1529 A02C07                      MOV AL,[ID_BYTE]
152C 884402                      MOV BYTE PTR [SI+2],AL         ; Device/Drop
152F C6440303                    MOV BYTE PTR [SI+3],3          ; Byte Count
1533 A02A07                      MOV AL,[DEVICE_NO]
1536 0C50                        OR AL,50H
1538 884404                      MOV BYTE PTR [SI+4],AL         ; Display Character Command
153B C6440580                    MOV BYTE PTR [SI+5],80H        ;         LSB Flash
153F A08407                      MOV AL,[LSB_LED]
1542 884406                      MOV BYTE PTR [SI+6],AL         ;         Data
1545 E8C4FB                      CALL LOAD_TO_DROP
                 ;
1548 BE1008                      MOV SI,SPU_CMD_BF
154B C6440581                    MOV BYTE PTR [SI+5],81H        ;         MSB Flash
154F A08507                      MOV AL,[MSB_LED]
1552 884406                      MOV BYTE PTR [SI+6],AL         ;         Data
1555 E8B4FB                      CALL LOAD_TO_DROP
1558 C3                          RET
                 ;
                 ; ************  SPU LED & EVENT_LED New Operation  **************
```

```
                     ;
1559 BE1008          SPU_LED_FLAST:  MOV SI,SPU_CMD_BF
155C C60406                          MOV BYTE PTR [SI],6            ; Length
155F C6440104                        MOV BYTE PTR [SI+1],4          ; Drop Command
1563 A02C07                          MOV AL,[ID_BYTE]
1566 884402                          MOV BYTE PTR [SI+2],AL         ; Device/Drop
1569 C6440303                        MOV BYTE PTR [SI+3],3          ; Byte Count
156D A02A07                          MOV AL,[DEVICE_NO]
1570 0C50                            OR AL,50H
1572 884404                          MOV BYTE PTR [SI+4],AL         ; Display Character Command

                     ;
1575 C6440583                        MOV BYTE PTR [SI+5],83H        ;        USB Flash
1579 C6440630                        MOV BYTE PTR [SI+6],30H        ;        Data
157D E88CFB                          CALL LOAD_TO_DROP
                     ;
1580 BE1008                          MOV SI,SPU_CMD_BF
1583 C6440582                        MOV BYTE PTR [SI+5],82H        ;        HSB Flash
1587 A08607                          MOV AL,[HSB_LED]
158A 884406                          MOV BYTE PTR [SI+6],AL         ;        Data
158D E87CFB                          CALL LOAD_TO_DROP
                     ;
1590 BE1008                          MOV SI,SPU_CMD_BF
1593 C6440580                        MOV BYTE PTR [SI+5],80H        ;        LSB Flash
1597 A08407                          MOV AL,[LSB_LED]
159A 884406                          MOV BYTE PTR [SI+6],AL         ;        Data
159D E86CFB                          CALL LOAD_TO_DROP
                     ;
15A0 BE1008                          MOV SI,SPU_CMD_BF
15A3 C6440581                        MOV BYTE PTR [SI+5],81H        ;        MSB Flash
15A7 A08507                          MOV AL,[MSB_LED]
15AA 884406                          MOV BYTE PTR [SI+6],AL         ;        Data
15AD E85CFB                          CALL LOAD_TO_DROP
15B0 C3                              RET
                     ; ************  Authorize Sareteirukai  ---> CY  ****************
15B1 E85F00          AUTHO_KAI:      CALL CONV_BIT_AL         ; AL = 2 ** CONV_NO
15B4 8B1E1E07                        MOV BX,WORD PTR [BINARY_LED]
15B8 BE8001                          MOV SI,BASIC_AUTHO
15BB 2200                            AND AL,[SI][BX]          ; Z = 0 --- No
15BD C3                              RET
                     ; ************  IF PC Code=0 Then   Z=1    ELSE   Z=0  ***********
15BE 53              PC_CODE_0_KAI:  PUSH BX
15BF 56                              PUSH SI
15C0 BE2000                          MOV SI,PC_CODE
15C3 B700                            MOV BH,0
15C5 8A1E2407                        MOV BL,[CONV_NO]
15C9 02DB                            ADD BL,BL
15CB 8B10                            MOV DX,[SI][BX]
15CD 83FA00                          CMP DX,0
15D0 5E                              POP SI
15D1 5B                              POP BX
15D2 C3                              RET
                     ; ************  IF SC Mode   Then   Z=1    ELSE   Z=0  ***********
15D3 E83D00          SC_MODE_KAI:    CALL CONV_BIT_AL
15D6 22060E00                        AND AL,[SCAN_MODE_FLAG]
15DA C3                              RET
                     ;
15DB BE2000          PC_CODE_ADRS:   MOV SI,PC_CODE
15DE B700                            MOV BH,0
15E0 8A1E2407                        MOV BL,[CONV_NO]
15E4 02DB                            ADD BL,BL
15E6 C3                              RET
                     ; ************  PC/FC List & Authorize   CY= 1 --- None  *********
15E7 50              PCFC_MAP_ARUKA: PUSH AX
15E8 E82800                          CALL CONV_BIT_AL         ; AL = 2 ** CONV_NO
15EB BE0001                          MOV SI,PC_FC_LIST
15EE B100                            MOV CL,0
15F0 8AE0            AKANE:          MOV AH,AL                ; Z = 0 --- No
15F2 2224                            AND AH,[SI]
15F4 22A48000                        AND AH,[SI+128]
15F8 750B                            JNZ AKANE_CHAN
15FA 46                              INC SI
15FB FEC1                            INC CL
15FD 80F964                          CMP CL,100
1600 75EE                            JNZ AKANE
1602 58                              POP AX
1603 F9                              STC
1604 C3                              RET
1605 58              AKANE_CHAN:     POP AX
1606 F8                              CLC
1607 C3                              RET
```

```
                   ; ************  Drop No.  Bit Position  --->  AL  ***************
1608 51            DROP_BIT_AL:    PUSH CX
1609 8A0E2607                      MOV CL,[DROP_NO]
160D B001                          MOV AL,1
160F D2C0                          ROL AL,CL
1611 59                            POP CX
1612 C3                            RET
                   ; ************  Converter Bit Position  --->  AL  ***************
1613 51            CONV_BIT_AL:    PUSH CX
1614 8A0E2407                      MOV CL,[CONV_NO]
1618 B001                          MOV AL,1
161A D2C0                          ROL AL,CL
161C 59                            POP CX
161D C3                            RET
                   ; ************  Device Bit Position  --->  AL  ******************
161E 51            DEVICE_BIT_AL:  PUSH CX
161F 8A0E2A07                      MOV CL,[DEVICE_NO]
1623 B001                          MOV AL,1
1625 D2C0                          ROL AL,CL
1627 59                            POP CX
1628 C3                            RET
                   ; ************  EVENT Mode ---> Basic Mode  *********************
1629 A02E07        EVENT_TO_BASIC: MOV AL,[CONV_NO_BIT]
162C 343F                          XOR AL,3FH
162E 20068007                      AND [NOW_EVENT],AL
1632 C3                            RET
                   ; ************  Timer Set Operation  *****************************
1633 B90200        TIMER_02_SEC:   MOV CX,2
1636 E92B00                        JMP TIMER_SET_CX
1639 B90400        TIMER_04_SEC:   MOV CX,4
163C E92500                        JMP TIMER_SET_CX
163F B90500        TIMER_05_SEC:   MOV CX,5
1642 E91F00                        JMP TIMER_SET_CX
1645 90            TIMER_UD_SEC:   NOP
1646 B90A00        TIMER_1_SEC:    MOV CX,10
1649 E91800                        JMP TIMER_SET_CX
164C B91400        TIMER_2_SEC:    MOV CX,20
164F E91200                        JMP TIMER_SET_CX
1652 B93200        TIMER_5_SEC:    MOV CX,50
1655 E90C00                        JMP TIMER_SET_CX
1658 B96400        TIMER_10_SEC:   MOV CX,100
165B E90600                        JMP TIMER_SET_CX
165E B92C01        TIMER_30_SEC:   MOV CX,300
1661 E90000                        JMP TIMER_SET_CX
1664 53            TIMER_SET_CX:   PUSH BX
1665 56                            PUSH SI
1666 BE0003                        MOV SI,TIME_TABLE
1669 B700                          MOV BH,0
166B 8A1E2807                      MOV BL,[IC_BYTE]
166F 02DB                          ADD BL,BL
1671 8908                          MOV [SI][BX],CX
1673 5E                            POP SI
1674 5B                            POP BX
1675 C3                            RET
                   ;
                   ; ************  IBF Interrupt Unmask  ****************************
                   ;
1676 B81200        IBF_UNMASK:     MOV          AX,12H
1679 BA3AFF                        MOV          DX,0FF3AH       ;   IBF Interrupt Unmask
167C EF                            OUT          DX,AX
167D C3                            RET
                   ;
                   ; ************  Channel Table  --->  LED  ***********************
                   ;
167E BE1000        VIEW_TBL_LED:   MOV SI,VIEW_CHANNEL     ; [ID_BYTE]
1681 B700                          MOV BH,0
1683 8A1E2407                      MOV BL,[CONV_NO]
1687 8A20                          MOV AH,[SI][BX]
1689 8A4008                        MOV AL,[SI][BX+8]
168C 88268507                      MOV [MSB_LED],AH
1690 A28407                        MOV [LSB_LED],AL
1693 8BD8                          MOV BX,AX
1695 C3                            RET
                   ;
                   ; ************  LED  --->  BX  **********************************
                   ;
1696 8A3E8507      LED_BIN_BX:     MOV BH,[MSB_LED]     ; BX <--- LED
169A 8A1E8407                      MOV BL,[LSB_LED]
                   ;
                   ; ************  Decimal to Binary  ******************************
                   ;
```

```
169E 80E30F     DECBIN_BX:      AND BL,0FH        ; BX ASCII Decimal ---> BX Binary
16A1 80E70F                     AND BH,0FH
16A4 02FF                       ADD BH,BH
16A6 02DF                       ADD BL,BH         ; BL=BL+(2*BH)
16A8 02FF                       ADD BH,BH         ; BH=2*(2*BH))
16AA 02FF                       ADD BH,BH         ; BH=2*(2*(2*BH))
16AC 02DF                       ADD BL,BH         ; BL=BL+(2*BH)+2*(2*(2*BH))
16AE B700                       MOV BH,0          ;    =BL+10*BH
16B0 891E1E07                   MOV WORD PTR [BINARY_LED],BX
16B4 C3                         RET
                ;
                ; ************  LED  --->  VIEW_TABLE  **************************
                ;
16B5 BE1000     LED_VIEW_TBL:   MOV SI,VIEW_CHANNEL  ;
16B8 B700                       MOV BH,0             ;
16BA 8A1E2407                   MOV BL,[CONV_NO]     ;
16BE 8A268507                   MOV AH,[MSB_LED]     ;
16C2 8820                       MOV [SI][BX],AH      ;   Last Channel Memory Ni Ireru
16C4 A08407                     MOV AL,[LSB_LED]     ;
16C7 884008                     MOV [SI][BX+8],AL    ;
16CA C3                         RET
                ;
                ; ************  IF KEYIN THEN GOTO BASE_ROUTINE  ****************
                ;
16CB A08907     IF_KEY_GO_BASE: MOV AL,[KEY_DATA]
16CE 3C00                       CMP AL,TIMER_OUT_CODE
16D0 7404                       JZ TIMER_ON
16D2 5A                         POP DX
16D3 E93D01                     JMP BASE_ROUTINE
16D6 C3         TIMER_ON:       RET
                ;
                ; ************  SCAN Mode Up Channel Search  ********************
                ;
16D7 E8A4FF     DW_SCAN_SEARCH: CALL VIEW_TBL_LED
16DA E8B9FF                     CALL LED_BIN_BX
16DD E833FF                     CALL CONV_BIT_AL
16E0 BE8001                     MOV SI,BASIC_AUTHO
16E3 FECB       URI:            DEC BL
16E5 80FB00                     CMP BL,0
16E8 7503                       JNZ URI1
16EA BB6300                     MOV BX,99
16ED 8AE0       URI1:           MOV AH,AL
16EF 2220                       AND AH,[SI][BX]
16F1 74F0                       JZ URI
16F3 E96200                     JMP UD_CONV_DISP
                ;
                ; ************  PCFC Mode Up Channel Search  ********************
                ;
16F6 E885FF     DW_PCFC_SEARCH: CALL VIEW_TBL_LED
16F9 E89AFF                     CALL LED_BIN_BX
16FC E814FF                     CALL CONV_BIT_AL
16FF BE0001                     MOV SI,PC_FC_LIST
1702 FECB       UKI:            DEC BL
1704 80FB00                     CMP BL,0
1707 7503                       JNZ UKI1
1709 BB6300                     MOV BX,99
170C 8AE0       UKI1:           MOV AH,AL
170E 2220                       AND AH,[SI][BX]
1710 22A08000                   AND AH,[SI+128][BX]
1714 74EC                       JZ UKI
1716 E93F00                     JMP UD_CONV_DISP
                ;
                ; ************  PCFC Mode Up Channel Search  ********************
                ;
1719 E862FF     UP_PCFC_SEARCH: CALL VIEW_TBL_LED
171C E877FF                     CALL LED_BIN_BX
171F E8F1FE                     CALL CONV_BIT_AL
1722 BE0001                     MOV SI,PC_FC_LIST
1725 FEC3       UMI:            INC BL
1727 80FB64                     CMP BL,100
172A 7203                       JC UMI1
172C BB0100                     MOV BX,1
172F 8AE0       UMI1:           MOV AH,AL
1731 2220                       AND AH,[SI][BX]
1733 22A08000                   AND AH,[SI+128][BX]
1737 74EC                       JZ UMI
1739 E91C00                     JMP UD_CONV_DISP
                ;
                ; ************  SCAN Mode Up Channel Search  ********************
                ;
173C E83FFF     UP_SCAN_SEARCH: CALL VIEW_TBL_LED
```

```
173F E854FF                  CALL LED_BIN_BX
1742 E8CEFE                  CALL CONV_BIT_AL
1745 BE8001                  MOV SI,BASIC_AUTHO
1748 FEC3      UKA:          INC BL
174A 80FB64                  CMP BL,100
174D 7203                    JC UKA1
174F BB0100                  MOV BX,1
1752 8AE0      UKA1:         MOV AH,AL
1754 2220                    AND AH,[SI][BX]
1756 74F0                    JZ UKA
               ;
1758 E8CEFE    UD_CONV_DISP: CALL EVENT_TO_BASIC
175B E80A00                  CALL BINDEC_LED
175E E854FF                  CALL LED_VIEW_TBL
1761 E847FD                  CALL SPU_LED_DISP
1764 E841FB                  CALL GO_CONVERTER
1767 C3                      RET
               ;
1768 B700      BINDEC_LED:   MOV BH,0
176A 80FB0A    HITOMI:       CMP BL,10
176D 7207                    JC MAKO
176F 80EB0A                  SUB BL,10
1772 FEC7                    INC BH
1774 EBF4                    JMP HITOMI
1776 81CB3030  MAKO:         OR BX,3030H
177A 881E0407                MOV [LSB_LED],BL
177E 883E0507                MOV [MSB_LED],BH
1782 C3                      RET
               ; ************* SC/FC/PC  Mode Wo AX ni Set Suru  ****************
1783 E84DFE    SCFCPC_MODE_AX: CALL SC_MODE_KAI
1786 7404                    JZ SAORI_FCPC
1788 B84353                  MOV AX,ASCII_SC          ; [ SCAN Mode ]
178B C3                      RET
               ;
178C E82FFE    SAORI_FCPC:   CALL PC_CODE_0_KAI
178F 7504                    JNZ SAORI_PC
               ;
1791 B84346                  MOV AX,ASCII_FC          ; [ FC Mode ]
1794 C3                      RET
               ;
1795 B84350    SAORI_PC:     MOV AX,ASCII_PC          ; [ PC Mode ]
1798 C3                      RET
               ;------------------------------------------------------------------------------------------
               ;
               ;             Key Operation
               ;
               ;------------------------------------------------------------------------------------------
1799 8A0E8907  KEY_OPERATION: MOV CL,[KEY_DATA]
179D B700                    MOV BH,0
179F 8A1E2807                MOV BL,[IC_BYTE]
17A3 02DB                    ADD BL,BL
17A5 BE8003                  MOV SI,JUMP_ADDRESS
17A8 8B00                    MOV AX,[SI][BX]
17AA 3B061C07                CMP AX,[INIT_POINT]     ; Hagime Wa ON/OFF Key Shika Uketukenai Yo
17AE 7419                    JZ OP_INITIAL
17B0 80F913                  CMP CL,ONOFF_KEY_CODE
17B3 7503                    JNZ OP_NORMAL_KEY
17B5 E97401                  JMP OP_SPU_OFF  ; SPU Wo OFF Surundane
               ;
17B8 50        OP_NORMAL_KEY: PUSH AX         ; ON/OFF Key Igai no Operation
17B9 C3                      RET
               ;
               ; TOSHINO-OS-TOSHINO-OS-TOSHINO-OS-TOSHINO-OS-TOSHINO-OS-TOSHINO-OS-TOSHINO-OS-TOSHINO-OS-TOSHINO-OS-TOSHI
               ;
17BA 58        NEXT_CONTINUE: POP AX
17BB B700      NEXT_OS:      MOV BH,0
17BD 8A1E2807                MOV BL,[IC_BYTE]
17C1 02DB                    ADD BL,BL
17C3 BE8003                  MOV SI,JUMP_ADDRESS
17C6 8900                    MOV [BX][SI],AX
17C8 C3        RETURN_OS:    RET
               ;-----------------------------------------------------
               ;
               ;             SPU  Initial Off Mode
               ;
               ;----------------------------------------------;
17C9 8A0E8907  OP_INITIAL:   MOV CL,[KEY_DATA]             ;
17CD 80F913                  CMP CL,ONOFF_KEY_CODE         ;   SPU  OFF
17D0 7511                    JNZ MP_100_CK_001             ;     []
17D2 E854FE                  CALL EVENT_TO_BASIC           ;   SPU  ON
17D5 E88EFC                  CALL SPU_VIEW_DISP            ;
                                                           ;
17D8 E8CDFA                  CALL GO_CONVERTER             ;
                                                           ;
17DB E8D6FB    WAKEARI_DE_ON: CALL SPU_RELAY_ON            ;     !!
                                                           ;
17DE A11A07                  MOV AX,[BASE_POINT]           ;
17E1 EBD8                    JMP NEXT_OS                   ;
```

```
                 ;                                                         ;;
                 ; ****************************************************  ;;
                 ;                                                         ;;
17E3 80F911       MP_100_CK_001:  CMP CL,EVENT_KEY_CODE                   ;;
17E6 7524                         JNZ MP_100_CK_002                       ;;
17E8 B430                         MOV AH,30H                              ;;
17EA E8ADF8                       CALL CONV_SW_FLAG                       ;;
17ED 7402                         JZ CONV_SW_OK_YO                        ;;
17EF B431         CONV_SW_NG_YO:  MOV AH,31H                              ;;
17F1 A02A07       CONV_SW_OK_YO:  MOV AL,[DEVICE_NO]                      ;;
17F4 0C30                         OR AL,30H                               ;;
17F6 88268507                     MOV [MSB_LED],AH                        ;;
17FA A28407                       MOV [LSB_LED],AL                        ;;
17FD A02407                       MOV AL,[CONV_NO]                        ;;
1800 0C30                         OR AL,30H                               ;;
1802 FEC0                         INC AL                                  ;;
1804 A28607                       MOV [HSB_LED],AL                        ;;
1807 E84FFD                       CALL SPU_LED_FLAST                      ;;
180A EBBC                         JMP RETURN_OS                           ;;
180C 80F917       MP_100_CK_002:  CMP CL,SEND_KEY_CODE                    ;;
180F 75B7                         JNZ RETURN_OS                           ;;
                  ;;;;;;;;;;;;;;; CALL SPECIAL_SPU_1                       ;;
1811 EBB5                         JMP RETURN_OS                           ;;
                  ;-------------------------------------------------------;;
                  ;
                  ;               Base Routine
                  ;
                  ;---------------------------------------------------------------
1813 A08907       BASE_ROUTINE:   MOV AL,[KEY_DATA]
1816 E8EBF8                       CALL KAZUKO
1819 7334                         JNC RANDOM_ACCESS
181B 3C10                         CMP AL,PLUS_KEY_CODE
181D 7503                         JNZ BASE1
181F E92401                       JMP UP_CHANNEL_OP
1822 3C11         BASE1:          CMP AL,EVENT_KEY_CODE
1824 7503                         JNZ BASE2
1826 E94703                       JMP EVENT_KEY_OP
1829 3C12         BASE2:          CMP AL,AUTHO_KEY_CODE
182B 7503                         JNZ BASE3
182D E99A01                       JMP AUTHO_KEY_OP
1830 3C14         BASE3:          CMP AL,MINUS_KEY_CODE
1832 7503                         JNZ BASE4
1834 E9A701                       JMP DOWN_CH_OP
1837 3C15         BASE4:          CMP AL,SCAN_KEY_CODE
1839 7503                         JNZ BASE5
183B E91502                       JMP SCAN_KEY_OP
183E 3C16         BASE5:          CMP AL,CLEAR_KEY_CODE
1840 7503                         JNZ BASE6
1842 E99C02                       JMP CLEAR_KEY_OP
1845 3C17         BASE6:          CMP AL,SEND_KEY_CODE
1847 7503                         JNZ BASE7
1849 E9AB02                       JMP SEND_KEY_OP
184C E98400       BASE7:          JMP NEXT_END      ; Zoooooooooooooooooboooooooooooooooooooooc
                  ;-----------------------------------------------------------------------------
                  ;
                  ;               Random Access Routine
                  ;
                  ;-----------------------------------------------------------------------------
184F B700         RANDOM_ACCESS:  MOV BH,0
1851 8A1E2807                     MOV BL,[IC_BYTE]
1855 8BF3                         MOV SI,BX
1857 E86406                       CALL KEY_BUFF_ADRS
185A 8800                         MOV [BX][SI],AL
                  ;
185C A28507                       MOV [MSB_LED],AL
185F B088                         MOV AL,88H                       ; LSB = "_"
1861 A28407                       MOV [LSB_LED].AL
1864 E87EFC                       CALL SPU_LED_DISFL
1867 E8E8FD                       CALL TIMER_5_SEC
                  ;
186A E84DFF                       CALL NEXT_CONTINUE               ; [[[ Key Input Wait ]]]
                  ;
186D A08907                       MOV AL,[KEY_DATA]
1870 E891F8                       CALL KAZUKO
1873 7264                         JC RANDOM_OUT
1875 B700                         MOV BH,0              ;
1877 8A1E2807                     MOV BL,[IC_BYTE]      ;
187B 8BF3                         MOV SI,BX             ;
187D E83E06                       CALL KEY_BUFF_ADRS    ;     AH = [ 1st KEY  ]
1880 8A20                         MOV AH,[SI][BX]       ;     AL = [ KEY_DATA ]
                  ;
```

```
1882 A28407                        MOV [LSB_LED],AL      ;   LED Display
1885 88268507                      MOV [MSB_LED],AH      ;
1889 E83206                        CALL KEY_BUFF_ADRS    ;
188C 894004                        MOV [SI][BX+4],AX     ;
188F E819FC                        CALL SPU_LED_DISP     ;
                                                         ;
1892 E801FE                        CALL LED_BIN_BX
1895 E819FD                        CALL AUTHO_KAI
1898 747D                          JZ WT_NO_WT_END
              ;
189A E836FD                   CALL SC_MODE_KAI
189D 752B                     JNZ TUNE_SURU
189F E81CFD                   CALL PC_CODE_0_KAI
18A2 7426                     JZ TUNE_SURU
              ;
18A4 E8EFFD                   CALL LED_BIN_BX.      ; PC Mode Daga PC-Map Ni Aruka
18A7 E869FD                   CALL CONV_BIT_AL
18AA BE0001                   MOV SI,PC_FC_LIST
18AD 2200                     AND AL,[SI][BX]
18AF 7519                     JNZ TUNE_SURU
              ;
18B1 E87305                   CALL ANGO_INPUT       ;
18B4 E82E06                   CALL ANGO_BIN_DX      ;
18B7 E821FD                   CALL PC_CODE_ADRS     ;
18BA 3B10                     CMP DX,[SI][BX]       ;
18BC 7524                     JNZ MSGERR_WT_END     ; IF  PC_CODE <> Input Code Then PC_Control
18BE E8FD05                   CALL KEY_BUFF_ADRS    ;
18C1 8B4004                   MOV AX,[SI][BX+4]     ;
18C4 A38407                   MOV [LSB_LED].AX      ;
18C7 E8E1FB                   CALL SPU_LED_DISP
              ;
18CA E85CFD   TUNE_SURU:      CALL EVENT_TO_BASIC
              ;
18CD E8E5FD                   CALL LED_VIEW_TBL
              ;
18D0 E81CF9                   CALL RUN_CONVERTER
              ;
18D3 A11A07   NEXT_END:       MOV AX,[BASE_POINT]
18D6 E9E2FE                   JMP NEXT_OS
              ;
18D9 3C16     RANDOM_OUT:     CMP AL,CLEAR_KEY_CODE
18DB 7585                     JNZ MSGERR_WT_END
18DD E8B6FB                   CALL SPU_VIEW_DISP
18E0 EBF1                     JMP NEXT_END
              ;
18E2 B87245   MSGERR_WT_END:  MOV AX,ASCII_ER
18E5 E8BCFB   MSG_WT_END:     CALL SPU_LED_AX
18E8 E85BFD   WAIT_END:       CALL TIMER_1_SEC
              ;
18EB E8CCFE   IF_TIMEOUT_END: CALL NEXT_CONTINUE
              ;
18EE A08907                   MOV AL,[KEY_DATA]
18F1 3C00                     CMP AL,TIMER_OUT_CODE
18F3 7403                     JZ RANDOM_MODORI
18F5 E91BFF                   JMP BASE_ROUTINE
              ;
18F8 A08007   RANDOM_MODORI:  MOV AL,[NOW_EVENT]          ;
18FB 84062E07                 TEST AL,[CONV_NO_BIT]       ;
18FF 7505                     JNZ EVENT_MODORI            ;
1901 E892FB                   CALL SPU_VIEW_DISP          ;
1904 EBCD                     JMP NEXT_END                ;
1906 BE3000   EVENT_MODORI:   MOV SI,EVENT_CHANNEL        ;
1909 03362407                 ADD SI,[CONV_NO]            ;
190D 8B1C                     MOV BX,[SI]                 ;
190F E856FE                   CALL BINDEC_LED             ;
1912 E896FB                   CALL SPU_LED_DISP           ;
1915 EBBC                     JMP NEXT_END                ;
              ;
              ;
1917 E82CFD   WT_NO_WT_END:   CALL TIMER_1_SEC
              ;
191A E89DFE                   CALL NEXT_CONTINUE
              ;
191D A08907                   MOV AL,[KEY_DATA]
1920 3C00                     CMP AL,TIMER_OUT_CODE
1922 7403                     JZ MSG_NO_WT_END
1924 E9ECFE                   JMP BASE_ROUTINE
1927 B8DCD4   MSG_NO_WT_END:  MOV AX,ASCII_NO      ; 1 Sec.  "No"
192A EBB9                     JMP MSG_WT_END



              ;
              ;------------------------------------------------------------------------
              ;
              ;               SPU  OFF Key  Operation
              ;
              ;------------------------------------------------------------------------
```

```
192C E8AAFA      OP_SPU_OFF:     CALL SPU_RELAY_OFF
192F E862FA                      CALL SPU_CLEAR_DISP
1932 E8EEFA                      CALL EVENT_LED_OFF
                 ; ************
1935 A11C07                      MOV AX,[INIT_POINT]
1938 E880FE                      CALL NEXT_OS        ; Korewa Tannaru Junbideari Mada OS niwamodorana
193B E8ACF9                      CALL STP_CONVERTER
193E 7203                        JC MAKI
                 ;
1940 E842F8                      CALL CONV_P_OFF_CMD
                 ;
1943 E982FE      MAKI:           JMP RETURN_OS       ; Modoru Junbiwa Shitearunode Return




                 ;-----------------------------------------------------------------------------
                 ;
                 ;               UP Channel Change
                 ;
                 ;-----------------------------------------------------------------------------
1946 E8CAFC      UP_CHANNEL_OP:  CALL CONV_BIT_AL
1949 22060E00                    AND AL,[SCAN_MODE_FLAG]
194D 7433                        JZ UP_PCFC
                 ;
194F E8EAFD      UP_SCAN:        CALL UP_SCAN_SEARCH
1952 E8EAFC                      CALL TIMER_05_SEC
                 ;
1955 E862FE                      CALL NEXT_CONTINUE
                 ;
1958 A08907                      MOV AL,[KEY_DATA]
195B 3C00                        CMP AL,TIMER_OUT_CODE
195D 7558                        JNZ UP_DOWN_EXIT          ; U/D Sugu Hanashita
                 ;
195F E814FA      YUKO:           CALL SPU_STATUS_REQ
1962 E8E0FC                      CALL TIMER_UD_SEC
                 ;
1965 E852FE                      CALL NEXT_CONTINUE
                 ;
1968 A08907                      MOV AL,[KEY_DATA]
196B 3C1C                        CMP AL,KEY_PUSH_CODE
196D 7548                        JNZ UP_DOWN_EXIT          ; Key Release or Another Key
196F E8CAFD                      CALL UP_SCAN_SEARCH
1972 E8BEFC                      CALL TIMER_02_SEC
                 ;
1975 E842FE                      CALL NEXT_CONTINUE
                 ;
1978 A08907                      MOV AL,[KEY_DATA]
197B 3C00                        CMP AL,TIMER_OUT_CODE
197D 74E0                        JZ YUKO
197F E93500                      JMP UP_DOWN_EXIT          ; Another Key

                 ; ************  PC-FC Mode  ****************************************
1982 E862FC      UP_PCFC:        CALL PCFC_MAP_ARUKA
1985 7240                        JC UP_NO_MAP
                 ;
1987 E88FFD                      CALL UP_PCFC_SEARCH
198A E882FC                      CALL TIMER_05_SEC
                 ;
198D E82AFE                      CALL NEXT_CONTINUE
                 ;
1990 A08907                      MOV AL,[KEY_DATA]
1993 3C00                        CMP AL,TIMER_OUT_CODE
1995 7520                        JNZ UP_DOWN_EXIT
                 ;
1997 E8DCF9      YASUKO:         CALL SPU_STATUS_REQ
199A E8A8FC                      CALL TIMER_UD_SEC
                 ;
199D E81AFE                      CALL NEXT_CONTINUE
                 ;
19A0 A08907                      MOV AL,[KEY_DATA]
19A3 3C1C                        CMP AL,KEY_PUSH_CODE
19A5 7510                        JNZ UP_DOWN_EXIT
19A7 E86FFD                      CALL UP_PCFC_SEARCH
19AA E896FC                      CALL TIMER_02_SEC
                 ;
19AD E80AFE                      CALL NEXT_CONTINUE
                 ;
19B0 A08907                      MOV AL,[KEY_DATA]
19B3 3C00                        CMP AL,TIMER_OUT_CODE
19B5 74E0                        JZ YASUKO
                 ;
                 ;
19B7 A08907      UP_DOWN_EXIT:   MOV AL,[KEY_DATA]
```

```
198A 3C00                           CMP AL,TIMER_OUT_CODE
198C 7506                           JNZ MIKA
198E E8D5FA                         CALL SPU_VIEW_DISP
19C1 E82BF8                         CALL RUN_CONVERTER
19C4 E94CFE       MIKA:             JMP BASE_ROUTINE
                  ;
19C7 E95DFF       UP_NO_MAP:        JMP MSG_NO_WT_END

                  ;-----------------------------------------------------------------------
                  ;
                  ;                 Adding Channels to the FC/PC List
                  ;
                  ;------------------------------------------------------------------
19CA E8B1FC       AUTHO_KEY_OP:     CALL VIEW_TBL_LED
19CD E8C6FC                         CALL LED_BIN_BX
19D0 BE0001                         MOV SI,PC_FC_LIST
19D3 E83DFC                         CALL CONV_BIT_AL
19D6 0800                           OR [SI][BX],AL
19D8 B86441                         MOV AX,ASCII_AD
19DB E907FF                         JMP MSG_WT_END
                  ;------------------------------------------------------------------
                  ;
                  ;                 Down ChanneL Change
                  ;
                  ;------------------------------------------------------------------
19DE E832FC       DOWN_CH_OP:       CALL CONV_BIT_AL
19E1 22060E00                       AND AL,[SCAN_MODE_FLAG]
19E5 7432                           JZ DW_PCFC
                  ;
19E7 E8EDFC       DW_SCAN:          CALL DW_SCAN_SEARCH
19EA E852FC                         CALL TIMER_05_SEC
                  ;
19ED E8CAFD                         CALL NEXT_CONTINUE
                  ;
19F0 A08907                         MOV AL,[KEY_DATA]
19F3 3C00                           CMP AL,TIMER_OUT_CODE
19F5 7520                           JNZ DOWN_EXIT
                  ;
19F7 E87CF9       EIKO:             CALL SPU_STATUS_REQ
19FA E848FC                         CALL TIMER_UD_SEC
                  ;
19FD E8BAFD                         CALL NEXT_CONTINUE
                  ;
1A00 A08907                         MOV AL,[KEY_DATA]
1A03 3C1C                           CMP AL,KEY_PUSH_CODE
1A05 7510                           JNZ DOWN_EXIT
1A07 E8CDFC                         CALL DW_SCAN_SEARCH
1A0A E826FC                         CALL TIMER_02_SEC
                  ;
1A0D E8AAFD                         CALL NEXT_CONTINUE
                  ;
1A10 A08907                         MOV AL,[KEY_DATA]
1A13 3C00                           CMP AL,TIMER_OUT_CODE
1A15 74E0                           JZ EIKO
1A17 EB9E         DOWN_EXIT:        JMP UP_DOWN_EXIT
                  ; ************  PC-FC Mode  ****************************************
1A19 E8CBFB       DW_PCFC:          CALL PCFC_MAP_ARUKA
1A1C 7232                           JC DW_NO_MAP
                  ;
1A1E E8D5FC                         CALL DW_PCFC_SEARCH
1A21 E81BFC                         CALL TIMER_05_SEC
                  ;
1A24 E893FD                         CALL NEXT_CONTINUE
                  ;
1A27 A08907                         MOV AL,[KEY_DATA]
1A2A 3C00                           CMP AL,TIMER_OUT_CODE
1A2C 75E9                           JNZ DOWN_EXIT
                  ;
1A2E E845F9       KEIKO:            CALL SPU_STATUS_REQ
1A31 E811FC                         CALL TIMER_UD_SEC
                  ;
1A34 E883FD                         CALL NEXT_CONTINUE
                  ;
1A37 A08907                         MOV AL,[KEY_DATA]
1A3A 3C1C                           CMP AL,KEY_PUSH_CODE
1A3C 75D9                           JNZ DOWN_EXIT
1A3E E885FC                         CALL DW_PCFC_SEARCH
1A41 E8EFFB                         CALL TIMER_02_SEC
                  ;
1A44 E873FD                         CALL NEXT_CONTINUE
                  ;
1A47 A08907                         MOV AL,[KEY_DATA]
```

```
1A4A 3C00                          CMP AL,TIMER_OUT_CODE
1A4C 74E0                          JZ KEIKO
1A4E EBC7                          JMP DOWN_EXIT
                 ;
1A50 E9D4FE      DW_NO_MAP:        JMP MSG_NO_WT_END
                 ;----------------------------------------------------------------------
                 ;
                 ;                 SCAN  Key Operation
                 ;
                 ;----------------------------------------------------------------------
1A53 E82DFD      SCAN_KEY_OP:      CALL SCFCPC_MODE_AX
1A56 E84BFA                        CALL SPU_LED_AX
1A59 E8F6FB                        CALL TIMER_5_SEC
                 ;
1A5C E858FD                        CALL NEXT_CONTINUE
                 ;
1A5F A08907                        MOV AL,[KEY_DATA]
1A62 3C00                          CMP AL,TIMER_OUT_CODE
1A64 7503                          JNZ SCAN_AFTER
1A66 E98FFE                        JMP RANDOM_MODORI
                 ;
1A69 3C15        SCAN_AFTER:       CMP AL,SCAN_KEY_CODE
1A6B 7539                          JNZ SCAN_ANOTHER
                 ; **************************************************************
1A6D E84EFB      SCAN_SCAN:        CALL PC_CODE_0_KAI
1A70 7410                          JZ SC_FC_PC_XCHG
                 ;
1A72 E88203                        CALL ANGO_INPUT
1A75 E86D04                        CALL ANGO_BIN_DX
1A78 E860FB                        CALL PC_CODE_ADRS
1A7B 3B10                          CMP DX,[SI][BX]
1A7D 7403                          JZ SC_FC_PC_XCHG       ; IF  PC_CODE <> Input Code Then PC_Error
                 ;
1A7F E960FE                        JMP MSGERR_WT_END
                 ;
1A82 E88EFB      SC_FC_PC_XCHG:    CALL CONV_BIT_AL
1A85 30060E00                      XOR [SCAN_MODE_FLAG],AL
1A89 22060E00                      AND AL,[SCAN_MODE_FLAG]
1A8D 7406                          JZ EMI_TO_FCPC
1A8F B84353      EMI_TO_SCAN:      MOV AX,ASCII_SC
1A92 E950FE                        JMP MSG_WT_END
1A95 E826FB      EMI_TO_FCPC:      CALL PC_CODE_0_KAI
1A98 7506                          JNZ EMI_TO_PC
1A9A B84346      EMI_TO_FC:        MOV AX,ASCII_FC
1A9D E945FE                        JMP MSG_WT_END
1AA0 B84350      EMI_TO_PC:        MOV AX,ASCII_PC
1AA3 E93FFE                        JMP MSG_WT_END
                 ;
                 ;
                 ;
1AA6 3C12        SCAN_ANOTHER:     CMP AL,AUTHO_KEY_CODE
1AA8 7403                          JZ PC_CODE_XCHG
1AAA E966FD                        JMP BASE_ROUTINE
                 ;
                 ;                 IF PC_CODE = 0 THEN "NEW" ELSE ANSHO-KEY-IN
                 ;
1AAD E80EFB      PC_CODE_XCHG:     CALL PC_CODE_0_KAI
1AB0 740D                          JZ NEW_PC_CODE
                 ;
1AB2 E87203                        CALL ANGO_INPUT
1AB5 E82D04                        CALL ANGO_BIN_DX
1AB8 E820FB                        CALL PC_CODE_ADRS
1ABB 3B10                          CMP DX,[SI][BX]
1ABD 751F                          JNZ PC_CODE_ERR        ; IF  PC_CODE <> Input Code Then PC_Erro
                 ;
1ABF E8CE02      NEW_PC_CODE:      CALL ANGO_TOUROKU
1AC2 E87AFB                        CALL TIMER_05_SEC
                 ;
1AC5 E8F2FC                        CALL NEXT_CONTINUE
                 ;
1AC8 E85304                        CALL ANGO_DISPLAY
1ACB 7303                          JNC NEW_PC_SET
1ACD E912FE                        JMP MSGERR_WT_END
                 ;
1AD0 E81204      NEW_PC_SET:       CALL ANGO_BIN_DX
1AD3 E805FB                        CALL PC_CODE_ADRS
1AD6 8910                          MOV [SI][BX],DX
                 ;
1AD8 B85541                        MOV AX,ASCII_AU
1ADB E907FE                        JMP MSG_WT_END
```

```
                ;
                ;
1ADE E901FE     PC_CODE_ERR:    JMP MSGERR_WT_END
                ;---------------------------------------------------------------------------
                ;
                ;               Deleting Channels from the FC/PC List
                ;
                ;---------------------------------------------------------------------------
1AE1 E89AFB     CLEAR_KEY_OP:   CALL VIEW_TBL_LED
1AE4 E8AFFB                     CALL LED_BIN_BX
1AE7 BE0001                     MOV SI,PC_FC_LIST
1AEA E826FB                     CALL CONV_BIT_AL
1AED 34FF                       XOR AL,0FFH
1AEF 2000                       AND [SI][BX],AL
                ;
1AF1 B84564                     MOV AX,ASCII_DE
1AF4 E9EEFD                     JMP MSG_WT_END
                ;-----------------------------------------------------------
                ;
                ;               Send Key Function
                ;
                ;-----------------------------------------------------------
1AF7 B84553     SEND_KEY_OP:    MOV AX,ASCII_SE
1AFA E8A7F9                     CALL SPU_LED_AX
                ;
1AFD E813FB                     CALL CONV_BIT_AL
1B00 22063008                   AND AL,[SEND_ENABLE]
1B04 7503                       JNZ SEND_KYOKA
1B06 E90EFE                     JMP WT_NO_WT_END
                ;
1B09 E846FB     SEND_KYOKA:     CALL TIMER_5_SEC
                ;
1B0C E8ABFC                     CALL NEXT_CONTINUE
                ;
1B0F A08907                     MOV AL,[KEY_DATA]
1B12 E8EFF5                     CALL KAZUKO
1B15 7303                       JNC SETUKO
1B17 E9BFFD                     JMP RANDOM_OUT
1B1A A28407     SETUKO:         MOV [LSB_LED],AL
1B1D 8A1E3308                   MOV BL,[SEND_INDEX]
1B21 80FB80                     CMP BL,SEND_MAX
1B24 7203                       JC TAMIKO
1B26 E9EEFD     TAMI:           JMP WT_NO_WT_END
1B29 B420       TAMIKO:         MOV AH,20H
1B2B 88268507                   MOV [MSB_LED],AH
1B2F E88C03                     CALL KEY_BUFF_ADRS
1B32 A08907                     MOV AL,[KEY_DATA]
1B35 8800                       MOV [SI][BX],AL
1B37 E8ABF9                     CALL SPU_LED_DISFL
1B3A E815FB                     CALL TIMER_5_SEC
                ;
1B3D E87AFC                     CALL NEXT_CONTINUE
                ;
1B40 A08907                     MOV AL,[KEY_DATA]
1B43 3C16                       CMP AL,CLEAR_KEY_CODE
1B45 74B0                       JZ SEND_KEY_OP
1B47 3C12                       CMP AL,AUTHO_KEY_CODE
1B49 75DB                       JNZ TAMI
                ;
1B4B E87003                     CALL KEY_BUFF_ADRS
1B4E 8A00                       MOV AL,[SI][BX]
1B50 BE3508                     MOV SI,SEND_DATA_BUFF
1B53 B700                       MOV BH,0
1B55 8A1E3308                   MOV BL,[SEND_INDEX]
1B59 8A262807                   MOV AH,[IC_BYTE]
1B5D 886001                     MOV [SI][BX+1],AH
1B60 884002                     MOV [SI][BX+2],AL
1B63 80C302                     ADD BL,2
1B66 881E3308                   MOV [SEND_INDEX],BL
                ;
1B6A B85541                     MOV AX,ASCII_AU
1B6D E975FD                     JMP MSG_WT_END

                ;-------------------------------------------------------------
                ;
                ;               Event Key Operation
                ;
                ;-------------------------------------------------------------
1B70 E84BFA     EVENT_KEY_OP:   CALL PC_CODE_0_KAI
1B73 7410                       JZ EV_PC_OK_YO
                ;
```

```
1B75 E8AF02                             CALL ANGO_INPUT        ; PC Code Input
1B78 E86A03                             CALL ANGO_BIN_DX
1B7B E85DFA                             CALL PC_CODE_ADRS
1B7E 3B10                               CMP DX,[SI][BX]
1B80 7403                               JZ EV_PC_OK_YO
1B82 E95DFD         EVENT_ERR:          JMP MSGERR_WT_END
                    ;
1B85                EV_PC_OK_YO:                               ; Event Enable ?
1B85 B87250                             MOV AX,ASCII_PR
1B88 E819F9                             CALL SPU_LED_AX
1B8B E8B8FA                             CALL TIMER_1_SEC
                    ;
1B8E E829FC                             CALL NEXT_CONTINUE
                    ;
1B91 E86601                             CALL YOYAKU_SEARCH
1B94 7203                               JC Y_HAJIME
1B96 E9C600                             JMP FORCED_EVENT
                    ;
1B99 B87250         Y_HAJIME:           MOV AX,ASCII_PR
1B9C E885F9                             CALL SPU_LED_AX
1B9F E8B6FA                             CALL TIMER_10_SEC
                    ;
1BA2 E815FC                             CALL NEXT_CONTINUE
                    ;
1BA5 A08907                             MOV AL,[KEY_DATA]
1BA8 E91100                             JMP EVENT_1ST_KEY
                    ;
1BAB E8AAFA         EVENT_KEY_WAIT:     CALL TIMER_10_SEC
                    ;
1BAE E809FC                             CALL NEXT_CONTINUE
                    ;
1BB1 A08907                             MOV AL,[KEY_DATA]
1BB4 3C12                               CMP AL,AUTHO_KEY_CODE
1BB6 742D                               JZ EVENT_AUTHO
1BB8 3C16                               CMP AL,CLEAR_KEY_CODE
1BBA 7432                               JZ EVENT_CLEAR
1BBC 3C10           EVENT_1ST_KEY:      CMP AL,PLUS_KEY_CODE
1BBE 7441                               JZ EVENT_PLUS
1BC0 3C14                               CMP AL,MINUS_KEY_CODE
1BC2 7443                               JZ EVENT_MINUS
1BC4 3C00                               CMP AL,TIMER_OUT_CODE
1BC6 740B                               JZ EVENT_T_OUT
1BC8 3C11                               CMP AL,EVENT_KEY_CODE
1BCA 740A                               JZ EVENT_EVENT
1BCC E835F5                             CALL KAZUKO
1BCF 733E                               JNC RANDOM_YOYAKU
1BD1 EBAF                               JMP EVENT_ERR
                    ;
1BD3 E922FD         EVENT_T_OUT:        JMP RANDOM_MODORI
                    ;
1BD6 E850FA         EVENT_EVENT:        CALL EVENT_TO_BASIC
1BD9 E8A2FA                             CALL VIEW_TBL_LED
1BDC E810F6                             CALL RUN_CONVERTER
1BDF E8C9F8                             CALL SPU_LED_DISP
1BE2 E9EEFC                             JMP NEXT_END
                    ;
1BE5 E8B600         EVENT_AUTHO:        CALL KEIYAKU           ; Pay Channel Shinki Keiyaku
1BE8 B85541                             MOV AX,ASCII_AU
1BEB E90800                             JMP EVENT_MSG
                    ;
1BEE E8CB00         EVENT_CLEAR:        CALL KAIYAKU
1BF1 7319                               JNC EVENT_NO
1BF3 B84564                             MOV AX,ASCII_DE
1BF6 E8ABF8         EVENT_MSG:          CALL SPU_LED_AX
1BF9 E84AFA                             CALL TIMER_1_SEC
                    ;
1BFC E8BBFB                             CALL NEXT_CONTINUE
                    ;
1BFF EB84                               JMP EV_PC_OK_YO
                    ;
1C01 E80A01         EVENT_PLUS:         CALL UP_YOYAKU
1C04 E90300                             JMP EVENT_UD
1C07 E84E01         EVENT_MINUS:        CALL DOWN_YOYAKU
1C0A 7353           EVENT_UD:           JNC FORCED_EVENT
1C0C E918FD         EVENT_NO:           JMP MSG_NO_WT_END
                    ;
1C0F B700           RANDOM_YOYAKU:      MOV BH,0
1C11 8A1E2807                           MOV BL,[IC_BYTE]
1C15 8BF3                               MOV SI,BX
1C17 E8A402                             CALL KEY_BUFF_ADRS
1C1A 8800                               MOV [BX][SI],AL
```

```
                       ;
1C1C A28507                               MOV [MSB_LED],AL
1C1F B088                                 MOV AL,88H                ; LSB = "_"
1C21 A28407                               MOV [LSB_LED],AL
1C24 E8F8F8                               CALL SPU_LED_FLASH
1C27 E828FA                               CALL TIMER_5_SEC
                       ;
1C2A E88DFB                               CALL NEXT_CONTINUE        ; [[[ Key Input Wait ]]]
                       ;
1C2D A08907                               MOV AL,[KEY_DATA]
1C30 E8D1F4                               CALL KAZUKO
1C33 7249                                 JC IRG_YOYAKU
1C35 B700                                 MOV BH,0              ;
1C37 8A1E2807                             MOV BL,[IC_BYTE]      ;
1C3B 8BF3                                 MOV SI,BX
1C3D E87E02                               CALL KEY_BUFF_ADRS    ;    AH = [ 1st KEY  ]
1C40 8A20                                 MOV AH,[SI][BX]       ;    AL = [ KEY_DATA ]
                       ;
1C42 A28407                               MOV [LSB_LED],AL      ;   LED Display
1C45 88268507                             MOV [MSB_LED],AH      ;
1C49 E87202                               CALL KEY_BUFF_ADRS    ;
1C4C 894004                               MOV [SI][BX+4],AX     ;
1C4F E8CDF8                               CALL SPU_LED_FLASH    ;
1C52 E841FA                               CALL LED_BIN_BX
                       ;
1C55 8B362807                             MOV SI,[IC_BYTE]
1C59 81C6000A                             ADD SI,HELP
1C5D 881C                                 MOV [SI],BL
                       ;
1C5F E83000            FORCED_EVENT:      CALL EV_FREQ_ADRS
1C62 833C00                               CMP WORD PTR [SI],0
1C65 7417                                 JZ IRG_YOYAKU         ; Housou Sareteimasen
1C67 833C01                               CMP WORD PTR [SI],1   ;
1C6A 740C                                 JZ EVENT_RT1
                       ;
1C6C E86D00                               CALL PAY_CH_MIRU      ; [[[ Pay Channel Tuning ]]]
1C6F E839F8                               CALL SPU_LED_DISP     ; [[[ Pay ]]]
1C72 E80E01                               CALL EVENT_BIN_TBL
1C75 E933FF                               JMP EVENT_KEY_WAIT
                       ;
1C78 E8A4F8            EVENT_RT1:         CALL SPU_LED_FLASH
1C7B E92DFF                               JMP EVENT_KEY_WAIT
                       ;
1C7E E996FC            IRG_YOYAKU:        JMP WT_NO_WT_END
                       ;
                       ; ************     SI = ES_EVENT_TIMER + [CONV_NO] * 128 + Channel
                       ;
1C81 8B362407          ES_PAY_STATUS:     MOV SI,[CONV_NO]
1C85 B107                                 MOV CL,7
1C87 D3C6                                 ROL SI,CL
1C89 81C60006                             ADD SI,ES_EVENT_TIMER         ; Timer Address
1C8D 03361E07                             ADD SI,[BINARY_LED]           ; Channel
1C91 C3                                   RET
                       ;
1C92 BE0009            EV_FREQ_ADRS:      MOV SI,EVENT_NO_FREQ
1C95 03361E07                             ADD SI,[BINARY_LED]
1C99 03361E07                             ADD SI,[BINARY_LED]
1C9D C3                                   RET
                       ;
1C9E 8B362807          KEIYAKU:           MOV SI,[IC_BYTE]
1CA2 81C6000A                             ADD SI,HELP
1CA6 8A1C                                 MOV BL,[SI]
1CA8 B700                                 MOV BH,0
1CAA 891E1E07                             MOV [BINARY_LED],BX
1CAE E8D0FF                               CALL ES_PAY_STATUS
1CB1 268024F8                             AND BYTE PTR ES:[SI],0F8H
1CB5 A02A07                               MOV AL,[DEVICE_NO]
1CB8 260804                               OR ES:[SI],AL
1CBB C3                                   RET
1CBC 8B362807          KAIYAKU:           MOV SI,[IC_BYTE]
1CC0 81C6000A                             ADD SI,HELP
1CC4 8A1C                                 MOV BL,[SI]
1CC6 B700                                 MOV BH,0
1CC8 891E1E07                             MOV [BINARY_LED],BX
1CCC E8B2FF                               CALL ES_PAY_STATUS
1CCF 26803CF8                             CMP BYTE PTR ES:[SI],0F8H
1CD3 7306                                 JNC KAIYAKU_ERR
1CD5 268024F8                             AND BYTE PTR ES:[SI],0F8H
1CD9 F9                                   STC
1CDA C3                                   RET
1CDB C3                KAIYAKU_ERR:       RET
```

```
                        ;
1CDC E8A2FF             PAY_CH_MIRU:     CALL ES_PAY_STATUS
1CDF B480                                MOV AH,80H
1CE1 26803CF8                            CMP BYTE PTR ES:[SI],0F8H
1CE5 7202                                JC HATU
1CE7 B4C0                                MOV AH,0C0H
                        ;
1CE9 0A262E07           HATU:            OR AH,[CONV_NO_BIT]
1CED 802680073F                          AND BYTE PTR [NOW_EVENT],3FH
1CF2 08268007                            OR [NOW_EVENT],AH
1CF6 E8F6F4                              CALL RUN_CONVERTER
1CF9 C3                                  RET
                        ;
1CFA BE000A             YOYAKU_SEARCH:   MOV SI,HELP
1CFD 03362807                            ADD SI,[IC_BYTE]
1D01 B700                                MOV BH,0
1D03 8A1C                                MOV BL,[SI]
1D05 83FB00                              CMP BX,0
1D08 740F                                JZ UP_WAKEARI
1D0A 4B                                  DEC BX
1D0B E90B00                              JMP UP_WAKEARI
                        ;
1D0E BE000A             UP_YOYAKU:       MOV SI,HELP
1D11 03362807                            ADD SI,[IC_BYTE]
1D15 B700                                MOV BH,0
1D17 8A1C                                MOV BL,[SI]
1D19 8B362407           UP_WAKEARI:      MOV SI,[CONV_NO]
1D1D B107                                MOV CL,7
1D1F D3C6                                ROL SI,CL
1D21 81C60006                            ADD SI,ES_EVENT_TIMER
1D25 B164                                MOV CL,100
1D27 43                 UYL:             INC BX
1D28 83FB64                              CMP BX,100
1D2B 7203                                JC UYJ
1D2D BB0100                              MOV BX,1
1D30 26F60007           UYJ:             TEST BYTE PTR ES:[SI][BX],7
1D34 7506                                JNZ UD_Y_RET
1D36 FEC9                                DEC CL
1D38 75ED                                JNZ UYL
1D3A F9                                  STC
1D3B C3                                  RET
                        ;
1D3C 891E1E07           UD_Y_RET:        MOV [BINARY_LED],BX
1D40 E825FA                              CALL BINDEC_LED
                        ;
1D43 BE3000                              MOV SI,EVENT_CHANNEL
1D46 03362407                            ADD SI,[CONV_NO]
1D4A 881C                                MOV [SI],BL
                        ;
1D4C 8B362807                            MOV SI,[IC_BYTE]
1D50 81C6000A                            ADD SI,HELP
1D54 881C                                MOV [SI],BL
1D56 F8                                  CLC
1D57 C3                                  RET
                        ;

1D58 BE000A             DOWN_YOYAKU:     MOV SI,HELP
1D5B 03362807                            ADD SI,[IC_BYTE]
1D5F 8A1C                                MOV BL,[SI]
1D61 B700                                MOV BH,0
1D63 8B362407                            MOV SI,[CONV_NO]
1D67 B107                                MOV CL,7
1D69 D3C6                                ROL SI,CL
1D6B 81C60006                            ADD SI,ES_EVENT_TIMER
1D6F B164                                MOV CL,100
1D71 4B                 DYL:             DEC BX
1D72 7503                                JNZ DYJ
1D74 BB6300                              MOV BX,99
1D77 26F60007           DYJ:             TEST BYTE PTR ES:[SI][BX],7
1D7B 75BF                                JNZ UD_Y_RET
1D7D FEC9                                DEC CL
1D7F 75F0                                JNZ DYL
1D81 F9                                  STC
1D82 C3                                  RET
                        ;
1D83 A01E07             EVENT_BIN_TBL:   MOV AL,[BINARY_LED]
1D86 BE3000                              MOV SI,EVENT_CHANNEL
1D89 03362407                            ADD SI,[CONV_NO]
1D8D 8804                                MOV [SI],AL
1D8F C3                                  RET
                        ;
```

```
                    ;
                    ;-----------------------------------------------
                    ;
                    ;                   Another  Subroutines
                    ;
                    ;-----------------------------------------------
                    ;

1D90 58             ANGO_TOUROKU:   POP AX
1D91 BE0004                         MOV SI,NEXT_GO_ADRS
1D94 B700                           MOV BH,0
1D96 8A1E2807                       MOV BL,[IC_BYTE]
1D9A 02DB                           ADD BL,BL
1D9C 8900                           MOV [SI][BX],AX
                    ;
1D9E B89CD4         ANGO_1_10:      MOV AX,ASCII_NU
1DA1 E800F7                         CALL SPU_LED_AX
1DA4 E8B1F8                         CALL TIMER_10_SEC
                    ;
1DA7 E810FA                         CALL NEXT_CONTINUE
                    ;
1DAA E8FC00                         CALL ANGO_SUB
1DAD 7307                           JNC ANGO_1_20
1DAF 3C16                           CMP AL,CLEAR_KEY_CODE
1DB1 7571                           JNZ ANGO_ERR
1DB3 E942FB                         JMP RANDOM_MODORI
1DB6 8800           ANGO_1_20:      MOV [SI][BX],AL
1DB8 8A00           ANGO_1_21:      MOV AL,[SI][BX]
1DBA A28407                         MOV [LSB_LED],AL
1DBD B420                           MOV AH,20H
1DBF E80E01                         CALL ANGO_SUB1
                    ;
1DC2 E8F5F9                         CALL NEXT_CONTINUE
                    ;
1DC5 E8E100                         CALL ANGO_SUB
1DC8 7306                           JNC ANGO_1_30
1DCA 3C16                           CMP AL,CLEAR_KEY_CODE
1DCC 7556                           JNZ ANGO_ERR
1DCE EBCE                           JMP ANGO_1_10
1DD0 884001         ANGO_1_30:      MOV [SI][BX+1],AL
1DD3 8A4001         ANGO_1_31:      MOV AL,[SI][BX+1]
1DD6 A28407                         MOV [LSB_LED],AL
1DD9 8A20                           MOV AH,[SI][BX]
1DDB E8F200                         CALL ANGO_SUB1
                    ;
1DDE E8D9F9                         CALL NEXT_CONTINUE
                    ;
1DE1 E8C500                         CALL ANGO_SUB
1DE4 7306                           JNC ANGO_1_40
1DE6 3C16                           CMP AL,CLEAR_KEY_CODE
1DE8 75E9                           JNZ ANGO_1_31
1DEA EBCC                           JMP ANGO_1_21
1DEC 884002         ANGO_1_40:      MOV [SI][BX+2],AL
1DEF 8A4002         ANGO_1_41:      MOV AL,[SI][BX+2]
1DF2 A28407                         MOV [LSB_LED],AL
1DF5 8A6001                         MOV AH,[SI][BX+1]
1DF8 E8D500                         CALL ANGO_SUB1
                    ;
1DFB E8BCF9                         CALL NEXT_CONTINUE
                    ;
1DFE E8A800                         CALL ANGO_SUB
1E01 7306                           JNC ANGO_1_RET
1E03 3C16                           CMP AL,CLEAR_KEY_CODE
1E05 751D                           JNZ ANGO_ERR
1E07 EBCA                           JMP ANGO_1_31
1E09 884003         ANGO_1_RET:     MOV [SI][BX+3],AL
1E0C A28407                         MOV [LSB_LED],AL
1E0F 8A6002                         MOV AH,[SI][BX+2]
1E12 E8BB00                         CALL ANGO_SUB1
                    ;
1E15 BE0004                         MOV SI,NEXT_GO_ADRS
1E18 B700                           MOV BH,0
1E1A 8A1E2807                       MOV BL,[IC_BYTE]
1E1E 02DB                           ADD BL,BL
1E20 8B00                           MOV AX,[SI][BX]
1E22 50                             PUSH AX
1E23 C3                             RET
                    ;
                    ;
                    ;
1E24 E9B8FA         ANGO_ERR:       JMP MSGERR_WT_END
```

```
                          ;.
                          ;
                          ;
1E27 58                   ANGO_INPUT:       POP AX
1E28 BE0004                                 MOV SI,NEXT_GO_ADRS
1E2B B700                                   MOV BH,0
1E2D 8A1E2807                               MOV BL,[IC_BYTE]
1E31 02DB                                   ADD BL,BL
1E33 8900                                   MOV [SI][BX],AX
                          ;
1E35 B8B6B6               ANGO_2_10:        MOV AX,0B6B6H
1E38 E869F6                                 CALL SPU_LED_AX
1E3B E81AF8                                 CALL TIMER_10_SEC
                          ;
1E3E E879F9                                 CALL NEXT_CONTINUE
                          ;
1E41 E86500               ANGO_2_11:        CALL ANGO_SUB
1E44 7307                                   JNC ANGO_2_20
1E46 3C16                                   CMP AL,CLEAR_KEY_CODE
1E48 75DA                                   JNZ ANGO_ERR
1E4A E9ABFA                                 JMP RANDOM_MODORI
1E4D 8800                 ANGO_2_20:        MOV [SI][BX],AL
1E4F B8B686               ANGO_2_21:        MOV AX,86B6H
1E52 E88900                                 CALL ANGO_SUB2
                          ;
1E55 E862F9                                 CALL NEXT_CONTINUE
                          ;
1E58 E84E00                                 CALL ANGO_SUB
1E5B 7306                                   JNC ANGO_2_30
1E5D 3C16                                   CMP AL,CLEAR_KEY_CODE
1E5F 75C3                                   JNZ ANGO_ERR
1E61 EBD2                                   JMP ANGO_2_10
1E63 884001               ANGO_2_30:        MOV [SI][BX+1],AL
1E66 B8B620               ANGO_2_31:        MOV AX,20B6H
1E69 E87200                                 CALL ANGO_SUB2
                          ;
1E6C E84BF9                                 CALL NEXT_CONTINUE
                          ;
1E6F E83700                                 CALL ANGO_SUB
1E72 7306                                   JNC ANGO_2_40
1E74 3C16                                   CMP AL,CLEAR_KEY_CODE
1E76 75AC                                   JNZ ANGO_ERR
1E78 EBD5                                   JMP ANGO_2_21
1E7A 884002               ANGO_2_40:        MOV [SI][BX+2],AL
1E7D B88620               ANGO_2_41:        MOV AX,2086H
1E80 E85B00                                 CALL ANGO_SUB2
                          ;
1E83 E834F9                                 CALL NEXT_CONTINUE
                          ;
1E86 E82000                                 CALL ANGO_SUB
1E89 7306                                   JNC ANGO_2_RET
1E8B 3C16                                   CMP AL,CLEAR_KEY_CODE
1E8D 7595                                   JNZ ANGO_ERR
1E8F EBD5                                   JMP ANGO_2_31
1E91 884003               ANGO_2_RET:       MOV [SI][BX+3],AL
1E94 B82020                                 MOV AX,2020H
1E97 E84400                                 CALL ANGO_SUB2
                          ;
1E9A BE0004                                 MOV SI,NEXT_GO_ADRS
1E9D B700                                   MOV BH,0
1E9F 8A1E2807                               MOV BL,[IC_BYTE]
1EA3 02DB                                   ADD BL,BL
1EA5 8B00                                   MOV AX,[SI][BX]
1EA7 50                                     PUSH AX
1EA8 C3                                     RET
                          ;
                          ;
                          ;
1EA9 A08907               ANGO_SUB:         MOV AL,[KEY_DATA]
1EAC E855F2                                 CALL KAZUKO
1EAF 730D                                   JNC KEY_BUFF_ADRS
1EB1 3C00                                   CMP AL,TIMER_OUT_CODE
1EB3 7504                                   JNZ KAORU
1EB5 58                                     POP AX
1EB6 E93FFA                                 JMP RANDOM_MODORI
1EB9 E80200               KAORU:            CALL KEY_BUFF_ADRS
1EBC F9                                     STC
1EBD C3                                     RET
                          ;
1EBE BE0010               KEY_BUFF_ADRS:    MOV SI,KEY_DATA_STACK
1EC1 B700                                   MOV BH,0
```

```
1EC3 8A1E2807                          MOV BL,[IC_BYTE]
1EC7 03DB                              ADD BX,BX
1EC9 03DB                              ADD BX,BX
1ECB 03DB                              ADD BX,BX
1ECD 03DB                              ADD BX,BX
1ECF C3                                RET
                     ;
1ED0 88268507        ANGO_SUB1:        MOV [MSB_LED],AH
1ED4 E8BDF4                            CALL SPU_CLEAR_DISP
1ED7 E8D1F5                            CALL SPU_LED_DISP
1EDA E87BF7                            CALL TIMER_10_SEC
1EDD C3                                RET
                     ;
1EDE E8C3F5          ANGO_SUB2:        CALL SPU_LED_AX
1EE1 E874F7                            CALL TIMER_10_SEC
1EE4 C3                                RET
                     ;
1EE5 E8D6FF          ANGO_BIN_DX:      CALL KEY_BUFF_ADRS
1EE8 B500                              MOV CH,0
1EEA 8AF5                              MOV DH,CH
1EEC 8A10                              MOV DL,[SI][BX]         ; DX = #1
1EEE 80E20F                            AND DL,0FH
1EF1 E81F00                            CALL MULTI_10_DX        ; DX = #1*10
1EF4 8A4801                            MOV CL,[SI+1][BX]
1EF7 80E10F                            AND CL,0FH
1EFA 03D1                              ADD DX,CX               ; DX = #1*10+#2
1EFC E81400                            CALL MULTI_10_DX        ; DX =(#1*10+#2)*10
1EFF 8A4802                            MOV CL,[SI+2][BX]
1F02 80E10F                            AND CL,0FH
1F05 03D1                              ADD DX,CX               ; DX = (#1*10+#2)*10+#3
1F07 E80900                            CALL MULTI_10_DX        ; DX =((#1*10+#2)*10+#3)*10
1F0A 8A4803                            MOV CL,[SI+3][BX]
1F0D 80E10F                            AND CL,0FH
1F10 03D1                              ADD DX,CX               ; DX =((#1*10+#2)*10+#3)*10+#4
1F12 C3                                RET
                     ;
1F13 03D2            MULTI_10_DX:      ADD DX,DX        ; *2
1F15 8BC2                              MOV AX,DX
1F17 03C0                              ADD AX,AX        ; *2*2     = *4
1F19 03C0                              ADD AX,AX        ; *2*2*2   = *8
1F1B 03D0                              ADD DX,AX        ; *2 + *8 = *10
1F1D C3                                RET
                     ;
                     ; ************  Key In Shita Angou Wo Display Suru  ************
                     ;
1F1E 58              ANGO_DISPLAY:     POP AX
1F1F BE0004                            MOV SI,NEXT_GO_ADRS
1F22 B700                              MOV BH,0
1F24 8A1E2807                          MOV BL,[IC_BYTE]
1F28 02DB                              ADD BL,BL
1F2A 8900                              MOV [SI][BX],AX
                     ;
1F2C E88FFF                            CALL KEY_BUFF_ADRS
1F2F C6400700                          MOV BYTE PTR [SI][BX+7],0
                     ;
1F33 B85541          ANGO_AU_WT_LP:    MOV AX,ASCII_AU
1F36 E86BF5                            CALL SPU_LED_AX
1F39 E80AF7                            CALL TIMER_1_SEC
                     ;
1F3C E87BF8                            CALL NEXT_CONTINUE
                     ;
1F3F A08907                            MOV AL,[KEY_DATA]
1F42 3C12                              CMP AL,AUTHO_KEY_CODE
1F44 7476                              JZ ANGO_NINTEI
1F46 3C16                              CMP AL,CLEAR_KEY_CODE
1F48 7462                              JZ ANGO_NO_AUTHO
1F4A E871FF                            CALL KEY_BUFF_ADRS
1F4D FE4007                            INC BYTE PTR [SI][BX+7]
1F50 B020                              MOV AL,20H
1F52 A28507                            MOV [MSB_LED],AL
1F55 8A00                              MOV AL,[SI][BX]
1F57 A28407                            MOV [LSB_LED],AL
1F5A E84EF5                            CALL SPU_LED_DISP
1F5D E8E6F6          ANGO_DISP_LP:     CALL TIMER_1_SEC
                     ;
1F60 E857F8                            CALL NEXT_CONTINUE
                     ;
1F63 A08907                            MOV AL,[KEY_DATA]
1F66 3C12                              CMP AL,AUTHO_KEY_CODE
1F68 7452                              JZ ANGO_NINTEI
1F6A 3C16                              CMP AL,CLEAR_KEY_CODE
```

```
1F6C 743E                            JZ ANGO_NO_AUTHO
1F6E E84DFF                          CALL KEY_BUFF_ADRS
1F71 8A6007                          MOV AH,[SI][BX+7]
1F74 80E403                          AND AH,3
1F77 0ADC                            OR BL,AH
1F79 8A40FF                          MOV AL,[SI][BX-1]
1F7C A28507                          MOV [MSB_LED],AL
1F7F 8A00                            MOV AL,[SI][BX]
1F81 A28407                          MOV [LSB_LED],AL
1F84 E80DF4                          CALL SPU_CLEAR_DISP
1F87 E821F5                          CALL SPU_LED_DISP
                     ;
1F8A E831FF                          CALL KEY_BUFF_ADRS
1F8D FE4007                          INC BYTE PTR [SI][BX+7]
1F90 8A6007                          MOV AH,[SI][BX+7]
1F93 80FC96                          CMP AH,150
1F96 7314                            JNC ANGO_NO_AUTHO
1F98 80E403                          AND AH,3
1F9B 75C0                            JNZ ANGO_DISP_LP
1F9D E8A6F6          AUGO_AU_RETRY:  CALL TIMER_1_SEC
                     ;
1FA0 E817F8                          CALL NEXT_CONTINUE
                     ;
1FA3 A08907                          MOV AL,[KEY_DATA]
1FA6 3C12                            CMP AL,AUTHO_KEY_CODE
1FA8 7412                            JZ ANGO_NINTEI
1FAA EB87                            JMP ANGO_AU_WT_LP
                     ;
1FAC BE0004          ANGO_NO_AUTHO:  MOV SI,NEXT_GO_ADRS
1FAF B700                            MOV BH,0
1FB1 8A1E2807                        MOV BL,[IC_BYTE]
1FB5 02DB                            ADD BL,BL
1FB7 8B00                            MOV AX,[SI][BX]
1FB9 50                              PUSH AX
1FBA F9                              STC
1FBB C3                              RET
                     ;
1FBC BE0004          ANGO_NINTEI:    MOV SI,NEXT_GO_ADRS
1FBF B700                            MOV BH,0
1FC1 8A1E2807                        MOV BL,[IC_BYTE]
1FC5 02DB                            ADD BL,BL
1FC7 8B00                            MOV AX,[SI][BX]
1FC9 50                              PUSH AX
1FCA F8                              CLC
1FCB C3                              RET
                     ;
                     ;
                     ;
1FCC 3C88            PAY_GROUP_1:    CMP AL,88H
1FCE 7406                            JZ PAY_PROG_START
1FD0 3C8A                            CMP AL,8AH
1FD2 7478                            JZ PAY_PROG_STOP
1FD4 F8                              CLC
1FD5 C3                              RET
                     ;
1FD6 8A4405          PAY_PROG_START: MOV AL,[SI+5]     ; Channel
1FD9 B400                            MOV AH,0
1FDB 8B5406                          MOV DX,[SI+6]     ; DX = Freq. Data
1FDE BB0009                          MOV BX,EVENT_NO_FREQ
1FE1 03D8                            ADD BX,AX
1FE3 03D8                            ADD BX,AX         ; BX = Freq. Table Address
1FE5 8917                            MOV [BX],DX       ; Frequency Set
                     ;
1FE7 BA0000                          MOV DX,0
1FEA BB0006                          MOV BX,ES_EVENT_TIMER
1FED 03D8                            ADD BX,AX
                     ;
1FEF 83FA06          EV_F_ST_CK:     CMP DX,6
1FF2 7356                            JNC P_P_START_RET
                     ;
1FF4 26F60707                        TEST BYTE PTR ES:[BX],7
1FF8 7449                            JZ NEXT_EV_ST
                     ;
1FFA 50                              PUSH AX           ; Channel
1FFB 53                              PUSH BX           ; N th Converter  Event Timer Address
1FFC 52                              PUSH DX           ; Drop No.

1FFD A31E07                          MOV [BINARY_LED],AX
2000 88162407                        MOV [CONV_NO],DL
2004 268A07                          MOV AL,ES:[BX]
2007 2407                            AND AL,7
```

```
2009 7502                              JNZ DEV_OK
200B B002                              MOV AL,2
                 ;
200D A22A07      DEV_OK:               MOV [DEVICE_NO],AL
2010 02C0                              ADD AL,AL
2012 02C0                              ADD AL,AL
2014 02C0                              ADD AL,AL          ; AL * 8
2016 02D0                              ADD DL,AL
2018 88162807                          MOV [IC_BYTE],DL
201C E81AF0                            CALL CONV_TO_DROP
201F E884F0                            CALL ID_DROP_DEVICE
2022 E88FF3                            CALL SPU_RELAY_ON
2025 8B1E1E07                          MOV BX,[BINARY_LED]
2029 E83CF7                            CALL BINDEC_LED
                 ;
202C BE8003                            MOV SI,JUMP_ADDRESS
202F 03362807                          ADD SI,[IC_BYTE]
2033 03362807                          ADD SI,[IC_BYTE]
2037 8B161A07                          MOV DX,[BASE_POINT]
203B 8914                              MOV [SI],DX
                 ;
203D E81FFC                            CALL FORCED_EVENT
                 ;
2040 5A                                POP DX
2041 5B                                POP BX
2042 58                                POP AX
2043 42          NEXT_EV_ST:           INC DX
2044 81C38000                          ADD BX,128
2048 EBA5                              JMP EV_F_ST_CK
                 ;
204A F8          P_P_START_RET:        CLC
204B C3                                RET
                 ;
204C 90          PAY_PROG_STOP:        NOP
204D F8          PAY_GROUP_2:          CLC
204E C3                                RET
                 ;
                 ;
                 ;
                                       GLOBAL         POWER_DET_CMD
                                       GLOBAL         LOAD_FROM_DROP
                                       GLOBAL         LOAD_TO_DROP
                                       GLOBAL         SPU_STATUS_REQ
                                       GLOBAL         ID_DROP_DEVICE
                                       GLOBAL         IC_DROP_DEVICE
                                       GLOBAL         CONV_SW_BIT_AL
                                       GLOBAL         DROP_BIT_AL
                                       GLOBAL         SPU_RELAY_OFF
                                       GLOBAL         SPU_CLEAR_DISP
                                       GLOBAL         EVENT_LED_OFF
                                       GLOBAL         DROP_MAP_SET
                                       GLOBAL         KEY_OPERATION
                                       GLOBAL         CONV_TO_DROP
                                       GLOBAL         DROP_TO_CONV
                                       GLOBAL         BINDEC_LED
                                       GLOBAL         LED_VIEW_TBL
                                       GLOBAL         SPU_LED_DISP
                                       GLOBAL         RUN_CONVERTER
                                       GLOBAL         WAKEARI_DE_ON
                                       GLOBAL         OP_SPU_OFF
                                       GLOBAL         OP_INITIAL
                                       GLOBAL         BASE_ROUTINE
                                       GLOBAL         JUMP_ADRS_INIT
                                       GLOBAL         JUMP_ADRS_INIZ
                                       GLOBAL         DEVICE_MAP_SET
                                       GLOBAL         PAY_GROUP_1
                                       GLOBAL         PAY_GROUP_2
                 ;
                 ;
                 ;
                                       EXTRN SPECIAL_SPU_1

Errors=     0
```

What is claimed is:

1. A cable television system for providing selected television signals to a plurality of remotely located subscriber premises, having a head end for producing a television signal and a cable network for conducting the television signal from the head end to a plurality of remote locations, each of which is adjacent but external to a respective subset of the subscriber premises, comprising:

external control unit means at each of the remote locations for receiving the television signal from the cable network;

a plurality of drop cables connected to each external control unit means, each drop cable conducting a selected portion of the television signal from the external control unit means to a respective one of the subscriber premises associated with that external control unit means;

subscriber device means connected to each drop cable at the subscriber premises for applying to the drop cable a first control signal indicative of data to be transmitted to the external control unit means, at least one of said subscriber device means being a subscriber processing unit means for allowing the subscriber to apply to the drop cable a first control signal including channel data indicative of the portion of the television signal which that subscriber wishes to select;

processing means associated with each external control unit means for processinq the first control signals applied to all the drop cables associated with that external control unit means, for determining independently of the head end whether or not the portion of the television signal indicated by the channel data is authorized for viewing, and for causing that external control unit means to apply to each associated drop cable the portion of the television signal indicated by the first control signal channel data received via the drop cable if that portion is authorized, the processing means including common signal processing circuitry which at least partially processes the information represented by the first control signals applied to all of the drop cables associated with that external control unit means, and further including a microprocessor, alterable memory means for storing data representing which of the subscribers associated with the external control unit means is authorized to receive each particular portion of the television signal, and communication means for allowing the head end to modify the authorization data stored by the memory means;, means associated with each external control unit means for applying to each drop cable a second control signal including data to be transmitted to the associated subscriber premises, at least a portion of which differs from the data included in the first control signal; and means associated with each subscriber device means to receive and store the data included in the second control signal.

2. The apparatus defined in claim 1, wherein:

said subscriber processing unit means includes a character display means;

the second control signal applied to each drop cable includes character display data; and said subscriber processing unit means includes means responsive to the received and stored second control signal for controlling the character display means in accordance with the character display data included in the second control signal.

3. The apparatus defined in claim 2, wherein the character display data included in the second control signal applied to each drop cable are indicative of the selected portion of the television signal applied to that drop cable by the external control unit means.

4. The apparatus defined in claim 1, further comprising:

means associated with the head end for applying to the cable network a downstream control signal indicative of data to be transmitted to at least one external control unit means; and means associated with each external control unit means for processing the downstream control signal to receive and store the data indicated by the downstream control signal.

5. The apparatus defined in claim 1, further comprising:

means associated with each external control unit means for applying to the cable network an upstream control signal indicative of data to be transmitted to the head end; and means associated with the head end for processing the upstream control signal to receive and store the data indicated by the upstream control signal.

6. The apparatus defined in claim 4, further comprising:

means associated with each external control unit means for applying to the cable network an upstream control signal indicative of data to be transmitted to the head end; and means associated with the head end for processing the upstream control signal to receive and store the data indicated by the upstream control signal.

7. The apparatus defined in claim 4, wherein:

said downstream control signal processing means associated with each external control unit means includes means for producing address signal information which uniquely identifies the associated external control unit means;

the downstream control signal includes address signal data indicative of at least one external control unit means to which the downstream control signal is to be transmitted; and said downstream control signal processing means associated with each external control unit means includes means for comparing the received address signal data to the associated address signal information, and enabling the associated downstream control signal processing means to store the data indicated by the downstream control signal if the received address signal data bear a predetermined relationship to the associated address signal information.

8. The apparatus defined in claim 1, wherein said means associated with each external control unit means for comparing received address signal data enables said downstream control signal processing means to store the data indicated by the downstream control signal if the received address signal data correspond to the associated address signal information.

9. The apparatus defined in claim 4, wherein:

the downstream control signal includes broadcast address signal data indicative of all external control unit means; and said downstream control signal processing means associated with each external control unit means includes means for recognizing the broadcast address signal data, and enabling the associated downstream control signal processing means to store the data indicated by the downstream control signal if the received broadcast address signal data is recognized.

10. The apparatus defined in claim 4, wherein:

the downstream control signal includes channel authorization data indicative of the portions of the television signal which at least one subscriber associated with that external control unit means is authorized to select; and said downstream control signal processing means associated with each external control unit means includes means for causing said external control unit means to apply to each associated drop cable the portion of the television signal indicated by the first control signal channel data received via the drop cable only if the stored channel authorization data indicates that the subscriber associated with the drop cable is authorized to receive that portion of the television signal.

11. The apparatus defined in claim 7, wherein:

said downstream control signal processing means associated with each external control unit means includes data storage means for storing data at one or more storage addresses;

the downstream control signal includes storage address data indicative of a storage address in said external control unit means; and said downstream control signal processing means associated with each external control unit means includes means for causing said associated data storage means to store the data indicated by the downstream control signal commencing at a storage address which bears a predetermined relationship to the storage address data indicated by the downstream control signal.

12. The apparatus defined in claim 5, wherein:

the first control signal includes data indicative of information to be transmitted from a subscriber device means to the head end;

said processing means associated with each external control unit means includes subscriber data storage means to receive and store the information indicated by the first control signal;

the downstream control signal includes read data indicative of a request to transmit to the head end the information stored in said subscriber data storage means; and said means associated with said external control unit means for applying the upstream control signal includes means responsive to the downstream control signal for enabling said means for applying the upstream control signal to apply to the cable network the upstream control signal including data indicative of the stored information.

13. The apparatus defined in claim 5, wherein:

the first control signal includes data indicative of information to be transmitted to the head end;

said processing means associated with each external control unit means includes accumulation and storage means to accumulate and store the information indicated by the first control signals applied to all of the drop cables associated with that external control unit means;

the downstream control signal includes send function data indicative of a request to transmit to the head end the accumulated information stored in said accumulation and storage means; and said means associated with said external control unit means for applying the upstream control signal includes means responsive to the send function data of the downstream control signal for enabling said means for applying the upstream control signal to apply to the cable network the upstream control signal including data indicative of the accumulated and stored information.

14. The apparatus of claim 4, wherein:

the first control signal includes data indicative of a request to view a pay-per-view program event;

the downstream control signal includes pay-per-view program event data indicative of the transmission of a pay-per-view program event and the portion of the television signal corresponding to that pay-per-view program event; and the downstream control signal processing means associated with each external control unit means includes means responsive to the pay-per-view program event data of the downstream control signal for applying to each associated drop cable the portion of the television signal indicated by the downstream control signal if the pay-per-view program event indicated by the downstream control signal corresponds to the pay-per-view program event request of the first control signal.

15. A cable television system for providing selected television signals to a plurality of remotely located subscriber premises, having a head end for producing a television signal and a cable network for conducting the television signal from the head end to a plurality of remote locations, each of which is adjacent but external to a respective subset of the subscriber premises, comprising:

external control unit means at each of the remote locations for receiving the television signal from the cable network;

a plurality of drop cables connected to each external control unit means, each drop cable conducting a selected portion of the television signal from the external control unit means to a respective one of the subscriber premises associated with that external control unit means;

subscriber device means connected to each drop cable at the subscriber premises for applying to the drop cable a control signal indicative of data to be transmitted to the external control unit means, at least one of said subscriber device means being a subscriber processing unit means for allowing the subscriber to apply to the drop cable a control signal including channel data indicative of the portion of the television signal which that subscriber wishes to select;

means associated with each external control unit means for processing the control signals applied to all the drop cables associated with that external control unit means, and for causing that external control unit means to apply to each associated drop cable the portion of the television signal indicated by the first control signal channel data received via the drop cable;

means associated with the head end for applying to the cable network a downstream control signal including channelization data indicative of a desired correlation between each portion of the television signal which can be selected by the subscriber and the channel data indicated by the first control signal used to select each portion of the television signal; and means associated with each external control unit means for receiving and storing the channelization data and for causing the external control unit means to apply to each associated drop cable the portion of the television signal which is correlated to the control signal channel data received via the drop cable, and for allowing the head end to modify, using the downstream control signal, the stored channelization data.

16. A cable television system for providing a television signal from a head end to subscribers, comprising:

means for generating a channel selection control signal indicative of the portion of the television signal which that subscriber wishes to select;

means associated with the head end for applying to the cable network a channelization control signal including data indicative of a desired correlation between each portion of the television signal which can be selected by the subscriber and the data indicated by the subsciber control signal used to select each portion of the television signal; and means associated with at least one subscriber and responsive to the channelization data for transmitting to the subscriber the portion of the television signal which is correlated to the channel selection data indicated by the channel selection control signal, said means responsive to the channelization data including alterable memory means for storing the channelization data, and means for allowing the head end to modify, using the channelization control signal, the channelization data stored by the memory means.

* * * * *

UNITED STATES PATENT AND TRADEMARK OFFICE
CERTIFICATE OF CORRECTION

PATENT NO. : 4,710,956

DATED : December 1, 1987

INVENTOR(S) : Robert M. Rast

It is certified that error appears in the above-identified patent and that said Letters Patent is hereby corrected as shown below:

Column 9, line 18, after "other" should be inserted -- + --.

Column 17, line 5, "5V" should be -- +5V --.

Column 42, line 45, "eevent" should be -- event --.

Column 43, line 38, "to" (second occurrence) should be deleted.

Column 45, line 7, "t" should be -- at --.

Column 46, line 37, "setp" should be -- step --.

Column 49, line 5, "the" (first occurrence) should be -- that --.

Claim 8, column 344, line 59, "1," should be -- 7, --.

Signed and Sealed this

Nineteenth Day of March, 1991

*Attest:*

HARRY F. MANBECK, JR.

*Attesting Officer* *Commissioner of Patents and Trademarks*